(12) United States Patent
Tracy et al.

(10) Patent No.: US 7,380,270 B2
(45) Date of Patent: May 27, 2008

(54) ENHANCED SYSTEM, METHOD AND MEDIUM FOR CERTIFYING AND ACCREDITING REQUIREMENTS COMPLIANCE

(75) Inventors: Richard P. Tracy, Ashburn, VA (US); Hugh Barrett, Centreville, VA (US); Lon J. Berman, Sterling, VA (US); Gary M. Catlin, Bricktown, NJ (US); Thomas G. Dimtsios, Freehold, NJ (US)

(73) Assignee: Telos Corporation, Ashburn, VA (US)

( * ) Notice: Subject to any disclaimer, the term of this patent is extended or adjusted under 35 U.S.C. 154(b) by 649 days.

(21) Appl. No.: 09/946,164

(22) Filed: Sep. 5, 2001

(65) Prior Publication Data

US 2003/0050718 A1    Mar. 13, 2003

Related U.S. Application Data

(63) Continuation-in-part of application No. 09/822,868, filed on Apr. 2, 2001, now Pat. No. 6,993,448, which is a continuation-in-part of application No. 09/794,386, filed on Feb. 28, 2001, now Pat. No. 6,901,346.

(60) Provisional application No. 60/223,982, filed on Aug. 9, 2000.

(51) Int. Cl.
*G06F 17/30* (2006.01)

(52) U.S. Cl. .................................. 726/3; 726/5; 726/6
(58) Field of Classification Search ........ 713/200–202; 726/1–36, 22, 23–25, 3, 5, 6
See application file for complete search history.

(56) References Cited

U.S. PATENT DOCUMENTS

| 5,032,979 | A | 7/1991 | Hecht et al. |
| 5,621,889 | A | 4/1997 | Lermuzeaux et al. |
| 5,625,751 | A | 4/1997 | Brandwajn et al. |
| 5,684,959 | A | 11/1997 | Bhat et al. |
| 5,699,403 | A | 12/1997 | Ronnen |
| 5,740,248 | A | 4/1998 | Fieres et al. |
| 5,796,942 | A | 8/1998 | Esbensen |
| 5,850,516 | A | 12/1998 | Schneier |
| 5,859,847 | A | 1/1999 | Dew et al. |

(Continued)

FOREIGN PATENT DOCUMENTS

EP    0999489    5/2000

(Continued)

OTHER PUBLICATIONS

Using model checking to analyze network vulnerabilities Ritchey, R.W.; Ammann, P.; Security and Privacy, 2000. S&P 2000. Proceedings. 2000 IEEE Symposium on May 14-17, 2000 pp. 156-165.*

(Continued)

*Primary Examiner*—David Y Jung
(74) *Attorney, Agent, or Firm*—Sonnenschein Nath & Rosenthal LLP

(57) ABSTRACT

A computer-assisted system, method and medium for enabling a user to select at least one of a plurality of predefined process steps to create a tailored sequence of process steps that can be used to assess the risk of and/or determine the suitability of a target system to comply with at least one predefined standard, regulation and/or requirement.

105 Claims, 67 Drawing Sheets

U.S. PATENT DOCUMENTS

| | | | |
|---|---|---|---|
| 5,892,900 | A | 4/1999 | Ginter et al. |
| 5,892,903 | A | 4/1999 | Klaus |
| 5,931,946 | A | 8/1999 | Terada et al. |
| 6,006,328 | A | 12/1999 | Drake |
| 6,134,664 | A | 10/2000 | Walker |
| 6,148,401 | A | 11/2000 | Devanbu et al. |
| 6,151,599 | A | 11/2000 | Shrader et al. |
| 6,185,689 | B1 | 2/2001 | Todd, Sr. et al. |
| 6,205,407 | B1 | 3/2001 | Testa et al. |
| 6,219,626 | B1 | 4/2001 | Steinmetz et al. |
| 6,219,628 | B1 | 4/2001 | Kodosky et al. |
| 6,219,805 | B1 | 4/2001 | Jones et al. |
| 6,230,105 | B1 | 5/2001 | Harris et al. |
| 6,256,773 | B1 | 7/2001 | Bowman-Amuah |
| 6,282,546 | B1 | 8/2001 | Gleichauf et al. |
| 6,298,445 | B1 | 10/2001 | Shostack et al. |
| 6,317,868 | B1 | 11/2001 | Grimm et al. |
| 6,324,647 | B1 | 11/2001 | Bowman-Amuah |
| 6,389,402 | B1 | 5/2002 | Ginter et al. |
| 6,405,364 | B1 | 6/2002 | Bowman-Amuah |
| 6,408,391 | B1 | 6/2002 | Huff et al. |
| 6,370,573 | B1 | 8/2002 | Bowman-Amuah |
| 6,473,794 | B1 | 10/2002 | Guheen et al. |
| 6,546,493 | B1 | 4/2003 | Magdych et al. |
| 7,020,697 | B1 | 3/2006 | Goodman et al. |
| 2001/0027389 | A1 | 10/2001 | Beverina et al. |
| 2001/0034847 | A1 | 10/2001 | Gaul, Jr. |
| 2002/0042687 | A1 | 4/2002 | Tracy et al. |
| 2002/0069035 | A1 | 6/2002 | Tracy et al. |
| 2002/0104014 | A1 | 8/2002 | Zobel et al. |
| 2002/0198750 | A1 | 12/2002 | Innes et al. |
| 2002/0199122 | A1 | 12/2002 | Davis et al. |
| 2003/0046128 | A1 | 3/2003 | Heinrich |
| 2003/0064717 | A1 | 4/2003 | Rajaram |
| 2003/0065793 | A1 | 4/2003 | Kouznetsov et al. |
| 2003/0159063 | A1 | 8/2003 | Apfelbaum et al. |
| 2003/0163728 | A1 | 8/2003 | Shaw |
| 2003/0172166 | A1 | 9/2003 | Judge et al. |
| 2004/0010709 | A1 | 1/2004 | Baudoin et al. |
| 2004/0025015 | A1 | 2/2004 | Satterlee et al. |
| 2004/0049698 | A1 | 3/2004 | Ott et al. |

FOREIGN PATENT DOCUMENTS

| | | |
|---|---|---|
| WO | WO 00/70463 | 11/2000 |
| WO | WO 01/37511 | 5/2001 |
| WO | WO 01/59989 | 8/2001 |
| WO | WO 01/99349 | 12/2001 |
| WO | WO 02/061544 | 8/2002 |

OTHER PUBLICATIONS http://www.ansto.gov.au/research/research_home/library/useful_links/standards,_regulations_and_test_methods.html, year 2007.* http://www.hitrust.com.hk/whitepaper/whitepaper_Security_Intelligence_and_ControlSM_Services_the_New_Age_of_Information_Security.pdf, year 2007.*

Responsible agent behavior: a distributed computing perspective Mamdani, E.; Pitt, J.; Internet Computing, IEEE vol. 4, Issue 5, Sep.-Oct. 2000 pp. 27-31.*

Tests and tolerances for high-performance software-implemehted fault detection Turmon, M.; Granat, R.; Katz, D.S.; Lou, J.Z.; Computers, IEEE Transactions on vol. 52, Issue 5, May 2003 pp. 579-591.*

Validation of Component-Based Software with a Customer Centric Domain Level Approach Skroch, Oliver; Engineering of Computer-Based Systems, 2007. ECBS '07. 14th Annual IEEE International Conference and Workshops on the Mar. 26-29, 2007 pp. 459-466.*

International Search Report from PCT Application No. PCT/US02/09842.

Polk, W.T. Dec. 1992. "Automated Tools for testing computer system vulnerability (Abstract)." National Institute of Standards & Technology. Washington, DC.

Hochberg, Judith, Kathleen Jackson, Cathy Stallings, J.F. McClary, David Dubois, and Josephine Ford. May 3, 1993. "NADIR: An automated system for detecting network instrusion and misuse (Abstract)." Computers & Security, vol. 12, No. 3, pp. 235-248.

U.S. Appl. No. 09/794,386, filed Feb. 28, 2001, Tracy et al.

U.S. Appl. No. 09/822,868, filed Apr. 02, 2001, Tracy et al.

Baskerville, Richard. Dec. 4, 1993. "Information Systems Security Design Methods: Implications for Information Systems Development." ACM Computing Surveys, vol. 25, No. 4, pp. 375-414.

Zhou, Qin, J. Davidson, and A.A. Fouad. Feb. 1994. "Application of artificial neural networks in power system security and vulnerability assessment (Abstract)." IEEE Transactions on Power Systems, vol. 9, No. 1, pp. 525-532.

Jackson, K. A., J. G. Hochberg, S. K. Wilhelmy, J. F. McClary, and G. G. Christoph. May 3-5, 1994. "Management issues in automated audit analysis (Abstract)." Los Alamos National Lab, Department of Energy computer security group training conference, Denver, Colorado.

Jackson, K. A., M. C. Neuman, D. D. Simmonds, C. A. Stallings, and J. L. Thompson. May 1-4, 1995. "Misuse and intrusion detection at Los Alamos National Laboratory (Abstract)." Department of Energy computer security group training conference (17$^{th}$). Milwaukee, Wisconsin.

Casella, K. A. Sep. 17-22, 1995. "Security administration in an open networking environment (Abstract)." Proceedings of the Ninth Systems Administration Conference, pp. 67-73. Monterey, California.

Doty, T. Fall 1995. "Test Driving SATAN (Abstract)." Computer Security Journal, vol. 11, No. 2, pp. 9-14.

Karygiannis, T. Mar. 23-25, 1998. "Network security testing using moblie agents (Abstract)." Proceedings of the Third International Conference on the Practical Application of Intelligent Agents and a Multi-Agent Technology, pp. 625-626. London, United Kingdom.

Gimble, T. F., M. F. Ugone, C. A. Miggins, D.L. Dixon, and K. Fitzpatrick. Jun. 3, 1998. "Information Assurance for the Defense Civilian Personnel Data System—Washington, Headquarters Services (Abstract)." Audit Report, Department of Defense, Office of the Inspector General. Washington, DC.

Swiler, L. P. and C. Phillips. Jun. 30, 1998. "Graph-based system for network-vulnerability analysis (Abstract). " USDOE Office of Financial Management and Controller. Washington DC.

Rudd, Alan, Joel McFarland, and Scott Olsen. Aug. 1998. "Managing security vulnerabilities in a networked world (Abstract)." Journal of Digital Imaging, vol. 11, No. 3, Suppl. 1, pp. 216-218.

Mar. 1999. "DoD Information Technology Security Certificate and Accreditation Process (DITSCAP) (on CD-ROM) (Abstract)." Defense Information Systems Agency. Arlington, Virginia.

Levine, Diane E. May 24, 1999. "CyberCop Patrols on Linux: Network Associates Scanner Detects Security, System Vulnerabilities." *Information Week*.

Jun. 1999. "Intrusion detection [mark survey] (Abstract)." *Secure Computing (International Edition)*, pp. 58-60, 62, 64, 66, 68. United Kingdom.

Rogers, Amy. Jul. 9, 1999. "Testing for Network Vulnerabilities: VARs Can Build Lucrative Practices Around Emerging Products." *ChannelWEB*.

Mixer, R.A. Jul. 26, 1999. "Common Database Format for Network Security Data (Master's Thesis) (Abstract)." Air Force Institute of Technology, Wright Patterson AFB, Ohio.

Apr. 2000. "Secure Strategies: A Year Long Series On The Fundamentals of Information Systems Security." www.infosecuritymag.com/articles/april00/features4.shtml Mayer, A., A. Wool, and E. Ziskind. May 14-17, 2000. "Fang: A firewall analysis engine (Abstract)." Proceeding 2000 IEEE Symposium on Security and Privacy, pp. 177-187. Berkeley, California.

Korzeniowski, Paul. Aug. 2000. "Audit and Assessment: Ironclad Security." www.infosecuritymag.com/articles/august00/columns6.shtml.

Nov. 8, 2000. "BMC Software Automates Security Management for E-businesses; Provides Customers with Automated Access Management and E-business Information Security (Abstract)." *Business Wire*, p. 084. Houston, Texas.

Mendelson, Edward. Dec. 5, 2000. "The Danger Within." *PC Magazine*.

Dec. 18, 2000. "TruSecure Adopts Sanctum Inc.'s Web Application Security Audit Solution; Sanctum's Powerful Web Application Security Audit Software Complements TruSecure's Security Program (Abstract)." *Business Wire*, p. 0121. Santa Clara, California.

Shipley, G. Jan. 8, 2001. "Vulnerability assessment scanners (Abstract)." *Network Computing*, vol. 12, No. 1, pp. 51-65.

May 3, 2001. "Mixing Solutions to Garner Full Assessments: Vulnerability Assessment Tools." *Channel WEB*.

Mohamed, Baith. Jun. 19-22, 2001. "An effective modified security auditing tool (SAT)(Abstract)." Proceedings of the 23rd International Conference on Information Technology Interfaces, part vol. 1, pp. 37-41. Pula, Croatia.

Gilliam, D. P., J. C. Kelly, J. D. Powell, and M. Bishop. Jun. 20-22, 2001. "Development of a software security assessment instrument to reduce software security risk (Abstract)." Proceedings Tenth IEEE International Workshop on Enabling Technologies: Infrastructure for Collaborative Enterprises, pp. 144-149. Cambridge, Massachusetts.

Langa, Fred. Jun. 11, 2001. "Good and Bad Online Security Check-Ups." InformationWeek.com.

Chi, Sung-Do, Jong Sou Park, Ki-Chan Jung, and Jang-Se Lee. Jul. 2001. "Network security modeling and cyber attack simulation methodology (Abstract)." Information Security and Privacy. 6th Australasian Conference, ACISP 2001 Proceedings, pp. 320-333. Sidney, NSW, Australia.

Aug. 22, 2001. "Xacta Detect Installation Guide." Xacta Corporation.

Aug. 29, 2001. "Xacta Web C & A™ 2001 System Administrator Guide." Xacta Corporation.

Aug. 29, 2001. "Xacta Web C & A™ 2001 Installation Guide." Xacta Corporation.

Hulme, George V. Sep. 21, 2001. "Sanctum Adds Audit-Automation Tools to Security Software: Sanctum Introduces Enhanced Version of AppScan Software, Which Automates the Auditing of Web Applications for Holes that Hackers Could Use to Break Into Systems." InformationWeek.com.

Wang, Rong, Feiyi Wang, and G. T. Byrd. Oct. 15-17, 2001. "Design and implementation of acceptance monitor for building scalable intrusion tolerant system (Abstract)." Proceedings Tenth Annual International Conference on Computer Communications and Networks, pp. 200-205. Scottsdale, Arizona.

Fisher, Dennis. Oct. 29, 2001. "HP Expands Security Practice." *EWEEK*.

Sidel, Scott and Andy Briney. Feb. 2002. "Patching Across the Enterprise" www.infosecuritymag.com/2002/feb/features_sidebar1.shtml.

Hulme, George V. Mar. 14, 2002. "Hercules' Strength is Security Automation: Citadel's New Tool Gathers Info from Software-Vulnerability Scanners and Downloads Available Patches." InformationWeek.com.

Hulme, George V. Mar. 18, 2002. "Herculean Help For Patching: Tool Collates Vulnerabilities and Aids with Patch Deployment." InformationWeek.com.

Sturdevant, Cameron. Apr. 8, 2002. "Top Layer Testing." *EWEEK*.

Machrone, Bill. Apr. 22, 2002. "Syscheck: System Tests and Port Scanners." *ExtremeTech*.

Machrone, Bill. Apr. 22, 2002. "Syscheck: Network Tests." *ExtremeTech*.

Fischer, Dennis. May 20, 2002. "Enforcer Keeps Far-flung Systems in Check." *EWEEK*.

Dyck, Timothy. May 20, 2002. "App Scanning Helps Secure Weak Spots." *EWEEK*.

Rapoza, Jim. May 20, 2002. "Foundscan Roots Out Problems." *EWEEK*.

Musich, Paula. May 28, 2002. "Loudcloud Automates Patch Management." *EWEEK*.

Karagiannis, Konstantinos. Jun. 20, 2002. "Finding and Fixing Network Vulnerabilities." *PC Magazine*.

Jul. 29, 2002. "Best Practices and Beyond. (Industry Speaks)." *Government Computer News*, vol. 21, No. 21, p. S14(6).

James, Robert. Sep. 2002. "Hercules: Citadel provides some muscle to vulnerability scanners." www.infosecuritymag.com/2002/sep/testcenter.shtml.

Briney, Andrew. Oct. 2002. "Automating Policies: New Software Tools Relieve the Headache of Policy Management." www.infosecuritymag.com/2002/oct/policytools.shtml.

Wood, Lamont. Oct. 24, 2002. "Smart Security: Network Scanners." *Tech Update*.

Greenemeier, Larry. Nov. 4, 2002. "Certified Secure." InformationWeek.com.

Hulme, George V. Nov. 11, 2002. "Discover Security Threats Faster: E-Security's New Tool Helps Companies Quickly Identify Problems Before an Attack Occurs." InformationWeek.com.

Nov. 11, 2002. "Microsoft Gets Security Approval." *Federal Computer Week*.

2002. "ActiveSentry™ 3.0 (Security You Can See)." *Intranode Software Technologies*, pp. 1-19.

2002. "Managed Vulnerability Assessment: A Proactive Approach to Network Security." www.qualys.com.

2002. "SecureScan SP." www.vigilante.com.

2002. "Xacta Web C & A™ User Guide Version 3.3." Xacta Corporation.

Dec. 26, 1985. "Department of Defense Trusted Computer System Evaluation Criteria." DoD 5200.28-STD.

Jul. 31, 2000. "Department of Defense Information Technology Security Certification and Accreditation Process (DITSCAP): Application Manual." DoD 8510.1-M.

Jan. 23, 2003. International Search Report from PCT/US02/28179 (note that all references were cited previously in an IDS submission filed on Apr. 14, 2003).

Apr. 11, 2003. International Preliminary Examination Report from PCT/US00/09842 (note that all references were cited previously in IDS submissions on Jul. 29, 2002 and Nov. 12, 2002).

International Search Report from related International Application No. PCT/US2003/037608, dated Jun. 17, 2004.

International Search Report from related International Application No. PCT/US03/37603, dated Oct. 25, 2004.

Xacta™ Corporation. Aug. 2001. *Xacta Web C&A™ 2001 User Guide: DITSCAP/NIACAP*. Ashburn, VA: Xacta Corporation.

Linger, Richard C. Nov. 2000. "Systemic Generation of Stochastic Diversity as an Intrusion Barrier in Survivable Systems Software." Carnegie Mellon University. http://www.sei.cmu.edu/programs/nss/stochastic-divers.html.

The Software Engineering Institute (SEI). Nov. 2000. "Operationally Critical Threat, Asset, and Vulnerability Evaluation (Octave) Framework. Version 1.0." Carnegie Mellon University. http://www.sei.cmu.edu/publications/documents/99.reports/99tr017/99tr017chap01.html.

The Software Engineering Institute (SEI). Nov. 2000. "Survivable Network Analysis." Carnegie Mellon University. http://www.sei.cmu.edu/organization/programs/nss/analysis-method.html.

Xacta™ Corporation. Sep. 2000. *Web C&A™*. Ashburn, VA: Xacta Corporation.

Winkler, Ira, Al Berg, George Kurtz, Chris Prosise, and Dan Swanson. Jul. 2000. "Audits, Assessments & Tests (Oh My)." http://www.infosecuritymag.com/july2000/audits.html.

Dorobek, Christopher J. May 2000. "Project Matrix Identifies How Systems Interact." *Government Computer News*. Post-Newsweek Tech Media Group, Inc. http://www.gcn.com/vol19_no11/news/1974-1.html.

Government Computer News. May 2000. "CIO Council Launches Security Best Practices Web Site." Post-Newsweek Tech Media Group, Inc. http://www.gcn.com/vol1_no1/daily-updates/2067-1.html.

Government Computer News. Aug. 1999. "Scanner Suite Increases its Risk Assessment Tool Features." Post-Newsweek Tech Media Group, Inc. http://www.gcn.com/vol18_no28/com/495-1.html.

FDIC. Jul. 1999. "Risk Assessment Tools and Practices for Information System Security." http://www.fdic.gov/news/financial/1999/FIL9968a.html.

Fisher, David A., and Howard F. Lipson. Jan. 1999. "Emergent Algorithms: A New Method for Enhancing Survivability in Unbounded Systems." *Proceedings of the Hawaii International Conference On Systems Sciences.* Maui, Hawaii: IEEE. http://www.sei.cmu.edu/organization/programs/nss/emergent-algor.html.

Ellison, R. J., R. C. Linger, T. Longstaff, and N. R. Mead. Sep. 1998. *A Case Study in Survivable Network System Analysis.* Pittsburgh, PA: Carnegie Mellon Software Engineering Institute.

Linger, R. C., N. R. Mead, and H. F. Lipson. 1998. "Requirements Definition for Survivable Network Systems." IEEE. http://www.sei.cmu.edu/programs/nss/icre.html.

Ellison, Robert J., David A. Fisher, Richard C. Linger, Howard F. Lipson, Thomas A. Longstaff, and Nancy R. Mead. 1998. "Survivability: Protecting Your Critical Systems." *Proceedings of the International Conference on Requirements Engineering.* Colorado Springs, CO: IEEE. http://www.sei.cmu.edu/programs/nss/project-critical-systems.html.

Valletta, Anthony M. Dec. 1997. "DoD Information Technology Security Certification and Accreditation Process (DITSCAP)." *Department of Defense Instruction.* Doc. No. 5200.40.

Bassham, Lawrence E., and Timothy Polk. "Threat Assessment of Malicious Code and Human Computer Threats." Oct. 1992. National Institute of Standards and Technology. http://www.it.kth.se/~cwe/wastebin/threat-assess.html.

"System Accreditation." http://bsp.cio.gov/getlife.cfm?messageid=000.

Ellison, Robert J., Richard C. Linger, Thomas Longstaff, and Nancy R. Mead. "Survivable Network System Analysis: A Case Study." Carnegie Mellon University.

* cited by examiner

802 — [Network]
802a — Name = Xacta

806 — [Segment]
807 — Name = Office

806a — Network = Xacta
806b — IPRange = 192.168.0.0-255
806c — ScanDate = 12-01-2000
806d — ScanDate = 12-15-2000

⟵ 806

808 — [Host]
808a — IPAddress = 192.168.0.10
808b — MAC = 01 02 03 04 05 06
808c — Hostname = Banana
808d — OS = Windows 98
808e — Version = 2

810 — [Host]
810a — IPAddress = 192.168.0.20
810b — MAC = 01 02 03 08 00 09
810c — Hostname = Peach
810d — OS = Windows NT
810e — Version = 4.0
810f — Mfr = HP
810g — Model = Vectra XJ12
810h — CPU = Pentium II
810i — CPU Qty = 1
810j — CPU Speed = 400 MHz
810k — RAM = 128 MB
810l — Disk Space = 60 GB
810m — Software = Microsoft Office 8.0
810n — Software = Autocad 14.1
810o — Software = Adobe Acrobat 3.0
810p — Software = Roadhog 1.1

(Screenshot of "Edit Platform Category - Microsoft Internet Explorer")

Address: http://webdev:81/webca30/WebcaController?next=ModifyPlatformCategory&PlatID=1

XACTA WEB C&A™ 2001

- I. Information Gathering
- II. Requirements Analysis
- III. Testing

Edit Platform Category ? help  examples

PROJECT: Test Web C&A 2001

- Platform Category*: Product Development V
- Description: Product development Web server is use by PD for developing and testing web based solution for vertical market sales
- Estimated Quantity: 3
- Test Strategy*: —Select One—
- IP Address Range: 10.4.40.23-10.4.40.25

STAGE: I. Information Gathering

Hardware Specs

- Hardware Family*: Server
- Manufacturer: Dell
- Model: PowerEdge 1300
- Serial Number: ZX24S
- Location: Product Development Labor
- CPU Type: Intel pentium III  CPU Number: Intel pentium  Visual ID: WebDev  CPU Speed: 700Mhz
- RAM: 512 Meg
- Disk Size: 18 GB
- Disk Description: 29 Gigabyte SCSI-II Drives, No Raid
- Other Storage: 60 Gigabyte Streaming tape system
- Display: 19 inch KDS SVGA
- Other Hardware:

STEPS:
1. Project Definition
2. System Parameters
3. System Security
4. Project Personnel
5. Project Milestones
6. System Users
7. Platform Categories
8. Software Inventory
9. Equipment Inventory
10. System Interfaces
11. System Data Flow
12. Accreditation Boundary
13. System Environment 1002, 1004, 1006, 1008, 1010, 1014

|   | THREAT CATEGORY | SUB-CATEGORY | SUB-SUB-CATEGORY |
|---|---|---|---|
| 1 | NATURAL DISASTER | FIRE | |
| 2 | | FLOOD | |
| 3 | | EARTHQUAKE | |
| 4 | | VOLCANO | |
| 5 | | TORNADO | |
| 6 | | LIGHTNING | |
| 7 | SYSTEM FAILURE | HARDWARE | |
| 8 | | POWER | |
| 9 | | COMMUNICATION LINK | |
| 10 | ENVIRONMENTAL FAILURE | TEMPERATURE | |
| 11 | | POWER | |
| 12 | | HUMIDITY | |
| 13 | | SAND/DUST | |
| 14 | | SHOCK/VIBRATION | |
| 15 | HUMAN UNINTENTIONAL | SOFTWARE DESIGN ERROR | |
| 16 | | SYSTEM DESIGN ERROR | |
| 17 | | OPERATOR ERROR | SYSTEM ADMINISTRATOR |
| 18 | | | REGULAR USER |
| 19 | | | MAINTENANCE PERSONNEL |
| 20 | HUMAN INTENTIONAL | AUTHORIZED PERSONNEL | SYSTEM ADMINISTRATORS |
| 21 | | | MAINTENANCE PERSONNEL |
| 22 | | | REGULAR USERS |
| 23 | | UNAUTHORIZED USERS | TERRORISTS |
| 24 | | | HACKERS |
| 25 | | | SABOTEURS |
| 26 | | | THIEVES |
| 27 | | | VANDALS |
| 28 | | PHYSICAL COMBAT | |
| 29 | | ELECTRONIC WARFARE | |

| IF A CHARACTER POSITION IN THE PROJECT THREAT PROFILE STRING IS: | AND THE CORRESPONDING CHARACTER POSITION IN THE THREAT CORRELATION STRING IS: | THEN THE CORRESPONDING CHARACTER POSITION IN THE RISK PROFILE STRING IS: |
|---|---|---|
| N | ANYTHING | N |
| L | N | L |
| L | L | L |
| L | M | L |
| L | H | M |
| M | N | N |
| M | L | L |
| M | M | M |
| H | N | N |
| H | L | M |
| H | M | H |
| H | H | H |

Set Project Notification

Organization: A — 4702
Project: WPM Project — 4704

| Work Product | Description | Set Notification |
|---|---|---|
| Definition | Open new project, enter basic information, complete SSAA Section 1 | 🖋 |
| Requirements | Confirm applicable regulations, add custom requirements (if any) to SRTM, publish draft SRTM, complete SSAA Section 4. | 🖋 |
| Components | Enter information on hardware, software, interface, data flows, and accreditation boundary; complete SSAA Sections 3, 5; publish Appendix I (Artifacts) | 🖋 |
| Cert Level | Determine Certification Level | 🖋 |
| Project Plan | Enter project milestone information and complete SSAA Section 6 | 🖋 |
| Environment | Enter system environment information and complete SSAA Section 2 | 🖋 |

FIG. 47

Enter Notification for Work Product

Work Product: Definition ~ 4802
Title (User)* [Approver(Jones,Robert) ▽] ~ 4904

Select notification for this user when workproduct is:

- Opened: ⦿ Yes ○ No
- Submitted: ⦿ Yes ○ No
- Re-Opened: ⦿ Yes ○ No
- Approved: ⦿ Yes ○ No
- Disapproved: ⦿ Yes ○ No

[SAVE] 4910    [RESET] 4912    [CANCEL] 4914

FIG. 49

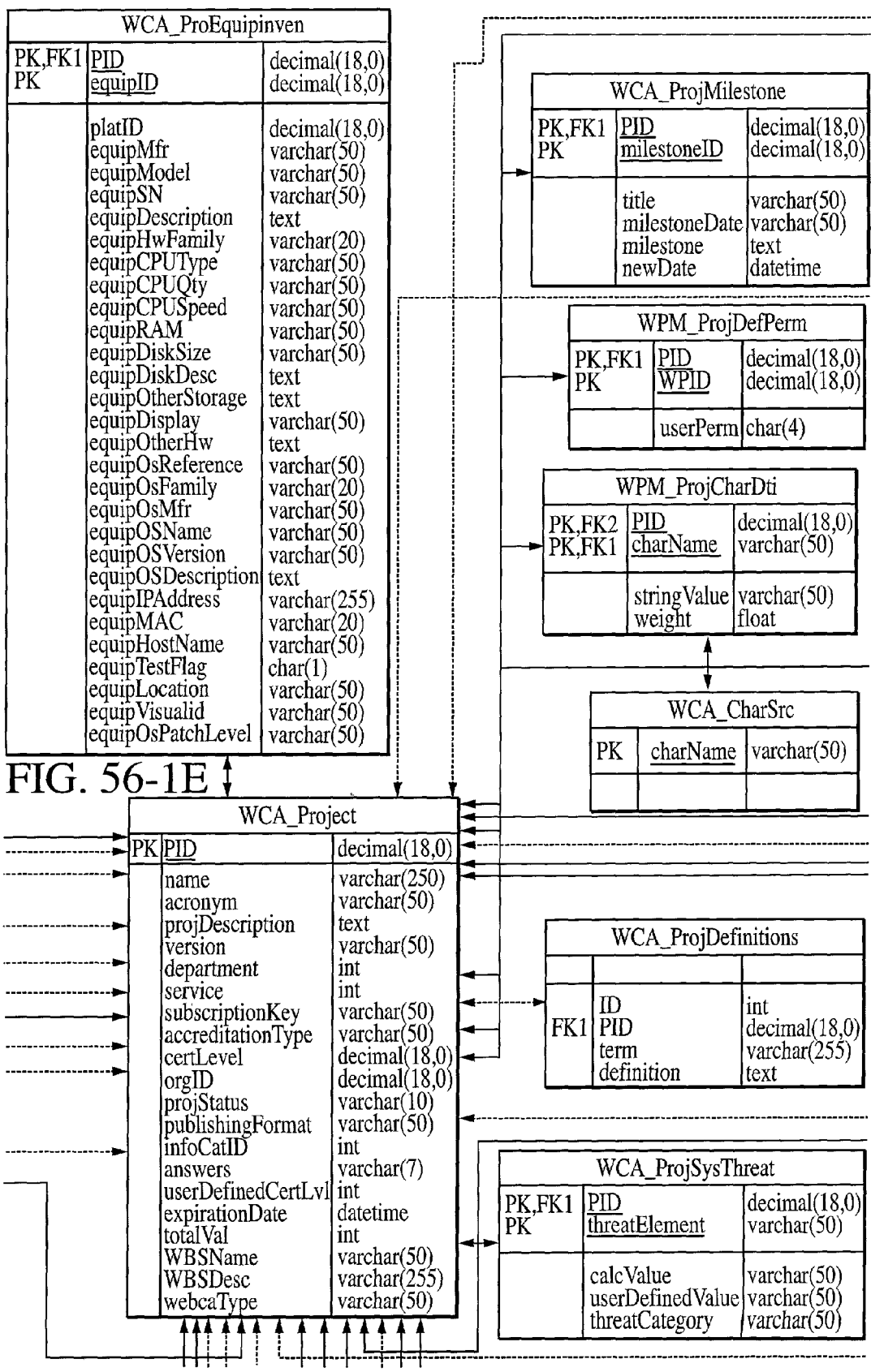

FIG. 56-2A

WCA_DocTmplSrc

| PK | instance | Int |
| PK | document | varchar(50) |
| PK | paragraph | varchar(255) |
| PK | applPubFormat | varchar(50) |
|  | dtsText | text |
|  | notes | varchar(50) |

WCA_ApplEventSrc

| PK | EventID | varchar(50) |
|  | StageName | varchar(50) |
|  | Category | varchar(50) |
|  | Severity | char(30) |
|  | PubFormat | varchar(10) |

WCA_AuditLog

| PK | id | int |
|  | PID | int |
|  | ProjectName | varchar(250) |
|  | TableName | varchar(25) |
|  | KeyValues | varchar(250) |
|  | StageName | varchar(50) |
|  | ProcessStep | varchar(255) |
|  | PageID | varchar(50) |
|  | UserID | decimal(18,0) |
|  | IPAddress | varchar(16) |
|  | ActionDesc | text |
|  | ActionStatus | char(20) |
|  | ActionTime | datetime |
|  | EventType | varchar(50) |
|  | ErrorMessage | text |
|  | UserName | varchar(25) |
|  | orgID | decimal(18,0) |
|  | orgName | varchar(50) |
|  | sessionID | varchar(50) |

WCA_PageAttrs

| PK | pageID | varchar(50) |
|  | stgID | decimal(18,0) |
|  | appPageTitle | varchar(50) |
|  | appPageHeading | varchar(50) |
|  | processStep | varchar(50) |
|  | prevStep | varchar(50) |
|  | nextStep | varchar(50) |
|  | servlet | varchar(255) |

WCA_LevelDetermin

| PK | ID | int |
|  | weightedTotalMin | float |
|  | weightedTotalMax | float |
|  | class | int |
|  | description | varchar(255) |
|  | applPubFormat | varchar(50) |

WCA_HWFamilyLookup

| PK | hwID | decimal(18,0) |
|  | hwFamily | varchar(50) |
|  | rank | int |
|  | type | char(10) |

WCA_SWSource

| PK | swReference | varchar(50) |
|  | swFamily | varchar(20) |
|  | swMfr | varchar(50) |
|  | swName | varchar(50) |
|  | swVersion | varchar(50) |
|  | swPatchLevel | varchar(50) |
|  | Type | char(1) |

WCA_HelpExampleSrcOld

| PK | ID | int |
| PK | applPubFormat | varchar(50) |
|  | page | varchar(50) |
|  | type | varchar(50) |
|  | title | varchar(100) |
|  | helptext | text |
|  | height | int |
|  | width | int |
|  | seeAlso | int |
|  | pageID | varchar(50) |
|  | heading | varchar(100) |
|  | stgID | decimal(18,0) |
|  | paragraph | varchar(50) |

WCA_MinSeCkListSrc

| PK | sectionName | varchar(255) |
| PK | question | varchar(50) |
|  | testText | text |
|  | questionSort | decimal(18,0) |
|  | applPubFormat | varchar(50) |
|  | validQuestion | char(1) |

WCA_ClassWeight

| PK | ID | int |
|  | characteristic | varchar(255) |
|  | alternative | varchar(255) |
|  | weight | float |
|  | applPubFormat | varchar(50) |

WCA_SeqReqCritQ

|  | secRegCritQID | int |
|  | code | varchar(255) |
|  | message | varchar(255) |

WPM_WPPrereqSrc

| PK | WBSID | decimal(18,0) |
| PK | WPID | decimal(18,0) |
| PK | prereqWPID | decimal(18,0) |

WCA_OSSource

| PK | osReference | varchar(50) |
|  | osFamily | varchar(20) |
|  | osMfr | varchar(50) |
|  | osName | varchar(50) |
|  | osVersion | varchar(50) |
|  | osPatchLevel | varchar(50) |
|  | Type | char(1) |

WCA_MarketLookup

|  | marker | varchar(50) |
|  | sqlStatement | varchar(1000) |
|  | retrievalType | varchar(50) |
|  | errorMessageText | varchar(255) |

| FIG. 56-1A | FIG. 56-1D |
| FIG. 56-1B | FIG. 56-1C |

| WCA_LookupMgr | |
|---|---|
| PK tableName | varchar(50) |
| PK columnName | varchar(50) |
| webCaLookupsID | decimal(18,0) |
| lkupDescription | varchar(50) |
| w/Size | decimal(18,0) |
| displayable | char(1) |
| required | char(1) |
| valuesLkTableName | varchar(30) |

| WPM_State | |
|---|---|
| PK state | varchar(15) |
| status | int |

| WPM_StateTranLkp | |
|---|---|
| PK eventID | varchar(15) |
| PK InitialStatus | int |
| PK FinalStatus | int |

| WCA_OsFamilyLookup | |
|---|---|
| PK osID | decimal(18,0) |
| osFamily | varchar(50) |
| rank | int |
| type | char(10) |

| WCA_InfoCategory | |
|---|---|
| PK InfoCatID | int |
| InfoCatName | varchar(60) |
| InfoCatValue | varchar(5) |
| rank | int |
| weight | float |

| WCA_TestProcSrc | |
|---|---|
| PK templateID | decimal(18,0) |
| cat1 | varchar(50) |
| cat2 | varchar(50) |
| cat3 | varchar(50) |
| osType | varchar(50) |
| testText | text |
| expectedResult | text |
| testinstance | varchar(50) |
| testTitle | varchar(100) |
| certAnalysisLevel | decimal(10,0) |
| threat | varchar(50) |
| impactStatement | text |
| interviewFlag | char(1) |
| observationFlag | char(1) |
| testFlag | char(1) |
| documentFlag | char(1) |
| testCategoryID | decimal(18,0) |

| WPM_WPSrc | |
|---|---|
| PK WBSID | decimal(18,0) |
| PK WPID | decimal(18,0) |
| WPName | varchar(50) |
| WPDesc | varchar(255) |
| WPRank | decimal(18,0) |

| WPM_EventRulesSrc | |
|---|---|
| PK WBSID | decimal(18,0) |
| PK WPID | decimal(18,0) |
| PK eventID | varchar(15) |
| eventParam | varchar(1000) |

| TableKeys | |
|---|---|
| PK TableName | varchar(30) |
| PK ColumnName | varchar(30) |
| KeyValue | decimal(18,0) |

| WCA_SwFamilyLookup | |
|---|---|
| PK swID | decimal(18,0) |
| swFamily | varchar(50) |
| rank | int |
| type | char(10) |

| WCA_SysUserCategory | |
|---|---|
| PK sysUserCategory | int |
| category | |
| categoryType | |

| WCA_DocParaTTLSrc | |
|---|---|
| title | varchar(60) |
| paragraph | varchar(50) |
| document | varchar(50) |
| applPubFormat | varchar(50) |
| paragraphLevel | int |
| paragraphType | varchar(50) |

| AppProps | |
|---|---|
| PK propName | varchar(255) |
| PK AppName | varchar(20) |
| PropVal | varchar(255) |

| WPM_PSSrc | |
|---|---|
| PK WBSID | decimal(18,0) |
| PK WPID | decimal(18,0) |
| PK processStep | varchar(60) |
| PSRank | decimal(18,0) |
| PSName | varchar(50) |
| PSDesc | varchar(255) |
| pageID | varchar(50) |

| UserPwdHistory | |
|---|---|
| PK userID | decimal(18,0) |
| PK userPassword | varchar(50) |
| lastModified | datetime |

| WCA_MLSecClass | |
|---|---|
| ID | int |
| maxDateClass | varchar(255) |
| minUserClear | varchar(255) |
| case1 | varchar(255) |
| case2 | varchar(255) |
| case3 | varchar(255) |

| AuditObjects | |
|---|---|
| id | int |
| tableName | varchar(25) |
| tableKeys | varchar(4000) |
| tableAction | varchar(25) |

| WCA_PublishFmt | |
|---|---|
| publishingCode | char(2) |
| pfDescription | varchar(60) |

…
ENHANCED SYSTEM, METHOD AND MEDIUM FOR CERTIFYING AND ACCREDITING REQUIREMENTS COMPLIANCE

RELATED APPLICATIONS

This application is a continuation in part of application Ser. No. 09/822,868, filed Apr. 2, 2001, entitled "System, Method and Medium for Certifying and Accrediting Requirements Compliance" which in turn is a continuation in part of application Ser. No. 09/794,386, filed Feb. 28, 2001, entitled "System, Method And Medium For Certifying and Accrediting Requirements Compliance", which in turn claims priority to application Ser. No. 60/223,982, filed Aug. 9, 2000, entitled "Web Certification and Accreditation System, Method and Medium", each of which are assigned to the assignee of this application and incorporated herein by reference.

BACKGROUND OF THE INVENTION

1. Field of the Invention

The present invention relates generally to the field of certification and accreditation (C&A) and, more particularly, to a computer-implemented system method and medium for C&A that automates target system configuration discovery and enables users to tailor a sequence of requirements and/or activities that can be used to assess the risk of and/or determines the suitability of a target system to comply with at least one predefined standard, regulation and/or requirement.

2. Background Description

The general purpose of C&A is to certify that automated information systems adequately protect information in accordance with data sensitivity and/or classification levels. In accordance with Department of Defense (DoD) Instruction 5200.40, dated Dec. 30, 1997, entitled DoD Information Technology Security Certification and Accreditation Process (DITSCAP), which is incorporated herein by reference in its entirety, certification can be defined as the comprehensive evaluation of the technical and non-technical features of an information technology (IT) system and other safeguards, made in support of the accreditation process, to establish the extent that a particular design and implementation meets a set of specified security requirements. Similarly, as used herein, accreditation can be defined as a formal declaration by a designated approving authority that an IT system is approved to operate in a particular security mode using a prescribed set of safeguards at an acceptable level of risk. In general, DISTSCAP is utilized by the DoD for identifying and documenting threats and vulnerabilities that pose risk to critical information systems. DITSCAP compliance generally means that security risk posture is considered acceptable and that potential liability for system "owners" is mitigated.

The C&A process typically involves a number of policies, regulations, guidelines, best practices, etc. that serve as C&A criteria. Conventionally, the C&A process is typically a labor intensive exercise that can require multiple skill sets over a period of time typically spanning 6-12 months. In particular, collecting data pertaining to a network configuration undergoing C&A is done manually by, for example, entering a system hardware configuration, operating system and/or application software package(s) associated with each node (e.g., IP address) on a network undergoing C&A. Several organizations and/or individuals may also be involved in the processes of selecting applicable standards, regulations and/or test procedures, and assembling test results and other information into a DITSCAP compliant package. There is therefore a need to substantially automate the network configuration data collection process, and format the data so that it can be used with, for example, a C&A system that substantially automates the process of performing security risk assessments, certification test procedure development, system configuration guidance, and residual risk acceptance.

SUMMARY OF THE INVENTION

To address the deficiencies of conventional schemes as indicated above, at least some embodiments of the present invention provide a system, method and medium that automates or substantially automates, and can provides users the ability to customize, the security C&A process in a manner that enhances and facilitates security risk assessments, certification test procedure development, system configuration guidance, and/or residual risk acceptance.

In an exemplary embodiment, the C&A process can be automated in accordance with, for example, any of DoD's DITSCAP requirements, National Information Assurance Certification and Accreditation Process (NIACAP) requirements, and U.S. Treasury/Internal Revenue Service (IRS) requirements. The present invention is not, however, limited to these requirements/standards, applications and/or environments, and may also be used in conjunction with other government and civilian/private sector organizations requiring risk management and guidance.

An exemplary embodiment according to the present invention contemplates a browser based solution that automates, for example, at least the DITSCAP, NIACAP, and IRS security processes. At least some embodiments of the present invention envision use of five primary elements: 1) gathering information, 2) analyzing requirements, 3) testing requirements, 4) performing risk assessment, and 5) generating certification documentation based on an assessment of the first four elements. In an exemplary first embodiment, predefined steps for executing these five elements are provided. In an exemplary second embodiment, users have the ability customize one or more of the five elements by, for example, selecting a portion of the predefined steps associated with one or more of the five primary elements associated with the first embodiment. Additional features of at least some embodiments of the present invention pertain to automatically sending e-mail alerts upon, for example, the occurrence of certain C&A-related events, a program management feature where one or more steps or events can be designated as being prerequisite to commencement of one or more other steps or events, and/or substantially automating network configuration discovery and formatting of the network configuration data for use with the five elements.

Still referring to the five elements mentioned above, the information gathered primarily relates to a description of a target system to be certified, and its respective components and operating environment (e.g., workstation manufacturer and model, operating system and version, secret, or top secret operating environment, etc.). The requirements analysis generally involves selecting a list of standards and/or regulations with which the system must or should comply. The user may optionally input his or her own standards/regulations and/or additional requirements. Once information is gathered and the requirements analysis is provided, the system intelligently selects a set of test procedures against which the system is tested. The user can also optionally add or delete test procedures to those initially selected by the system. Upon completion of testing, the risk assessment provides as output an estimate of the risk level for each individual test failed. Each of the failed tests are also collectively considered and used to evaluate the risk level of the target system as a whole. Then, documentation can be printed that includes information pertaining to the first four elements that would enable an accreditation decision to be made based on the inputs and outputs respectively provided and generated in the first four elements.

It is to be understood that the invention is not limited in its application to the details of construction and to the arrangements of the components set forth in the following (or previous) description or illustrated in the drawings. The invention is capable of other embodiments and of being practiced and carried out in various ways.

BRIEF DESCRIPTION OF THE DRAWINGS

The Detailed Description including the description of a preferred structure as embodying features of the invention will be best understood when read in reference to the accompanying figures wherein:

FIG. 8 is an exemplary embodiment of a target system configuration file format;

FIG. 10 is an exemplary edit platform category screen shot;

FIG. 19 is an exemplary screen shot showing how a user can edit a test procedure;

FIGS. 20A and 20B are exemplary screen shots that enable a user to enter test results;

FIG. 22 is a table showing three different levels of illustrative threat categories;

FIG. 23 is an exemplary screen shot showing a portion of the illustrative threat categories of FIG. 22;

FIG. 24 is an exemplary scheme by which the risk of an individual test failure is assessed in accordance with at least some embodiments contemplated by the present invention;

FIG. 39 is an exemplary screen shot that enables a user to add a role/title;

FIG. 41 is an exemplary screen shot that allows a user to add a reactor;

FIG. 47 is an exemplary screen shot that allows a user to set project notification;

FIG. 49 is an exemplary screen shot that allows a user to set notification parameters for a particular user;

DETAILED DESCRIPTION

Figure 1:
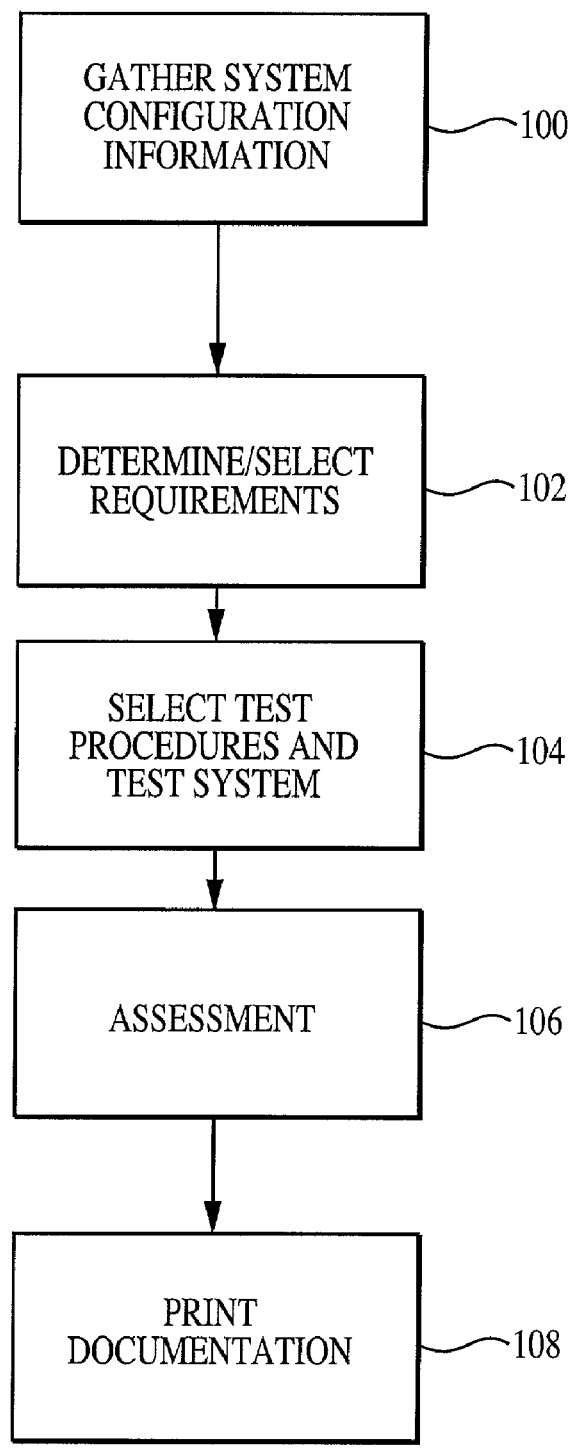
FIG. 1 is an exemplary high level flowchart of a method contemplated by at least some embodiments of the present invention.

Referring now to the drawings, and more particularly to FIG. 1, a high level flow diagram is shown that provides an overview of the method according to the present invention. In the first step, information is gathered pertaining to the system or network undergoing C&A, as is indicated by block 100. The information gathered typically relates to a description of the system to be certified, and its respective components and operating environment (e.g., workstation manufacturer and model, operating system and version, secret, or top secret operating environment, etc.). As will be described in further detail herein, at least some embodiments of the present invention advantageously automate collection of certain information pertaining to the network undergoing C&A. Alternatively, the information pertaining to the network undergoing C&A can be manually entered.

As indicated above, aspects of at least some embodiments of the present invention are described in accordance with DoD's DITSCAP requirements. However, it should be understood that such description is only by way of example, and that the present invention contemplates use with regard to any number of types of requirements or environments. In addition, within its use with regard to DITSCAP requirements, it should be understood that many of the various aspects and selection options are also exemplary, as is the fact that information is shown as being entered via a web browser.

The requirements analysis generally involves selecting (by a human and/or some automated procedure) a list of standards and/or regulations that the system must, or should, comply with. This is indicated by block 102. Optionally, selection of additional standards/regulations and/or requirements by a user is also contemplated. At least some embodiments of the present invention then contemplate automatically displaying/listing each requirement that comprises the current security requirements traceability matrix (SRTM), which is derived from the selected set of standards and/or regulations that the system must comply with. Additionally, the user will be able to customize the current SRTM by either adding, editing and/or deleting requirements. As known to those skilled in the art, a SRTM can be a table used to trace project lifecycle activities (e.g., testing requirements) and/or work products to the project requirements. The SRTM can be used to establish a thread that traces, for example, testing and/or compliance requirements from identification through implementation. A SRTM can thus be used to ensure that project objectives and/or requirements are satisfied and/or completed.

Once information is gathered 100 and the requirements analysis 102 is provided, the system can intelligently select a set of test procedures against which the system is tested, as indicated by block 104. The test procedures are selected in a manner so that successful completion of the test procedures will render the system undergoing C&A to satisfy the SRTM requirements.

Figure 2:
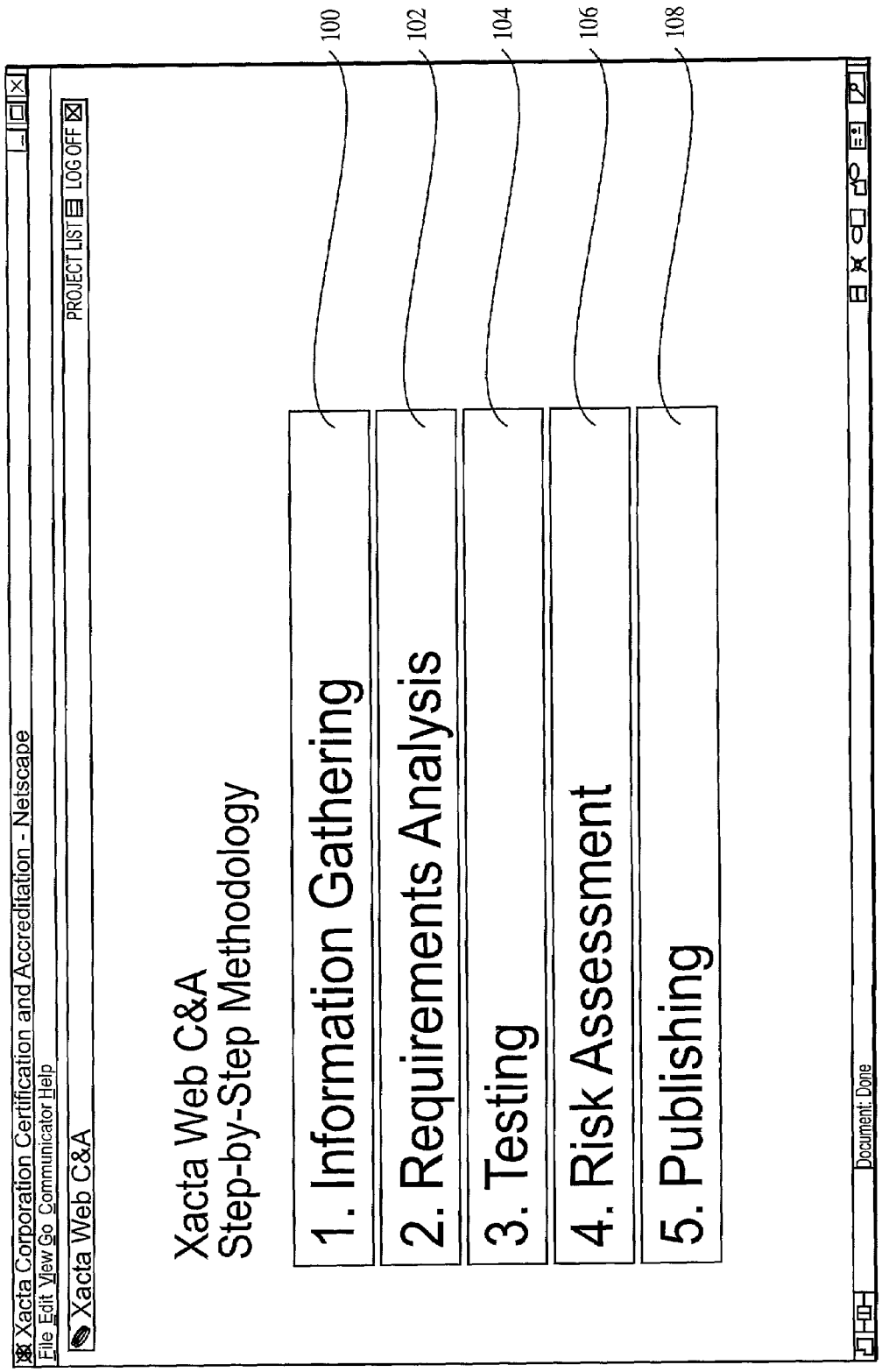
FIG. 2 is an exemplary introductory screen shot corresponding to the flow chart provided in FIG. 1.

Upon completion of testing 104, the risk assessment step (as indicated by block 106) then involves assessing for each test failure (should any exist) the vulnerability of the system, as well as the level of the threat as determined by the information gathered. The risk assessment 106 provides as output an estimate of the risk level for each individual test failed. Each of the failed tests are also collectively considered and used to evaluate the risk level of the system as a whole. Then, documentation can be optionally printed 108 that includes information pertaining to the first four elements that would enable an accreditation decision to be made based on the inputs and outputs respectively provided and generated in the first four blocks (i.e., 100, 102, 104, 106). Each block shown in FIG. 1 (i.e., 100, 102, 104, 106 and 108) will be discussed in further detail herein. FIG. 2 is an exemplary screen shot corresponding to the blocks (100, 102, 104, 106, 108) provided in FIG. 1. Further information pertaining to the system and method according to the present invention can be found in the following document: WEB C&A™ 2001 User Guide DITSCAP/NIACAP, dated Aug. 27, 2001 (available from Xacta Corporation, Ashburn, Va.), which is incorporated herein by reference in its entirety.

Figure 3:
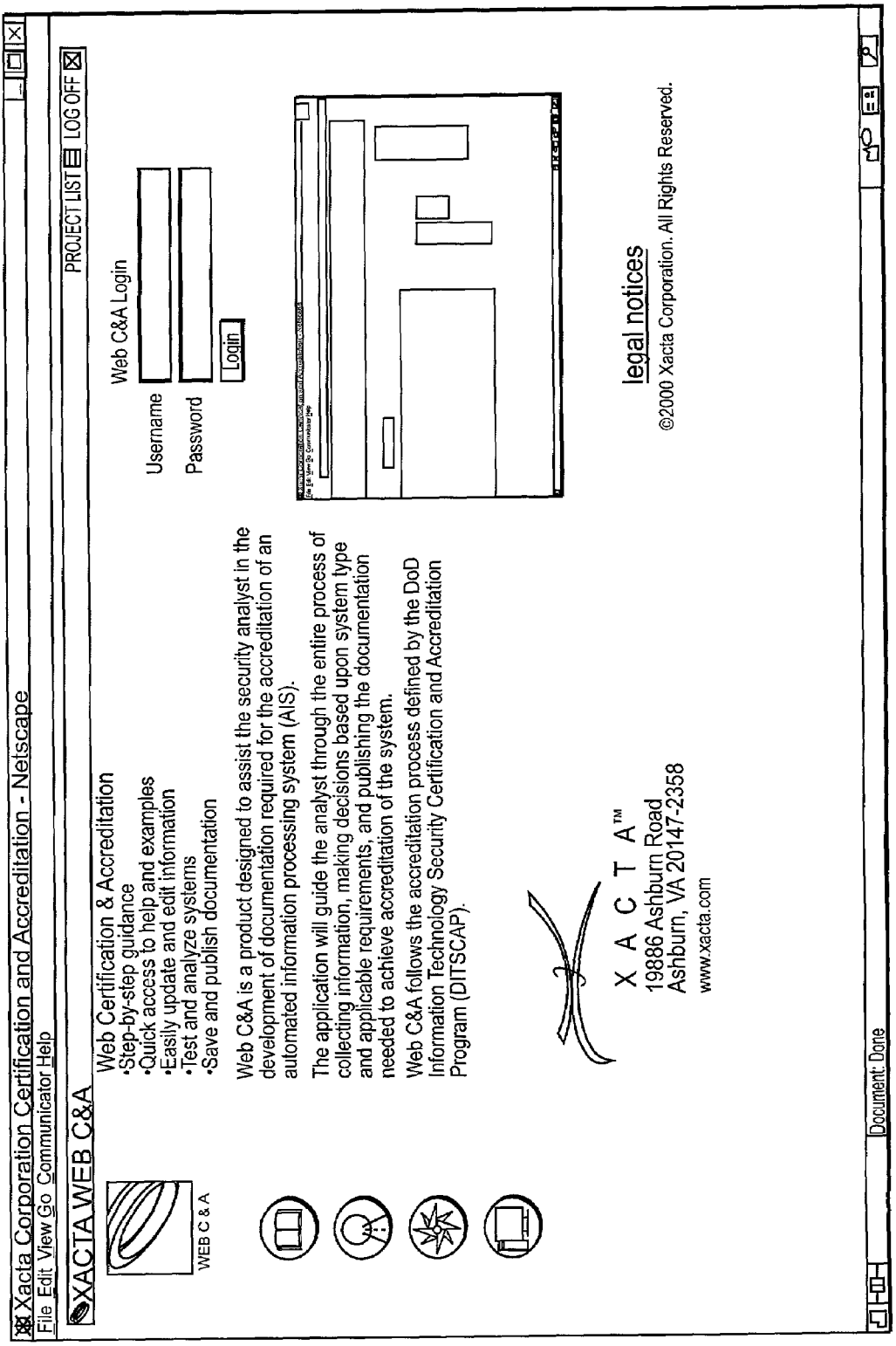
FIG. 3 is an exemplary user login screen shot.

FIG. 3 shows an exemplary access control screen shot (e.g., for access to some or all aspects of the present invention as indicated above). Each user can optionally be required to input a valid user name and password, which provides them with access to only the information for which they are responsible. The system can also optionally exclude the password and access feature, providing users access to a set of predetermined and/or default information.

Information Gathering

Figure 4:
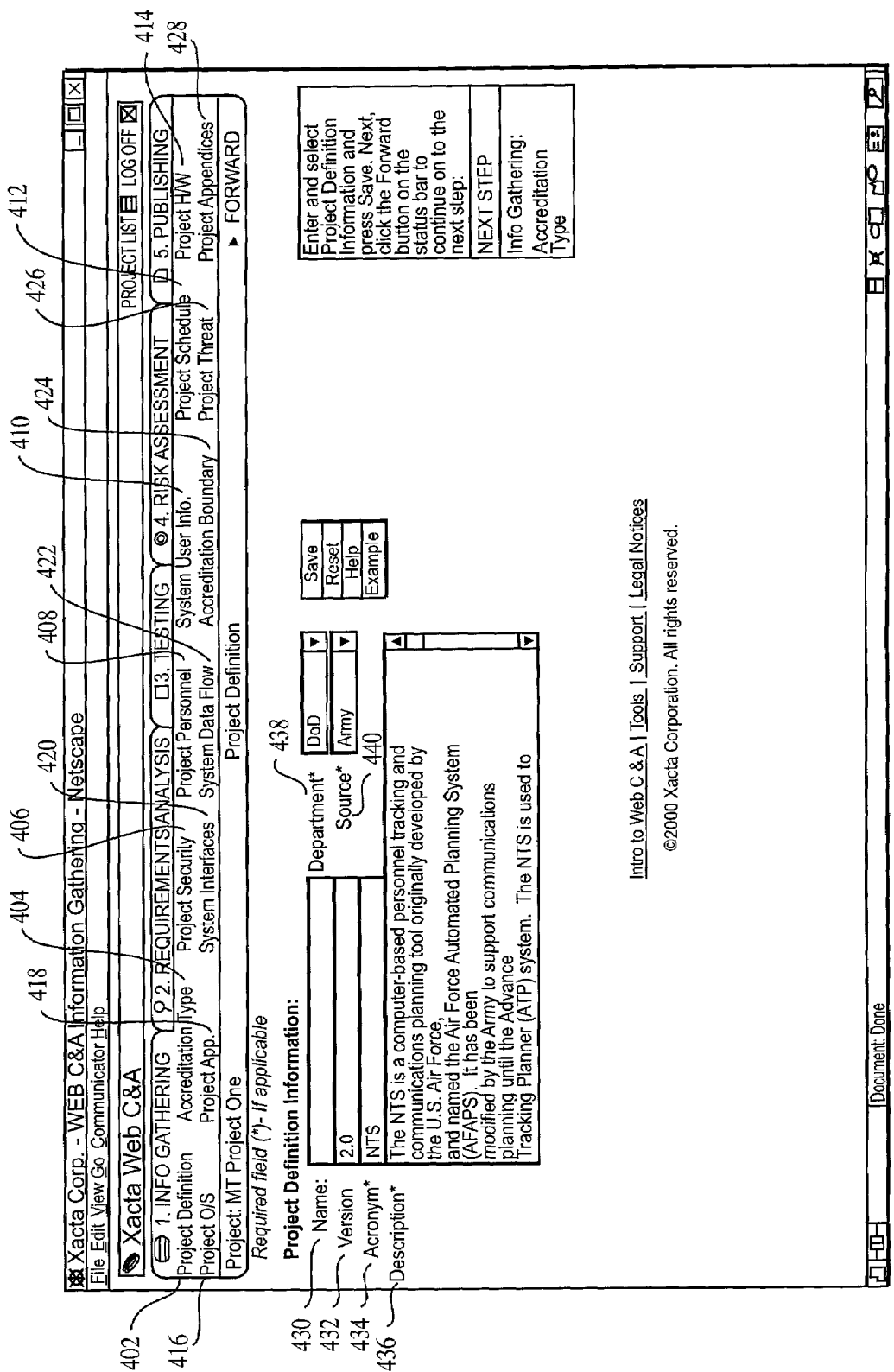
FIG. 4 is an exemplary project definition screen shot.
Figure 5:
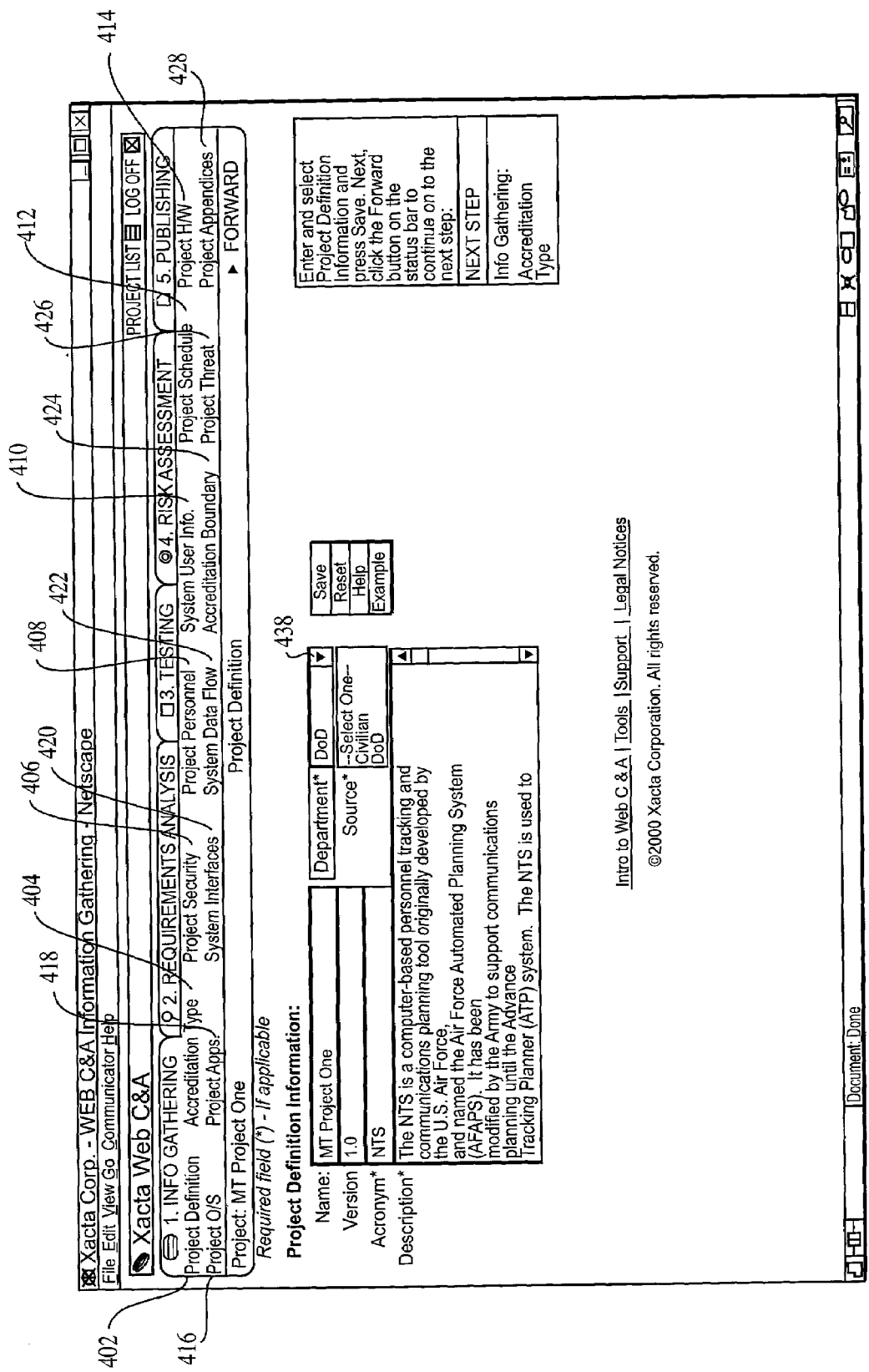
FIG. 5 is an exemplary project definition screen shot showing user selection of either civilian or Department of Defense applicability.

FIGS. 4-5 show selected exemplary screen shots of aspects of the information gathering 100 process. Specifically, FIG. 4 shows project definition information, which is assumed to have been selected by tab 402. Fields such as project name 430, project version 432, project acronym 434, project description 436, department 438, and service 440 can be provided as being part of the project definition. The project name 430 field is preferably a read-only field, provided for information only. The project version field 432 enables the numeric version of the system undergoing C&A to be entered, if applicable. The project acronym field 434 is optionally used to provide an acronym for the project. The project description field 436 can be used to provide a detailed description of the project (e.g., mission statement, function, features, and/or capabilities of the system being accredited). The department field 438 can be used to identify the Government (or civilian) department under which this system is being accredited. As shown, the current choice is DoD. The service field 440 is used to identify the Service/Agency under which this system is being accredited. As shown, the current choices are Army, Navy, Marine Corps, Air Force, OSD, and Other. Each of the above-identified fields can be tailored to suit a particular need and/or application.

FIG. 5 shows how a user can select, via a conventional pulldown menu, either civilian or DoD service from field 438. As disclosed in application Ser. No. 09/794,386, other menus can be provided that, for example, enable a user to select a military service branch (e.g., Army, Air Force, Marine Corps, OSD, or other), and to input Information Technology Security (ITSEC) parameters (that can pertain to, for example, interfacing mode, processing mode, attribution mode, mission-reliance factor, accessibility factor, accuracy factor, information categories, system class level, and certification analysis level, as explained in DoD Instruction 5200.40) of the system being accredited. In addition, as disclosed in application Ser. No. 09/794,386, menus can also be provided that allow a user to, for example, select a security level (e.g., secret, unclassified, sensitive, etc.) and related information, and/or provide context sensitive help.

Figure 6:
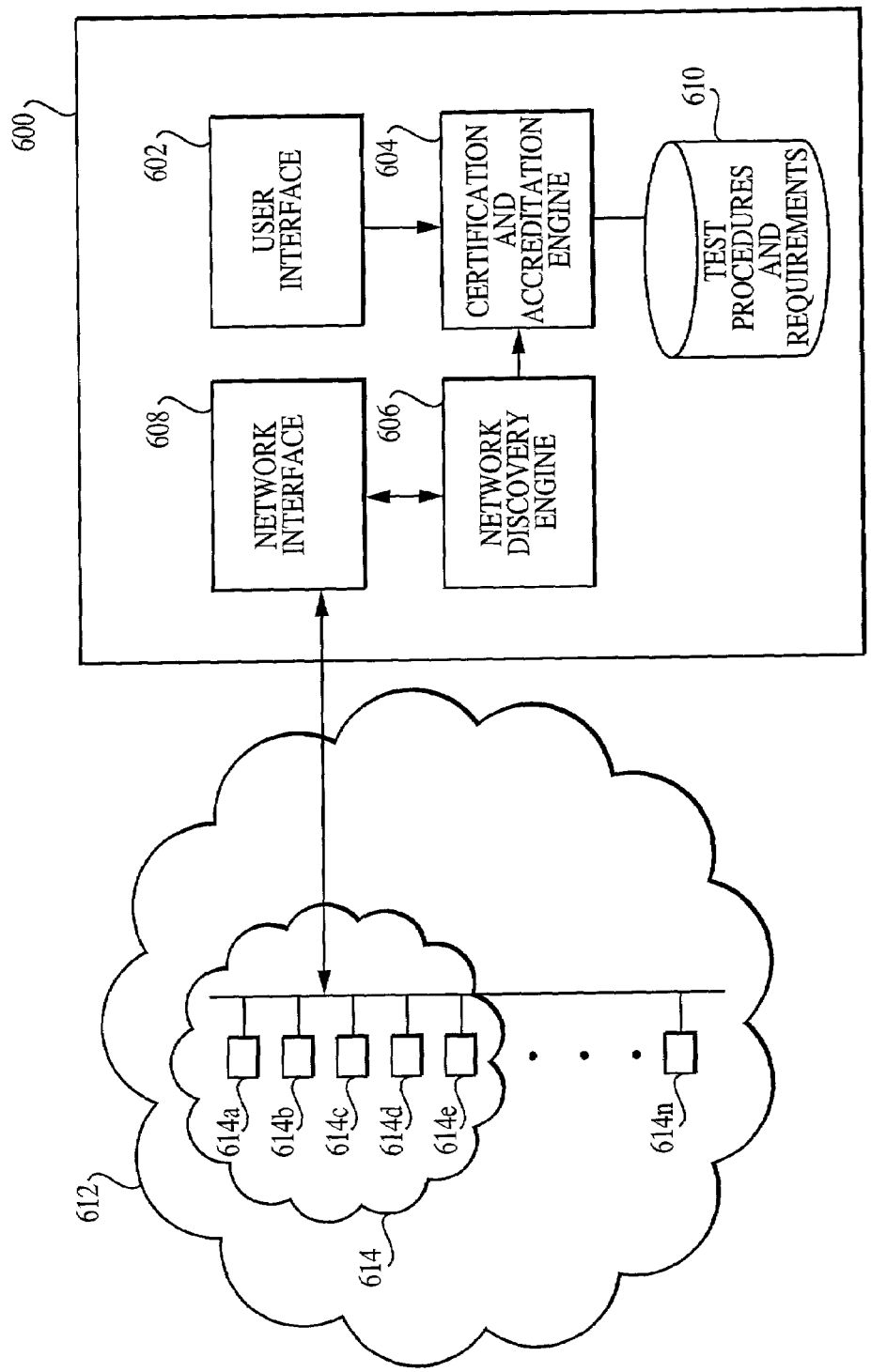
FIG. 6 is an exemplary block diagram of a certification and accreditation (C&A) system assessment aspect and an associated network and/or target system contemplated by at least some embodiments of the present invention.

FIG. 6, shows a high level system diagram that provides an overview of the target system assessment aspect 600 (hereinafter system 600) and an associated network or target system 612 according to at least some embodiments of the present invention. As used herein, a network can be defined as two or more objects that are directly or indirectly interconnected. Referring now to FIG. 6, a network interface 608 provides an interface to one or more networks 612 having one or more network devices 614*a-n* operatively connected thereto. The network interface 608 can be a conventional RJ-11 or other similar connection to a personal computer or other computer that facilitates electronic interchange with the network 612.

Network Discovery Engine

Figure 7:
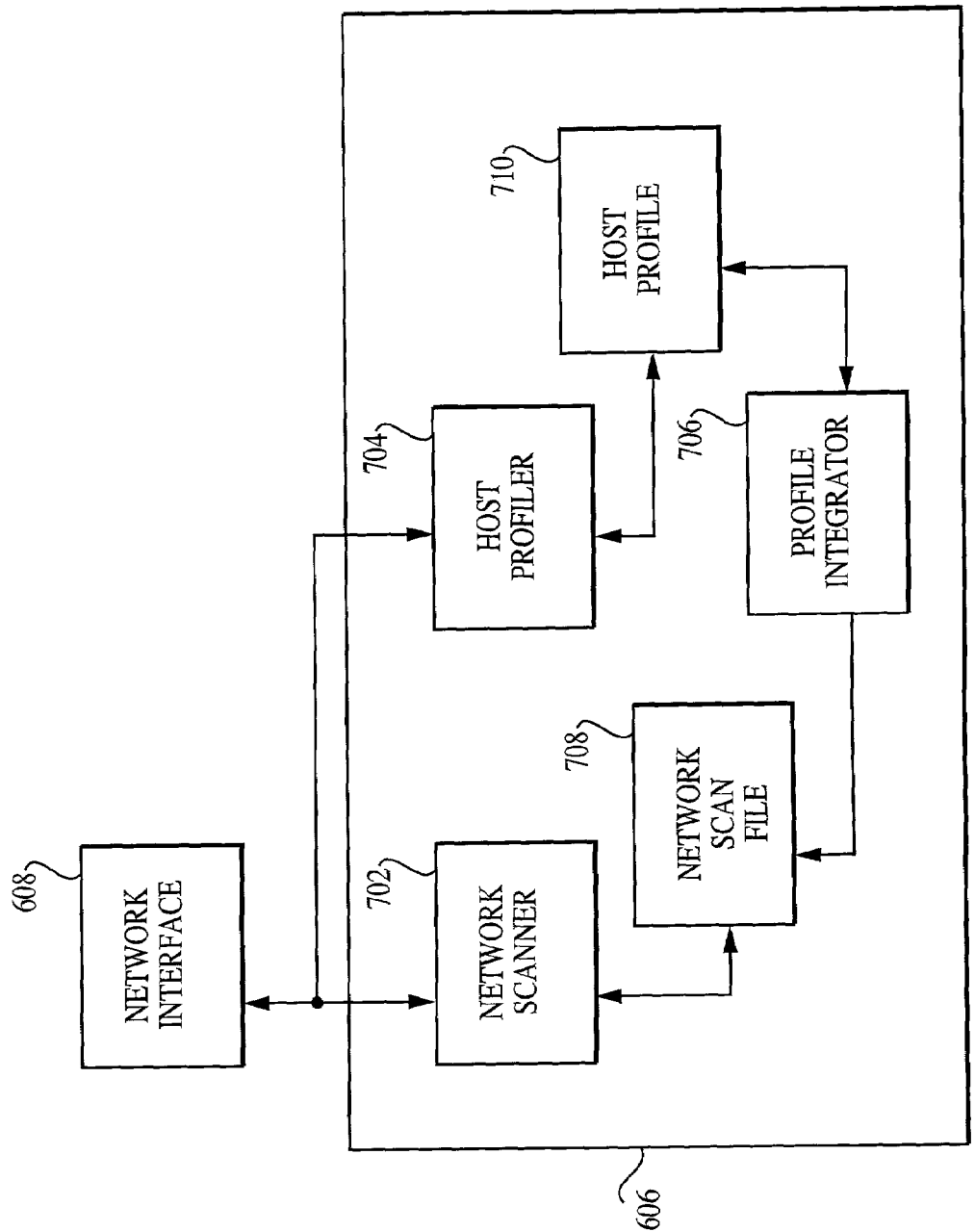
FIG. 7 is an exemplary block diagram of a target system discovery engine contemplated by at least some embodiments of the present invention.

As shown in FIG. 7, at least some embodiments of the present invention contemplate that the network discovery engine 606 comprises three separate modules: a network scanner 702, a host profiler 704, and a profile integrator 706. As will be discussed in further detail herein, the network discovery engine 606, via the network interface, collects information such as IP Address, hostname, media access control (MAC) address, operating system (OS), and OS version for one or more network devices (e.g., 614*a-n*).

Network Scanner

The network scanner 702 scans a network segment 614 (comprised of network devices 614*a-n*) and reports the results to a network scan file 708 (e.g., a text file). Network devices 614*a-n* can be any devices that, for example, have an Internet Protocol (IP) address associated therewith (or that have some other mechanism by which the devices/components can be identified). The network scanner 702 can scan through a specified range of IP addresses associated with each respective network device 614*a-e* within the network segment 614.

The network discovery engine 606 can utilize conventional network topology discovery techniques such as transmission control protocol (TCP)/user datagram protocol (UDP) port interrogation, and/or simple network management protocol (SNMP) queries, and receive network configuration information provided by such technique(s). Network topology information can optionally be manually added via the user interface 602. Upon entering or providing one or more IP address (e.g., a range of IP addresses), the host name of a network device 614*a-n* can be obtained by using, for example, a getHostName (or similarly named) function that will query a network device 614*a-n* for a host name. Functionally, the getHostName function can scan one or more domain naming service (DNS) servers internally and optionally over, for example, the World Wide Web to try and resolve the IP address (i.e., match the IP address with its respective host name). In the case of a MAC address, the initial sweep of, for example, a network segment 614 can have one or more Internet Control Message Protocol (ICMP) requests. One such request can be a "ping request." The packet returned from such a ping request can include, for example, the MAC address of the host device. Similarly, during a port sweep/interrogation, the OS family (e.g., Unix, Windows, etc.) and version can generally be determined. Regarding SNMP queries, if a queried network device 614*a-n* is SNMP enabled, additional information (e.g., device manufacturer, model, application software), etc. can generally be obtained. Finally, if a network device 614*a-n* utilizes (e.g., has installed thereon) an Enterprise Management (EM) software/system, the system 600 can scan the EM database (or an extract or portion thereof) associated with a particular network device 614*a-n* to obtain additional detailed information on each network device 614*a-n* in the IP range.

The network scanner 702 can obtain the following information relating to network devices 614*a-e* (which correspond to the network segment 614 under consideration): IP Address, hostname, media access control (MAC) address, operating system (OS), and OS version. This information can be written to a network scan text file 708. The MAC address, as used herein is a hardware address that uniquely identifies each node of a network. In IEEE 802 networks, for example, the Data Link Control (DLC) layer of the Open System Interconnection (OSI) Reference Model is divided into two sublayers: the Logical Link Control (LLC) layer and the Media Access Control (MAC) layer. The MAC layer interfaces directly with the network media. Consequently, each different type of network media requires a different MAC layer. On networks that do not conform to the IEEE 802 standards but do conform to the OSI Reference Model, the node address is called the Data Link Control (DLC) address.

Host Profiler

The host profiler 704 can produce a host profile file 710 (e.g., a text file) containing information such as hardware configuration, operating system and patch levels, installed software list, etc. Host profilers 704 can optionally be provided to accommodate different classes of hosts (e.g., Windows-based machines, UNIX-based machines, etc.). The host profile can be conventional enterprise management software developed by, for example, Tivoli Systems Inc., Austin Tex., or by Computer Associates International, Inc., Islandia, N.Y.

Using conventional system commands, operating system application program interface (API) calls, registry calls, etc., the host profiler 704 can determine information about the hardware configuration, operating system options, installed software, etc. of each network device 614*a-e* within a particular network segment 614. This information for each host 614*a-e* can be recorded in the host profile file 710. The data in the host profile file 710 can then be used to supplement the information about the respective host in the network scan file 708. A host profile text file 710 can contain information about more than one host.

Profile Integrator

The profile integrator 706 enables information from host profile file 710 to be added to an existing network scan file 708. The profile integrator 706 takes the data in one or more host profile text files 710 and integrates the data into an existing network scan text file 708.

Network Scan File

The network scan file 708 can utilize the conventional Microsoft .INI type file format. As will be appreciated by those skilled in the art, an .INI file is a file that contains startup information required to launch a program or operating system. In general, the network scan file 708, which can be an ASCII file, can identify particular network devices 614*a-e* by using the form <parameter>=<value>, where <parameter> is the name of the particular item of information, and <value> is the value of that item of information for the network device 614*a-e* under consideration. For example, as shown in FIG. 8 at 808*a*, the IP Address=192.168.0.10 indicates the identified host responded at the specified IP address.

As further shown in FIG. 8, the network scan file 708 can begin with a [Network] section 802 that describes the overall network being scanned. The network (e.g., network 612) name is Xacta, as indicated at 802*a*. Each network segment (e.g., 614) can be described by a [Segment] section 806. The network segment is called Office, as indicated at 807. At 806*a*, the network name Xacta is again provided. The Office segment has IP addresses in the 192.168.0.0-255 subnet, as indicated at 806*b*. The subnet was scanned twice: once on Dec. 1, 2000, and once on Dec. 15, 2000, as indicated at 806*c* and 806*d*, respectively.

A [Host] section 808, 810 can also be provided for each network device (e.g., 614*a-e*) within the network segment 614. The IP Address 808*a*, MAC 808*b*, Hostname 808*c*, OS 808*d*, and Version 808*e* are the basic information collected by the network scanner 702. At 810, the information collected by the host profiler 704, which has been integrated into the network scan file 708 by the profile integrator 706, includes: IP Address 810*a*, MAC 810*b*, Hostname 810*c*, OS 810*d*, and Version 810*e*, mfr 810*f*, model 810*g*, CPU 810*h*, CPU Qty 810*i*, CPU Speed 810*j*, RAM 810*k*, Disk Space 810*l*, and Software 810*m-p*. The host profile file 710 can use the same file format (e.g., .INI) as the network scan file 708. The profile integrator 706 can integrate one or more host profile files 710 with a network can file 708. Each [Host] sections (e.g., 810) can either have their own separate host profile files 710. Alternatively, two or more host sections 810 can be included in a host profile file.

Figure 9:
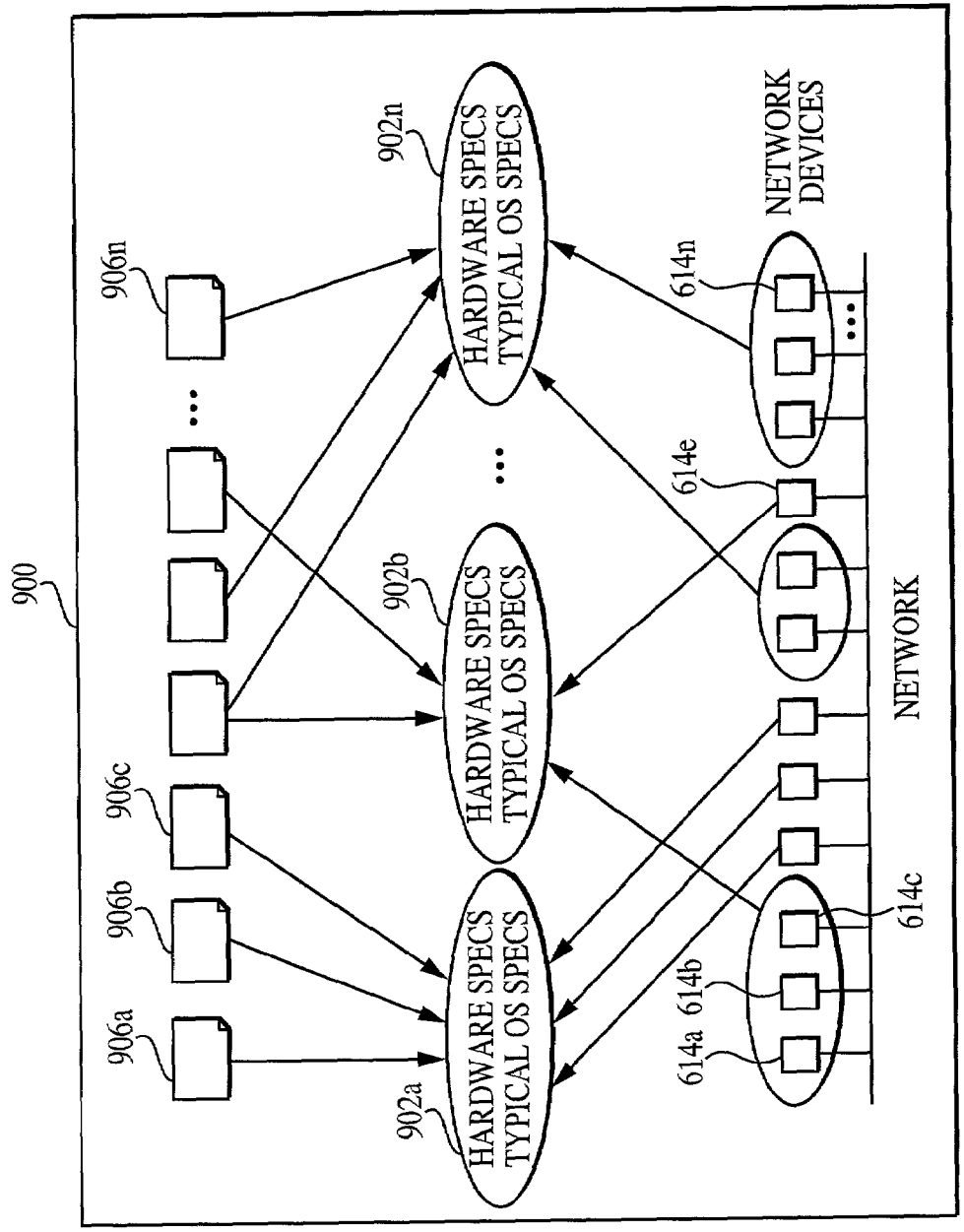
FIG. 9 is an exemplary illustration of the target system scanning and profiling relationships.

FIG. 9 illustrates an exemplary schema 900 that can be used in conjunction with network discovery. As shown, the schema 900 comprises: platform categories 902 (comprising categories 902*a-n*), network 612 (comprising network devices 614*a-n*), and software inventory 906 (comprising application software programs/packages 906*a-n*).

Platform category elements 902*a-n* represent generic categories of equipment that lie within the accreditation boundary (e.g., network segment 614) that includes the components (e.g., network devices 614*a-e*) that are associated with the network segment 614 being accredited. Representative platform categories can include desktop computer, laptop computer, mainframe computer, handheld device, hub, etc. Platform categories generally represent typical configuration(s) of the network devices 614*a-n* that belong to a particular platform category. As used herein, an accreditation boundary can be defined as the network devices (e.g., 614*a-e*) that comprise the network segment 614 (or target system) being accredited. There can also be one or more devices that are associated with the network segment 614 being accredited, but that are outside of the accreditation boundary and thus not included in the accreditation. Equipment outside the accreditation boundary can include equipment/services as a DNS used to translate the host names to IP addresses.

With regard to platform category elements 902*a-n*, the typical office LAN might consist of the following platform categories: file server, mail server, network printer, router, switch, and workstation. Information about each platform category 902*a-n* can include hardware specifications (e.g., manufacturer, model, CPU, memory, etc.) and OS specifications (e.g., OS name, version, patches, etc.). Since the platform categories 902*a-n* are generic, and numerous actual network devices 614*a-n* generally exist, the hardware and OS specifications of a platform category 902*a-n* will represent the typical configuration expected of network devices that belong to a particular platform category (e.g., network devices 614*a*, 614*b*, 614*c* and 614*i* belong to equipment category 902*b*).

Network devices 614*a-n* represent actual pieces of equipment within the accreditation boundary. Each network device 614*a-n* belongs to one of the exemplary platform categories 902*a-n*, as discussed above. Upon assignment to a platform category 902*a-n*, each network device 614*a-n* can "inherit" (or is assumed to have) the generic information (e.g., hardware and OS specs) of its assigned category. A user, via user interface 602, can then optionally add, delete and/or edit information. Network devices 614*a-n* are assigned to a platform category (e.g., 902*a*) to facilitate test procedure generation, as will be discussed in further detail herein, particularly with regard to FIG. 17.

Software inventory elements 906*a-n* represent application programs (i.e., operating systems are not included). The system 600 can form an association between one or more software elements 906*a-n* and one or more platform category element 614*a-n* (e.g., an association is formed between software elements 906*a*, 906*b*, 906*c* and platform category 902*a*). When such an association is formed, the software is considered to be installed on all equipment in that platform category 902*a-n*. Similarly, the system 600 can form associations between a software element 906*a-n* and a network device 614*a-n*. Such an association indicates that the software is actually installed on the associated network device 614*a-n*, but that the software element is not necessarily installed on every network device in a given platform category 902*a-n*.

Network configuration information can also be manually entered into the system 600. For example, returning to FIG. 4, when project hardware tab 414 is activated, a menu as shown in FIG. 10 can be provided. The menu allows a user to, for example, edit information pertaining to the Platform Category 1002 via a Description field 1004. Information pertaining to the Estimated Quantity 1006, Test Strategy, and IP Address Range 1010 can be provided. As shown, the menu also allow a user to edit hardware specs 1014 such as the Hardware Family, Manufacturer, Model, Serial Number, Location, etc.

Database Tables

At least some embodiments according to the present invention contemplate a database structure with at least the following tables that can be utilized to accommodate the network scanning and profiling features. The exemplary data dictionary disclosed herein provides additional details pertaining to the following tables.

WCA_ProjPlatCat Table—contains a row for each defined platform category.

WCA_ProjEquipInven Table—contains a row for each piece of equipment.

WCA_ProjSWInven Table—contains a row for each defined software element.

WCA_ProjPlatSW Table—contains a row for each defined association between a software inventory element and a platform category (for each project); each such association indicates that the software element is typically installed on members of the associated platform category.

WCA_ProjEquipSW Table—contains a row for each defined association between a software inventory element and an equipment inventory element (for each project); each such association indicates that the software element is actually installed on that particular piece of equipment.

WCA_OSSource Table—contains a row for each 'standard' operating system, including family (NT, UNIX, or Other), manufacturer, name, version, etc.

WCA_SWSource Table—contains a row for each 'standard' software application, including family (e.g. database, network OS, etc.), manufacturer, name, version, etc.

Certification and Accreditation Engine

As will be explained in further detail herein, once information has been collected (either manually or via an automated process, each as described above) pertaining to devices 614a-e belonging to the network segment 614, the certification and accreditation engine 614, can select compliance requirements/standards and test procedures applicable to the C&A under consideration. A user can also select requirements/standards and/or test procedures by using, for example, user interface 602.

Additional Information Gathering

Returning again to FIG. 4, when project personnel tab 408 is activated, a menu (not shown) can be provided that enables a user to enter information identifying all the project personnel associated with the accreditation effort. The personnel are preferably identified by the role, as discussed below, that they serve in the accreditation process. At least one entry for each role is preferably defined for the project.

For example, the following fields can be provided in a menu (not shown) subsequent to clicking the personnel tab 408:

Role Name—The role associated with the accreditation team member. The available choices can be:
Accreditation Team Lead—The person in charge of the accreditation effort, usually the Project Manager.
Accreditation Team Member—All the members of the accreditation team (analysts, testers, etc.).
Certification Authority (CA)—Person in charge of the system certification.
Certification Authority POC—Point of Contact (POC) to the CA.
DAA—Designated Approving Authority. Person ultimately responsible for the accreditation of the system.
DAA POC—Point of Contact (POC) to the DAA.
ISSO—Information System Security Officer. Person responsible for the security implementation of the system being accredited.
Organization Responsible—Organization responsible for the design and development of the system being accredited.
Organization Responsible POC—Point of Contact to the Organization responsible.
Program Manager—Program manager of the system being accredited.
User Representative—Representative from the user community.
Title—The title associated with the accreditation team member (Mr., Ms. or Dr., etc.)
First Name—The first, middle initial, and last name of the accreditation team member.
Office—The office (e.g., Office of the Assistant Deputy for Policy and Planning) of the accreditation team member.
Office Designation—The office designation of the accreditation team member. For example, if the office is the Office of the Assistant Deputy for Policy and Planning, then the office designation may be ADS-P.
Organization—An organization that is associated with the accreditation team member.
Work Address—A work address if applicable for the accreditation team member (include city, state and zip code).
Work Phone—A work phone number for the accreditation team member.
Work Fax—A work fax number if applicable for the accreditation team member.
Email Address—An email address if applicable for the accreditation team member.

When the project schedule tab 412 of FIG. 4 is activated, a screen can appear (not shown) that provides the capability to describe and store each project milestones for the system being accredited. Fields such as milestone title, milestone date, and milestone description can be provided.

When project hardware tab 414 is activated, a menu as shown in FIG. 10 can be provided. The menu allows a user to, for example, Edit/Delete H/W 472, enter various Platform Information 474, CPU information 476, and/or Memory/Storage Information 478. This information can be modified to reflect changes in system configurations throughout the information gathering requirements analysis and testing phases.

When project operating system 416 is activated, a menu (not shown) that enables a user to manually, in addition to or in lieu of the automated process heretofore, describe and store operating systems associated with the system hardware is provided. The ability to enter information pertaining to multiple operating systems (OS) on each hardware platform can be provided. Fields are provided to enable a user to enter information pertaining to the OS Name (e.g., Windows NT, AIX, HP UX, etc.), OS Type (e.g., NT, UNIX, etc.), OS Manufacturer (e.g., Microsoft, Hewlett Packard, IBM, etc.), OS Version (the numeric value of the operating system version), OS Options (a list of all OS options (if any) obtained for this platform), OS Patches (a list of OS patches (if any) that have been installed on the platform), OS Description (a detailed description of the operating system, possibly including the basic features, and any functions unique to the system being accredited).

When project application tab 418 is activated, a project application screen appears (not shown) that can provide the analyst with the ability to manually, in addition to or in lieu of the automated process described heretofore, describe and store applications associated with the system hardware/OS combinations. The following exemplary fields can be provided: Application Name (the name of the application), Application Type (the type of application on the system being accredited—e.g., database, office automation, e-mail server, etc.), Application Manufacturer (the name of the application manufacturer), Application Version (the numeric version of the application), Application Options (a list of the options associated with the application (if any)), Application Patches (a list of the patches associated with the application), and Application Description (a detailed description of the application).

When system interfaces tab 420 is activated, a menu (not shown) is provided that provides the user the ability to describe and store the flow of information into and out of the accredited system. The system interfaces entries can describe each of the internal and external interfaces identified for the system. The following exemplary fields can be provided: Interface Name (an internal or external name associated with the system interface), and Interface Description (a detailed description of the internal or external system interface, which preferably includes a statement of the significant features of the interface as it applies to the entire system, as well as a high level diagram of the communications links and encryption techniques connecting the components of the information system, associated data communications, and networks).

When system data flow tab 422 is activated, a menu (not shown) is provided that can provide the user the ability to describe and store the flow of information within the accredited system. System data flow entries can describe the flow of information to each of the external interfaces identified for the system. The following exemplary fields can be provided: Data Flow Short Name (a brief user-defined name associated with the system data flow), and Data Flow Description (a detailed description of the data flow associated with the external interface, which preferably includes a statement of the purpose of the external interface and the relationship between the interface and the system, as well as the type of data and the general method for data transmission, if applicable).

When accreditation boundary tab 424 is activated, a menu (not shown) that provides the user with the ability to describe and store the identification of components that are associated with the system being accredited, but are outside of the accreditation boundary (i.e., not included in the accreditation). This category might include such equipment/ services as, for example, a domain naming service (DNS) used to translate the host names to IP addresses. The DNS might not be part of the atomic system being accredited, but is required for most communication activities. The following exemplary fields can be provided: Accreditation Boundary Name (a name associated with the external system component), and Accreditation Boundary Description (a detailed description of the external system component, which preferably includes the function that this component/ service provides the system being accredited and its relationship to the system).

When project threat tab 426 is activated, a menu (not shown) appears that provides the user the ability to quantify the threat environment where the system is intended to operate. If the system is targeted to operate in multiple locations, the environmental condition that results in the higher or highest level of risk can be selected. The following exemplary fields can be provided: Location (CONUS (CONtinental US) or OCONUS (Outside CONtinenal US) as the primary operating location for the system), System Communications (the primary means of information transfer to external systems, such as No LAN, Local LAN Only, SIPRNET (SECRET Internet Protocol Router Network), NIPRNET (Unclassified but Sensitive Internet Protocol Router Network), Internet, etc.), Connection (the types of connection—e.g., wireless, dial-up, or protected distribution system (PDS), etc.), Training Competency Level (e.g., administrator, maintenance personnel, user, etc.), Installation Facility (the operating environment of the system at its intended end site), Natural Disaster Susceptibility (e.g., fire, flood, lightning, volcano, earthquake, tornado, etc.), and Custom Components.

When project appendices tab 428 is activated, a menu (not shown) that provides the user the ability to identify external documents that are associated with the C&A is provided. These appendices can optionally include references to other documents, or consist of the contents of other documents that are accessible via a computer-implemented embodiment of the present invention. Representative appendices that may be derived are: System Concept of Operations, Information Security Policy, System Rules of Behavior, Incident Response Plan, Contingency Plans, Personnel/Technical Security Controls, Memoranda of Agreement, Security, Education, Training and Awareness Plan, and Certification and Accreditation Statement.

Tabs 402-428 can be activated in any order, and do not need to be activated sequentially. Also, each tab can be optionally customized to contain different, fewer, or additional fields relative to the fields discussed above. Further, the tabs (402-428) can be arranged differently. Fewer or additional tabs can also be provided to suit a particular application or need.

Requirements Analysis

Figure 11:
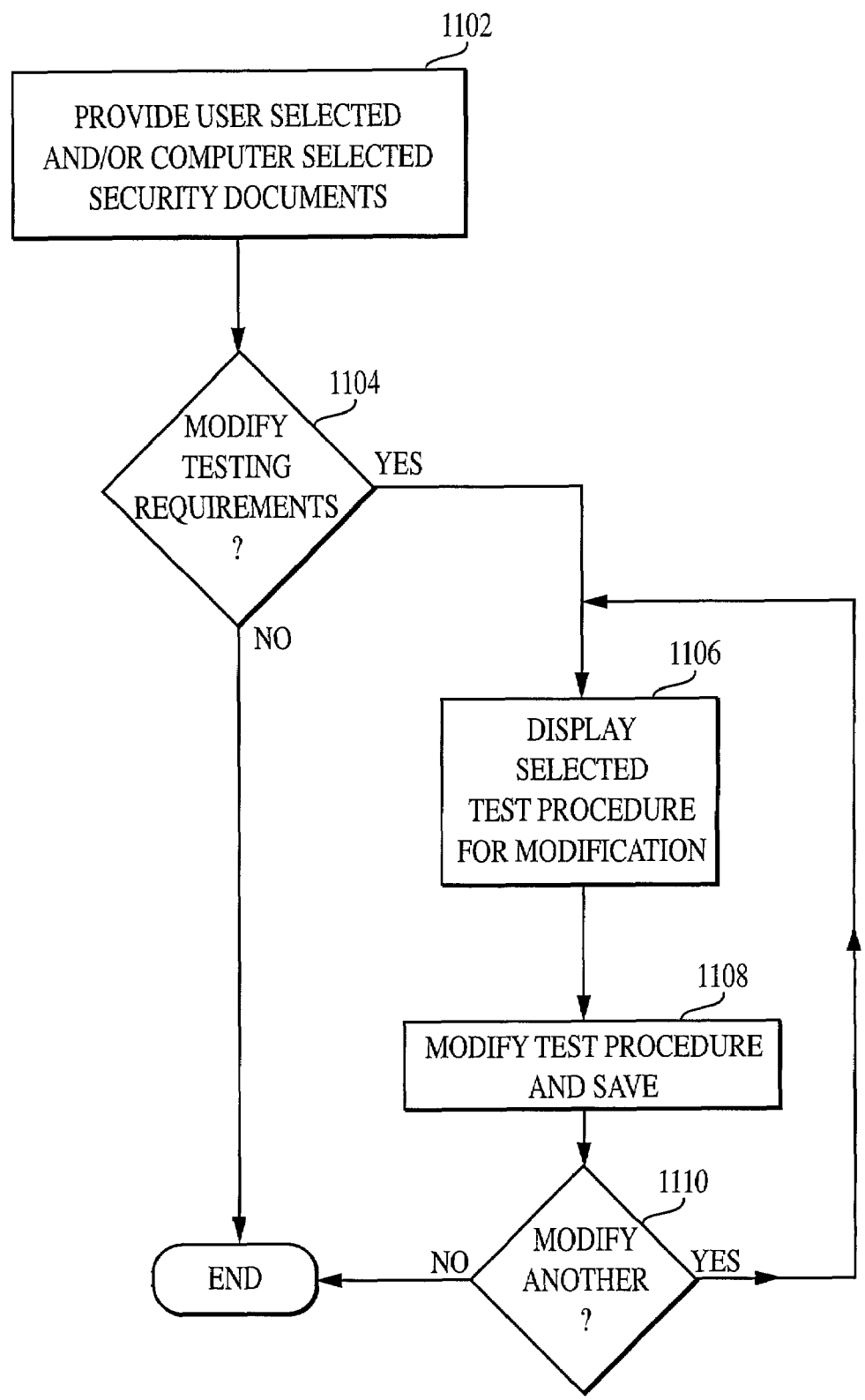
FIG. 11 is an exemplary flow chart of the requirements analysis process as contemplated by at least some embodiments of the present invention.

The system configuration captured in the step of block 100 of FIG. 1 is used as input for the determination of the requirements indicated by block 102. The process of editing and/or determining/selecting those requirements is shown in FIG. 11. In at least some embodiments contemplated by the present invention, the Requirements Analysis step is related to the Accreditation Type 404 and Project Security 406 information stored in the step indicated by block 100. In at least some embodiments, data is entered and saved in the Accreditation Type 404 and Project Security 406 fields provided before beginning the Requirements Analysis step indicated by block 102.

In an exemplary embodiment, a general purpose computer on which the present invention operates will have stored thereon or have access to a repository of security regulations and test procedures from various government and/or civilian departments, agencies, organizations, etc (e.g., such as those from DITSCAP). In step 1102 (FIG. 11a), and based at least in part on the information entered in step 100, pertinent regulations will be selected from this repository, upon which to build a security requirement traceability matrix (SRTM) for the C&A. The SRTM, as discussed above, can be a mapping of one or more test procedures to each individual requirement within a requirements document. Satisfactory completion of the respective one or more test procedures that can be mapped to each requirement is generally considered to render the requirement satisfied. However, the user has the flexibility to view and modify 1104 the SRTM as desired to meet the specific needs of the systems being accredited by, for example, adding and/or deleting one or more tests to/from the SRTM, and/or editing one or more of the test procedures to, for example, include additional testing requirements. If the user decides to modify a test procedure, the specified test procedure displayed 1106. The user can then modify and save the revised test procedure 1108. The user can then either end the editing process or continue to modify another security document 1110.

Figure 12:
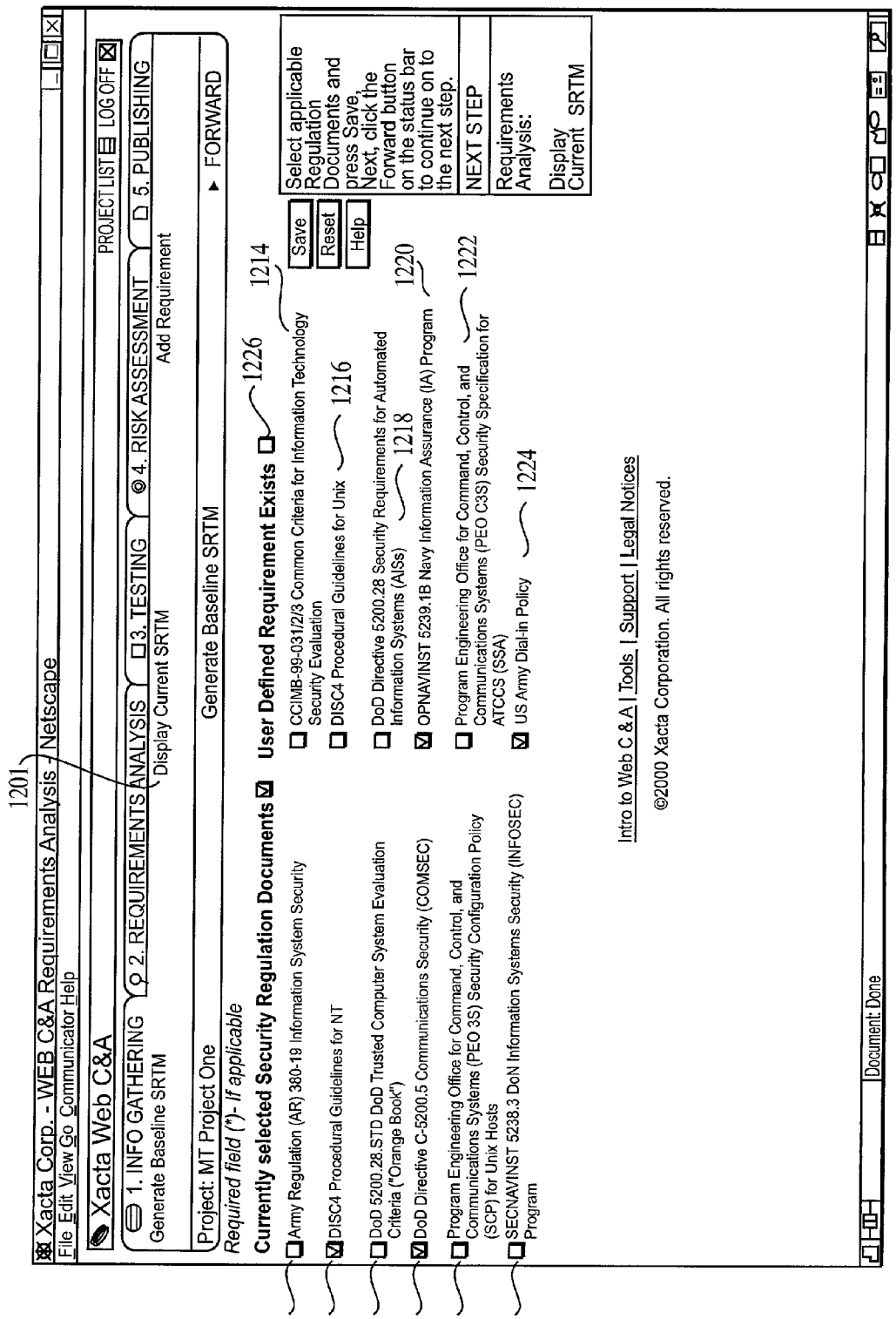
FIG. 12 is an exemplary screen shot used to generate a security requirements traceability matrix (SRTM)

FIG. 12 shows an exemplary Generate Baseline SRTM screen shot. In at least some embodiments of the present invention, clicking the Requirements Analysis tab 1201 from the application menu will switch control to the Generate Baseline SRTM screen. As shown, FIG. 12 provides a menu that provides a list of pre-packaged (i.e., shipped with the application) regulations documents (1202-1222) for the user to select. Each regulations document (1202-1222) contains specific requirements, one or more of which may be utilized when performing the C&A. All unmarked check boxes (e.g., check boxes associated with documents 1202, 1206, 1210, 1212, 1214, 1216, and 1218) represent unselected Regulations Documents, and thus do not factor into the requirements analysis step 102 for the particular project under consideration.

Figure 13:
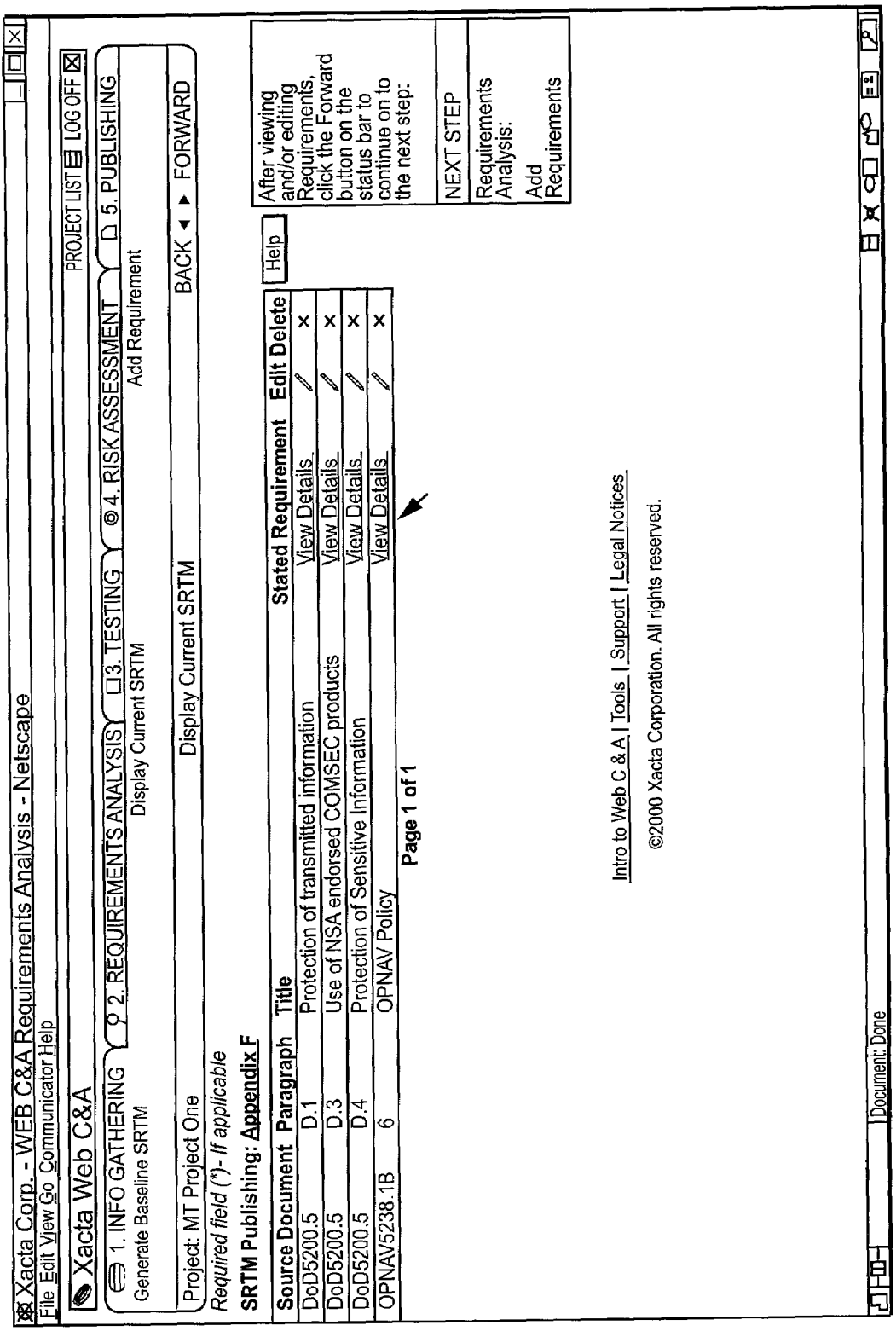
FIG. 13 is an exemplary screen shot showing a display of a SRTM.

After selections have been made, either by the user by, for example, clicking the appropriate boxes associated with documents (e.g., 1204, 1208, 1220 and 1224), and/or by the system, the application will provide a Display SRTM screen as shown in FIG. 13. Additionally, FIG. 13 may display any optional user-defined requirements as determined at FIG. 12, 1226. FIG. 13 particularly shows pertinent portions of DoD 5200.5, selected in FIG. 12 (1208), that are applicable to the C&A at hand.

Testing

Figure 14:
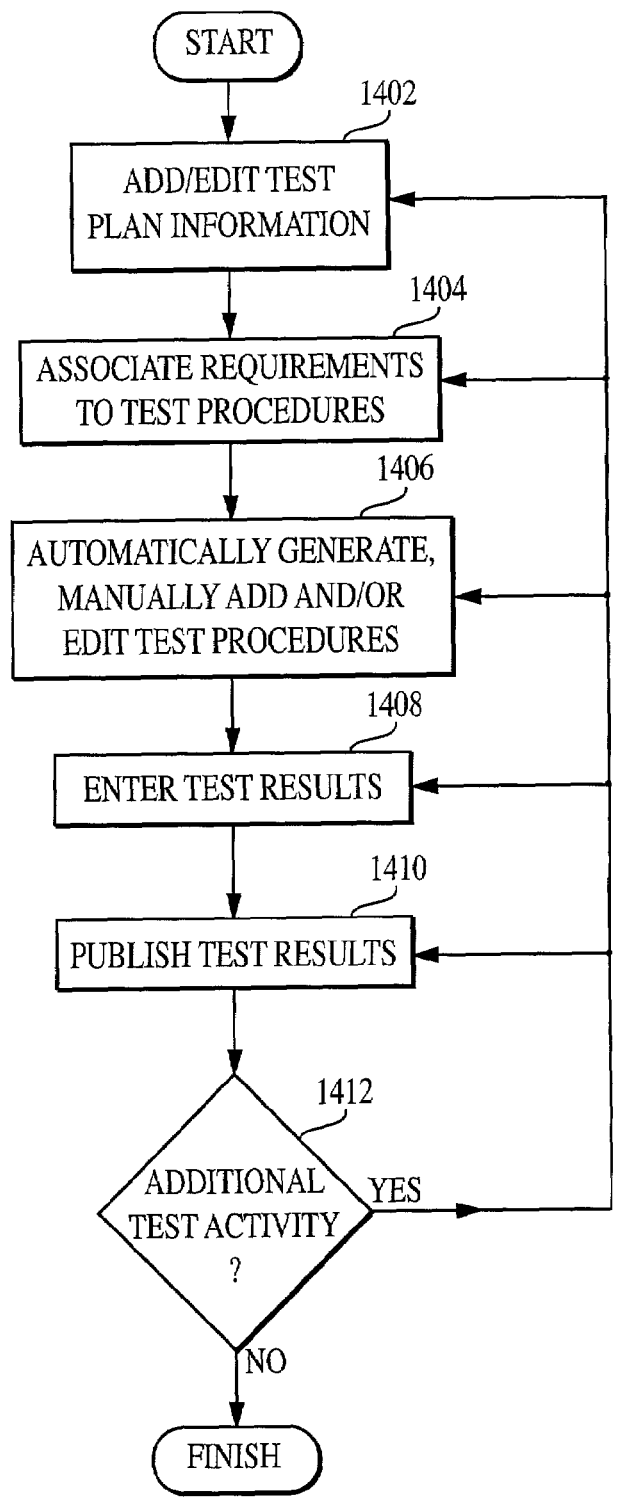
FIG. 14 is an exemplary flow chart illustrating the testing process as contemplated by at least some embodiments of the present invention.

With the security requirements traceability matrix in place (a portion of which is illustratively shown in FIG. 13), the user proceeds to the testing step 104. In at least some embodiments of the present invention, user interfaces will be provided, in accordance with the steps shown in FIG. 14, for the user to have the system 600 generate one or more test procedures, and/or add and/or edit test plan information 1402, associate all the requirements to test procedures 1404, add and/or edit test procedures 1406, enter test results 1408, and/or publish test results 1410. Any of the above steps can optionally be repeated as needed, as indicated in decision step 1412. Each of these steps will be discussed in further detail herein.

Figure 15:
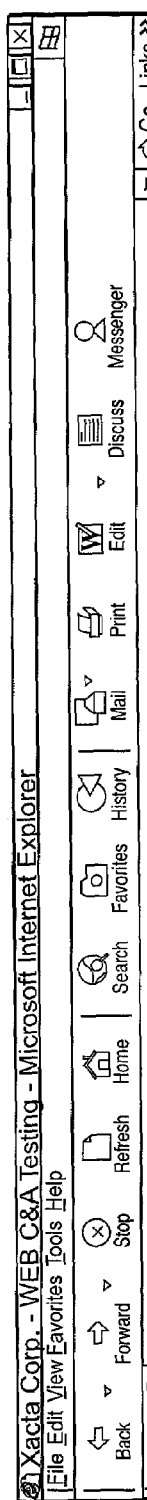
FIG. 15 is an exemplary screen shot showing how test plan information can be edited.

An Edit Test Plan Information screen, corresponding to step 1402, is shown in FIG. 15. The exemplary input fields on the screen are Expected Date of Test 1502, Planned Location of Procedure 1504, Test Resources 1506, Test Personnel 1508, and Remarks 1510.

Figure 16:
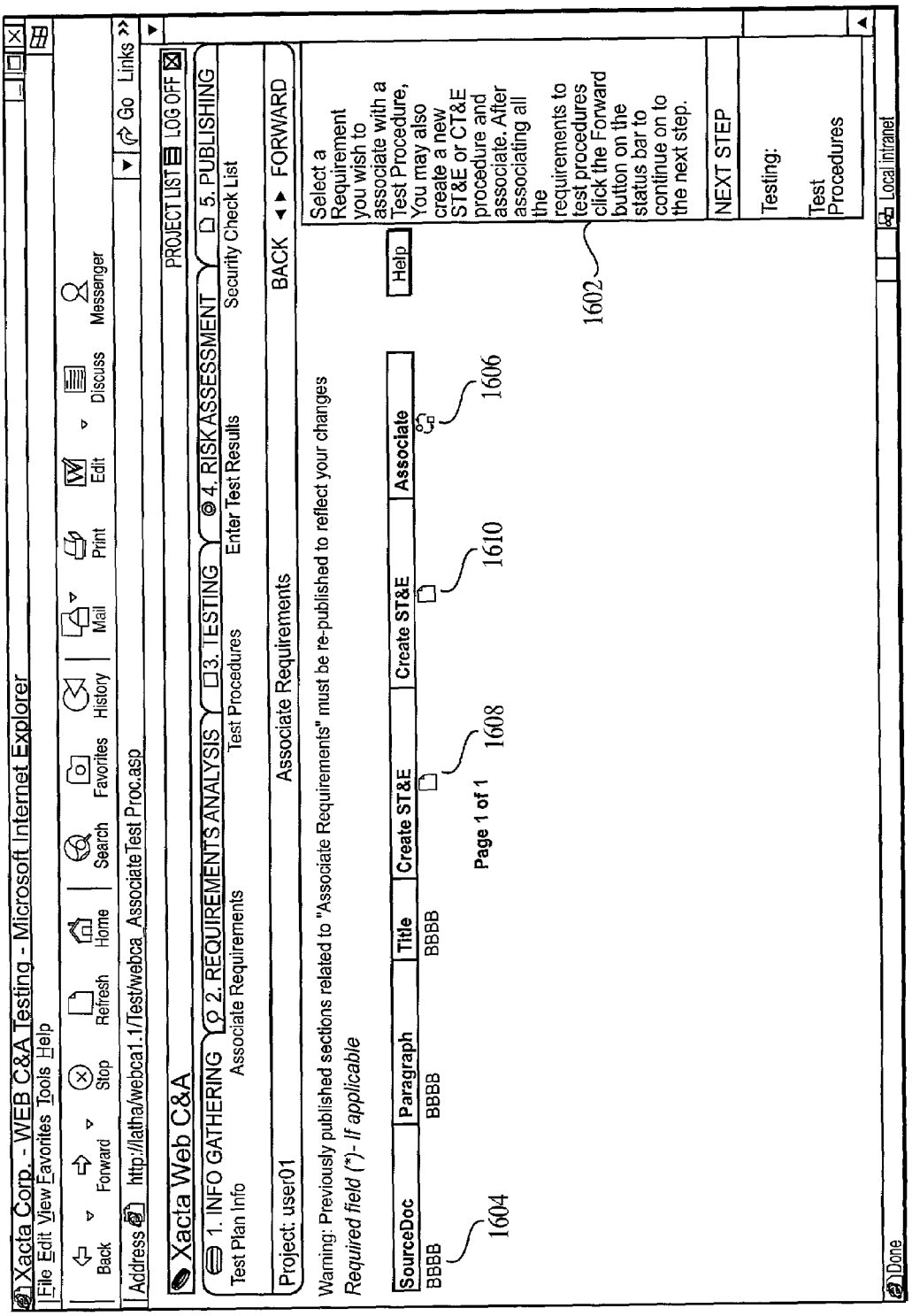
FIG. 16 is an exemplary screen shot illustrating how a user can select an existing test procedure and/or create a new test procedure and associate the test procedure(s) with one or more requirements.

FIG. 16 is an Associate Requirements screen, corresponding to step 1404, which illustrates how a user can manually select a test procedure to associate it with at least one requirement selected. As indicated in the descriptive text block 1602, a user can select a source requirements document 1604. Upon clicking on the associate icon 1606, a list of test procedures (not shown) can be displayed. The user can then select one or more of the test procedures within the test procedure database (as discussed above) and associate it/them with the selected source document 1604. A user can also create a new security test and evaluation procedure (ST&E) 1608 or certification test and evaluation (CT&E) procedure 1610, by clicking on the respective icon. After the user enters the respective CT&E and/or ST&E information into a form presented on a new menu (not shown), the user can save the procedure(s) and optionally associate the procedure(s) via the Associate icon, as described above. As discussed in application Ser. No. 09/794,386, the process described in FIG. 16 can also be automated.

Test Procedure Generation

Figure 17:
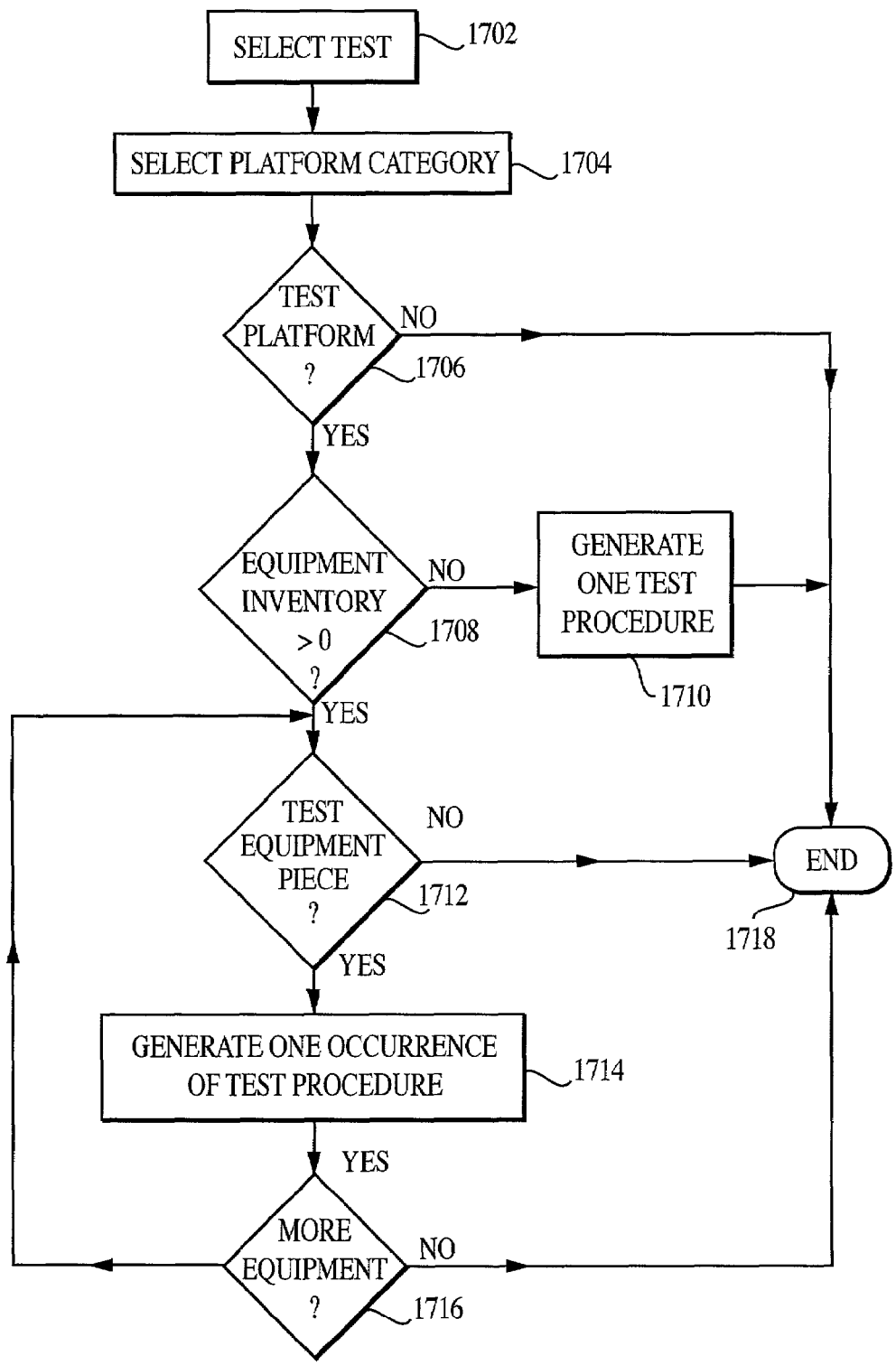
FIG. 17 is an exemplary flow diagram of a method for generating equipment tests contemplated by at least some embodiments of the present invention.

The certification and accreditation (C&A) engine 604 can generate test procedures, corresponding to step 1406, in accordance with the method shown in FIG. 17. In an exemplary embodiment of the system 600, the C&A engine 604 receives network configuration information from the network discovery engine 606 and compare the network configuration information with approved hardware and/or software standards, which can advantageously provide a substantially continuous and dynamic risk management process.

The system 600 can select one or more tests associated with each standard, regulation, etc. selected as discussed with regard to FIG. 12. For each selected test 1702 and for each platform category 1704, the C&A engine 604 can determine whether there is a test strategy associated therewith 1706. For each given platform category 902*a-n*, test strategies can include, for example, test one network device 614*a-n* associated with the platform category, test some network devices 614*a-n* associated with that category, or test all network devices 614*a-n* associated with the platform category.

If there is not a test strategy associated with the platform category 902*a-n* currently under consideration, the process terminates 1718 without generating an instance of the test 1702 currently under consideration. If there is a test strategy associated with the platform category 902*a-n* currently under consideration, then a determination is made 1708 as to whether there are any network devices 614*a-n* associated with the platform category 902*a-n* selected at block 1704. If there are no network devices 614*a-n* associated with the platform category selected at block 1704, then one test procedure can be generated 1710 for the test category. The test procedure generated can be a generic test procedure that would cover all or substantially all of any network devices 614*a-n* that may be added to the platform category in the future. If there is at least one network device 614*a-n* associated with the platform category selected at block 1704, a determination is made as to whether the network device is to be tested 1712. If no, the process ends 1718; if yes, a test procedure is generated for that equipment piece 1714. The test procedure that will be generated can depend upon the hardware configuration, operating system, and application programs for the particular network device 614*a-n*, as determined by business rules and/or decision logic within the certification and accreditation engine 604. Finally, a determination is made as to whether there is additional equipment 1716. If no, the process ends 1718; if yes, the process returns to decision step 1712.

Figure 18:
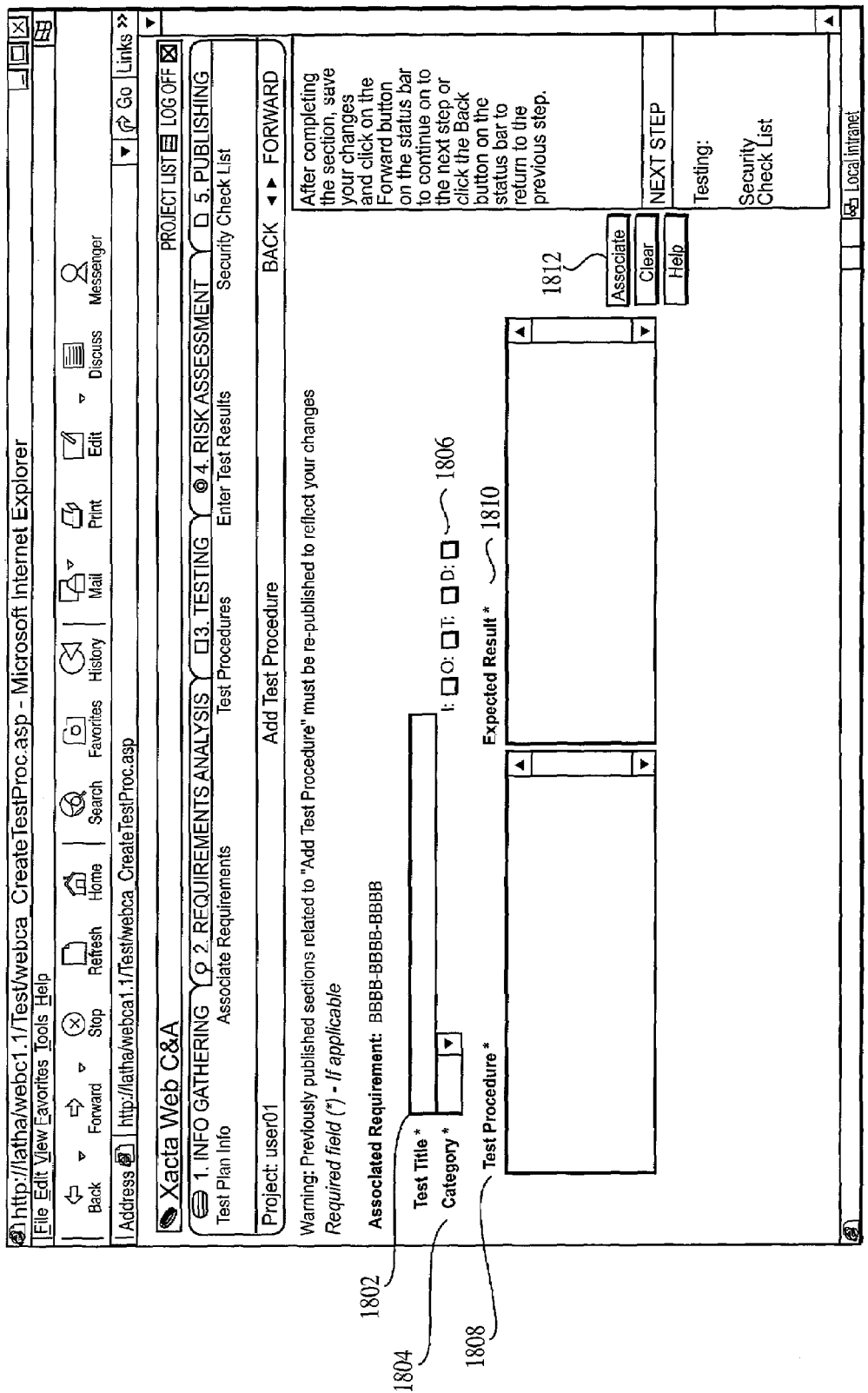
FIG. 18 is an exemplary screen shot showing how a user can add a test procedure.

FIG. 18 is a screen illustrating how a user can enter a new test procedure. As shown, the input fields on the screen are Test Title 1802, Category 1804, I, O, T, D (where I represents interview, O represents observation, T represents text, and D represents documentation review) 1806, Test Procedure 1808, and Expected Result 1810. If Associate 1812 is selected, then a new row is preferably created in the test procedure data base with the data entered in the input fields provided.

Figure 19:
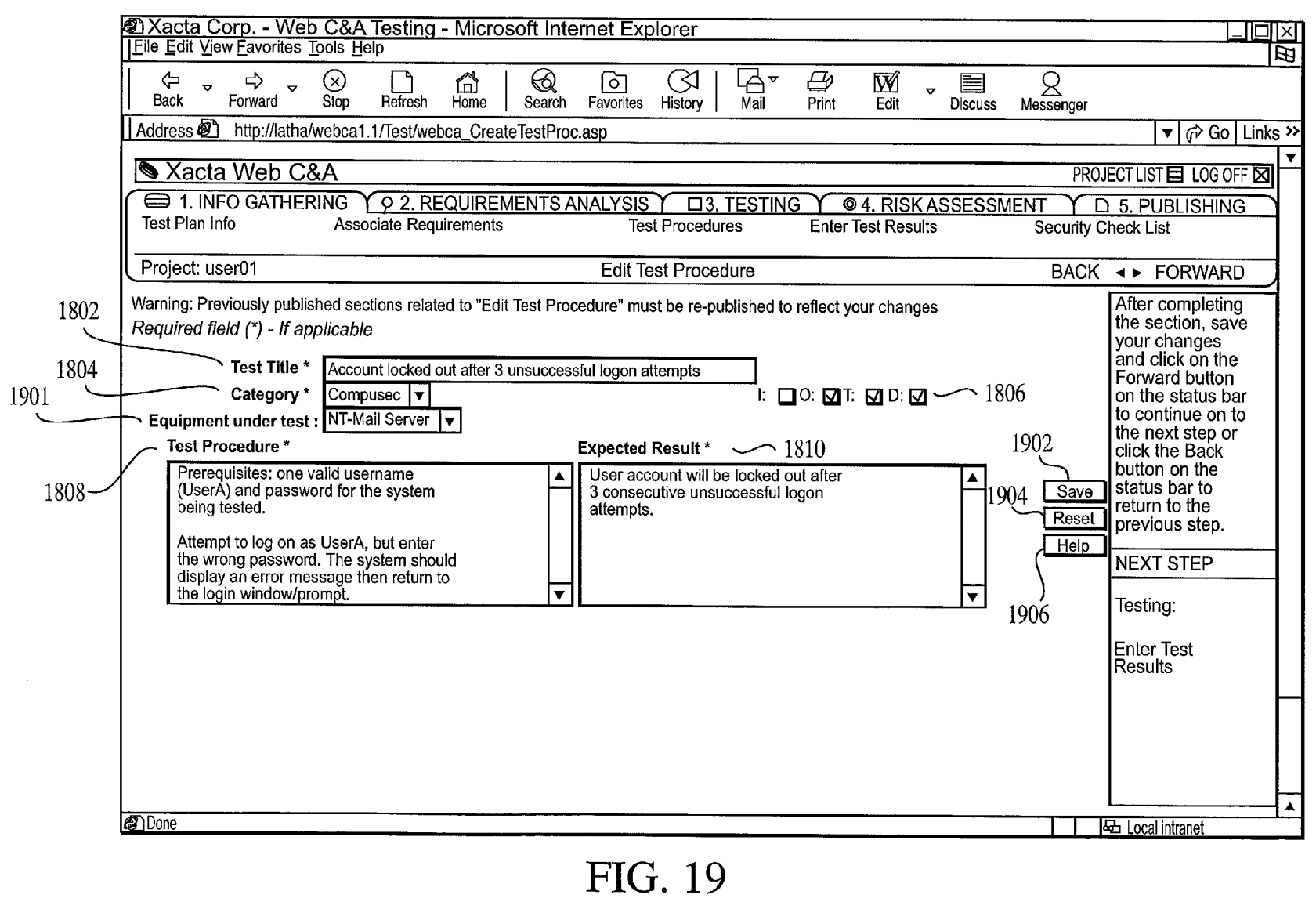

As previously discussed, the certification and accreditation engine 604 contains decision logic whereby test procedures can be intelligently selected for the C&A at hand by using the system information specified in step 100 and the requirements analysis step 102. As discussed above in the context of the SRTM, one or more test procedures within the test procedure database can be mapped to, linked with, and/or otherwise associated with each of the individual requirements within each respective requirements document (FIG. 12). As shown in FIG. 19, one or more of the test procedures intelligently selected by the present invention for the C&A at hand can be edited. In a preferred embodiment, the user will be able to edit any of fields 1802, 1804, 1806, 1808 and/or 1810. As disclosed in application Ser. No. 09/794,386, the user can also edit the test procedure once it has been entered.

Figure 20A:
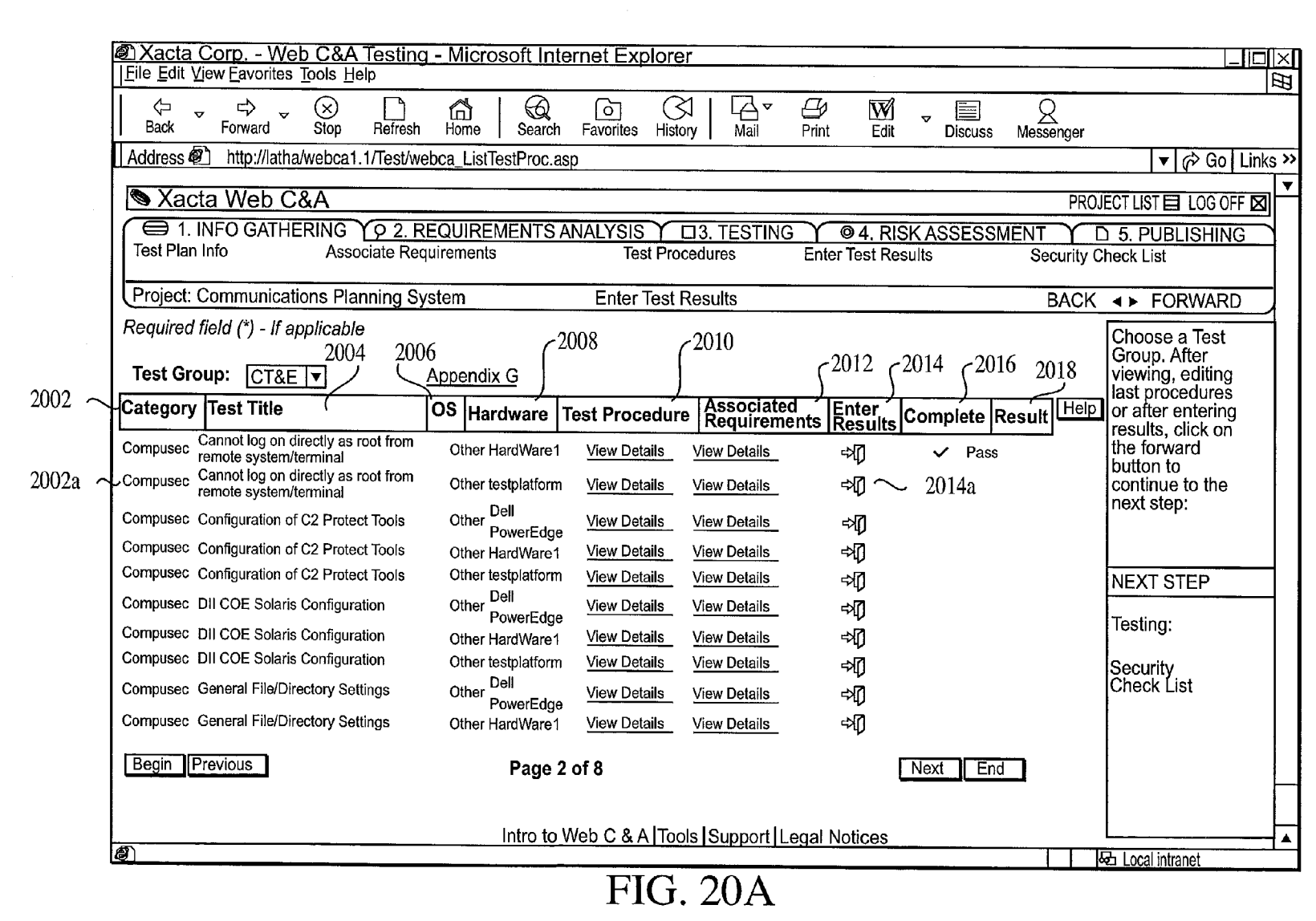

FIG. 20A is a screen that enable a user to enter test results. As shown, at least some embodiments of the present invention contain the following exemplary columns: Category 2002, Test Title 2004, Operating System (OS) 2006, Hardware 2008, Test Procedure 2010 (which enables a user to view the details of the test procedure), Associate Requirements 2012 (which allows the user to view which requirements a particular test procedure is associated with), Enter Results 2014, Complete 2016 (which provides an indication of whether the test procedure has been completed), and Result 2018 (which provides an indication of whether the test procedure has passed or failed). (It should be appreciated, however, that various embodiments of the present invention contemplate that the present invention automatically initiates the test, and obtains the results, without the need for any additional manual entry steps).

Figure 20B:
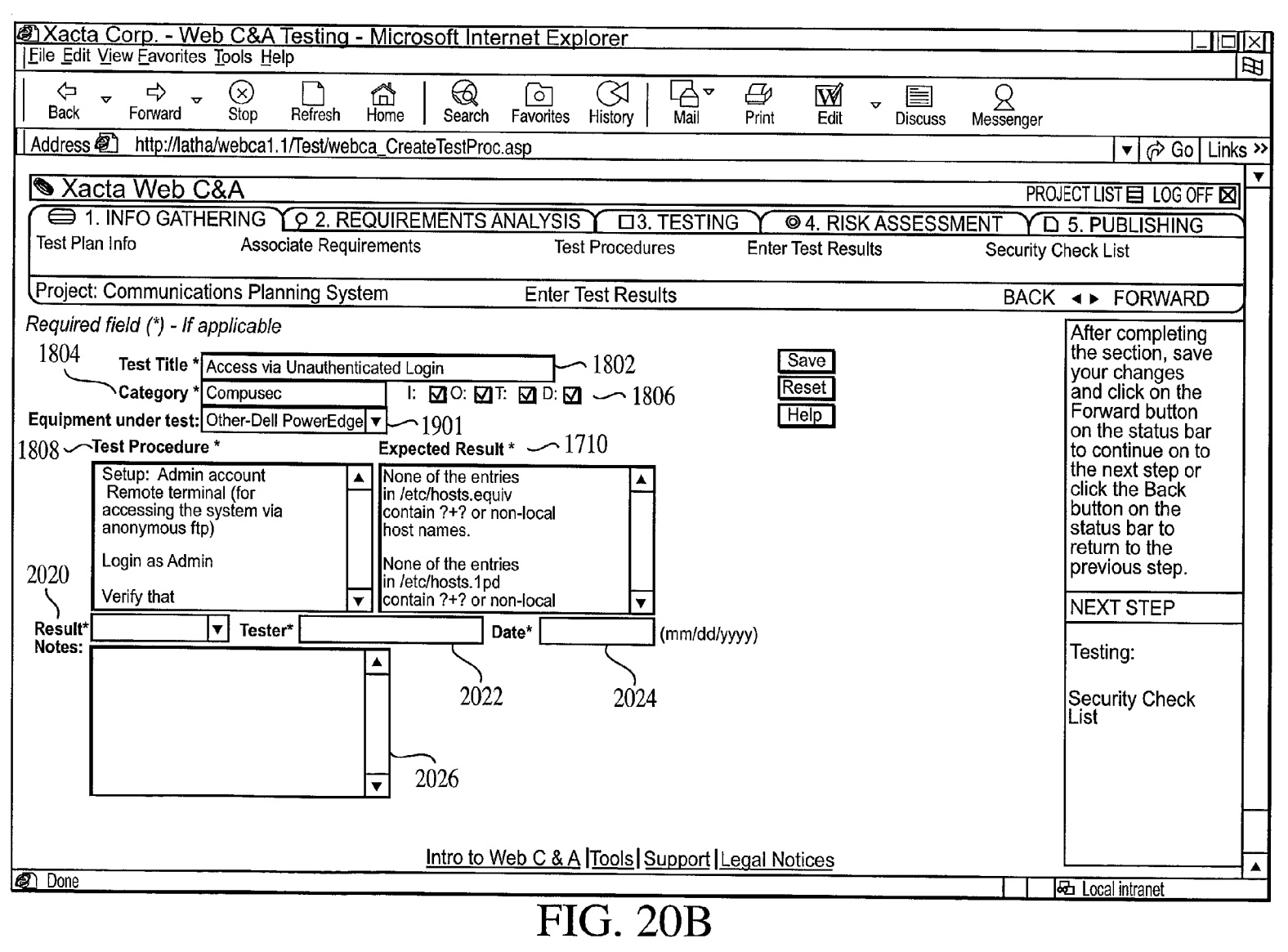

FIG. 20B is an exemplary screen that appears when the Enter Results 2014 icon is pressed that is associated with a particular test procedure. For example, in FIG. 20A, if icon 2014a is pressed, the a screen appearing similar in format to FIG. 20B will appear with the Test Title 1802 corresponding to the test contained in row 2002a of FIG. 20A (e.g., Cannot Log On Directly as Root from Remote System/Terminal). As shown, the Test Title 1802, Category 1804, Equipment Under Test 1901, I, 0, T, D 1806, Test Procedure 1808 and/or Expected Result 1810 and fields also preferably appear within this screen. Also, Result field 2020 appears, which allows the user to enter the test result (e.g., pass or fail). Tester field 2022 enables the tester to provide his name, and Date 2024 that the test was conducted. Finally, the tester is able to enter any Notes pertaining to the test 2026.

Risk Assessment

Once the testing step 104 has been completed and the results recorded, the risk assessment step 106 commences, as indicated by sub-headings a-d below.

a) Generate Project Threat Profile (Step 2102)

Figure 21:
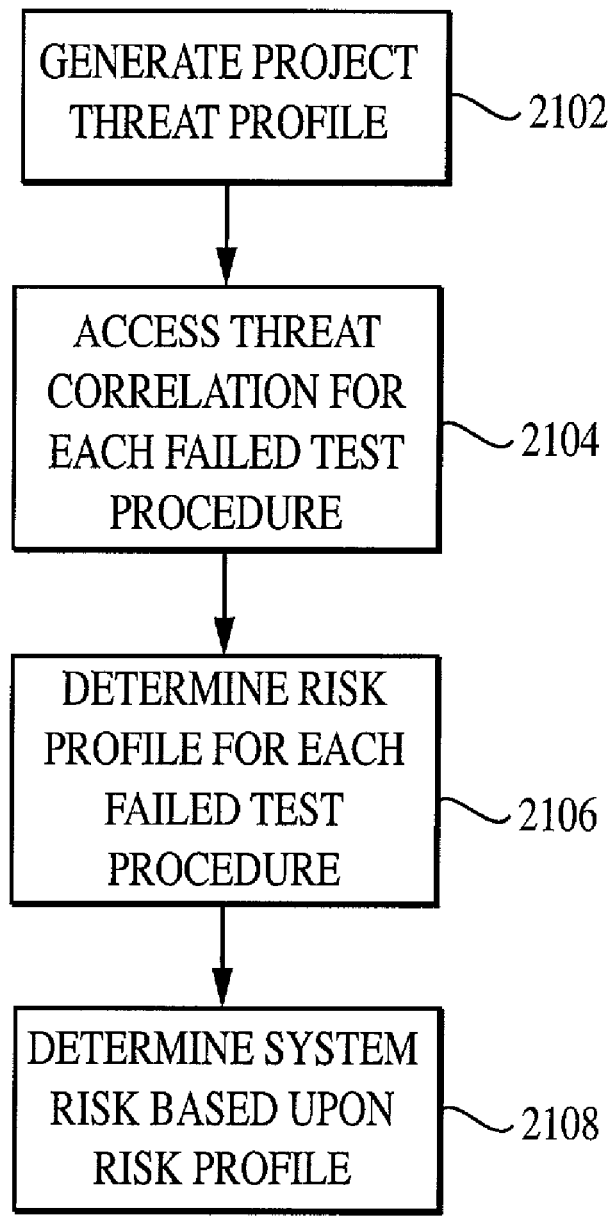
FIG. 21 is an exemplary high level flow diagram of the risk assessment method according to at least some embodiments contemplated by the present invention.

As shown in FIG. 21, at step 2102, at least some embodiments of the present invention generate a project threat profile, which is a score for each of the generic threat elements (e.g., fire, flood, hardware, power, software design error, etc.) as will be discussed in further detail herein. In at least some embodiments, the user performing the C&A is presented with a series of questions pertaining to the environment for which the C&A will be performed. (This information could also be obtained in an automated fashion using any number of known techniques). The present invention will then estimate the threat level based on the operators' answer. The value assigned to each of the generic threat elements is applicable to each test procedure associated with the particular system undergoing C&A. A user can optionally change any of the system determined threat element scores for one or more of the generic threat elements. Exemplary values for generic threat elements are as follows:

| Threat Element Score | Interpretation |
| --- | --- |
| N | Threat element is not applicable to this project or has negligible likelihood of occurrence |
| L | Threat element has low likelihood of occurrence for this project |
| M | Threat element has medium likelihood of occurrence for this project |
| H | Threat element has high likelihood of occurrence for this project |

For example, generic threat elements 1-29, as defined in FIG. 22, may have a project threat profile as follows:

MHNLLLLMMMMMLLLMMMMLLLLLLLLLNN corresponding, respectively, to elements 1-29. For this project threat profile, the threat of a flood is thus considered high.

Figure 23:
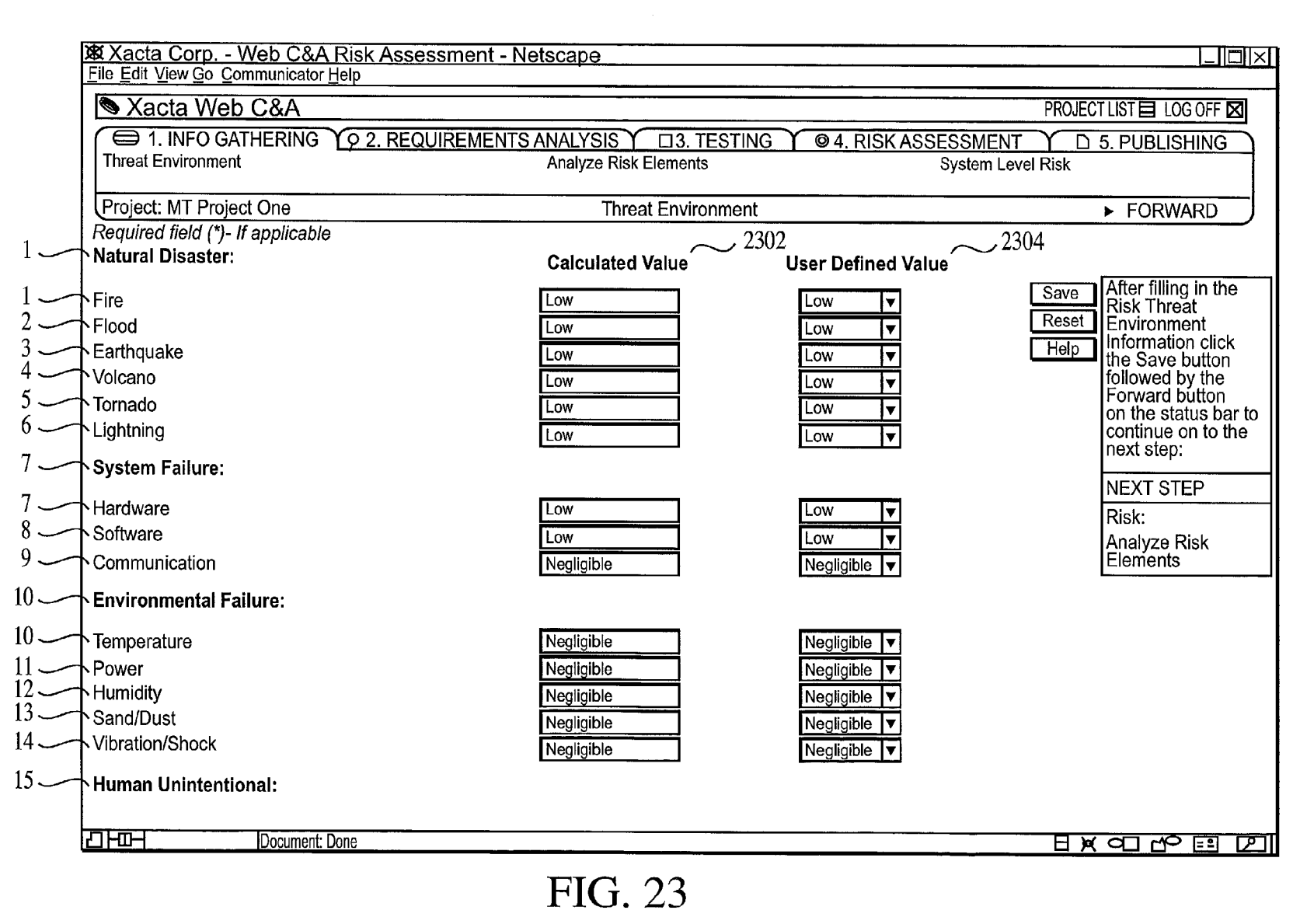

FIG. 23 shows an exemplary Threat Environment screen, which shows the calculated level of risk based on the information that was provided in step 100. As per at least some embodiments, the present invention automatically calculates the risk, which is indicated under the Calculated Value 2302 heading. This could be accomplished in any number of ways based upon data obtained during the current and/or testing phase, as indicated above. The User Defined Value 2234 preferably defaults to the corresponding Calculated Value 2302 for a given threat environment element (e.g., 1, 2, 3, etc.). However the user/analyst has the opportunity to optionally override the calculated risk rating by clicking on the User Defined Value 2204 for each corresponding threat element. As previously discussed, exemplary available choices are negligible, low, medium, or high, although they could also be, e.g., numerical in nature.

b) Threat Correlation String (step 2104)

In step 2104, a threat correlation for each failed test procedure is accessed. Specifically, each test procedure used in the C&A for the system being evaluated is, in at least some embodiments of the present invention, coded with a threat correlation string, with each character in the string representing one of the generic threat elements in the same order as they exist in the project threat profile as shown, for example, in FIG. 22. The test procedure database preferably contains these codes. Each character in the threat correlation string contains a score that indicates the relative potential of a given threat to exploit a vulnerability caused by failure of this particular test. An exemplary scoring system is as follows:

| Threat Correlation Score | Interpretation |
| --- | --- |
| N | Threat element is not applicable to this vulnerability (or has negligible potential to exploit it) |
| L | Threat element has low potential for exploit of this vulnerability |
| M | Threat element has medium exploit potential for this vulnerability |
| H | Threat element has high exploit potential for this vulnerability |

Thus, for example, failure of a particular test may mean that the system being tested is highly vulnerable to Floods.

To indicate this, the character in the threat correlation string corresponding to Floods would contain a score of "H."

c) Determine Risk Profile for Each Failed Test Procedure (Step 2106)

As indicated at step 2106, the risk profile for each test procedure is determined. Specifically, for each test failure, the threat correlation string contained within each test procedure, as determined at step 2104, is applied against the project threat profile as determined at step 2102.

For example, the project threat profile above, given as:

MHNLLLLMMMMMLLLMMMMLLLLLLLLNN may have a test procedure with the following threat correlation sting:

HHNMHLMNHHHMLNNNHLMLHNNLHHLMH

In this case, in accordance with an exemplary process according to at least some embodiments of the present invention, the combined risk profile string as determined in accordance with FIG. 24 would be:

MHNLMLLNMMMMLLLNMLMLMLLMMLNN

For a given row of FIG. 24, and given the first two values contained in the first two columns corresponding to that row, we have discovered and determined that the values contained in the third column of the row can be used a measure or risk.

The highest risk level in the combined string for a given test procedure is preferably used as the risk level for the failure of that test procedure. Thus, for the combined string above, the risk level for a failure of the test procedure is high, since there is an H in the second position. Similarly, if M were the highest risk level that appears in a combined string, then the risk level for a failure of that test procedure would be medium, etc.

d) Determine Overall System Level Risk (Step 2108)

Figure 25:
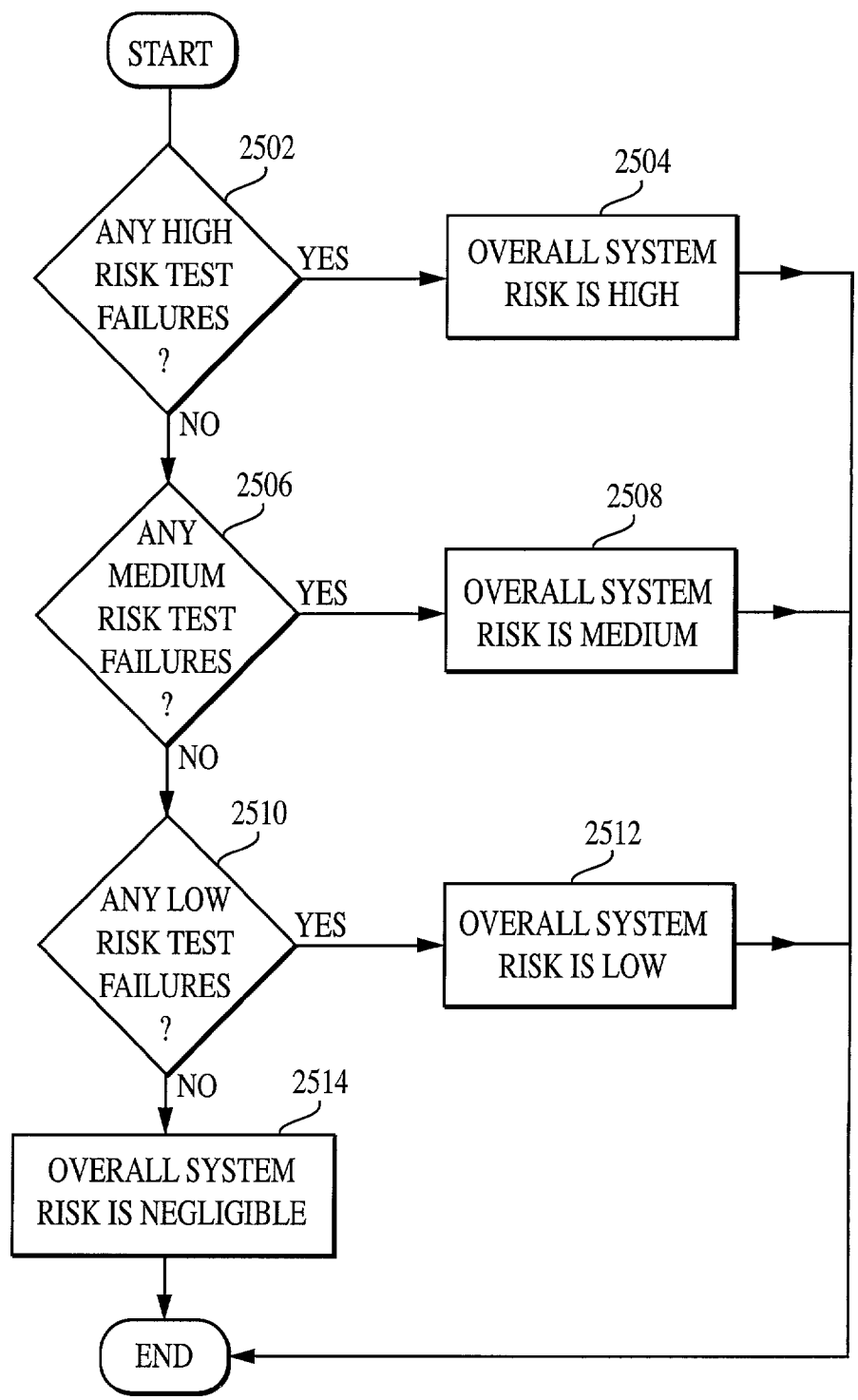
FIG. 25 is an exemplary flow diagram of a method of assessing overall system risk in accordance with at least some embodiments contemplated by the present invention.

In addition to the individual risk level scores for each test failure as determined in step 2106, an overall risk level for the project is also determined as indicated by step 2108. As shown in FIG. 25, in at least some embodiments, of the present invention, the overall system risk level is defined as the highest of the individual risk elements. Thus, if it is determined that any element in the risk profile associated with the failure of any given test procedure is "high" (as indicated by decision block 2502), then the overall risk for the system is high as indicated by a block 2504. If the risk profile associated with the failure of any given test procedure is "medium" (as indicated by decision block 2506), then the overall risk for the system is medium as indicated by a block 2508 when no high risk test failures are present. If the risk profile associated with the failure of any given test procedure is "low" (as indicated by decision block 2510), then the overall risk for the system is low when no high risk or medium risk failures are present, as indicated by a block 2512. If the risk profile associated with the failure of any given test procedure is "negligible" then the overall risk for the system is negligible, as indicated by a block 2514, when no high risk, medium risk, or low risk failures are present. The user also can have the ability to override the overall system risk level as determined in accordance with the above methodology. In such a case, the user will also be able to optionally provide explanatory text to accompany the overall user-defined system risk level.

Publishing

In the publishing step 108, the present invention collates the results of the certification process and optionally generates the documents needed for accreditation. The present invention takes the information gathered during the steps corresponding to blocks 100, 102, 104 and 106, and reformats the information by, for example, organizing it into to appropriate documents, document subsections or subparagraphs, sections and/or appendices, etc.

Figure 26:
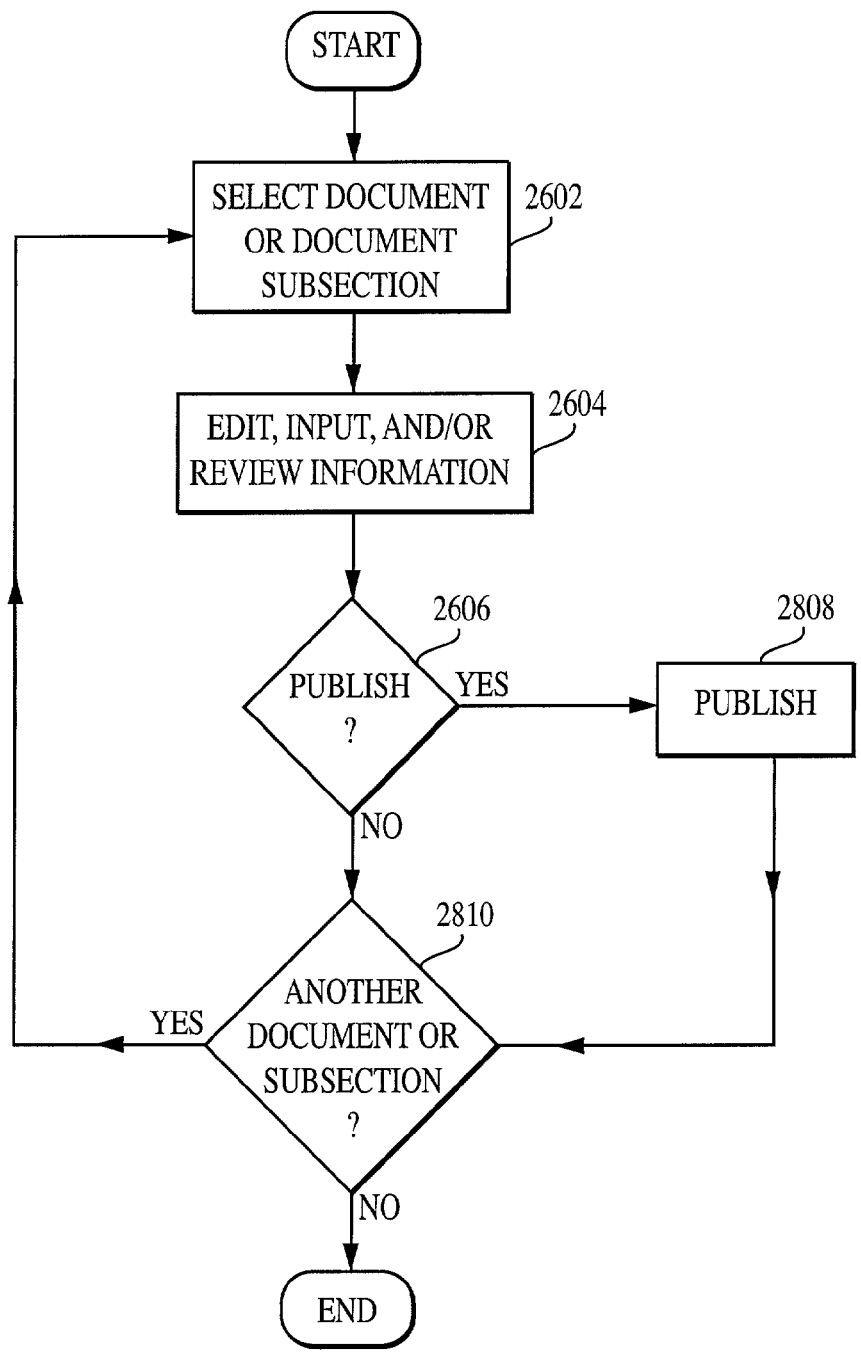
FIG. 26 is an exemplary flow diagram of the publishing process in accordance with at least some embodiments contemplated by the present invention.
Figure 27:
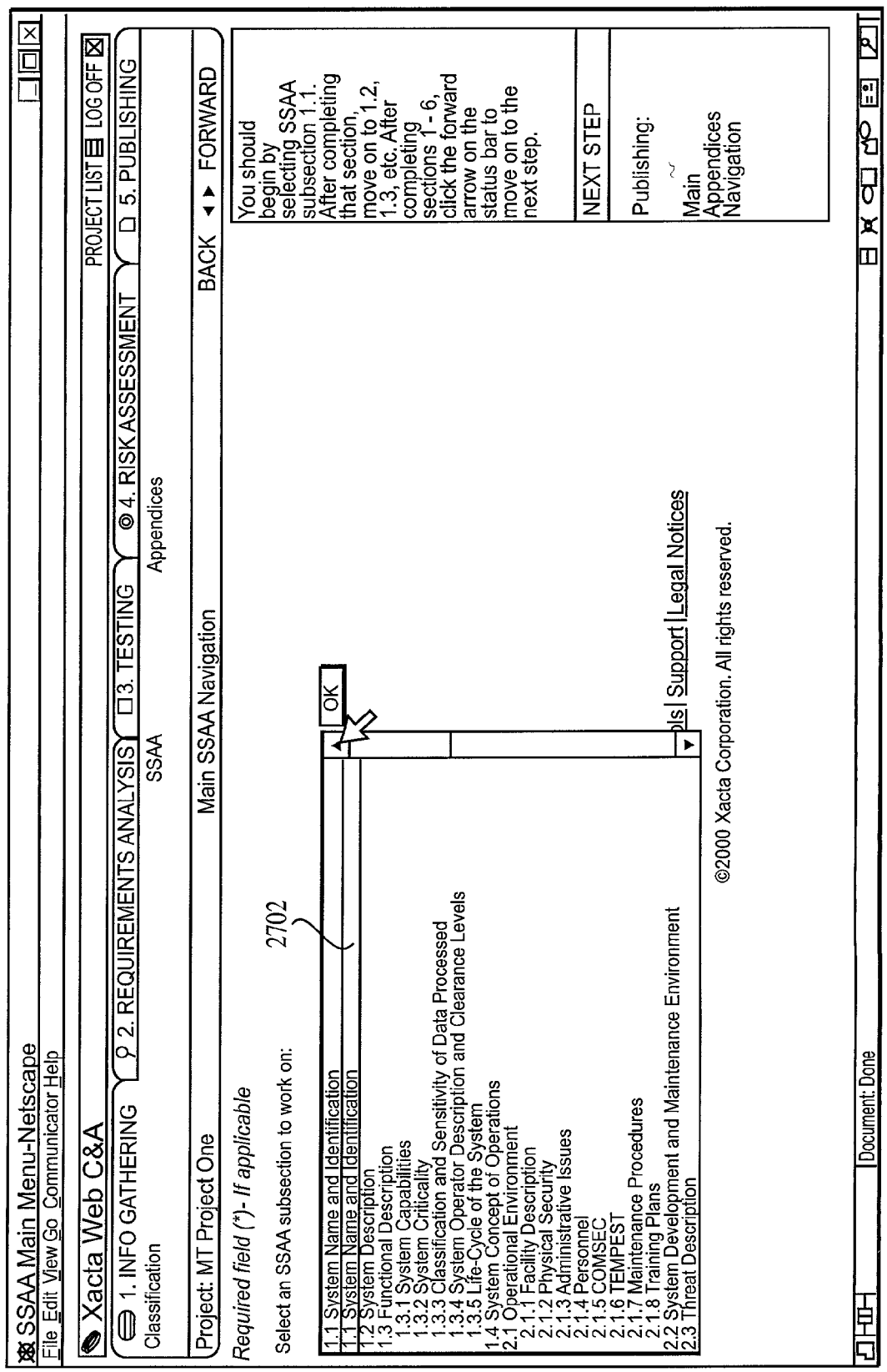
FIG. 27 is an exemplary screen shot showing how a user can select a portion of a document for publishing.
Figure 28:
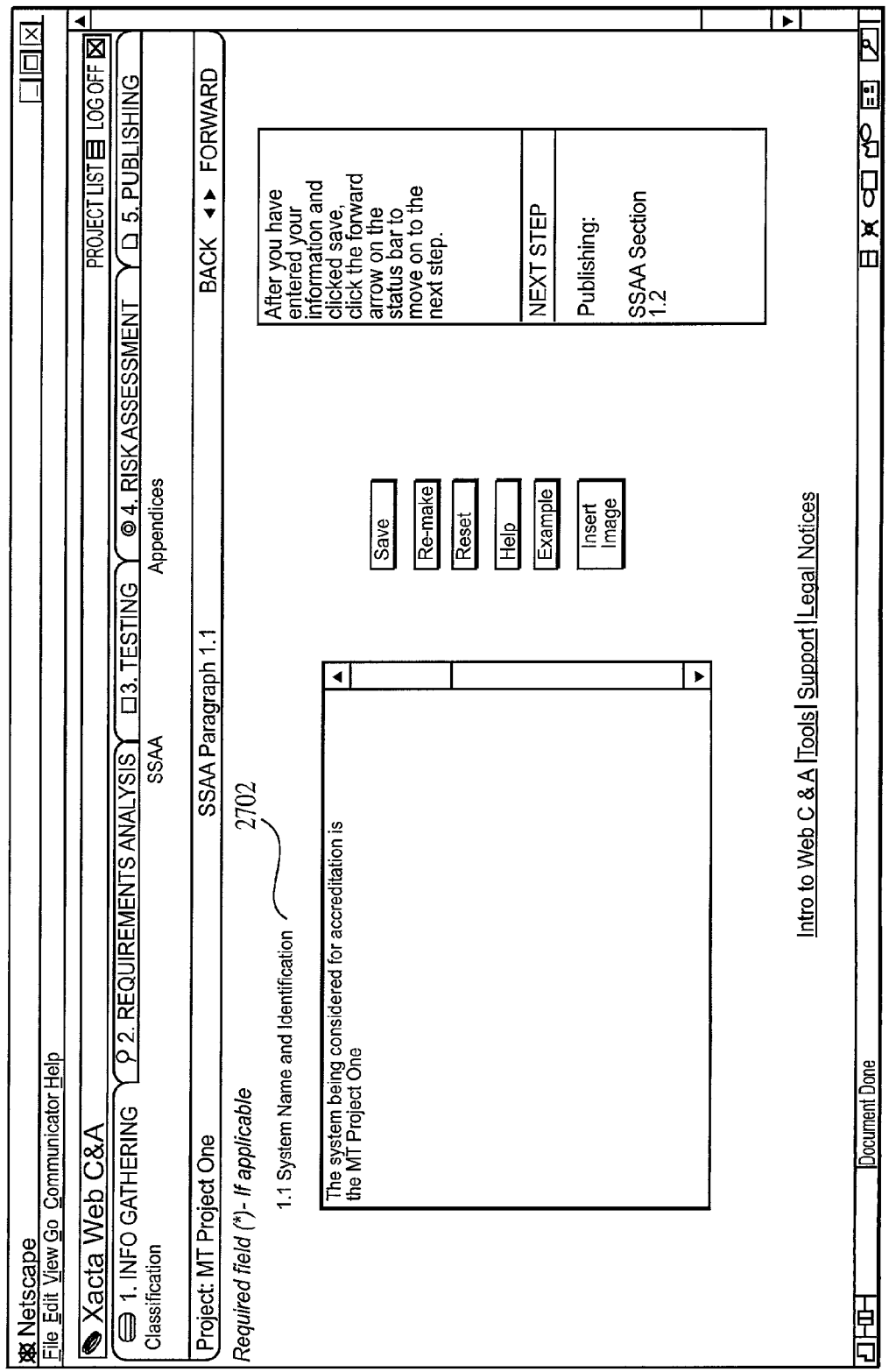
FIG. 28 is an exemplary screen shot that enables a user to edit and/or view a portion of a document prior to publishing.
Figure 29:
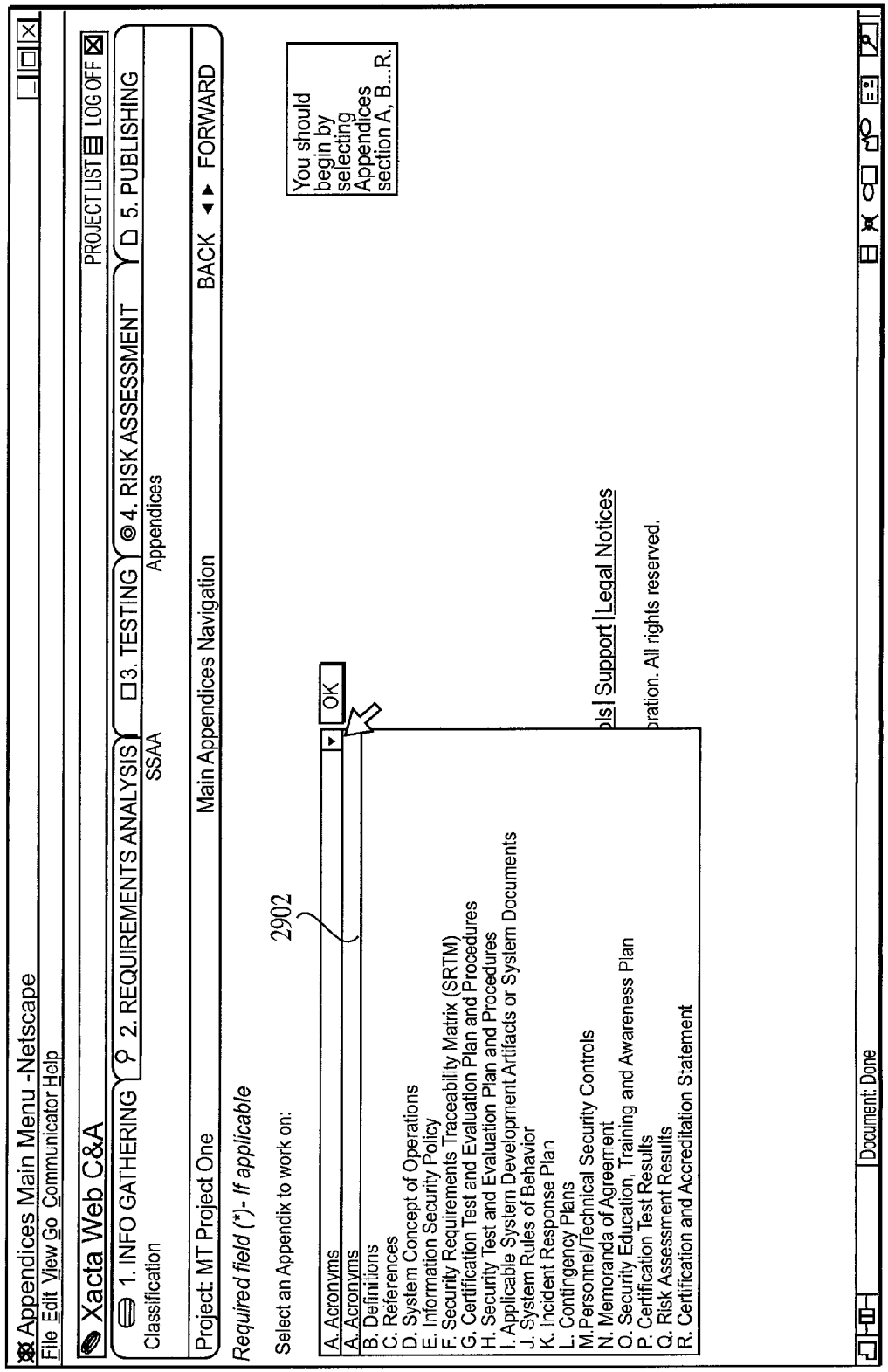
FIG. 29 is an exemplary screen shot showing how a user can select a portion of a document for publishing.
Figure 30:
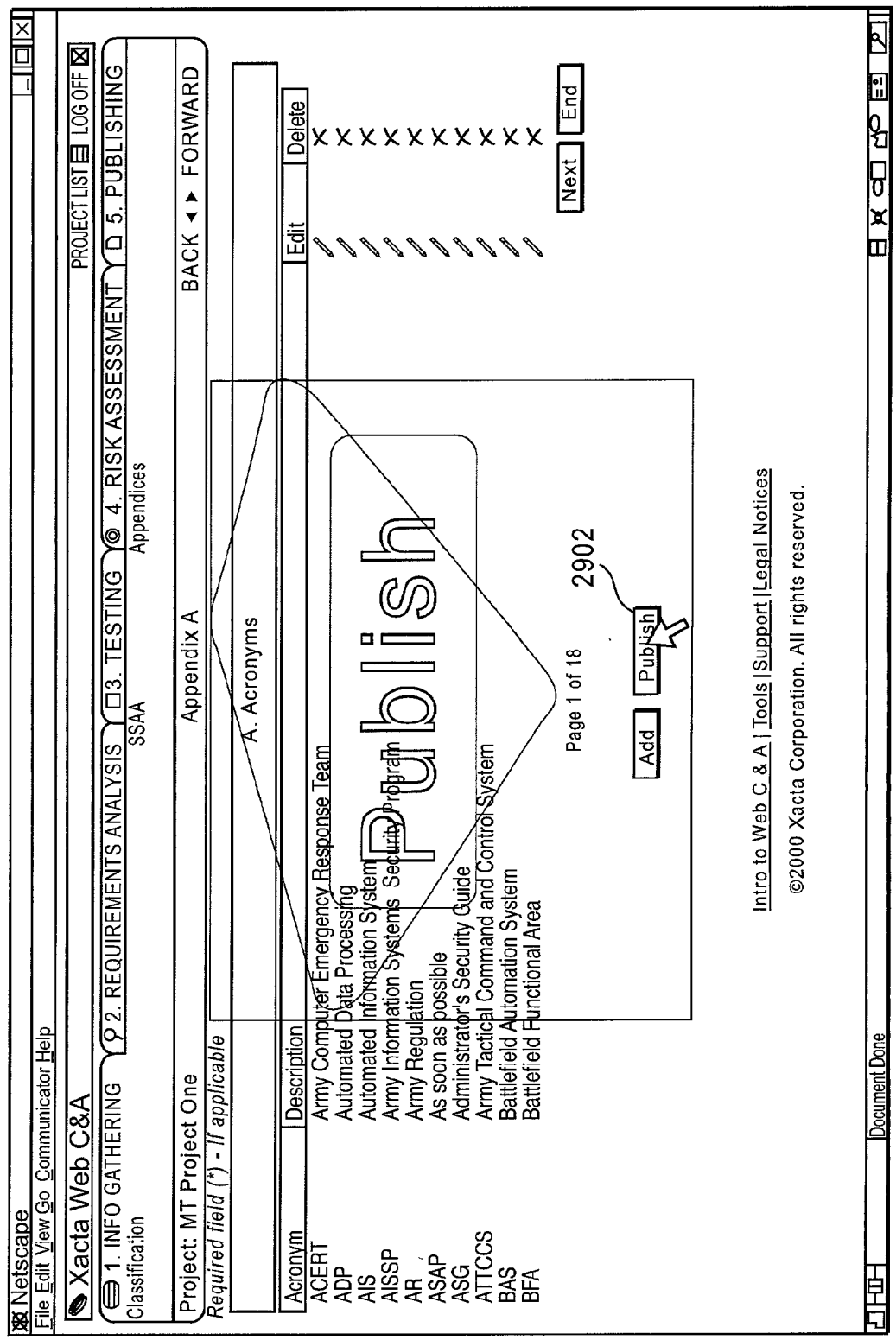
FIG. 30 is an exemplary screen shot illustrating how a user can publish a portion of a document.

As shown in FIG. 26, the invention allows a user to select a document or subsection thereof for publishing 2602, and to optionally input and/or review the information thereof 2604. As shown in FIG. 27, to view the document subsection thereof, the user simply clicks on the section name 2702. As shown in FIG. 28, the user can then edit the selection subsection 2702. The user can optionally edit, input information, or review the existing text 2604 or add to it, or even upload graphics if desired to further customize the final document. If the user chooses to publish the document or subsection under consideration 2606, the publishing function 2808, as shown in FIG. 29, can also, as previously discussed, generate any Appendices desired by the user and/or required by, for example, the DITSCAP (DoD Instruction 5200.40). At decision step 2810, the process can either be repeated for another document or subsection, or terminated. FIG. 30 shows an exemplary screen shot that enables a user to publish 2902 the acronym list 2902 selected in FIG. 29. The present invention also contemplates that accreditation can be automated, so that no accreditation agency is needed. In this embodiment, when sufficient test related results and/or information is provided to the computer 3102, the method according to the present invention can automatically determine that accreditation requirements have been satisfied.

Work Product Manager

At least some embodiments of the present invention provide a "front end" (called Work Product Manager (WPM)) that, inter alia, allows a user to customize a C&A and/or add workflow functionality to the C&A process. By using the WPM, work products (a unit of work) can be defined. Each one of these work products can, for example, be opened, submitted, and approved by a user (e.g., an analyst). When one of these events takes place, an e-mail or other electronic notification can be sent to the appropriate user(s). The present invention thus provides an e-mail Notification Setup Graphical User Interface (GUI) that enables users to define and enter, for example, Role/Title, Users, and work product notifications in support of the e-mail notification functionality.

In accordance with at least some embodiments of the present invention, the WPM provides, for example, electronic control and authorization of access to documents, notification of designated individuals when a predefined event occurs, document approval, tracking, status reporting, and tracking of edits and/or document revisions. The WPM of the present invention also advantageously provides for the revision, approval, and release of documents in a collaborative environment. In addition, the WPM of the present invention also can help ensure that published content (e.g., a C&A report or portion thereof) is accurate and timely, providing for the automated document release and/or user notification for time-sensitive documents or content.

The WPM enables users to define a Work Breakdown Structure (WBS) (collection of units of work) that resemble a company's best practices. WPM provides a GUI that can be used to notify users when the state of a Work Product changes.

The following terms and associated definitions associated with the WPM are provided:

Process Step (PS): A unit of work that normally corresponds, for example, to a screen display.

Work Product (WP): A unit of work within WPM that consists, for example, of one or more PSs.

Work Breakdown Structure (WBS): A set of WPs that can comprise the complete work flow for a project (e.g., a C&A).

Submittal: When work is completed on a WP, an analyst with appropriate permission can submit it for approval. Submittal can also lock the information in the WP so no further change can take place.

Approval: An analyst with appropriate permission can approve a submitted WP. In accordance with at least some embodiments of the present invention, when a WP is approved, its content preferably remains locked. Subsequent WPs may then become available for work.

Disapproval: An analyst with appropriate permission can disapprove a submitted WP. In accordance with at least some embodiments of the present invention, when a WP is disapproved, its content is unlocked so that further work may be done to complete it.

Prerequisite: WPs within a WBS can be set up with dependencies. In accordance with at least some embodiments of the present invention, any given WP may be configured so that it only becomes available for work when certain prerequisite WPs have been approved.

Reopening: An analyst with appropriate permission can reopen an already-approved WP if new information has become available and the WP must be revised. In accordance with at least some embodiments of the present invention, reopening preferably unlocks the information in the WP so that it may be revised. Subsequent WPs with dependencies may once again become unavailable for work.

Figure 31:
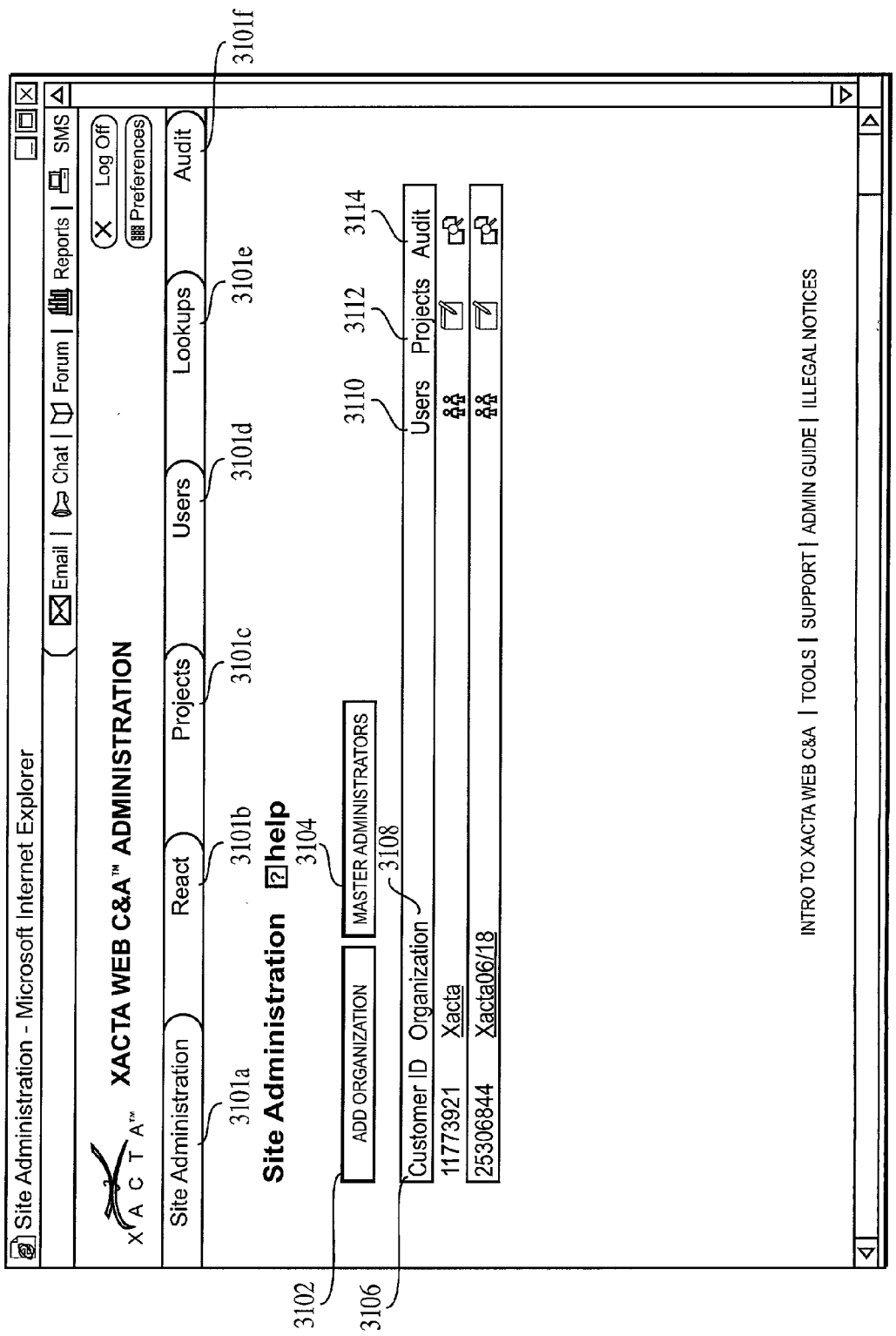
FIG. 31 is an exemplary screen shot of the Work Product Manager (WPM) that enables the addition of an organization.

FIG. 31 is an exemplary screen shot of the WPM that enables the addition of one or more organizations (e.g., a corporation (and/or one or more divisions and/or subsidiaries thereof), a non-profit organization (and/or one or more components thereof), government department or agency (and/or one or more portions thereof)), each of which can have, for example, one or more projects (e.g., a C&A) associated therewith. FIG. 31 thus conveniently enables one or more projects to be associated with one or more organizations (or portions thereof).

The WBS generally defines the process flow for the project. FIG. 31, associated with Site Administration tab 3101a, enables a system administrator, for example, to add an organization via button 3102. When button 3102 is selected, a subsequent screen(s) (not shown) appears that enables an administrator to enter information such as a customer ID 3106 and/or Organization 3108 name. A list of Users 3110 for the organization, existing organization Projects 3112, and Audit 3114 information (which can also be viewed by selecting tab 3101f) enables a user to select and/or search for a project name by, for example, entering the project name and/or other parameters associated with the project (e.g., the date that the project was created and/or worked on). A project name can also be entered via Projects 3112. The system can provide to the user, based upon the user entered data, any changes made, for example, to any project PSs and/or other information (e.g., Test Procedures). A complete list of all changes made to a project can be provided via Audit 3114 icon (and/or Audit tab 3101f). A list of Master Administrators who can, for example, add an organization can also be viewed via button 3104.

Figure 32:
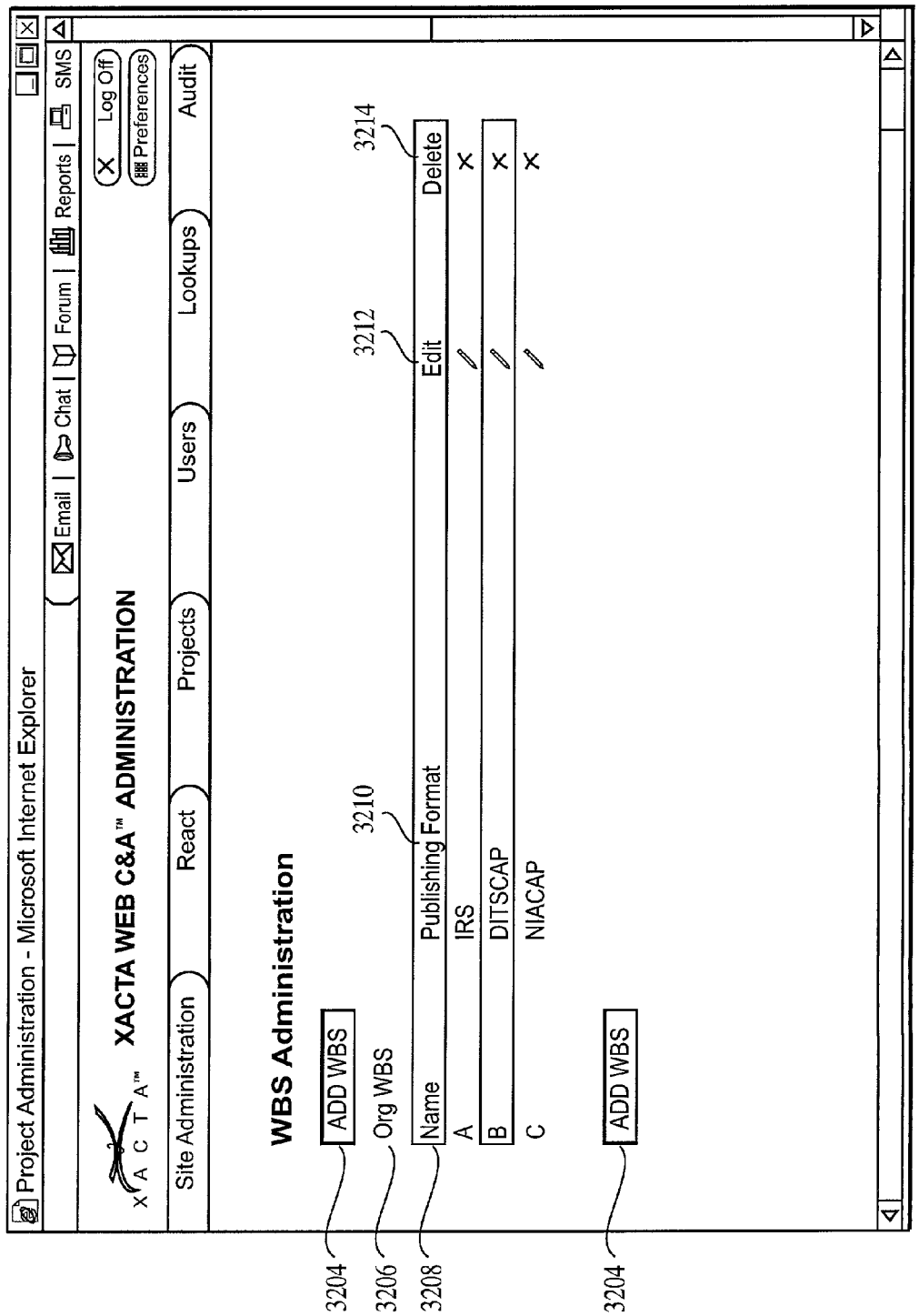
FIG. 32 is an exemplary screen shot of the WPM the that displays information pertaining to Work Breakdown Structures (WBSs)

Once an organization has been added, Users 3110 associated with the organization can add a WBS by, for example, selecting the Project 3112 icon associated with the Organization 3108 of interest, which will take the user to an exemplary screen shot such as shown in FIG. 32. Via FIG. 32, a user can select one of the Add WBS buttons 3204, as will be explained in further detail with regard to FIGS. 33-36. Once an organization has been entered, information pertaining to the WBS (Work Breakdown Structure) 3208 and Publishing Format 3210 are preferably displayed. A user can also Edit 3212 and/or Delete 3214 a WBS once it has been entered.

Figure 33:
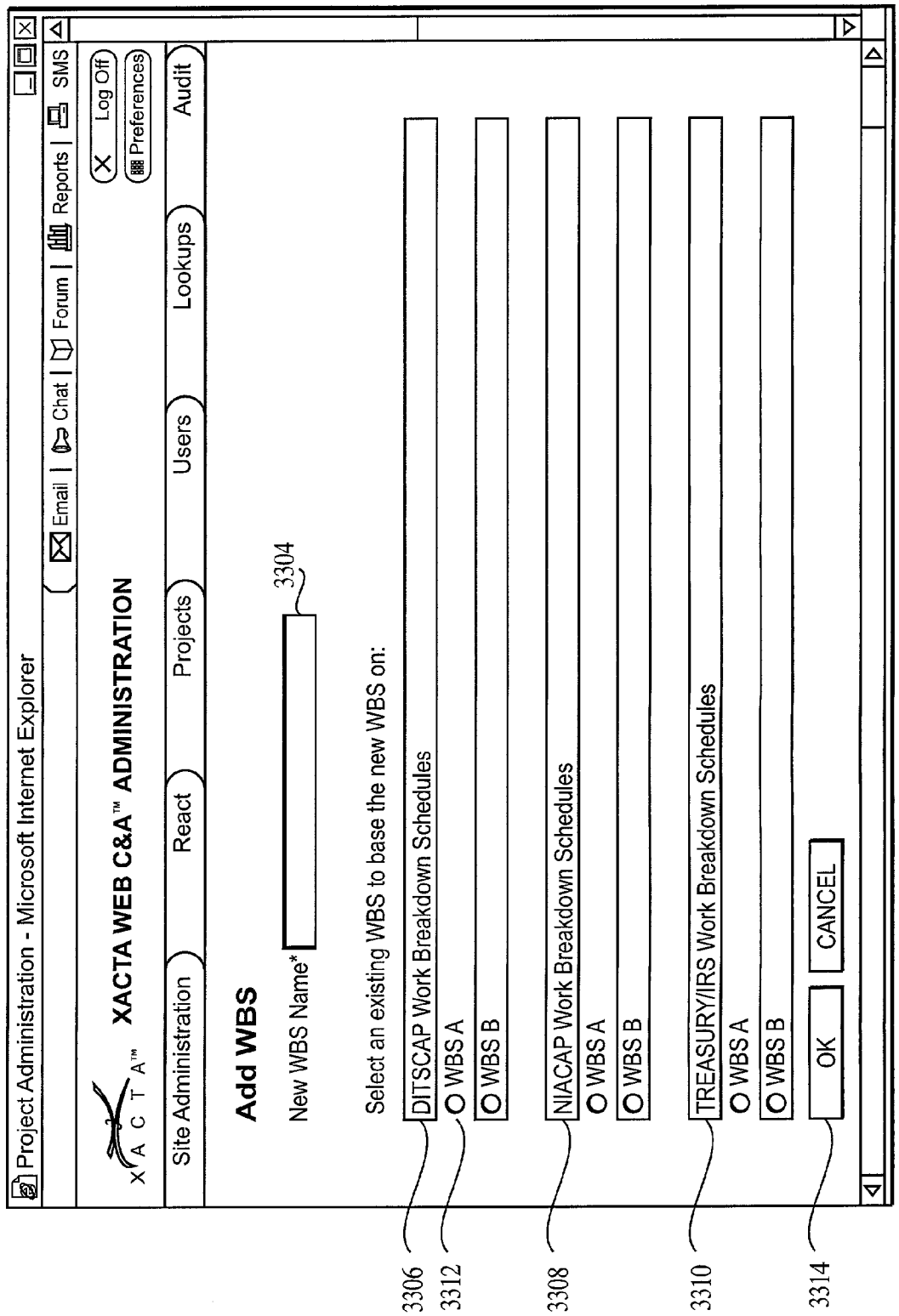
FIG. 33 is an exemplary screen shot that enables a user to add a new WBS.

Upon selecting one of the Add WBS buttons 3204, an exemplary display such as shown in FIG. 33 preferably appears, where a user begins the process of creating a tailored sequence of PSs. The user can enter a New WBS Name* 3304. The asterisk (*) can optionally be utilized to indicate to the user that data entry is mandatory. While creating a tailored sequence of PSs, the user can also optionally use either a predefined (e.g., shipped with the system) sequence of PSs, or base the new sequence of PSs of a sequence of tailored sequence steps that the user has previously defined. WBS A associated with each or any of the DITSCAP, NIACAP and/or Treasury/IRS methodologies can therefore be a predefined sequence of PSs, whereas WBS B associated with each or any of the DITSCAP, NIACAP and/or Treasury/IRS methodologies can be a tailored sequence steps that the user has previously defined. Any number WBSs that use either predefined or tailored sequence steps can be associated with each of the DITSCAP, NIACAP and/or Treasury/IRS methodologies. This feature of the present invention advantageously allows a user to customize his own WBS, by utilizing an existing WBS to expedite the process.

In this regard, the user can select, for example, a predefined or user-tailored DISTCAP 3306, NIACAP 3308, or Treasury/IRS 3310 Work Breakdown Structure (WBS) upon which to base the WBS entered at 3304. Thus, if the user wants to model the WBS after one of the DITSCAP 3306, NIACAP 3308, or Treasury/IRS Work Breakdown Structures (e.g., WBS A 3312), the user could select one of the six shown WBSs (with two being shown under each of the DITSCAP 3306, NIACAP 3308, and Treasury/IRS 3310 WBSs). Alternatively, the user can create a new WBS that is not based on a DITSCAP, NIACAP, or Treasury/IRS WBS by selecting the OK button 3314 without selecting one of the six shown WBSs.

Figure 34:
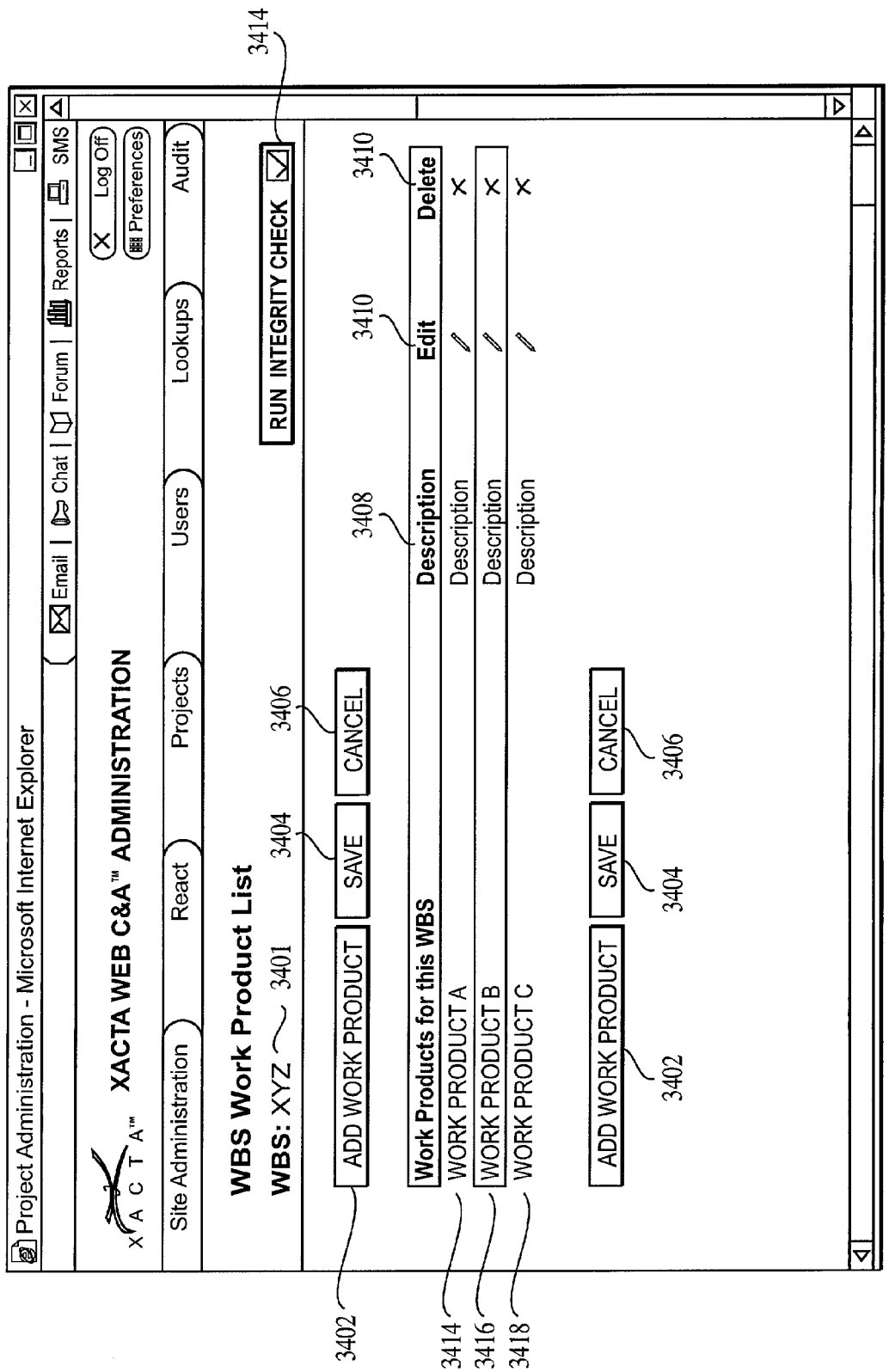
FIG. 34 is an exemplary screen shot that shows Work Products (WPs) that are associated with a WBS.
Figure 35:
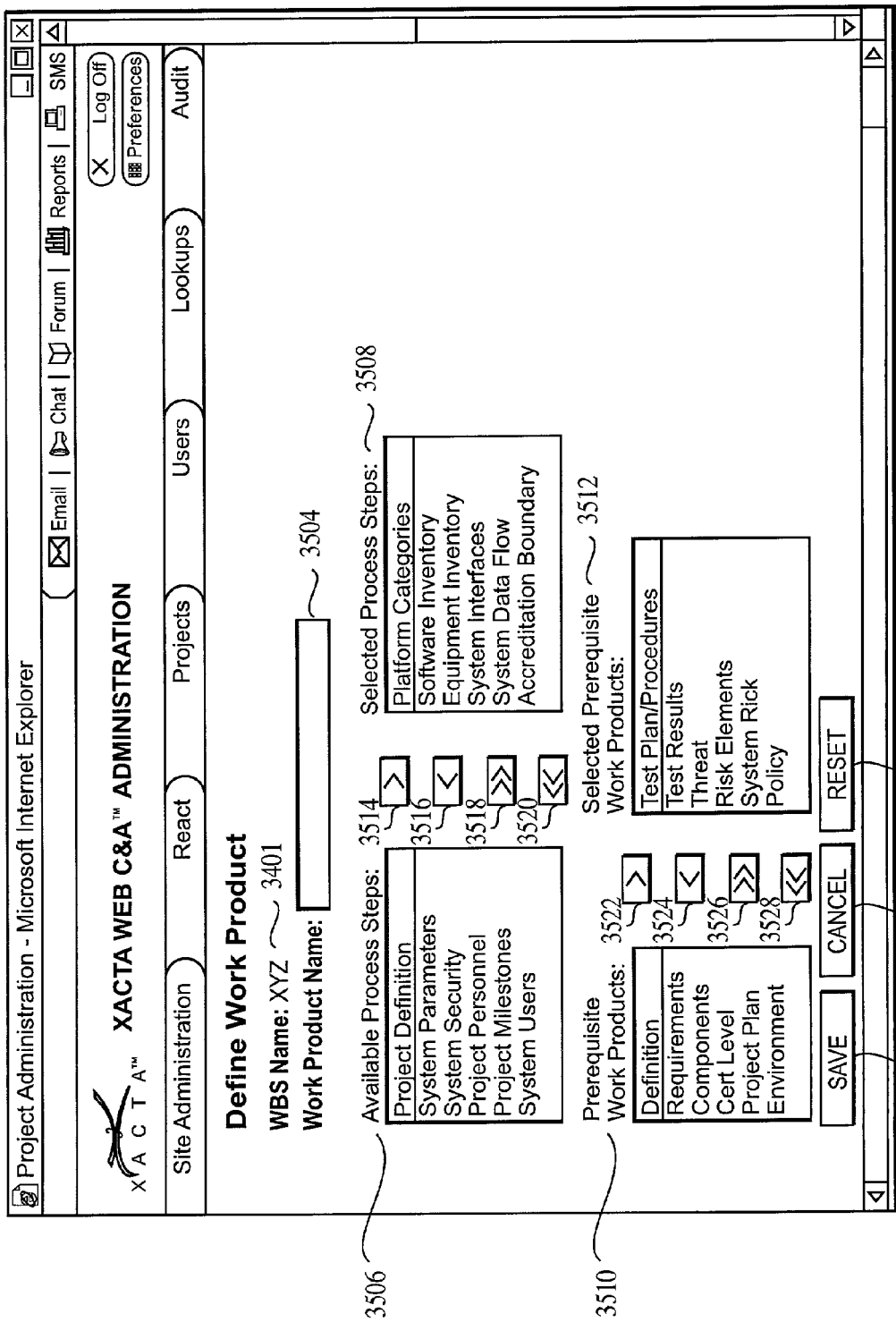
FIG. 35 is an exemplary screen shot that can be used to associate one or more Process Steps (PSs) with a WP.

As shown in FIG. 34, once a WBS 3401 has been added, Work Products (WPs) for the WBS 3401 can be added by selecting one of the Add Work Product 3402 buttons. When an Add Work Product 3402 button is selected, an exemplary display such as shown in FIG. 35 appears, where a user can enter a Work Product Name 3504. The Available Process Steps are shown in window 3506, from which the user can select which Process Steps he wishes to associate with the Work Product Name 3504. The Selected Process Steps are shown in window 3508. The user can add process steps via window 3506 one at a time by selecting button 3514, or add all available process steps by selecting button 3518. Selected process steps can similarly be removed from window 3508 by clicking buttons 3516 and 3520, respectively.

The user can also select Prerequisite Work Products that are displayed in window 3510, which, when selected, are the WPs that must be completed before the Work Product entered at 3504 can begin. One or more prerequisite work products individually can be added via button 3522, whereas all prerequisite work products can simultaneously be added via button 3526. Prerequisite work products can be similarly removed by selecting buttons 3524 and 3528, respectively. Selections can be saved by selecting button 3530, canceled by selecting button 3532, and reset by selecting button 3534.

Selecting cancel button 3532 can, for example, return the user to the previous screen, whereas selecting reset button 3534 can reset FIG. 35 to its default.

Returning now to FIG. 34, the user can enter a Description 3408 for a selected WP. By selecting an Edit icon 3410, the user will be returned to FIG. 35, where the WP can be edited. The user can also delete a WP by selecting the Delete 3412 icon associated with the WP that the user wishes to delete. The user can either save the WP(s) by selecting the Save 3404 icon, or cancel any changes by selecting the Cancel 3406 icon. Finally, the user can run an integrity check by selecting icon 3414, which will display a screen such as (but not necessarily the one) shown in FIG. 36.

Figure 36:
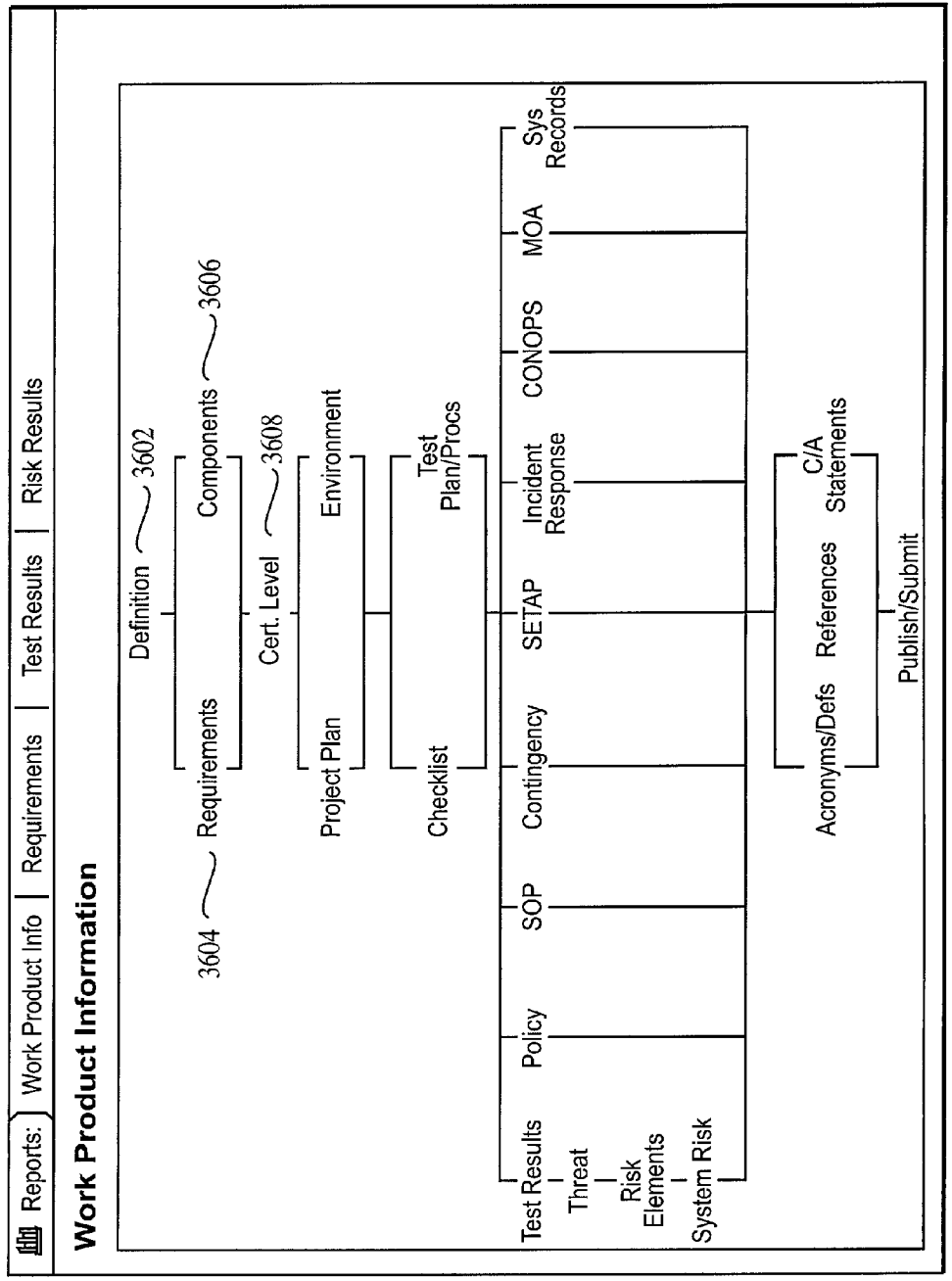
FIG. 36 is an exemplary screen shot that illustrates a hierarchy of prerequisite WPs.

FIG. 36 shows an illustrative user-defined workflow. As shown, WP Definition 3602 must be completed before starting the Requirements 3604 and Components 3606 WPs. The Requirements 3604 and Components 3606 WPs, in turn, must be completed before starting the Cert Level 3608 WP. The remaining listed WPs follow the same prerequisite pattern. FIG. 36 can be used by a user to ensure that prerequisites are properly defined, and to avoid a situation such as defining a project where two WPs are prerequisites for each other.

Figure 37:
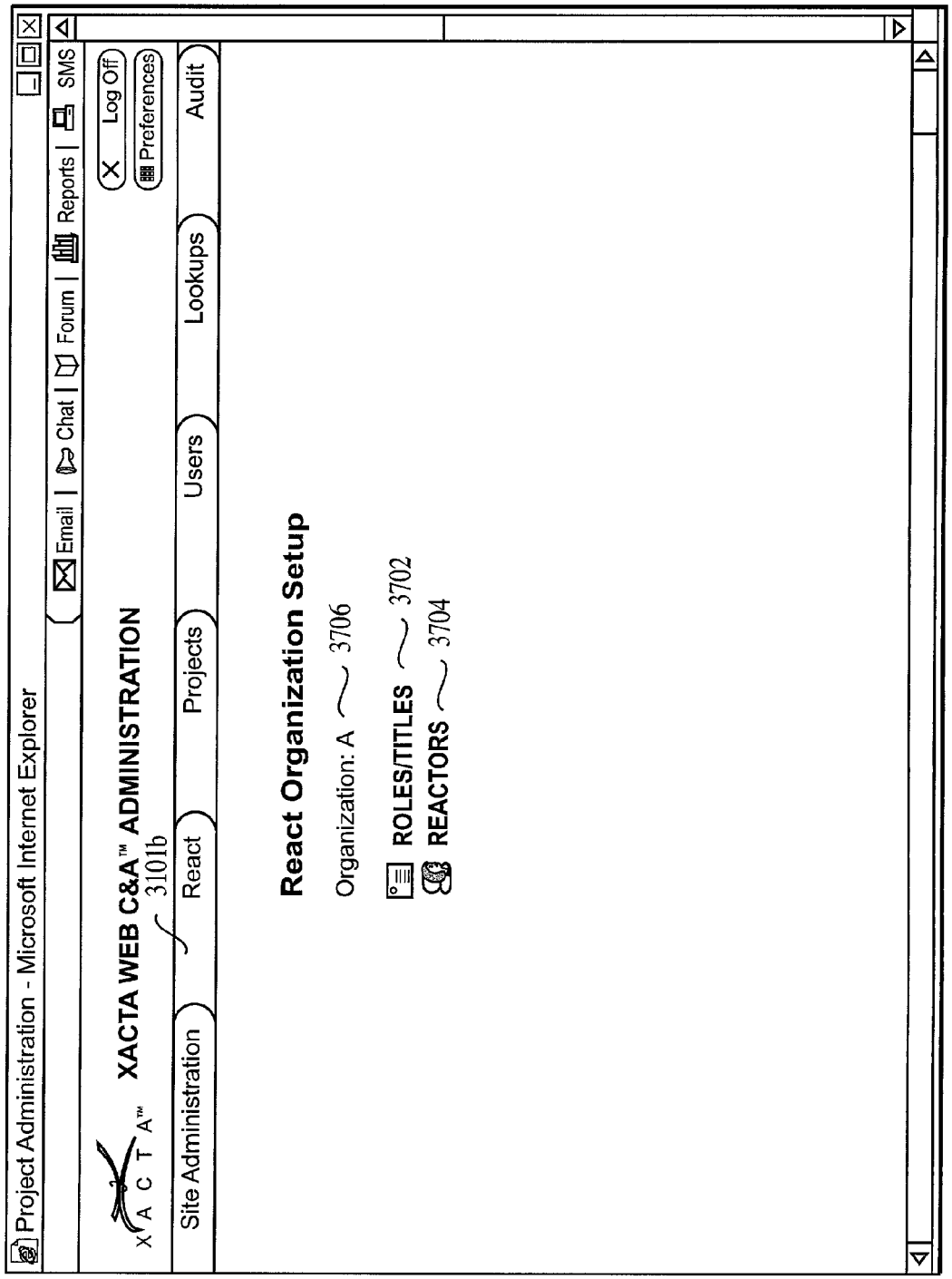
FIG. 37 is an exemplary screen shot that allows users to add and/or edit information pertaining to roles/titles and/or reactors.

FIG. 37 is an exemplary screen shot that enables a user to add and/or edit information pertaining to Roles/Titles 3702 and/or Reactors (e.g., a user) for a particular Organization 3706. FIG. 37 can appear by selecting, for example, React tab 3101b. If a user selects the Roles/Titles icon 3702, he will preferably be taken to an exemplary screen such as shown in FIG. 38.

Exemplary roles can be, for example, at least one of: certification and accreditation analyst, computer security incident response capabilities representative, privacy advocates office representative, disclosure office representative, vulnerabilities office representative, technical contingency planning document representative, request for information system originator, owner of business system, certification and accreditation request for information system coordinator, critical infrastructure protection representative, system point of contact, principal accrediting authority, certification and accreditation administrator, and certification and accreditation chief.

Figure 38:
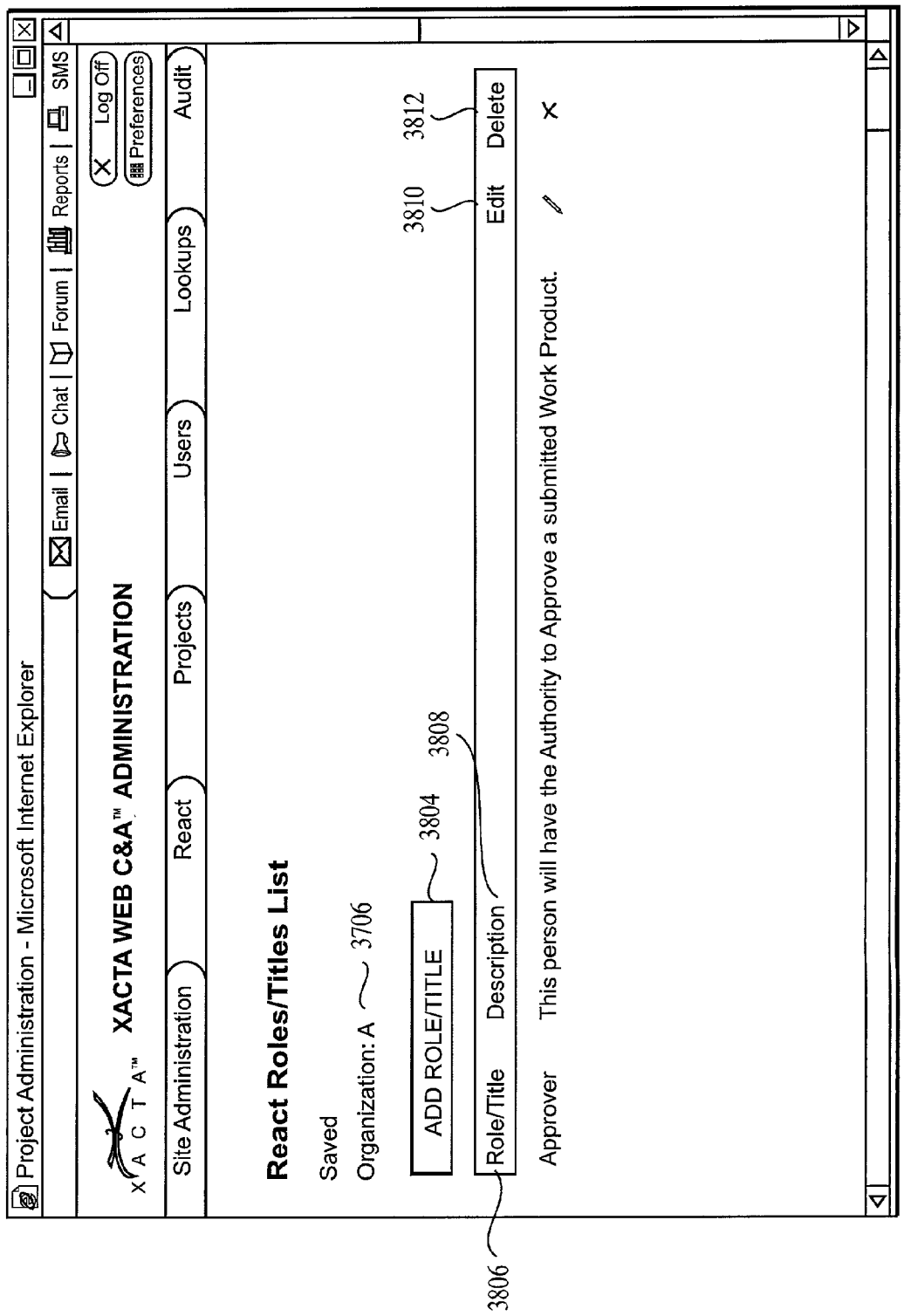
FIG. 38 is an exemplary screen shot that displays and facilitates the addition of information pertaining to a role/title.

With regard to FIG. 38, any Role(s) and/or Title(s) associated with the Organization 3706 are shown. Specifically, in FIG. 38, the Role/Title 3806 of Approver is shown, as is a Description 3808 of the Role/Title 3808. By selecting Edit icon 3810, the user can edit information pertaining to the Role/Title 3806 and/or Description 3808 thereof. By selecting the Delete 3812 icon, the user can delete a user-defined Role/Title (e.g., Approver). By selecting the Add Role/Title button 3804, the user will be advanced to an exemplary screen such as shown by FIG. 39.

Figure 39:
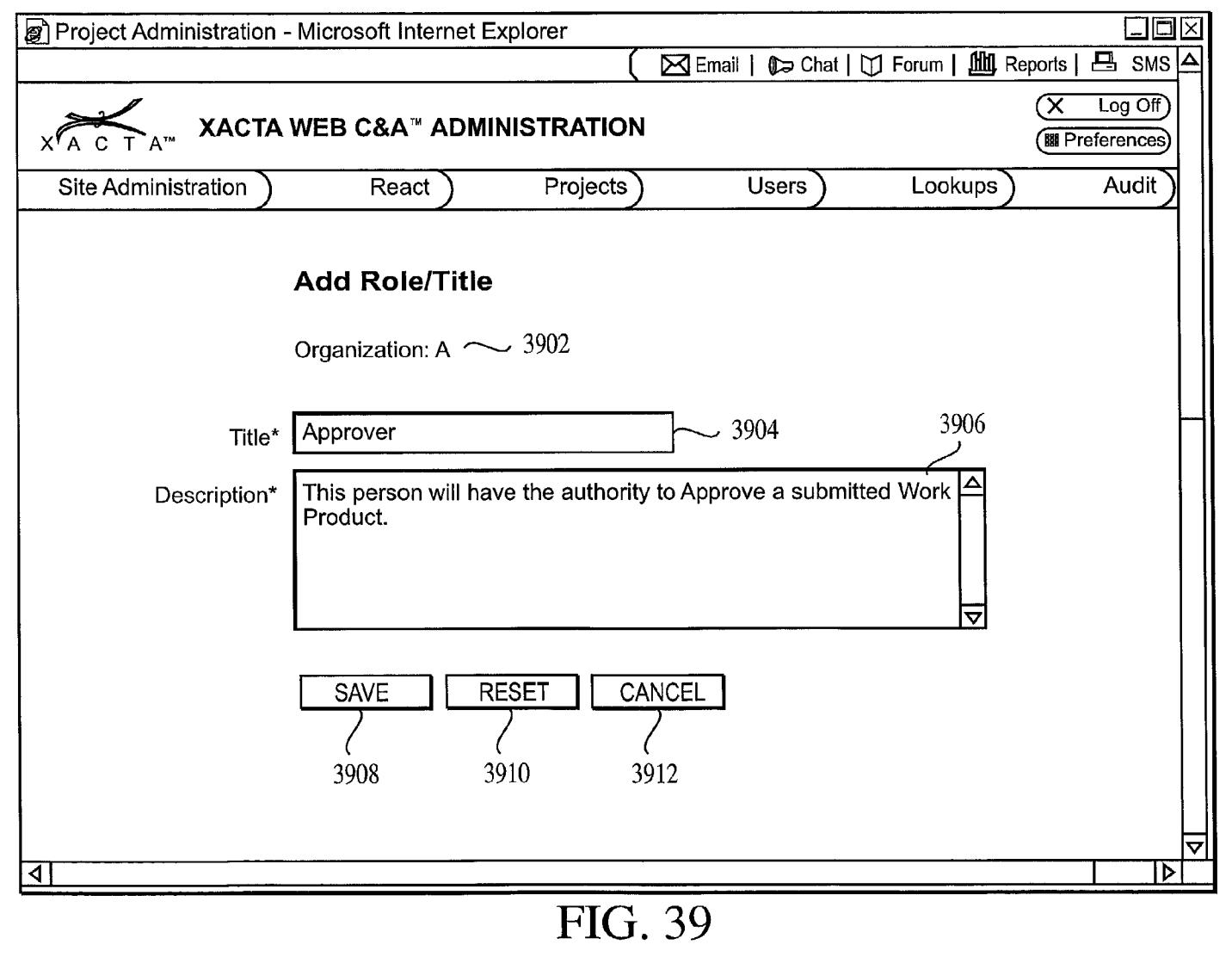

FIG. 39 is an exemplary screen shot that enables a user to add a Role/Title. In order to define a Title*, the user must provide a role/title name in text box 3904. The asterisk (*) indicates that the field is mandatory. Other symbols and/or characters can also be used to designate mandatory fields. In the Description: text box 3906, the user can optionally enter a description of the Title (e.g., Approver). The user can save the results by selecting the Save button 3908. Selecting the Reset button 3910 can reset the screen, for example, to its default condition. Clicking Cancel button 3912 can return the user to, for example, the previous screen.

Figure 40:
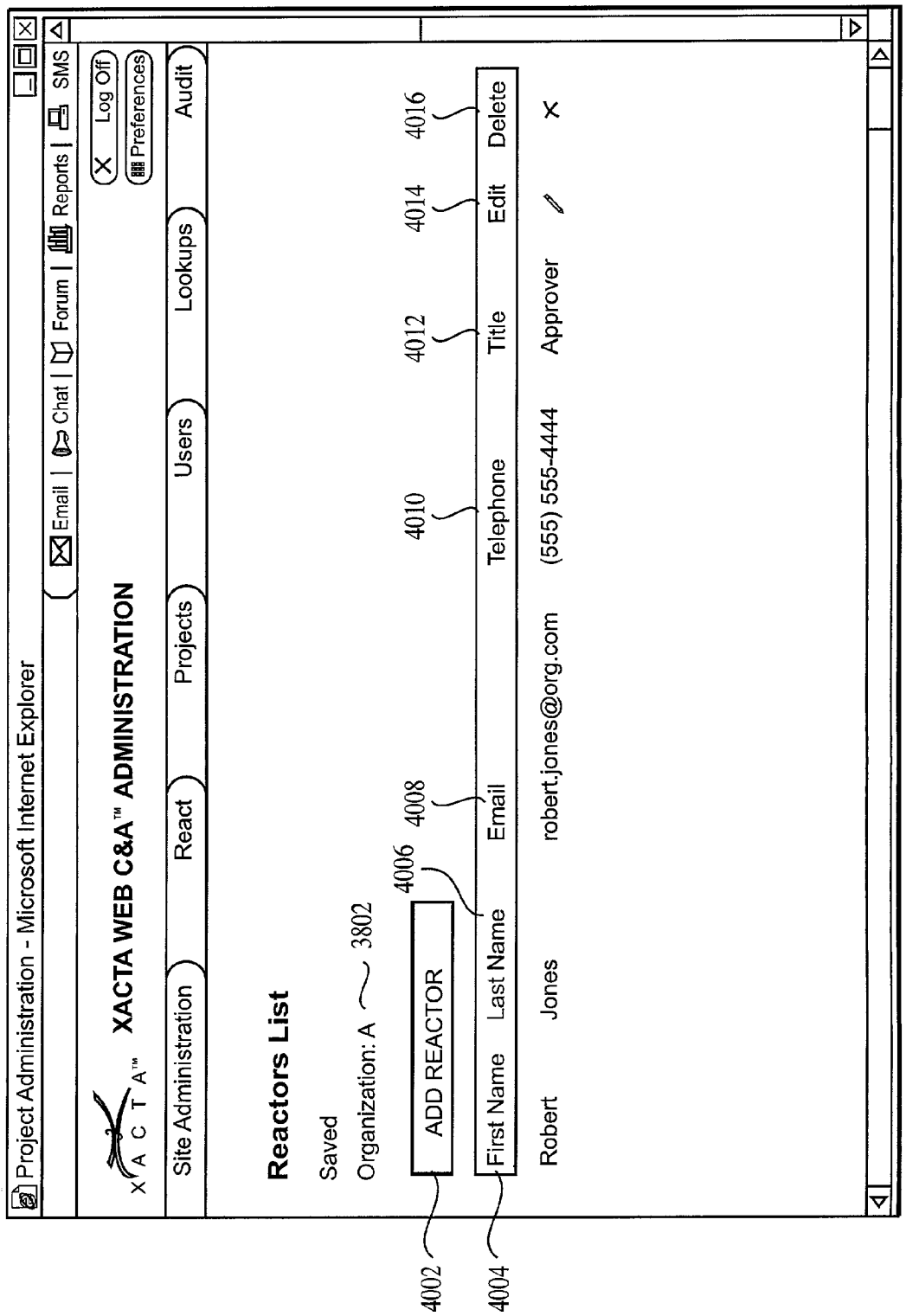
FIG. 40 is an exemplary screen shot that shows a reactor that is associated with a particular organization.
Figure 41:
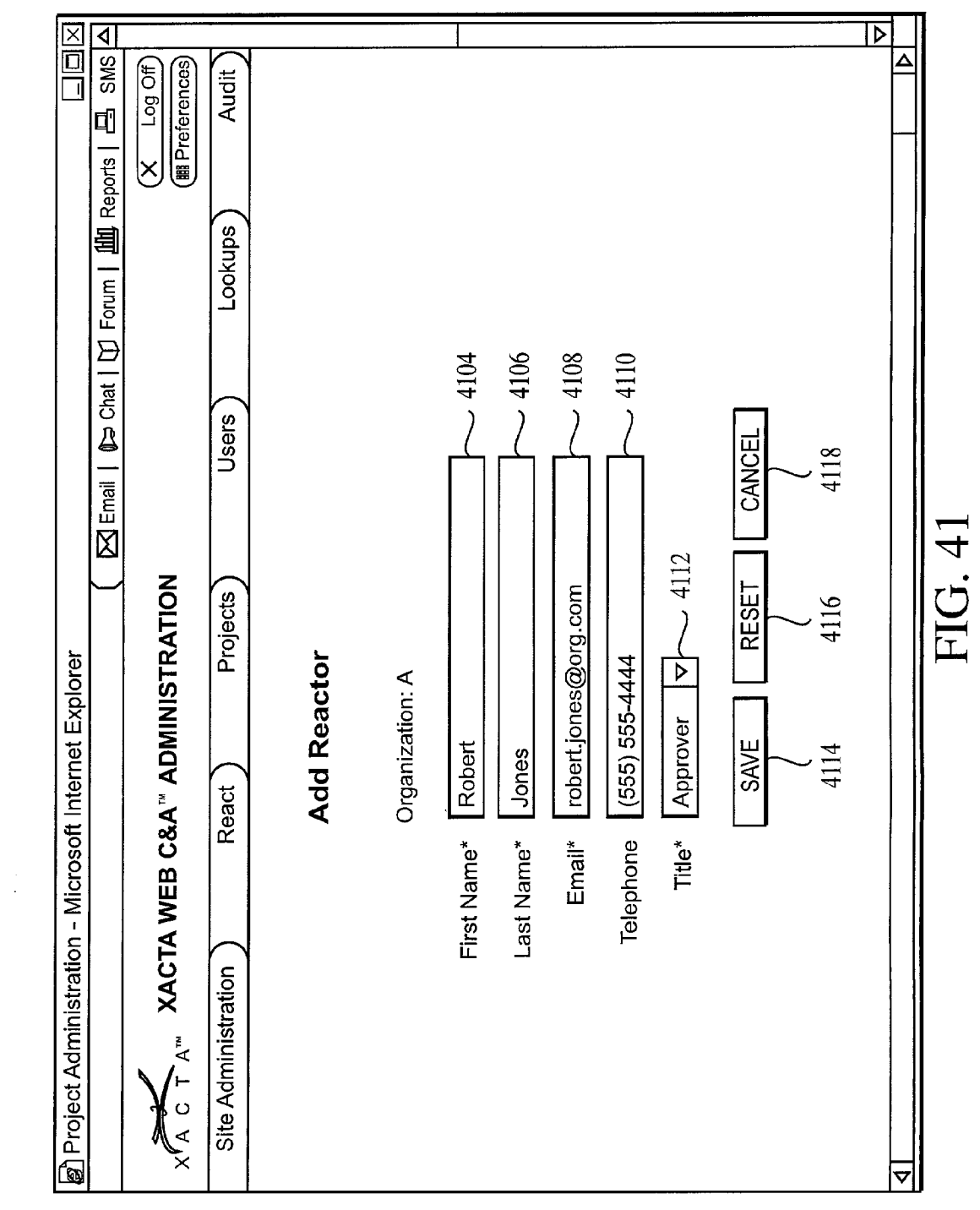

FIG. 40 is an exemplary screen shot that shows a reactor (e.g., user) associated with a particular organization. The First Name 4004, Last Name 4006, Email 4008, Telephone 4010, and Title 4012 of each user is displayed. Additional or less information for each user can also be displayed. By selecting Edit icon 4014, the user can edit information pertaining to a reactor. By selecting the Delete 4016 icon, the user can delete a reactor (e.g., Robert Jones). By selecting the Add Reactor button 4002, the user will be taken to an exemplary screen such as shown by FIG. 41, which allows a user to add a reactor. Via text boxes 4104, 4106, 4108 and 4110, a user can add information pertaining to the reactor's First Name, Last Name, Email, and Telephone, respectively. Via, for example, pull down menu 4112, the user can also associate a title/role with the reactor. As previously discussed, roles/titles can be defined, for example, via FIG. 39. As previously noted, an asterisk (*) next to a field name (e.g., First Name*) indicates that the user must provide information associated therewith. The user can save the results by selecting the Save button 4114. Selecting the Reset button 4116 will preferably reset the screen to its default condition. Selecting the Cancel button 4118 can return the user to, for example, the previous screen.

Figure 42:
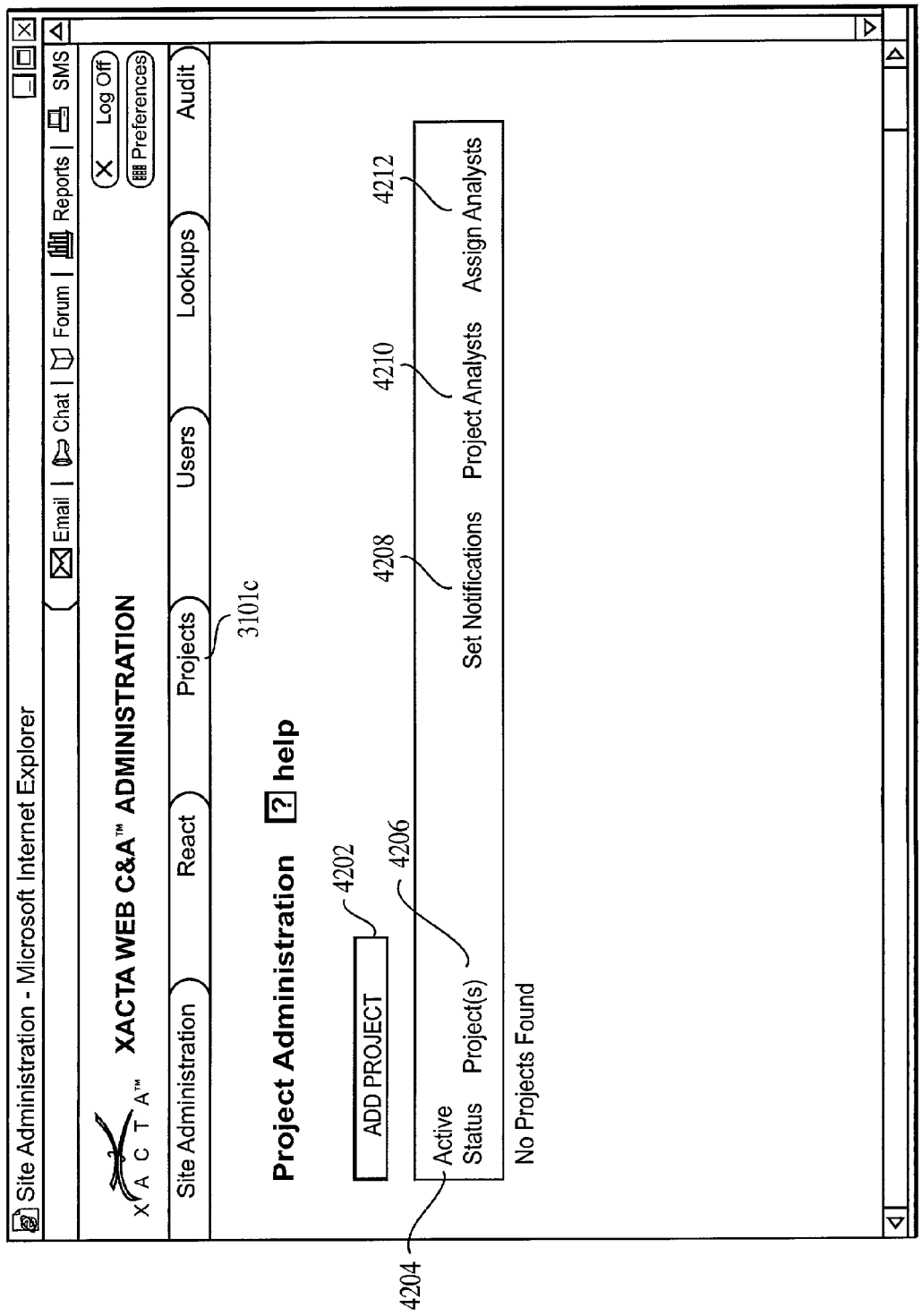
FIG. 42 is an exemplary screen shot that allows a user to view projects and/or add a project.
Figure 43:
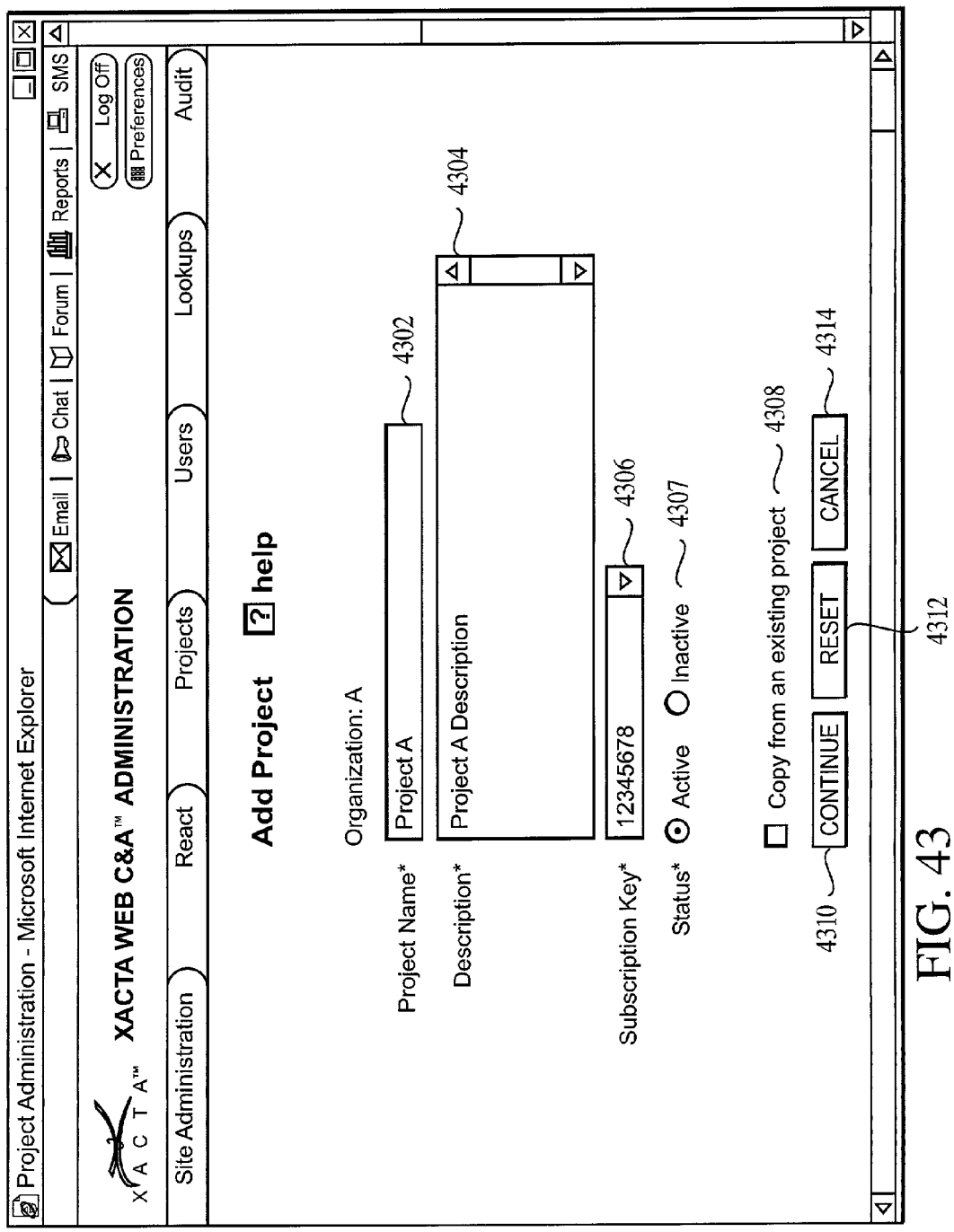
FIG. 43 is an exemplary screen shot that allows a user to add/define a project.
Figure 44:
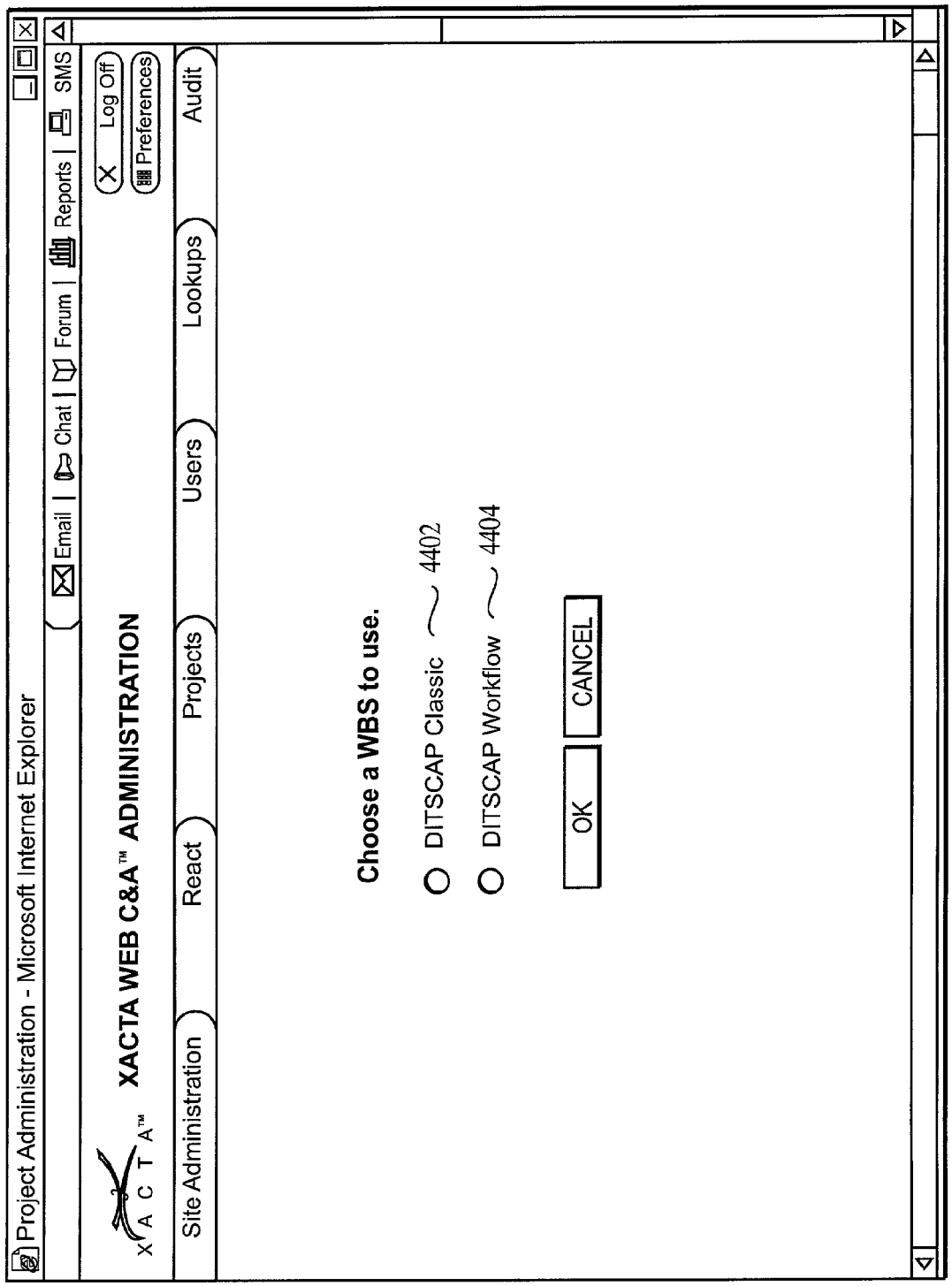
FIG. 44 is an exemplary screen shot that allows a user to select for a project either the classic or workflow methodology.

FIG. 42 is an exemplary screen shot that allows a user to view projects and/or add a project. FIG. 42 can appear when a user, for example, selects Projects tab 3101c. To add a project, the user can select the Add Project button 4202, which will preferably take the user to an exemplary screen as shown in FIG. 43. Via text boxes 4302 and 4304, a user can add information pertaining to the Project Name*, and Description*, respectively. In one embodiment of the present invention, users can also be provided (by, for example, the assignor and/or licensor of the present invention) a Subscription Key* 4306, which can be used, for example, to unlock the application (e.g., the FIGS. described herein pertaining to, for example, screen shots). In at least some embodiments, a system administrator, for example, can assign a client/user a matching (e.g., paired) subscription key and organization, each of which must be correctly entered to gain access to the system. Similarly, a project name can also be associated with a subscription key. In addition, in accordance with at least some embodiments, the Subscription Key* 4306 can also encompass the expiration date (e.g., the date at which a user's and/or organization's access terminates), publishing format (e.g., DITSCAP, NIACAP, or Treasury/IRS), and department/services name (e.g., DoD/Navy, Treasury/IRS). Via the Status* field 4307, a user can designate whether the project is Active or Inactive. In accordance with at least some embodiments of the present invention, users can access at least a portion of one or more projects (e.g., one or more PSs) to which they have been granted user rights, whereas users (other than, for example, a system administrator) would not be granted access to any portion of a project having an inactive status. If a user selects the Copy from an existing project box 4308, the user can use another project as the baseline for the project currently being defined. The user can select the Reset button 4312, which will reset the screen to its default condition. Clicking Cancel button 4118 can return the user to, for example, the previous screen. If the user selects the Continue button 4310, the user can be advanced to, for example, a subsequent screen, such as shown in FIG. 44, which allows a user to select, for example, a project using either the DITSCAP Classic 4402 (generally associated with, for example, FIGS. 1-30) or DITSCAP Workflow 4404 methodology (generally associated with, for example, FIGS. 31-55).

Figure 45:
FIG. 45 is an exemplary screen shot that allows a user to define project access.

FIG. 45 is an exemplary screen shot that allows a user to define project access for a given Project 4502 and WBS 4404 associated therewith. For each WP shown at 4501 (e.g., Definition, Requirements, etc.), the user can determine whether other users associated with the project can Read 4506, Write 4508, Submit 4512, or Approve 4514 each respective WP. If the user checks None 4510, other users will preferably not have access to any of the Read 4506, Write 4508, Submit 4512, or Approve 4514 functions. The user can save the results by selecting the Save button 4516. Selecting the Reset button 4518 will reset the screen to its default condition. Clicking Cancel button 4520 can return the user to, for example, the previous screen.

Figure 46:
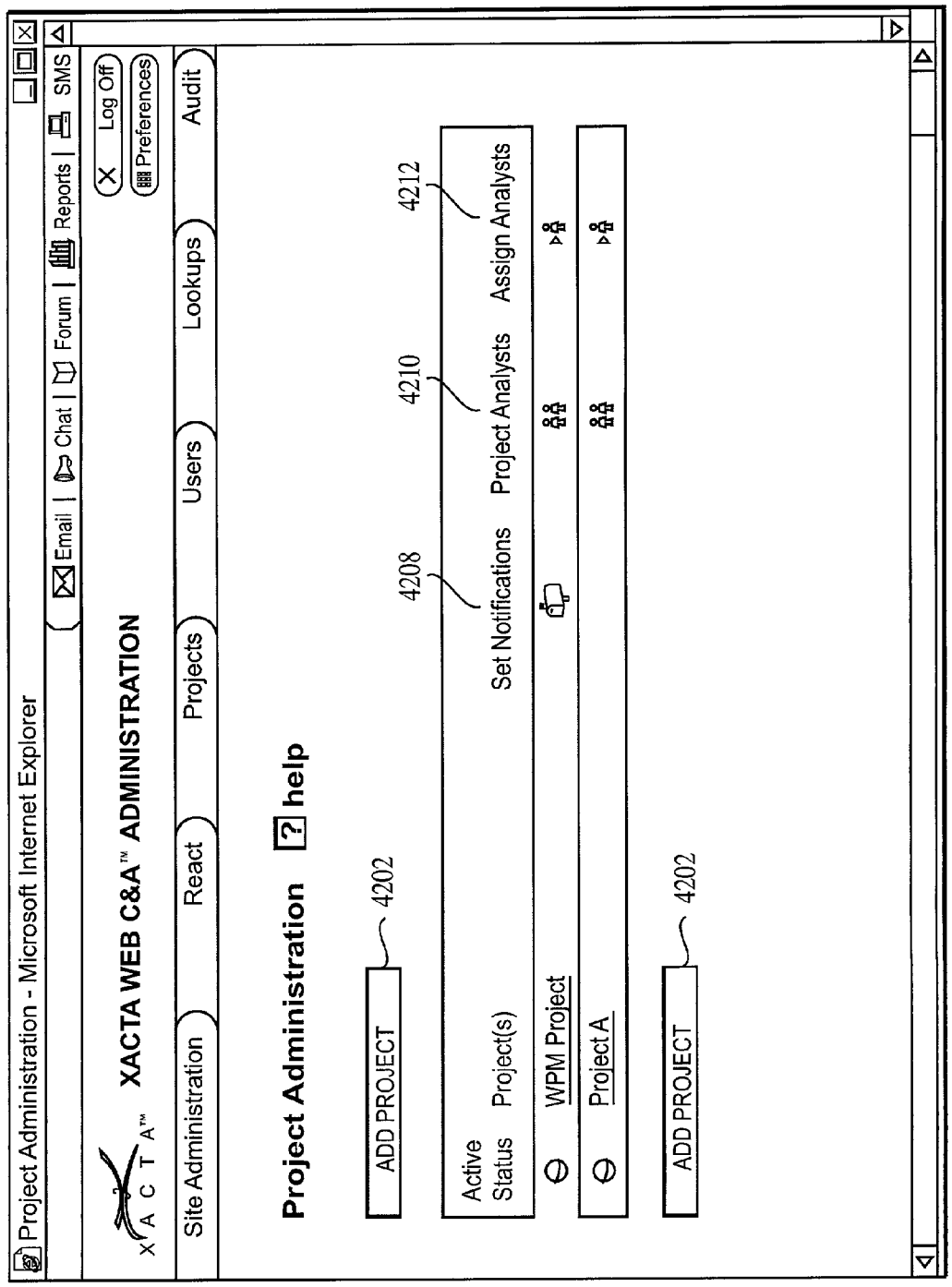
FIG. 46 is an exemplary screen shot that allows a user to set project notifications, view project analysts, and/or assign analysts to a project.

FIG. 46 is an exemplary screen shot, similar to FIG. 42, that shows two projects, the WPM Project and Project A. The Set Notifications 4208 icon, Project Analysts 420 icons, and Assign Analysts 4212 icons appear in accordance with how the projects have been defined. Specifically, the absence of a Set Notification 2408 icon for Project A indicates that no users associated with Project A will receive an electronic notification upon the occurrence of a predefined event.

Figure 48:
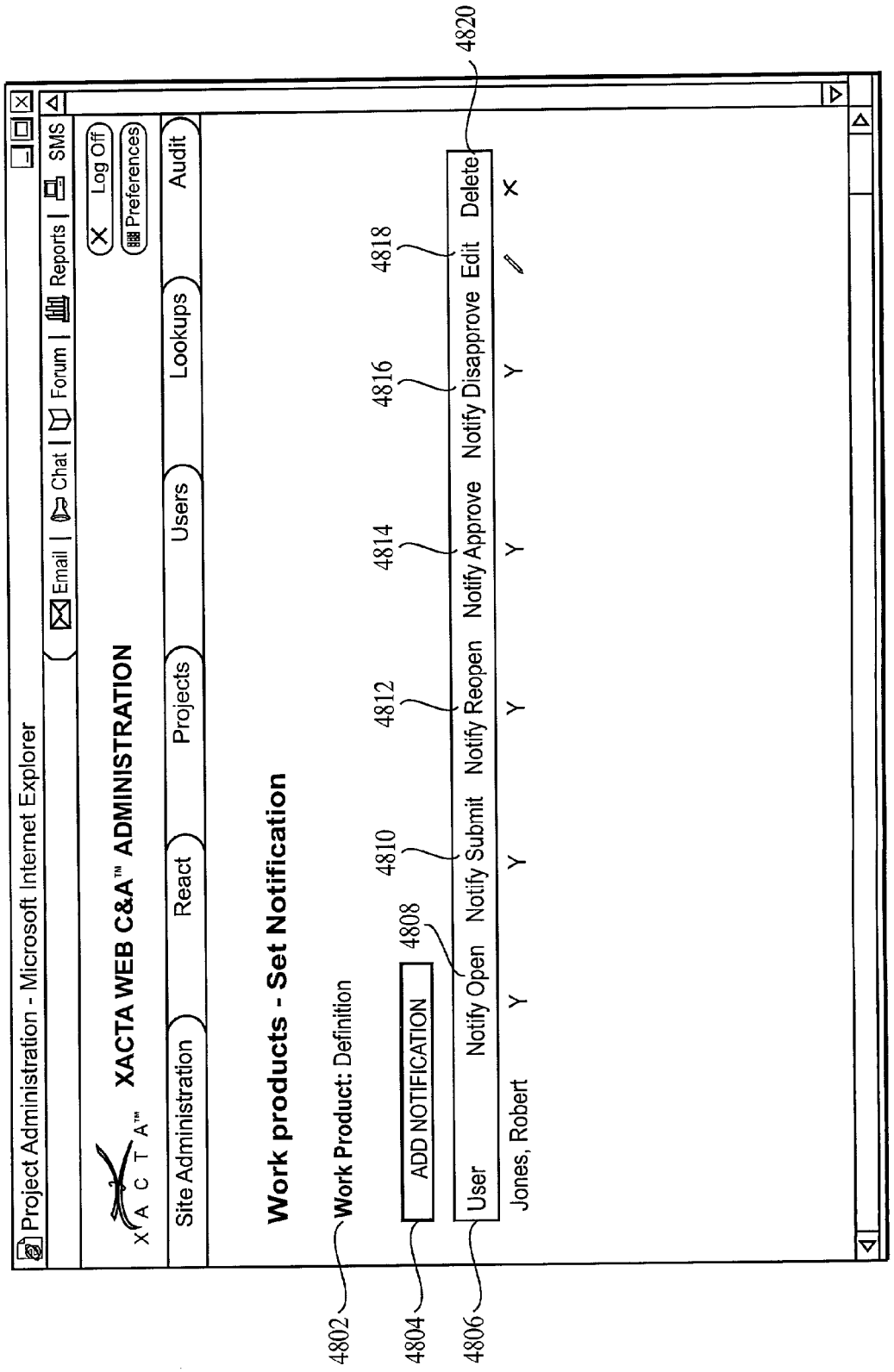
FIG. 48 is an exemplary screen shot that allow a user to view project notification for a particular user, and/or add additional notification parameters.

FIG. 47 is an exemplary screen shot that allows a user to set project notification by selecting, for example, a Set Notification 4208 icon such as shown in FIG. 48. As shown in FIG. 47, notification can be set for each Work Product 4706. For example, by selecting the Set Notification 4708 icon associated with the WP Definition 4710, the user can be advanced to a screen such as shown in FIG. 48, which allows a user to view project notification for a particular user, and/or add additional notification parameters. As shown, the WP, which has been illustratively selected via FIG. 47, is Definition 4802. FIG. 48 shows that user Robert Jones will be notified (as indicated by the five Ys) when the WP Definition is opened by another user 4808, submitted by another user 4810, reopened by another user 4812, or disapproved 4816. In accordance with at least some embodiments of the present invention, the notifications shown in FIG. 48 (and other notifications generally) can be implemented by, for example, using state changes in the WP. For example, upon approval of a WP, state changes for the approved WP (and/or additional WPs) could trigger the opening of any successor WPs.

Selecting the Edit 4816 icon associated with a user (e.g., Robert Jones) will allow a user to edit the notifications for that particular user (e.g., change one or more Y to an N, which would indicate that the user would not be notified upon the occurrence of the event for which no has been selected). A user can also delete all notifications for a user (e.g., Robert Jones) associated with a WP (e.g., Definition), by selecting the Delete icon 4820 for that particular user. If the user selects the Add Notification icon, he will preferably be advanced to a screen such as shown in FIG. 49.

FIG. 49 is an exemplary screen shot that allows a user to set notification parameters for a particular user. The WP Definition remains under consideration, as indicated at 4802. Via, for example, the pulldown menu at 4904, the user can select the Title (User)* for which he wishes to set notification(s) 4904. As shown at 4906, the user (e.g., Robert Jones) can either be notified, or not notified, when the WP Definition is Opened, Submitted, Re-Opened, Approved, or Disapproved. The user can save the results by selecting the Save button 4910. Selecting the Reset button 4912 will reset the screen to its default condition. Clicking Cancel button 4914 can return the user to, for example, the previous screen.

Figure 50:
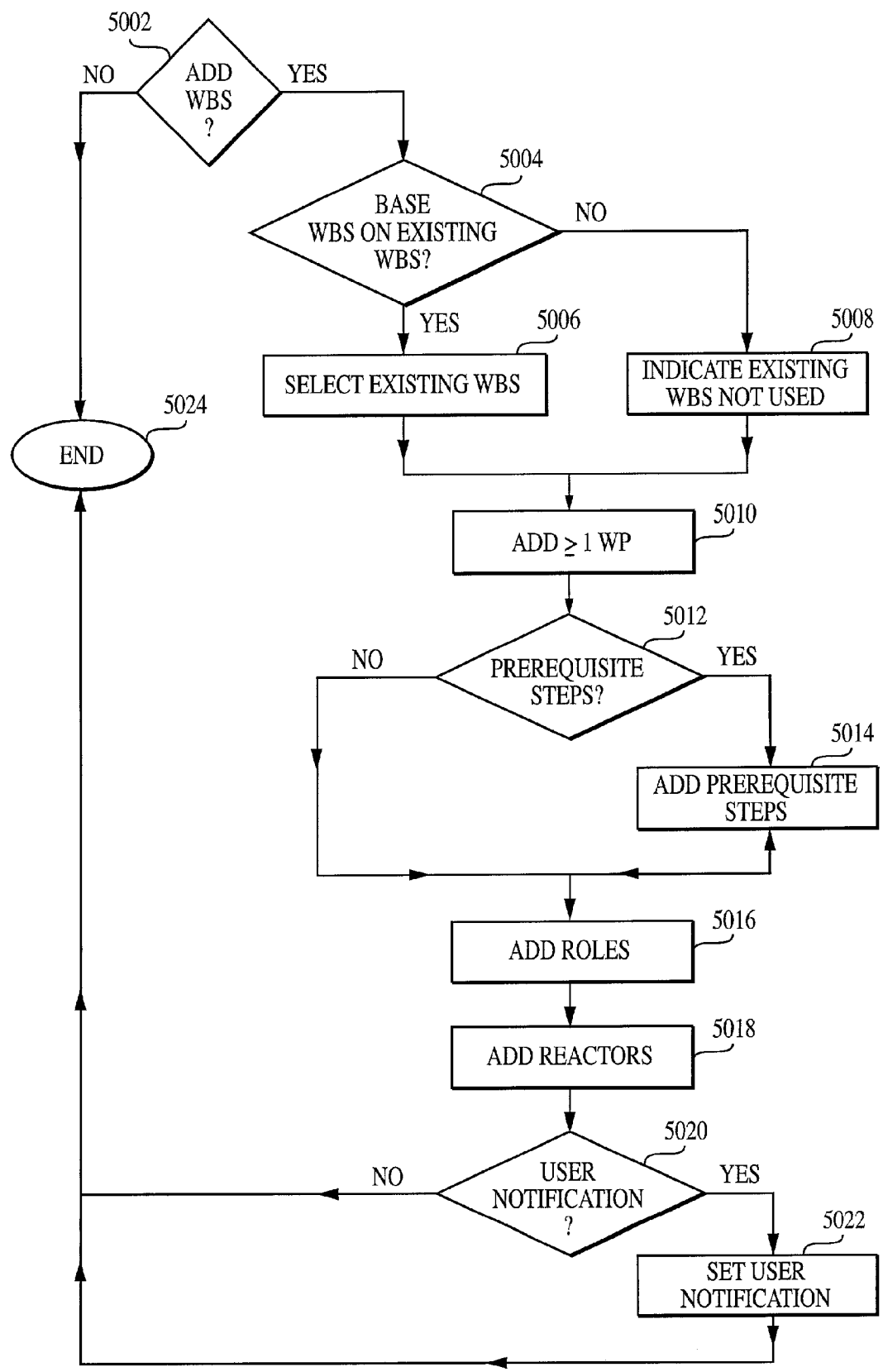
FIG. 50 is an exemplary flow diagram of the WPM process.

FIG. 50 is an exemplary flow diagram of the WPM process. At decision step 5002, the user determines whether to add a WBS. If no WBS is added, the process ends 5024. If the user decides to add a WBS, at decision step 5004 the user determines whether to base the new WBS on an existing WBS. If the user bases the new WBS on an existing WBS, the user selects an existing WBS at block 5006 (by, for example, FIG. 33). If the user does not base the new WBS on an existing WBS, the user indicates that an existing WBS will not be used (by for example, clicking on the OK button 3314 in FIG. 33 without selecting a DISTCAP 3306, NIA-CAP 3308, or Treasury/IRS 3310 WBS). At block 5010, the user adds one or more WPs to the WBS and, at decision step 5012, determines whether there will be any prerequisite WPs before beginning another WP. If, as discussed, for example, with regard to FIG. 35, there are prerequisite steps, the user adds the prerequisite steps at block 5014. If there are no prerequisite steps, or after block 5014, the user adds roles associated with the WBS (as discussed, for example, with regard to FIGS. 38-39). At block 5018, the user adds reactors to the WBS (as discussed, for example, with regard to FIGS. 40-41). At decision step 5020, the user determines whether any of the reactors need to be notified upon, for example, the opening, completion, or commencement of a WP. If it is determined that any of the reactors should be notified, the user sets user notification(s) (as discussed, for example, with regard to FIGS. 47-49). If no user notification is required, or after user notification is set at block 5022, the process ends 5024.

Computer Implementation

Figure 51:
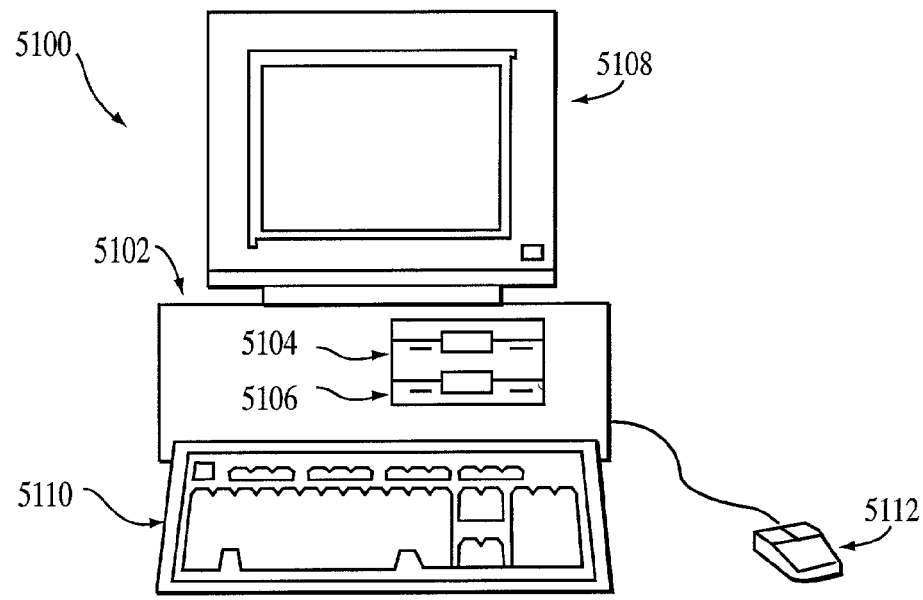
FIG. 51 illustrates one example of a central processing unit for implementing a computer process in accordance with a computer implemented embodiment of the present invention.

The techniques of the present invention may be implemented on a computing unit such as that depicted in FIG. 51. In this regard, FIG. 51 is an illustration of a computer system which is also capable of implementing some or all of the computer processing in accordance with at least some computer implemented embodiments of the present invention. The procedures described herein are presented in terms of program procedures executed on, for example, a computer or network of computers (as shown, for example, in FIG. 54).

Viewed externally, in FIG. 51, a computer system designated by reference numeral 5100 has a computer portion 5102 having disk drives 5104 and 5106. Disk drive indications 5104 and 5106 are merely symbolic of a number of disk drives which might be accommodated by the computer system. Typically, these could include a floppy disk drive 5104, a hard disk drive (not shown externally) and a CD ROM indicated by slot 5106. The number and type of drives vary, typically with different computer configurations. Disk drives 5104 and 5106 are in fact optional, and for space considerations, are easily omitted from the computer system used in conjunction with the production process/apparatus described herein.

The computer system 5100 also has an optional display 5108 upon which information, such as the screens illustrated in, for example, FIGS. 4-10, etc. may be displayed. In some situations, a keyboard 5110 and a mouse 5112 are provided as input devices through which input may be provided, thus allowing input to interface with the central processing unit 5102. Then again, for enhanced portability, the keyboard 5110 is either a limited function keyboard or omitted in its entirety. In addition, mouse 5112 optionally is a touch pad control device, or a track ball device, or even omitted in its entirety as well, and similarly may be used as an input device. In addition, the computer system 5100 may also optionally include at least one infrared (or radio) transmitter and/or infrared (or radio) receiver for either transmitting and/or receiving infrared signals.

Although computer system 5100 is illustrated having a single processor, a single hard disk drive and a single local memory, the system 5100 is optionally suitably equipped with any multitude or combination of processors or storage devices. Computer system 5100 is, in point of fact, able to be replaced by, or combined with, any suitable processing system operative in accordance with the principles of the present invention, including hand-held, laptop/notebook, mini, mainframe and super computers, as well as processing system network combinations of the same.

Figure 52:
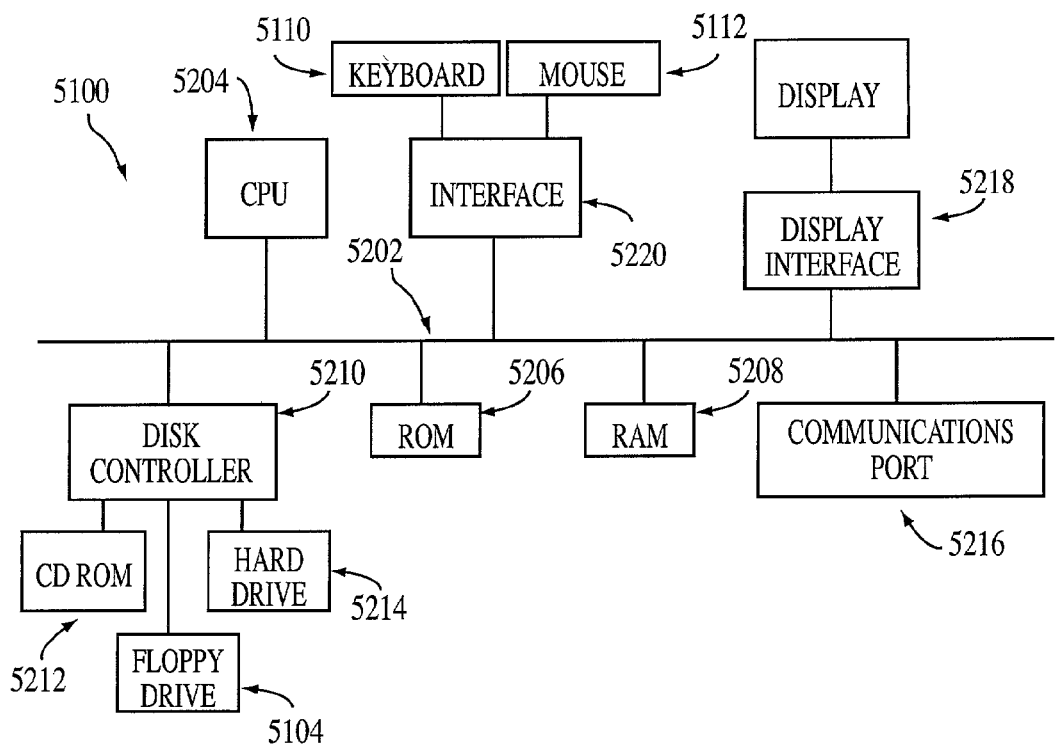
FIG. 52 illustrates one example of a block diagram of internal hardware of the central processing unit of FIG. 51.
Figure 53:
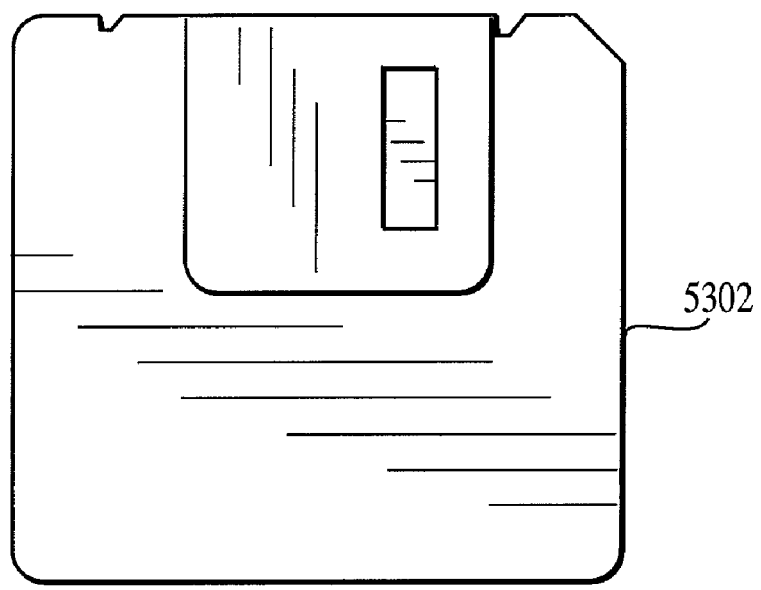
FIG. 53 is an illustrative computer-readable medium upon which computer instructions can be embodied.

FIG. 52 illustrates a block diagram of the internal hardware of the computer system 5100 of FIG. 51. A bus 5202 serves as the main information highway interconnecting the other components of the computer system 5100. CPU 5204 is the central processing unit of the system, performing calculations and logic operations required to execute a program. Read only memory (ROM) 5206 and random access memory (RAM) 5208 constitute the main memory of the computer 5102. Disk controller 5210 interfaces one or more disk drives to the system bus 5202. These disk drives are, for example, floppy disk drives such as 5104 or 5106, or CD ROM or DVD (digital video disks) drive such as 5212, or internal or external hard drives 5214. As indicated previously, these various disk drives and disk controllers are optional devices.

A display interface 5218 interfaces display 5208 and permits information from the bus 5202 to be displayed on the display 5108. Again as indicated, display 5108 is also an optional accessory. For example, display 5108 could be substituted or omitted. Communications with external devices, for example, the other components of the system described herein, occur utilizing communication port 5216. For example, optical fibers and/or electrical cables and/or conductors and/or optical communication (e.g., infrared, and the like) and/or wireless communication (e.g., radio frequency (RF), and the like) can be used as the transport medium between the external devices and communication port 5216. Peripheral interface 5220 interfaces the keyboard 5110 and the mouse 5112, permitting input data to be transmitted to the bus 5202.

In alternate embodiments, the above-identified CPU 5204, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

In general, it should be emphasized that the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention. For example, at least some of the functionality mentioned above could be implemented using Visual Basic, C, C++, or any assembly language appropriate in view of the processor(s) being used. It could also be written in an interpretive environment such as Java and transported to multiple destinations to various users.

One of the implementations of the invention is as sets of instructions resident in the random access memory 5208 of one or more computer systems 5100 configured generally as described above. Until required by the computer system, the set of instructions may be stored in another computer readable memory, for example, in the hard disk drive 5214, or in a removable memory such as an optical disk for eventual use in the CD-ROM 5212 or in a floppy disk (e.g., floppy disk 5302 of FIG. 53) for eventual use in a floppy disk drive 5104, 5106. Further, the set of instructions (such as those written in Java, HyperText Markup Language (HTML), Extensible Markup Language (XML), Standard Generalized Markup Language (SGML), and/or Structured Query Language (SQL)) can be stored in the memory of another computer and transmitted via a transmission medium such as a local area network or a wide area network such as the Internet when desired by the user. One skilled in the art knows that storage or transmission of the computer program medium changes the medium electrically, magnetically, or chemically so that the medium carries computer readable information.

Figure 54:
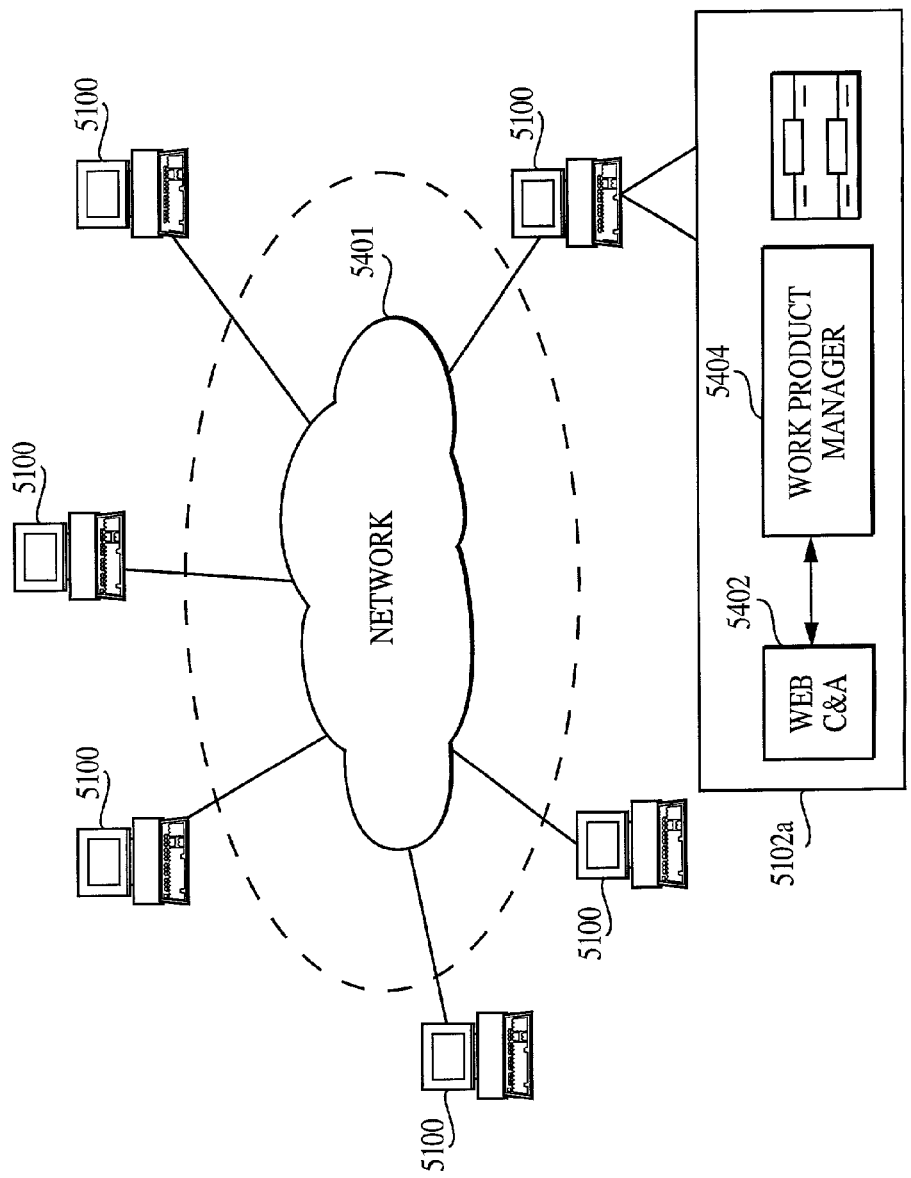
FIG. 54 is an exemplary network implementation of the present invention.

FIG. 54 is an exemplary network implementation of (and/or utilized by) at least some embodiments of the present invention. As shown, one or more computer systems 5100 can be operationally connected to a network 5401 such the Internet, a LAN, WAN, or the like. The network implementation of at least some embodiments of the present invention enables two or more users to collaboratively work, via the network 5401, on one or more C&As. The computer portion 5102a comprises a WEB C&A component 5402 (generally corresponding, for example to FIGS. 1-30) and a Work Product Manager (WPM) component 5405 (generally corresponding, for example, to FIGS. 31-55). WEB C&A component 5402 and WPM component 5404 are shown separately to indicate that the WPM is an optional aspect of the WEB C&A component, and is not required for the operation thereof.

Figure 55:
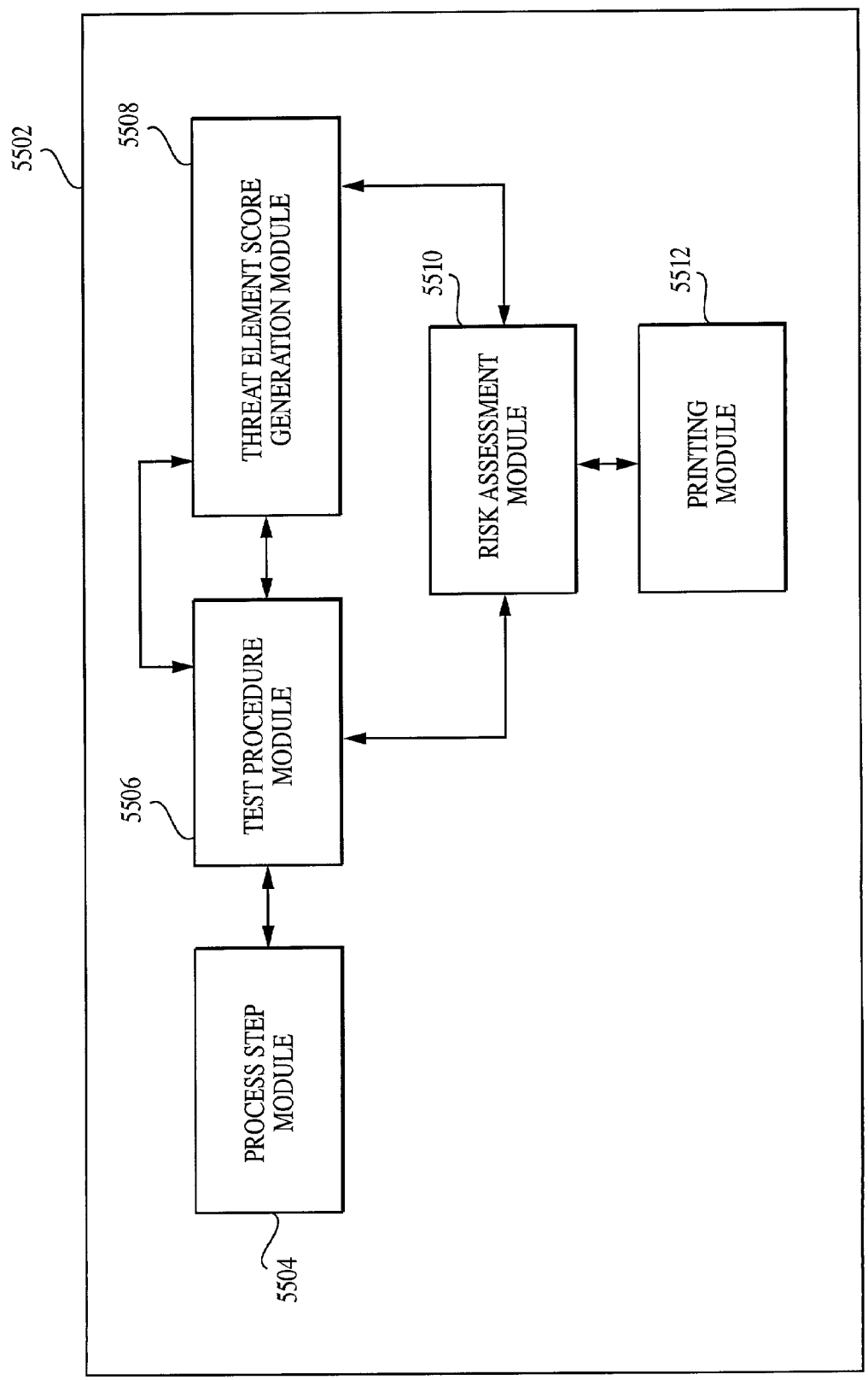
FIG. 55 shows an exemplary structure in accordance with the present invention.

FIG. 55 shows an alternative structure of WEB C&A component 5402 and WPM component 5404. Specifically, the WEB C&A component 5402 and the WPM component can be combined into a single module 5502. Module 5502, in turn, can comprise process step module 5504, test procedure module 5506, threat element score generation module 5508, risk assessment module 5510, and printing module 5512. In accordance with at least some embodiments of the present invention, process step module 5504 enables the user to choose one or more of the plurality of predefined process steps pertaining to collecting information descriptive of at least one aspect of the target system hardware and/or software, and/or a physical environment in which the target system operates. In accordance with at least some embodiments of the present invention, test procedure module 5506 enables the system and/or user to select at least one test procedure against which the target system is tested to satisfy at least one predefined standard, regulation and/or requirement. In accordance with at least some embodiments of the present invention, threat element score generation module 5508 generates a score for each of a plurality of threat elements, each score indicating a likelihood of that threat element affecting and/or impacting the target system. In accordance with at least some embodiments of the present invention, risk assessment module 5510 obtains a threat correlation indication associated with the one or more test procedures, and determines a risk assessment by comparing each score generated by threat element score generation module 5508 with a corresponding threat correlation indication. The threat correlation indication indicates a relative potential of one or more given threats to exploit a vulnerability caused by a failure of said at least one test procedure. Finally, in accordance with at least some embodiments of the present invention, printing module 5512 can be used to print a documentation package that will enable a determination to be made whether the target system complies with the at least one predefined standard, regulation and/or requirement. Of course, it should be understood that the present invention contemplates other configurations of modules, and is not limited to the specific structural implementation noted above. For example, the modules do not necessarily have to have the discrete or "bright line functionality" as discussed above; that is the modules may predominately have the functionality as described, but also include some functionality of another module or modules (e.g. process step module 5504 may, in certain embodiments, include a portion of the functionality of, for example, the test procedure module 5506 and/or the threat element score generation module).

Figures 1, 1A, 56:
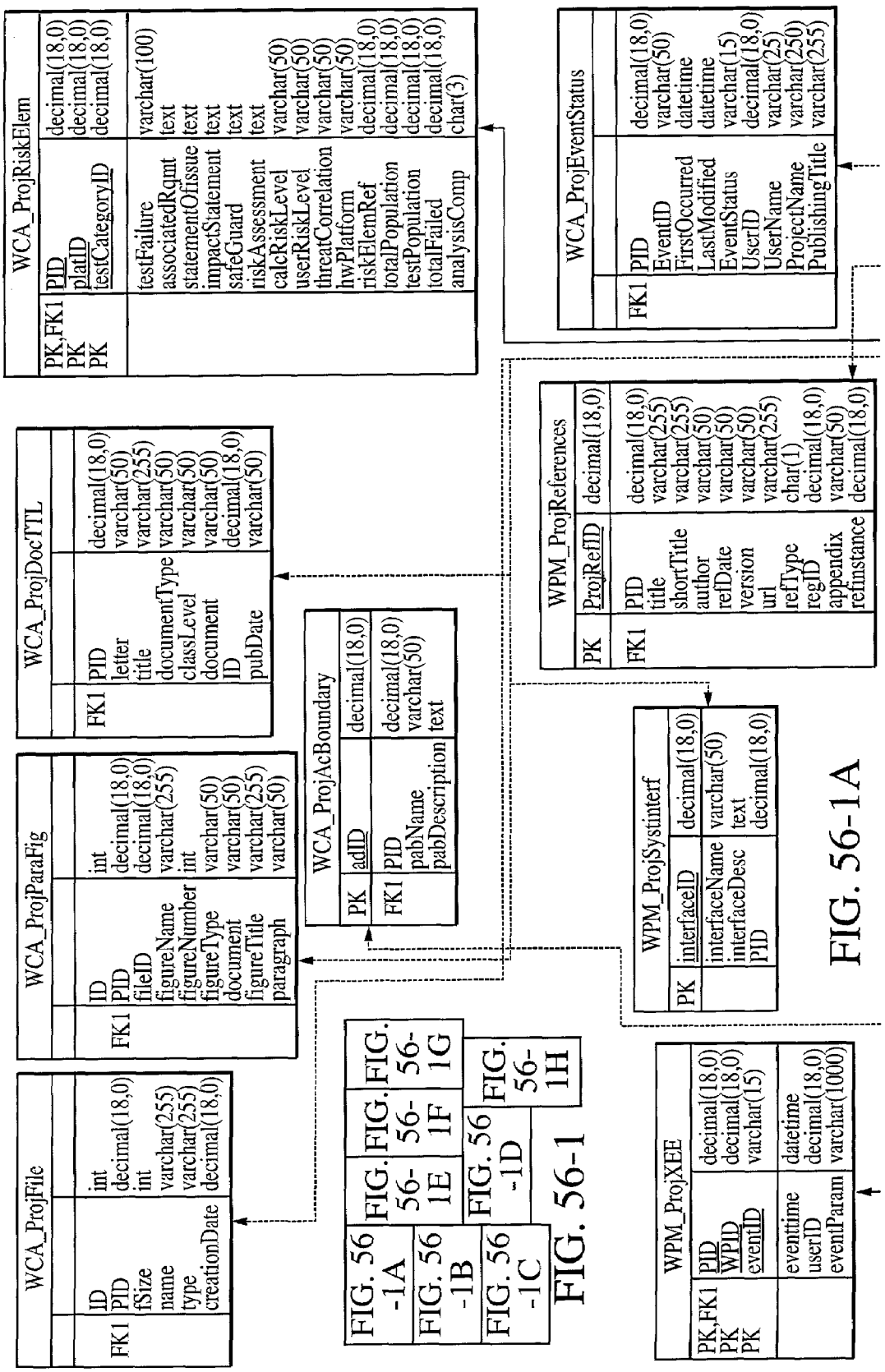
FIG. 56 is an exemplary entity relationship diagram that describes the attributes of entities and the relationship among them.
Figures 1B, 56:
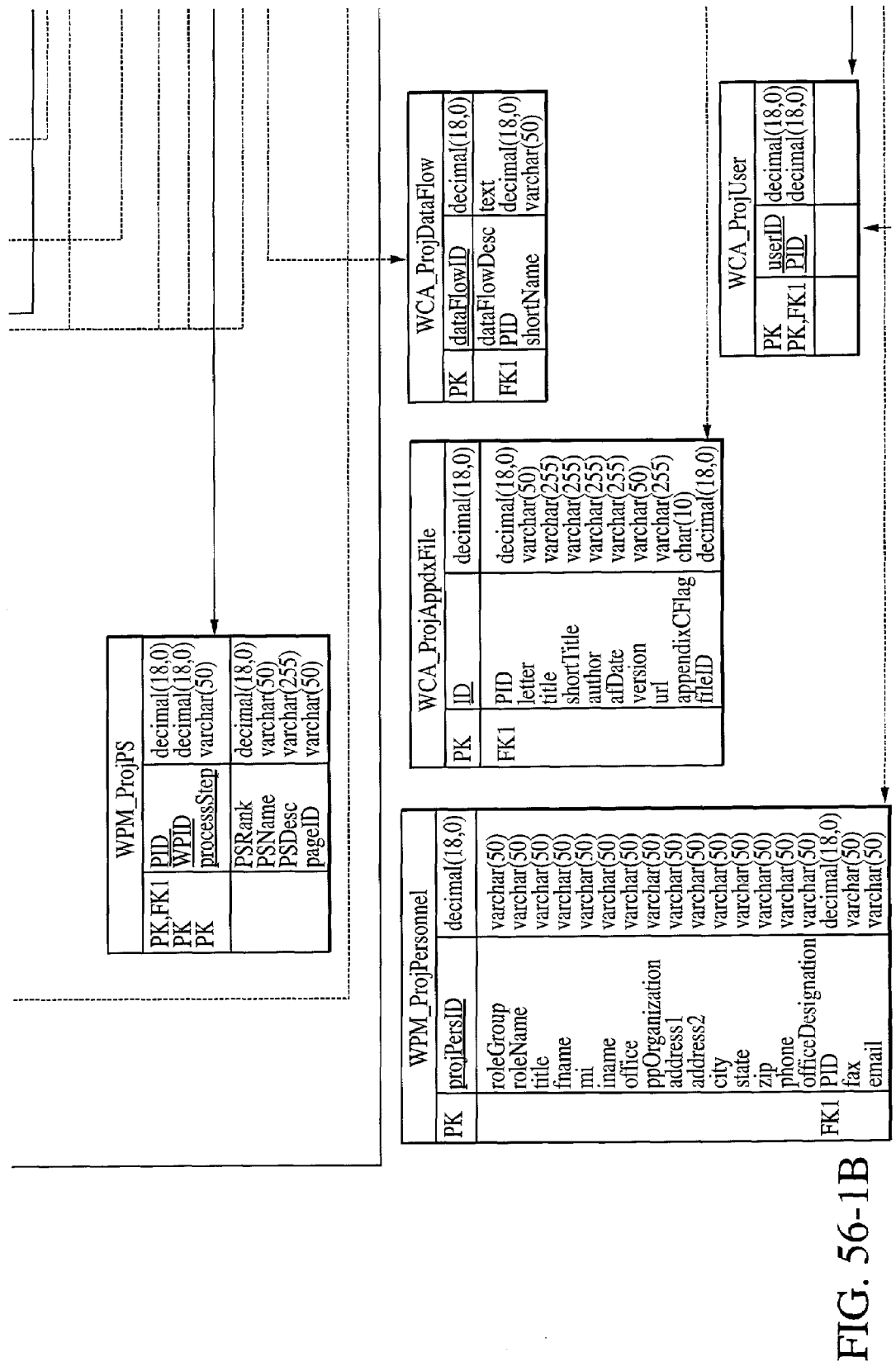
Figures 1C, 56:
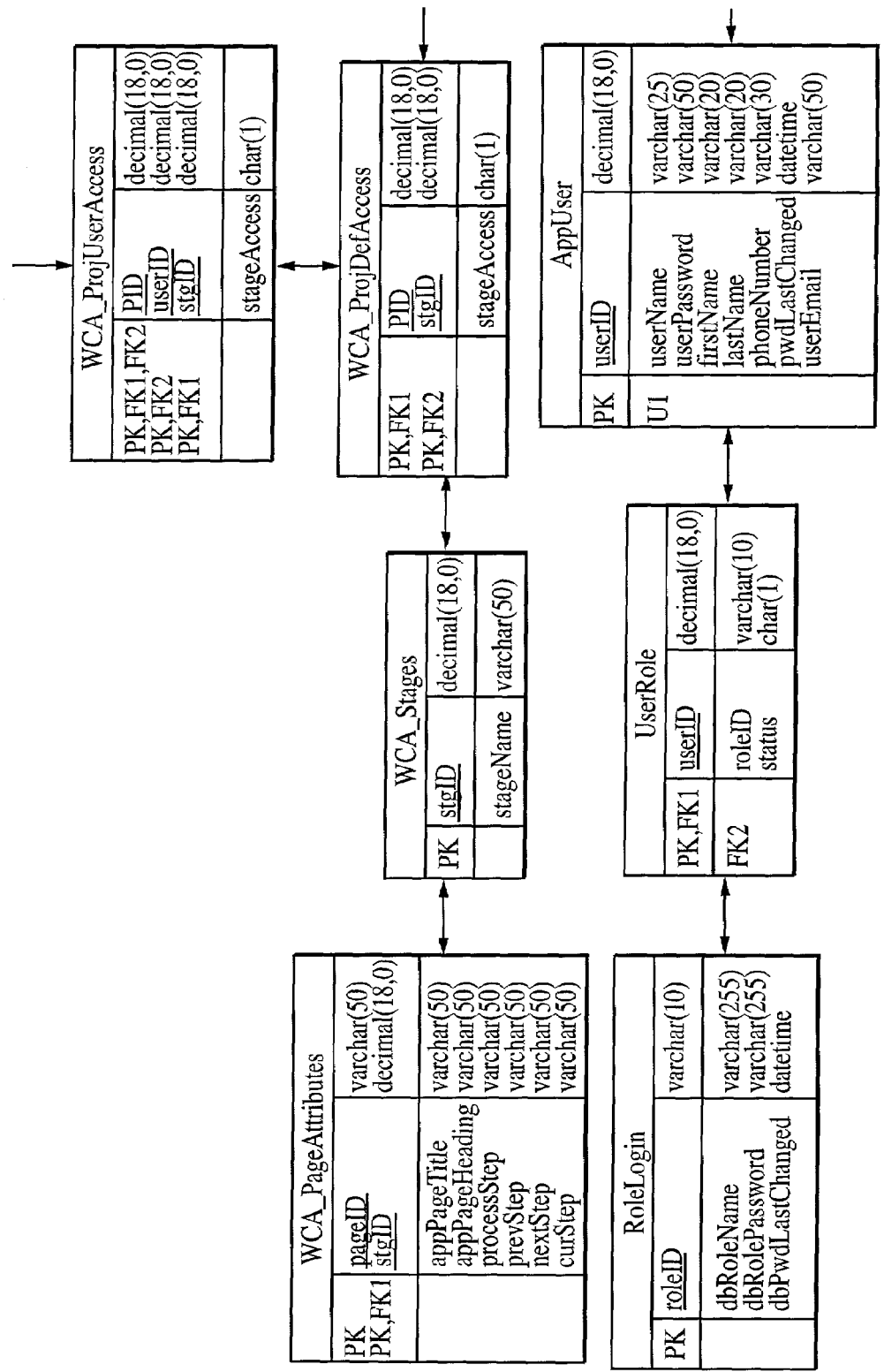
Figures 1D, 56:
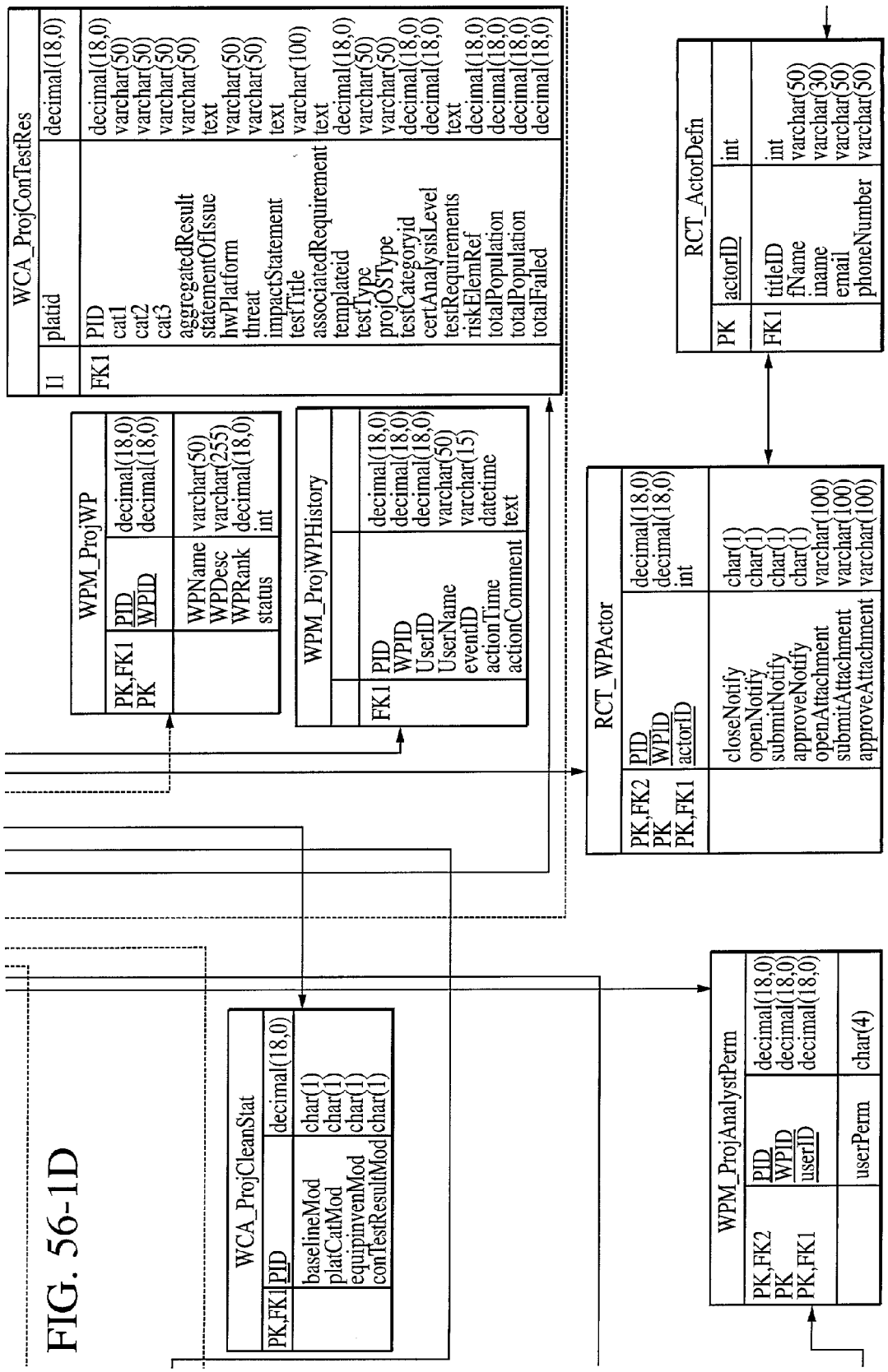
Figures 1F, 56:
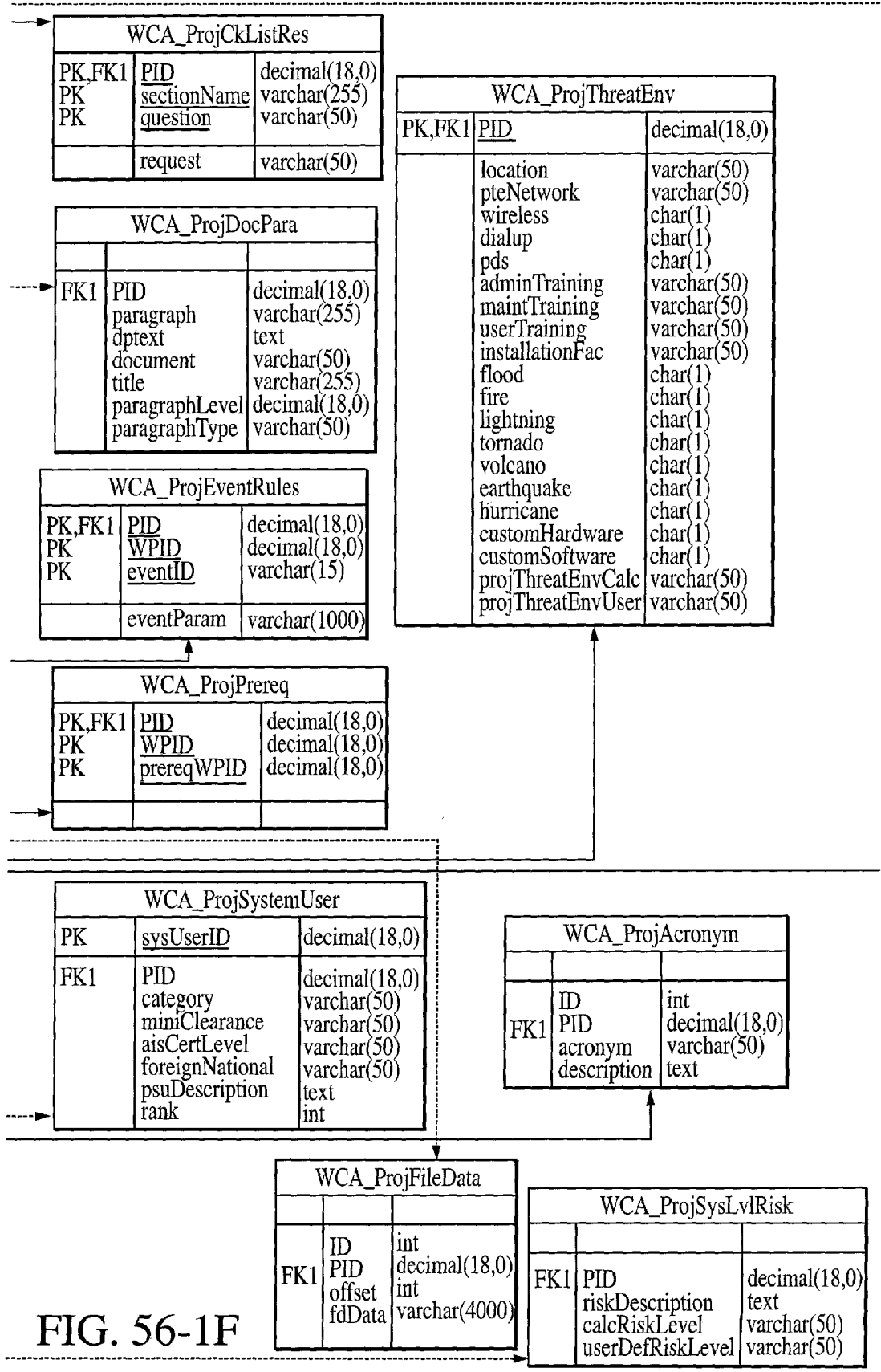
Figures 1G, 56:
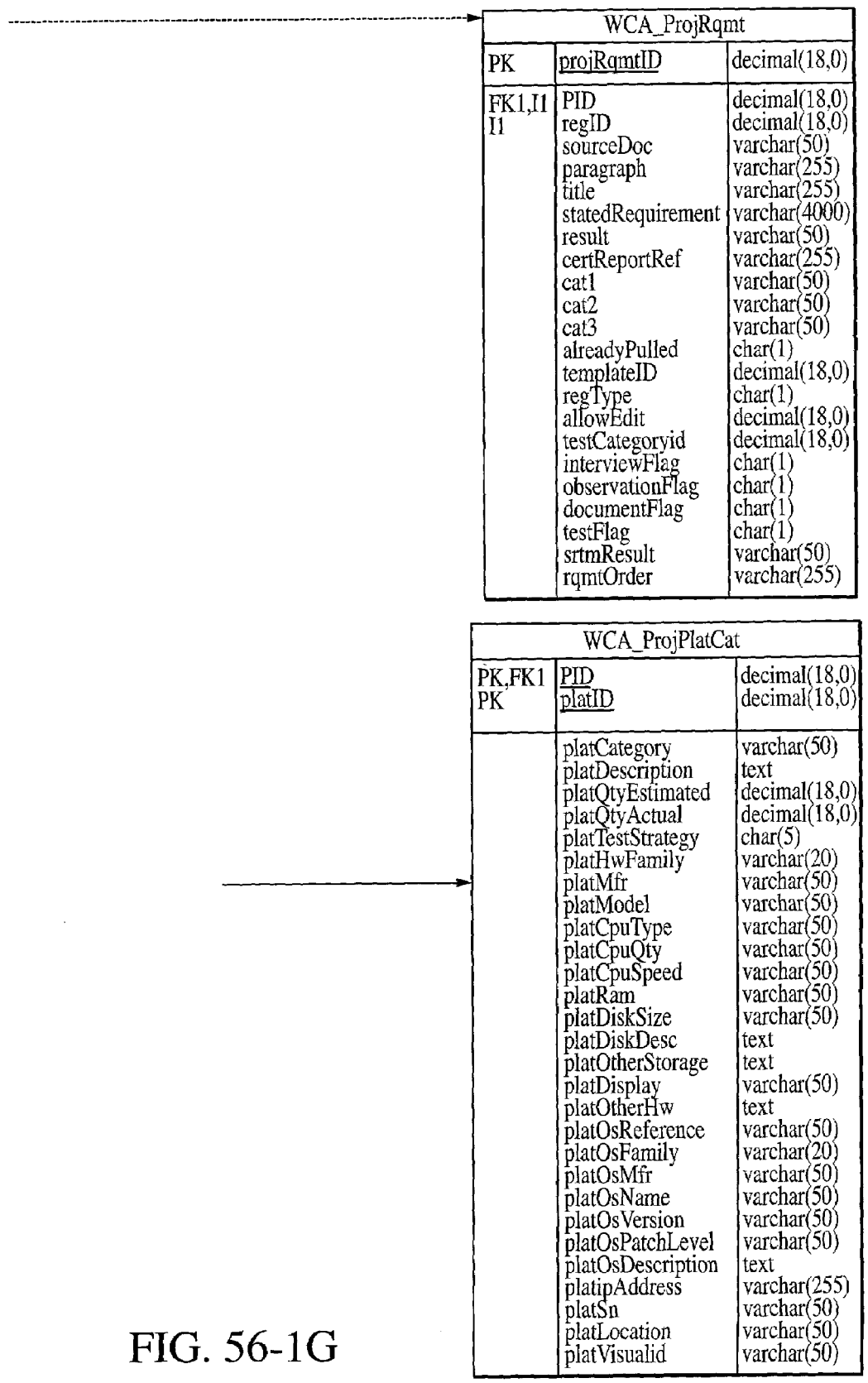
Figures 1H, 56:
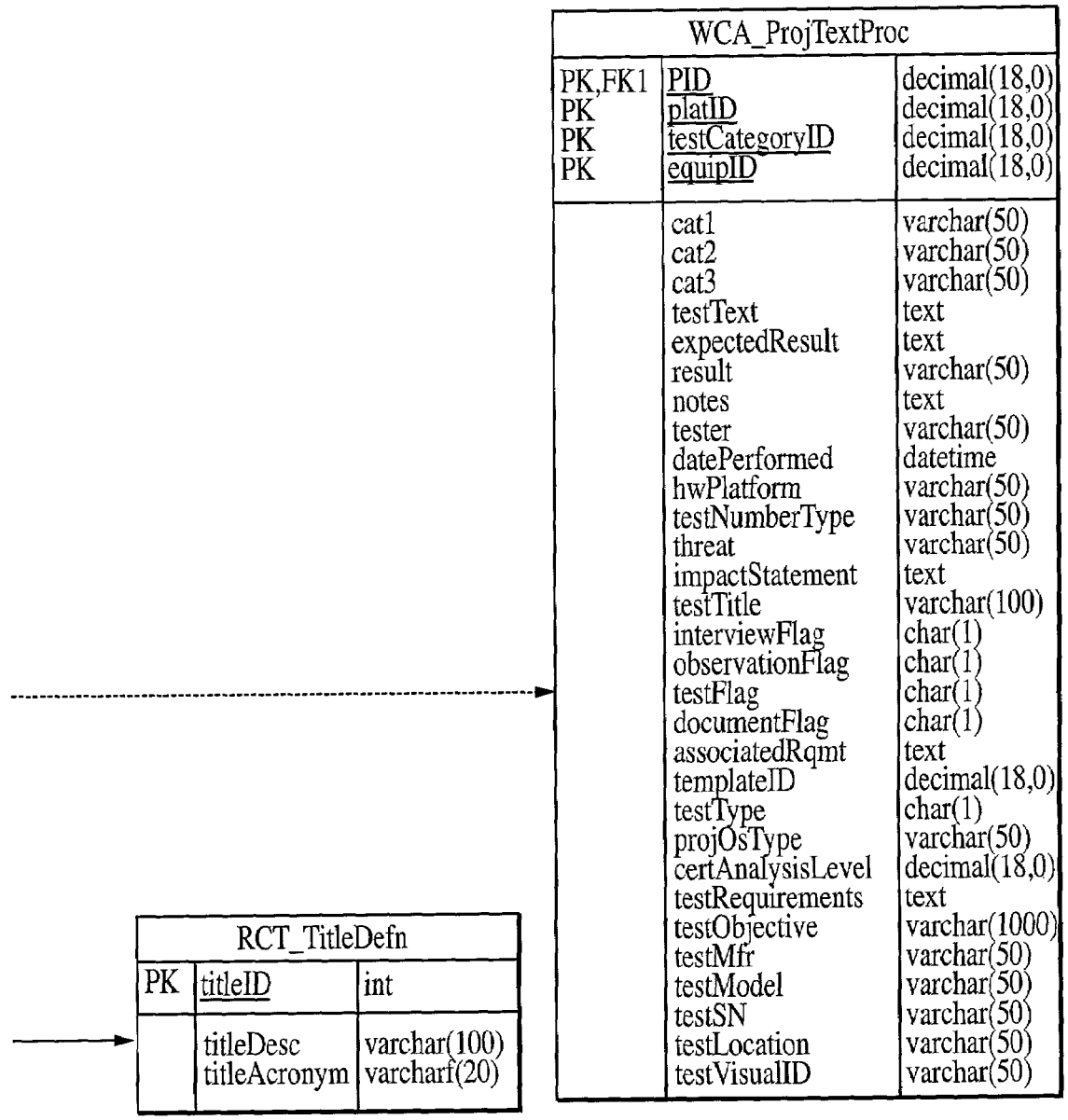
Figures 2C, 56:
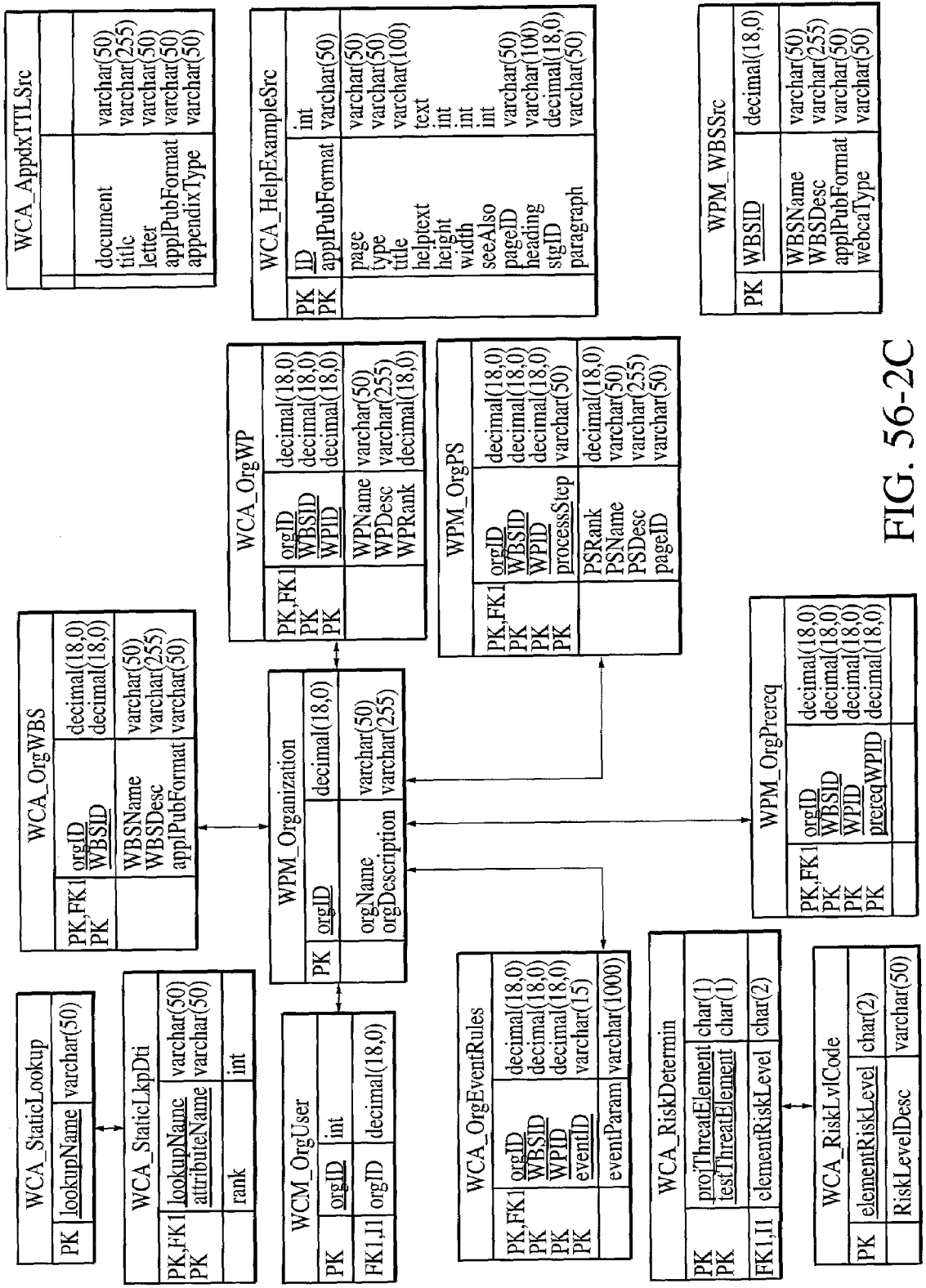
Figures 2D, 56:
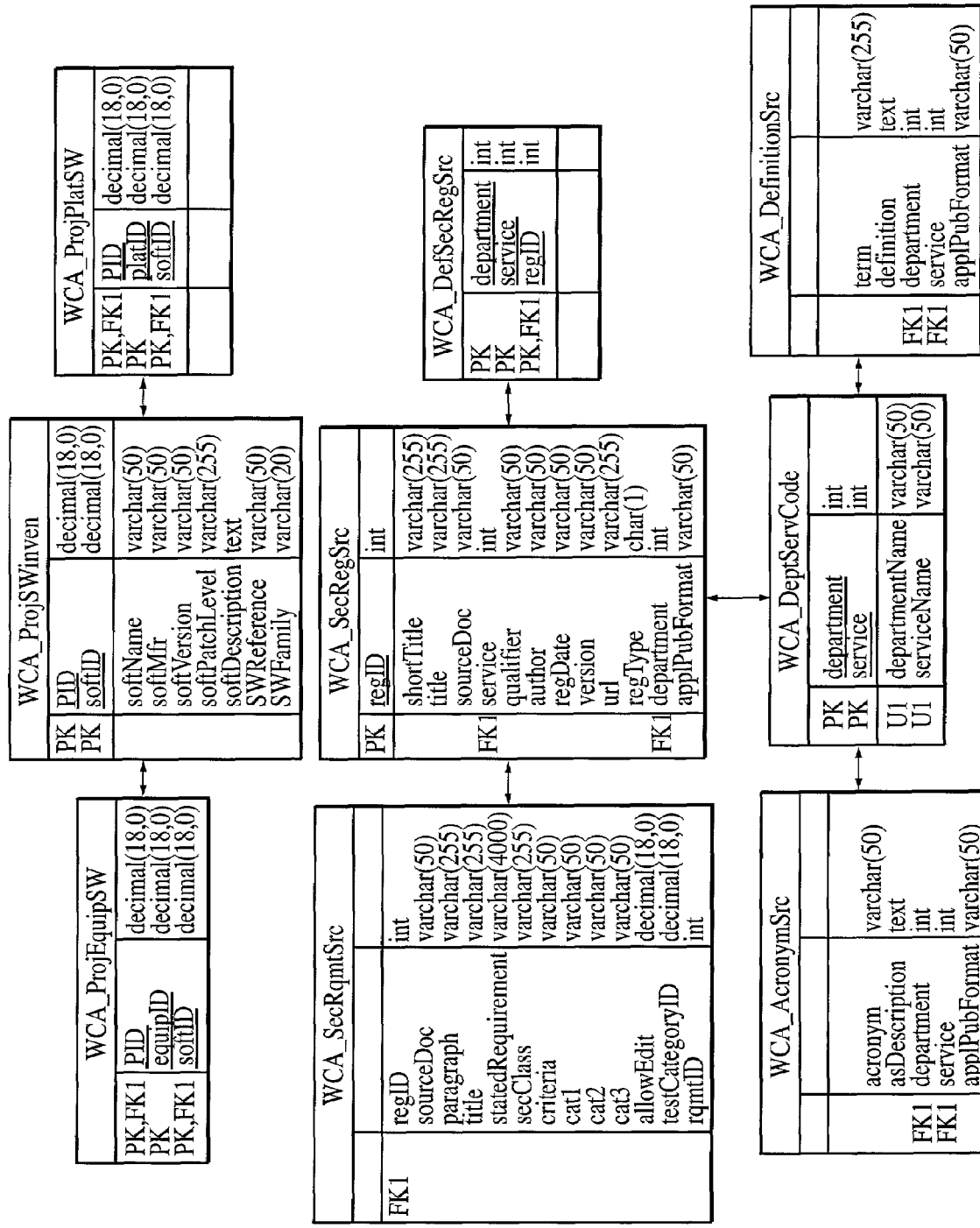

FIG. 56 is an entity relationship diagram (ERD) that describes the attributes of entities and the relationships among them, and illustrates the basic data abstraction of an embodiment of the system. As known to those skilled in the art, an ERD is a conceptual representation of real world objects and the relationships between them. It defines information that the systems create, maintain, process, and delete, as well as the inherent relationships that are supported by the database (i.e., data store).

At least some embodiments of the present invention can utilize a relational database to store and organize all information such as, for example, test procedures, standards/regulations, and user entered information. The design of an embodiment of the database is provided in the ERD shown in FIG. 56. The database is initially populated with security requirements, test procedures and related information to facilitate the operation of the system. As information is entered by the user and calculated by the system, it is also recorded in the database. At least some embodiments of the present invention produce output documentation that can be formatted in accordance with, for example, DITSCAP and/or NIACAP standard(s).

The ERD shown in FIG. 56 uses conventional notation. Each entity, as shown in FIG. 56, comprises a rectangular box. A one-to-one (1:1) relationship indicates that each occurrence of entity A is related to only one of entity B and each occurrence of B is related to only one occurrence of A. A 1:1 relationship is indicated by a single line connecting two entities.

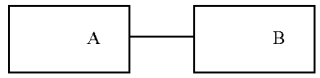

A one-to-many (1:M) relationship indicates that each occurrence of entity A is related to one or more occurrences of entity B, but each occurrence of entity B is related to only one occurrence of entity A. The two vertical lines shown below indicate that entity A is associated only with entity B. If the two vertical lines are not present, entity A can be associated with two or more entities (e.g., B, C and/or D).

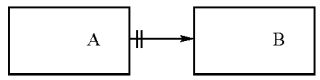

A many-to-many (N:M) relationship shows that each occurrence of entity A is related to one or more occurrences of entity B, and each occurrence of entity B is related to one or more occurrences of entity A.

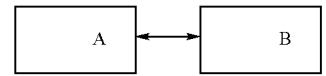

If there can be occurrences of one entity that are not related to at least one occurrence of the other entity, then the relationship is optional and this is shown by the use of a dashed line.

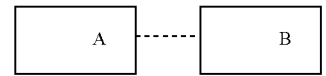

As known to those skilled in the art, a data dictionary, as provided below, defines and specifies the data elements in the system. The data dictionary shown below can be used either as a stand-alone system or as an integral part of the database. Data integrity and accuracy is better ensured in the latter case.

An instance of an entity shown in FIG. 56 will represent one or more lines associated with the Table column in the data dictionary provided below (i.e., an entity shown in FIG. 56 can have many data items/attributes). These data items, representing an attribute of each respective entity to which it belongs, are shown in each line of the data dictionary. The data dictionary also provides the DataType (e.g., varchar, bit, decimal, char, text, int, etc.), and Length (in characters) of the field. The Precision column is applicable only to numerical data and represents the maximum number of significant digits. The Null column indicates whether the field defaults to a null value. FIG. 56 and the data dictionary can be used to produce, for example, the SQL code required to create the data structures in the database.

The tables below provides an exemplary data dictionary that can be used with the ERD of FIG. 56.

TABLE REPORT

Database summary
Target DBMS: Microsoft SQL Server
Number of tables: 104
Number of columns: 731
Number of indexes: 8
Number of foreign keys: 69
Last map date: Jan. 1, 1970
Extended attributes: PRIMARY

| Tables | Columns | Indexes | Foreign keys | Notes |
|---|---|---|---|---|
| WPM_WPSrc | 5 | 0 | 0 | |
| WPM_WPPrereqSrc | 3 | 0 | 0 | |
| WPM_WBSSrc | 5 | 0 | 0 | |
| WPM_StateTranLkp | 3 | 0 | 0 | |
| WPM_State | 2 | 0 | 0 | |
| WPM_PSSrc | 7 | 0 | 1 | |
| WPM_ProjXEE | 6 | 0 | 1 | |
| WPM_ProjWPHistory | 7 | 0 | 1 | |
| WPM_ProjWP | 6 | 0 | 1 | |
| WPM_ProjPS | 7 | 0 | 2 | |
| WPM_ProjPrereq | 3 | 0 | 1 | |
| WPM_ProjEventRules | 4 | 0 | 1 | |
| WPM_ProjDefPerm | 3 | 0 | 1 | |
| WPM_ProjAnalystPerm | 4 | 0 | 2 | |
| WPM_OrgWP | 6 | 0 | 1 | |
| WPM_OrgWBS | 5 | 0 | 1 | |
| WPM_OrgPS | 8 | 0 | 1 | |
| WPM_OrgPrereq | 4 | 0 | 1 | |
| WPM_OrgEventRules | 5 | 0 | 1 | |
| WPM_EventRulesSrc | 4 | 0 | 0 | |

TABLE REPORT-continued

| | | | |
|---|---|---|---|
| WCA_TestProcSrc | 17 | 0 | 0 |
| WCA_SysUserCategory | 3 | 0 | 0 |
| WCA_SWSource | 7 | 0 | 0 |
| WCA_SwFamilyLookup | 4 | 0 | 0 |
| WCA_StaticLookup | 1 | 0 | 0 |
| WCA_StaticLkpDtl | 3 | 0 | 1 |
| WCA_Stages | 2 | 0 | 0 |
| WCA_SecRqmtSrc | 13 | 0 | 1 |
| WCA_SecReqCritQ | 3 | 0 | 0 |
| WCA_SecRegSrc | 13 | 0 | 1 |
| WCA_RiskLvlCode | 2 | 0 | 0 |
| WCA_RiskDetermin | 3 | 1 | 1 |
| WCA_PublishFmt | 2 | 0 | 0 |
| WCA_ProjUserAccess | 4 | 0 | 2 |
| WCA_ProjUser | 2 | 0 | 1 |
| WCA_ProjThreatEnv | 21 | 0 | 1 |
| WCA_ProjTestProc | 34 | 0 | 1 |
| WCA_ProjSysThreat | 5 | 0 | 1 |
| WCA_ProjSystemUser | 8 | 0 | 1 |
| WCA_ProjSysLvlRisk | 4 | 0 | 1 |
| WCA_ProjSysInterf | 4 | 0 | 1 |
| WCA_ProjSWInven | 9 | 0 | 0 |
| WCA_ProjRqmt | 23 | 1 | 1 |
| WCA_ProjRiskElem | 18 | 0 | 1 |
| WCA_ProjReference | 12 | 0 | 1 |
| WCA_ProjPlatSW | 3 | 0 | 1 |
| WCA_ProjPlatCat | 30 | 0 | 1 |
| WCA_ProjPersonnel | 19 | 0 | 1 |
| WCA_ProjParaFig | 9 | 0 | 1 |
| WCA_ProjMilestone | 6 | 0 | 1 |
| WCA_ProjFileData | 4 | 0 | 1 |
| WCA_ProjFile | 6 | 0 | 1 |
| WCA_ProjEventStatus | 7 | 0 | 1 |
| WCA_ProjEquipSW | 3 | 0 | 1 |
| WCA_ProjEquipInven | 30 | 0 | 1 |
| WCA_Project | 21 | 1 | 1 |
| WCA_ProjDocTTL | 8 | 0 | 1 |
| WCA_ProjDocPara | 7 | 0 | 1 |
| WCA_ProjDefinitions | 4 | 0 | 1 |
| WCA_ProjDefAccess | 3 | 0 | 2 |
| WCA_ProjDataFlow | 4 | 0 | 1 |
| WCA_ProjConTestRes | 23 | 1 | 1 |
| WCA_ProjCleanStat | 5 | 0 | 1 |
| WCA_ProjCkListRes | 4 | 0 | 1 |
| WCA_ProjCharDtl | 4 | 0 | 2 |
| WCA_ProjAppdxFile | 11 | 0 | 1 |
| WCA_ProjAcronym | 4 | 0 | 1 |
| WCA_ProjAcBoundary | 4 | 0 | 1 |
| WCA_PageAttrs | 6 | 0 | 0 |
| WCA_OSSource | 7 | 0 | 0 |
| WCA_OsFamilyLookup | 4 | 0 | 0 |
| WCA_OrgUser | 2 | 1 | 1 |
| WCA_Organization | 3 | 0 | 0 |
| WCA_MLSecClass | 6 | 0 | 0 |
| WCA_MinSeCkListSrc | 6 | 0 | 0 |
| WCA_MarkerLookup | 4 | 0 | 0 |
| WCA_LookupMgr | 8 | 0 | 0 |
| WCA_LevelDetermin | 6 | 0 | 0 |
| WCA_InfoCategory | 5 | 0 | 0 |
| WCA_HwFamilyLookup | 4 | 0 | 0 |
| WCA_HelpExampleSrc | 13 | 0 | 0 |
| WCA_DocTmplSrc | 6 | 0 | 0 |
| WCA_DocParaTTLSrc | 6 | 0 | 0 |
| WCA_DeptServCode | 4 | 1 | 0 |
| WCA_DefSecRegSrc | 3 | 0 | 1 |
| WCA_DefinitionSrc | 5 | 0 | 1 |
| WCA_ClassWeight | 5 | 0 | 0 |
| WCA_CharSrc | 1 | 0 | 0 |
| WCA_AuditObjects | 4 | 0 | 0 |
| WCA_AuditLog | 19 | 0 | 0 |
| WCA_ApplEventSrc | 5 | 0 | 0 |
| WCA_AppdxTTLSrc | 5 | 0 | 0 |
| WCA_AcronymSrc | 5 | 0 | 1 |
| UserRole | 3 | 0 | 2 |
| UserPwdHistory | 3 | 0 | 1 |
| TableKeys | 3 | 0 | 0 |
| RoleLogin | 4 | 0 | 0 |
| RCT_ProjWPActor | 11 | 0 | 2 |
| RCT_OrgTitleDefn | 4 | 0 | 1 |
| RCT_OrgActorDefn | 7 | 0 | 2 |
| InstallHistory | 2 | 1 | 0 |
| dtproperties | 7 | 0 | 0 |
| AppUser | 8 | 1 | 0 |
| AppProps | 4 | 0 | 0 |

AppProps
Owner: dbo
Target DB name: WCA310_D
Number of columns: 4
Number of indexes: 0
Number of foreign keys: 0
Extended attributes:
OnFileGroup PRIMARY
Clustered PK Yes

| Columns | Data type | Allow NULLs | Value/Range |
|---|---|---|---|
| PropName | varchar(255) | Not allowed | |
| PropVal | varchar(255) | Allowed | |
| AppName | varchar(20) | Not allowed | |
| PropDate | datetime | Allowed | |

Column Details
1. PropName
Physical data type: varchar(255)
Allow NULLs: Not allowed
2. PropVal
Physical data type: varchar(255)
Allow NULLs: Allowed
3. AppName
Physical data type: varchar(20)
Allow NULLs: Not allowed
4. PropDate
Physical data type: datetime
Allow NULLs: Allowed AppUser
Owner: dbo
Target DR name: WCA310_D
Number of columns: 8
Number of indexes: 1
Number of foreign keys: 0
Extended attributes:
OnFileGroup PRIMARY
Clustered PK No

| Columns | Data type | Allow NULLs | Value/Range |
|---|---|---|---|
| userID | decimal(18.0) | Not allowed | |
| userName (U1) | varchar(25) | Not allowed | |
| userPassword | varchar(50) | Not allowed | |
| firstName | varchar(20) | Allowed | |
| lastName | varchar(20) | Allowed | |
| phoneNumber | varchar(30) | Allowed | |
| pwdLastChanged | datetime | Allowed | |
| userEmail | varchar(50) | Allowed | |

| Indexes | Columns | Sort Order |
|---|---|---|
| IX_AppUser_UserName (U1) | userName | Ascending |

| Foreign Keys | Child | Parent |
|---|---|---|
| FK_UserPwdHistory_AppUser | UserPwdHistory.userID | userID |
| FK_UserRole_User | UserRole.userID | userID |
| FK_WPM_ProjAnalystPerm_AppUser | WPM_ProjAnalystPerm.userID | userID |

Column Details
1. userID
Physical data type: decimal(18.0)
Allow NULLs: Not allowed
2. userName (U1)
Physical data type: varchar(25)
Allow NULLs: Not allowed
3. userPassword
Physical data type: varchar(50)
Allow NULLs: Not allowed -continued 4. firstName
Physical data type: varchar(20)
Allow NULLs: Allowed
5. lastName
Physical data type: varchar(20)
Allow NULLs: Allowed
6. phoneNumber
Physical data type: varchar(30)
Allow NULLs: Allowed
7. pwdLastChanged
Physical data type: datetime
Allow NULLs: Allowed
8. userEmail
Physical data type: varchar(50)
Allow NULLs: Allowed
Index details
IX_AppUser_UserName
Column(s): userName (Asc)
Unique: Yes
Extended attributes:
OnFileGroup PRIMARY
CLUSTERED No
IGNORE_DUP_KEY No
FILLFACTOR 90
PAD_INDEX No
DROP_EXISTING No
STATISTICS_NORECOMPUTE No

--- dtproperties
Owner: dbo
Target DB name: WCA310_D
Number of columns: 7
Number of indexes: 0
Number of foreign keys: 0
Extended attributes:
OnFileGroup PRIMARY
TextImageOnGroup PRIMARY
Clustered PK Yes

| Columns | Data Type | Allow NULLs | Value/Range |
|---|---|---|---|
| id | int identity | Not allowed | |
| objectid | int | Allowed | |
| property | varchar(64) | Not allowed | |
| value | varchar(255) | Allowed | |
| lvalue | image | Allowed | |
| version | int | Not allowed | |
| uvalue | nvarehar(255) | Allowed | |

Column Details
1. id
Physical data type: int identity
Allow NULLs: Not allowed
2. objectid
Physical data type: int
Allow NULLs: Allowed
3. property
Physical data type: varchar(64)
Allow NULLs: Not allowed
4. value
Physical data type: varchar(255)
Allow NULLs: Allowed
5. lvalue
Physical data type: image
Allow NULLs: Allowed
6. version
Physical data type: int
Allow NULLs: Not allowed
7. uvalue
Physical data type: nvarchar(255)
Allow NULLs: Allowed

---

InstallHistory
Owner: dbo
Target DR name: WCA310_D
Number of columns: 2
Number of indexes: 1
Number of foreign keys: 0
Extended attributes:
OnFileGroup PRIMARY
Clustered PK No

| Columns | Data type | Allow NULLs | Value/Range |
|---|---|---|---|
| InstallDesc (I1) | varchar(50) | Not allowed | |
| InstallDate (I1) | datetime | Not allowed | |

| Indexes | Columns | Sort order |
|---|---|---|
| IX_InstallHistory (I1) | InstallDesc | Ascending |
| | InstallDate | Ascending |

Column Details
1. InstallDesc (I1)
Physical data type: varchar(50)
Allow NULLs: Not allowed
2. InstallDate (I1)
Physical data type: datetime
Allow NULLs: Not allowed
Index details
IX_InstallHistory
Column(s): InstallDesc (Ase)
InstallDate (Asc)
Unique: No
Extended attributes:
OnFileGroup PRIMARY
CLUSTERED No
IGNORE_DUP_KEY No
FILLFACTOR 0
PAD_INDEX No
DROP_EXISTING No
STATISTICS_NORECOMPUTE No

---

RCT_OrgActorDefn
Owner: dbo
Target DB name: WCA310_D
Number of columns: 7
Number of indexes: 0
Number of foreign keys: 2
Extended attributes:
OnFileGroup PRIMARY
Clustered PK Yes

| Columns | Data type | Allow NULLs | Value/Range |
|---|---|---|---|
| actorID | int | Not allowed | |
| titleID (FK) | int | Not allowed | |
| fName | varchar(50) | Not allowed | |
| lname | varchar(30) | Not allowed | |
| email | varchar(50) | Not allowed | |
| phoneNumber | varchar(50) | Allowed | |
| orgID (FK) | decimal(18.0) | Not allowed | |

| Foreign keys | Child | Parent |
|---|---|---|
| FK_RCT_Actor-Defn_RCT_TitleDefn | titleID | RCT_OrgTitle-Defn.titleID |
| FK_RCT_Actor-Defn_WCA_Organization | orgID | WCA_Organization.orgID |
| FK_RCT_WP-Actor_RCT_ActorDefn | RCT_ProjWP-Actor.actorID | actorID |

Column details
1. actorID
Physical data type: int
Allow NULLs: Not allowed
2. titleID (FK)
Physical data type: int
Allow NULLs: Not allowed
3. fName
Physical data type: varchar(50)
Allow NULLs: Not allowed
4. lname
Physical data type: varchar(30)
Allow NULLs: Not allowed
5. email -continued Physical data type: varchar(50)
Allow NULLs: Not allowed
6. phoneNumber
Physical data type: varchar(50)
Allow NULLs: Allowed
7. orgID (FK)
Physical data type: decimal(18.0)
Allow NULLs: Not allowed
Foreign keys
FK_RCT_ActorDefn_RCT_TitleDefn
Definition: Child Parent
titleID RCT_OrgTitleDefn.titleID
Relationship type: Non-Identifying
Cardinality: One-to-Zero-or-More
Allow NULLs: Not allowed
Verb phrase: hasFK_RCT_ActorDefn_RCT_TitleDefn
Inverse phrase: is of
Ref. Integrity on update: No Action
Ref. Integrity on delete: No Action
FK_RCT_ActorDefn_WCA_Organization
Definition: Child Parent
orgID WCA_Organization.orgID
Relationship type: Non-Identifying
Cardinality: One-to-Zero-or-More
Allow NULLs: Not allowed
Verb phrase: hasFK_RCT_ActorDefn_WCA_Organization
Inverse phrase: is of
Ref. Integrity on update: No Action
Ref. Integrity on delete: No Action RCT_OrgTitleDefn
Owner: dbo
Target DB name: WCA310_D
Number of columns: 4
Number of indexes: 0
Number of foreign keys: 1
Extended attributes:
OnFileGroup PRIMARY
Clustered PK Yes

| Columns | Data type | Allow NULLs | Value/Range |
|---|---|---|---|
| titleID | int | Not allowed | |
| titleDesc | varchar(100) | Not allowed | |
| titleAcronym | varchar(20) | Not allowed | |
| orgID (FK) | decimal(18.0) | Not allowed | |
| Foreign keys | | Child | Parent |
| FK_RCT_Title-Defn_WCA_Organization | | orgID | WCA_Organization.orgID |
| FK_RCT Actor-Defn_RCT_TitleDefn | | RCT_OrgActorDefn.titleID | titleID |

Columns details
1. titleID
Physical data type: int
Allow NULLs: Not allowed
2. titleDesc
Physical data type: varchar(100)
Allow NULLs: Not allowed
3. titleAcronym
Physical data type: varchar(20)
Allow NULLs: Not allowed
4. orgID (FK)
Physical data type: decimal(18.0)
Allow NULLs: Not allowed
Foreign keys details (child)
FK_RCT_TitleDefn_WCA_Oganization
Definition: Child Parent
orgID WCA_Organization.orgID
Relationship type: Non-Identifying
Cardinality: One-to-Zero-or-More
Allow NULLs: Not allowed
Verb phrase: hasFK_RCT_TitleDefn_WCA_Organization
Inverse phrase: is of
Ref. Integrity on update: No Action
Ref. Integrity on delete: No Action RCT_ProjWPActor
Owner: dbo
Target DB name: WCA310_D
Number of columns: 11
Number of indexes: 0
Number of foreign keys: 2
Extended attributes:
OnFileGroup PRIMARY
Clustered PK Yes

| Columns | Data type | Allow NULLs | Value/Range |
|---|---|---|---|
| PID (FK) | decimal(18.0) | Not allowed | |
| WPID | decimal(18.0) | Not allowed | |
| actorID (FK) | int | Not allowed | |
| openNotify | char(1) | Not allowed | |
| submitNotify | char(1) | Not allowed | |
| approveNotify | char(1) | Not allowed | |
| disapproveNotify | char(1) | Not allowed | |
| openAttachment | varchar(100) | Allowed | |
| submitAttachment | varchar(100) | Allowed | |
| approveAttachment | varchar(100) | Allowed | |
| disapproveAttachment | varchar(100) | Allowed | |
| Foreign keys | | Child | Parent |
| FK_RCT_WPActor_RCT_ActorDefn | | actorID | RCT_OrgActorDefn.actorID |
| FK_RCT_WPActor_WCA_Project | | PID | WCA_Project.PID |

Column details
1. PID (FK)
Physical data type: decimal(18.0)
Allow NULLs: Not allowed
2. WPID
Physical data type: decimal(18.0)
Allow NULLs: Not allowed
3. actorID (FK)
Physical data type: int
Allow NULLs: Not allowed
4. openNotify
Physical data type: char(1)
Allow NULLs: Not allowed
5. submitNotify
Physical data type: char(1)
Allow NULLs: Not allowed
6. approveNotify
Physical data type: char(1)
Allow NULLs: Not allowed
7. disapproveNotify
Physical data type: char(1)
Allow NULLs: Not allowed
8. openAttachment
Physical data type: varchar(100)
Allow NULLs: Allowed
9. submitAttachment
Physical data type: varchar(100)
Allow NULLs: Allowed
10. approveAttachment
Physical data type: varchar(100)
Allow NULLs: Allowed
11. disapproveAttachment
Physical data type: varchar(100)
Allow NULLs: Allowed
Foreign key details (child)
FK_RCT_WPActor_RCT_ActorDefn
Definition: Child Parent
actorID RCT_OrgActorDefn.actorID
Relationship type: Identifying
Cardinality: One-to-Zero-or-More
Allow NULLs: Not allowed
Verb phrase: hasFK_RCT_WPActor_RCT_ActorDefn
Inverse phrase: is of
Ref. Integrity on update: No Action
Ref. Integrity on delete: No Action
FK_RCT_WPActor_WCA_Project
Definition: Child Parent
PID WCA_Project.PID
Relationship type: Identifying
Cardinality: One-to-Zero-or-More
Allow NULLs: Not allowed -continued Verb phrase: hasFK_RCT_WPActor_WCA_Project
Inverse phrase: is of
Ref. Integrity on update: No Action
Ref. Integrity on delete: No Action

---

RoleLogin
Owner: dbo
Target DB name: WCA310_D
Number of columns: 4
Number of indexes: 0
Number of foreign keys: 0
Extended attributes:
OnFileGroup PRIMARY
Clustered PK No

| Columns | Data type | Allow NULLs | Value/Range |
|---|---|---|---|
| roleID | varchar(10) | Not allowed | |
| dbRoleName | varchar(255) | Not allowed | |
| dbRolePassword | varchar(255) | Not allowed | |
| dbPwdLastChanged | datetime | Allowed | |
| Foreign keys | | Child | Parent |
| FK_UserRole_RoleLogin | | UserRole.roleID | roleID |

Column details
1. roleID
Physical data type: varchar(10)
Allow NULLs: Not allowed
2. dbRoleName
Physical data type: varchar(255)
Allow NULLs: Not allowed
3. dbRolePassword
Physical data type: varchar(255)
Allow NULLs: Not allowed
4. dbPwdLastChanged
Physical data type: datetime
Allow NULLs: Allowed

---

TableKeys
Owner: dbo
Target DB name: WCA310_D
Number of columns: 3
Number of indexes: 0
Number of foreign keys: 0
Extended attributes:
OnFileGroup PRIMARY
Clustered PK No

| Columns | Data type | Allow NULLs | Value/Range |
|---|---|---|---|
| TableName | varchar(30) | Not allowed | |
| ColumnName | varchar(30) | Not allowed | |
| KeyValue | decimal(18.0) | Not allowed | |

Column details
1. TableName
Physical data type: varchar(30)
Allow NULLs: Not allowed
2. ColumnName
Physical data type: varchar(30)
Allow NULLs: Not allowed
3. KeyValue
Physical data type: decimal(18.0)
Allow NULLs: Not allowed

---

UserPwdHistory
Owner: dbo
Target DB name: WCA310_D
Number of columns: 3
Number of indexes: 0
Number of foreign keys: 1
Extended attributes:
OnFileGroup PRIMARY
Clustered PK No

| Columns | Data type | Allow NULLs | Value/Range |
|---|---|---|---|
| userID (FK) | decimal(18, 0) | Not allowed | |
| userPassword | varchar(50) | Not allowed | |
| lastModified | datetime | Not allowed | |
| Foreign keys | | Child | Parent |
| FK_UserPwdHistory_AppUser | | userID | AppUser.userID |

Column details
1. userID (FK)
Physical data type: decimal(18, 0)
Allow NULLs: Not allowed
2. userPassword
Physical data type: varchar(50)
Allow NULLs: Not allowed
3. lastModified
Physical data type: datetime
Allow NULLs: Not allowed
Foreign key details (child)
FK_UserPwdHistory_AppUser
Definition: Child Parent
userID AppUser.userID
Relationship type: Identifying
Cardinality: One-to-Zero-or-More
Allow NULLs: Not allowed
Verb phrase: hasFK_UserPwdHistory_AppUser
Inverse phrase: is of
Ref. Integrity on update: No Action
Ref. Integrity on delete: No Action

---

UserRole
Owner: dbo
Target DB name: WCA310_D
Number of columns: 3
Number of indexes: 0
Number of foreign keys: 2
Extended attributes:
OnFileGroup PRIMARY
Clustered PK No

| Columns | Data type | Allow NULLs | Value/Range |
|---|---|---|---|
| userID (FK) | decimal(18, 0) | Not allowed | |
| roleID (FK) | varchar(10) | Not allowed | |
| status | char(1) | Allowed | |
| Foreign keys | | Child | Parent |
| FK_UserRole_User | | userID | AppUser.userID |
| FK_UserRole_RoleLogin | | roleID | RoleLogin.roleID |

Column details
1. userID (FK)
Physical data type: decimal(18, 0)
Allow NULLs: Not allowed
2. roleID (FK)
Physical data type: varchar(10)
Allow NULLs: Not allowed
3. status
Physical data type: char(1)
Allow NULLs: Allowed
Foreign key details (child)
FK_UserRole_User
Definition: Child Parent
userID AppUser.userID
Relationship type: Identifying
Cardinality: One-to-Exactly-1
Allow NULLs: Not allowed
Verb phrase: hasFK_UserRole_User
Inverse phrase: is of
Ref. Integrity on update: No Action
Ref. Integrity on delete: No Action
FK_UserRole_RoleLogin
Definition: Child Parent
roleID RoleLogin.roleID
Relationship type: Non-Identifying
Cardinality: One-to-Zero-or-More
Allow NULLs: Not allowed
Verb phrase: hasFK_UserRole_RoleLogin
Inverse phrase: is of
Ref. Integrity on update: No Action
Ref. Integrity on delete: No Action WCA_AcronymSrc
Owner:                          dbo
Target DB name:                 WCA310_D
Number of columns:              5
Number of indexes:              0
Number of foreign keys:         1
Extended attributes:
OnFileGroup         PRIMARY
TextImageOnGroup    PRIMARY
Clustered PK        No
    Columns              Data type        Allow NULLs    Value/Range
    acronym              varchar(50)      Not allowed
    asDescription        text             Allowed
    department (FK)      int              Not allowed
    service (FK)         int              Not allowed
    applPubFormat        varchar(50)      Allowed
Foreign keys                              Child          Parent
FK_WCA_AcronymSrc_WCA_DeptServCode        department     WCA_DeptServCode.department
                                          service        WCA_DeptServCode.service
Column details
1. acronym
Physical data type:        varchar(50)
Allow NULLs:       Not allowed
2. asDescription
Physical data type:        text
Allow NULLs:       Allowed
3. department (FK)
Physical data type:        int
Allow NULLs:       Not allowed
4. service (FK)
Physical data type:        int
Allow NULLs:       Not allowed
5. applPubFormat
Physical data type:        varchar(50)
Allow NULLs:       Allowed
Foreign key details (child)
FK_WCA_AcronymSrc_WCA_DeptServCode
Definition:        Child       Parent
department         WCA_DeptServCode.department
service            WCA_DeptServCode.service
Relationship type: Non-Identifying
Cardinality:       One-to-Zero-or-More
Allow NULLs:       Not allowed
Verb phrase:       hasFK_WCA_AcronymSrc_WCA_DeptServCode
Inverse phrase:    is of
Ref. Integrity on update:    No Action
Ref. Integrity on delete:    No Action WCA_AppdxTTLSrc
Owner:                          dbo
Target DB name:                 WCA310_D
Number of columns:              5
Number of indexes:              0
Number of foreign keys:         0
Extended attributes:
OnFileGroup         PRIMARY
Clustered PK        No
Columns              Data type        Allow NULLs    Value/Range
document             varchar(50)      Allowed
title                varchar(255)     Allowed
letter               varchar(50)      Allowed
applPubFormat        varchar(50)      Not allowed
appendixType         varchar(50)      Not allowed
Column details
1. document
Physical data type:        varchar(50)
Allow NULLs:       Allowed
2. title
Physical data type:        varchar(255)
Allow NULLs:       Allowed
3. letter
Physical data type:        varchar(50)
Allow NULLs:       Allowed
4. applPubFormat
Physical data type:        varchar(50)
Allow NULLs:       Not allowed
5. appendixType
Physical data type:        varchar(50)
Allow NULLs:       Not allowed WCA_ApplEventSrc
Owner: dbo
Target DB name: WCA310_D
Number of columns: 5
Number of indexes: 0
Number of foreign keys: 0
Extended attributes:
OnFileGroup PRIMARY
Clustered PK No
Columns          Data type        Allow NULLs    Value/Range
EventID          varchar(50)      Not allowed
StageName        varchar(50)      Allowed -continued

| Category | varchar(50) | Allowed |
| Severity | char(30) | Allowed |
| PubFormat | varchar(10) | Allowed |

Column details
1. EventID
Physical data type: varchar(50)
Allow NULLs: Not allowed
2. StageName
Physical data type: varchar(50)
Allow NULLs: Allowed
3. Category
Physical data type: varchar(50)
Allow NULLs: Allowed
4. Severity
Physical data type: char(30)
Allow NULLs: Allowed
5. PubFormat
Physical data type: varchar(10)
Allow NULLs: Allowed

---

WCA_AuditLog
Owner: dbo
Target DB name: WCA310_D
Number of columns: 19
Number of indexes: 0
Number of foreign keys: 0
Extended attributes:
OnFileGroup PRIMARY
TextImageOnGroup PRIMARY
Clustered PK No

| Columns | Data type | Allow NULLs | Value/Range |
|---|---|---|---|
| id | int | Not allowed | |
| PID | int | Allowed | |
| ProjectName | varchar(250) | Allowed | |
| TableName | varchar(25) | Allowed | |
| KeyValues | varchar(250) | Allowed | |
| StageName | varchar(50) | Allowed | |
| ProcessStep | varchar(255) | Allowed | |
| PageID | varchar(50) | Allowed | |
| UserID | decimal(18, 0) | Allowed | |
| IPAddress | varchar(16) | Not allowed | |
| ActionDesc | text | Allowed | |
| ActionStatus | char(20) | Allowed | |
| ActionTime | datetime | Not allowed | |
| EventType | varchar(50) | Allowed | |
| ErrorMessage | text | Allowed | |
| UserName | varchar(25) | Allowed | |
| orgID | decimal(18, 0) | Allowed | |
| orgName | varchar(50) | Allowed | |
| sessionID | varchar(50) | Allowed | |

Column details
1. id
Physical data type: int
Allow NULLs: Not allowed
2. PID
Physical data type: int
Allow NULLs: Allowed
3. ProjectName
Physical data type: varchar(250)
Allow NULLs: Allowed
4. TableName
Physical data type: varchar(25)
Allow NULLs: Allowed
5. KeyValues
Physical data type: varchar(250)
Allow NULLs: Allowed
6. StageName
Physical data type: varchar(50)
Allow NULLs: Allowed
7. ProcessStep
Physical data type: varchar(255)
Allow NULLs: Allowed
8. PageID
Physical data type: varchar(50)
Allow NULLs: Allowed
9. UserID
Physical data type: decimal(18, 0)
Allow NULLs: Allowed
10. IPAddress
Physical data type: varchar(16)
Allow NULLs: Not allowed
11. ActionDesc
Physical data type: text
Allow NULLs: Allowed
12. ActionStatus
Physical data type: char(20)
Allow NULLs: Allowed
13. ActionTime
Physical data type: datetime
Allow NULLs: Not allowed
14. EventType
Physical data type: varchar(50)
Allow NULLs: Allowed
15. ErrorMessage
Physical data type: text
Allow NULLs: Allowed
16. UserName
Physical data type: varchar(25)
Allow NULLs: Allowed
17. orgID
Physical data type: decimal(18, 0)
Allow NULLs: Allowed
18. orgName
Physical data type: varchar(50)
Allow NULLs: Allowed
19. sessionID
Physical data type: varchar(50)
Allow NULLs: Allowed

---

WCA_AuditObjects
Owner: dbo
Target DB name: WCA310_D
Number of columns: 4
Number of indexes: 0
Number of foreign keys: 0
Extended attributes:
OnFileGroup PRIMARY
Clustered PK No

| Columns | Data type | Allow NULLs | Value/Range |
|---|---|---|---|
| id | int | Not allowed | |
| tblName | varchar(25) | Allowed | |
| tblKeys | varchar(4000) | Allowed | |
| tblAction | varchar(25) | Not allowed | |

Column details
1. id
Physical data type: int
Allow NULLs: Not allowed
2. tblName
Physical data type: varchar(25)
Allow NULLs: Allowed
3. tblKeys
Physical data type: varchar(4000)
Allow NULLs: Allowed
4. tblAction
Physical data type: varchar(25)
Allow NULLs: Not allowed

---

WCA_CharSrc
Owner: dbo
Target DB name: WCA310_D
Number of columns: 1
Number of indexes: 0
Number of foreign keys: 0
Extended attributes:

-continued

| | | | |
|---|---|---|---|
| OnFileGroup | PRIMARY | | |
| Clustered PK | No | | |
| Columns | Data type | Allow NULLs | Value/Range |
| charName | varchar(50) | Not allowed | |
| Foreign keys | | Child | Parent |
| FK_WCA_ProjCharDtl_ WCA_CharSrc | | WCA_ProjCharDtl.charName | charName |

Column details
1. charName
Physical data type:    varchar(50)
Allow NULLs:    Not allowed WCA_ClassWeight
Owner:    dbo
Target DB name:    WCA310_D
Number of columns:    5
Number of indexes:    0
Number of foreign keys:    0
Extended attributes:
OnFileGroup    PRIMARY
Clustered PK    No

| Columns | Data type | Allow NULLs | Value/Range |
|---|---|---|---|
| ID | int | Not allowed | |
| characteristic | varchar(255) | Allowed | |
| alternative | varchar(255) | Allowed | |
| weight | float | Allowed | |
| applPubFormat | varchar(50) | Not allowed | |

Column details
1. ID
Physical data type:    int
Allow NULLs:    Not allowed
2. characteristic
Physical data type:    varchar(255)
Allow NULLs:    Allowed
3. alternative
Physical data type:    varchar(255)
Allow NULLs:    Allowed
4. weight
Physical data type:    float
Allow NULLs:    Allowed
5. applPubFormat
Physical data type:    varchar(50)
Allow NULLs:    Not allowed WCA_DefinitionSrc
Owner:    dbo
Target DB name:    WCA310_D
Number of columns:    5
Number of indexes:    0
Number of foreign keys:    1
Extended attributes:
OnFileGroup    PRIMARY
TextImageOnGroup    PRIMARY
Clustered PK    No

| Columns | Data type | Allow NULLs | Value/Range |
|---|---|---|---|
| term | varchar(255) | Not allowed | |
| definition | text | Allowed | |
| department (FK) | int | Not allowed | |
| service (FK) | int | Not allowed | |
| applPubFormat | varchar(50) | Allowed | |

| Foreign keys | Child | Parent |
|---|---|---|
| FK_WCA_DefinitionSrc_WCA_DeptServCode | department | WCA_DeptServCode.department |
| | service | WCA_DeptServCode.service |

Column details
1. term
Physical data type:    varchar(255)
Allow NULLs:    Not allowed
2. definition
Physical data type:    text
Allow NULLs:    Allowed
3. department (FK)
Physical data type:    int
Allow NULLs:    Not allowed
4. service (FK)
Physical data type:    int
Allow NULLs:    Not allowed
5. applPubFormat
Physical data type:    varchar(50)
Allow NULLs:    Allowed
Foreign key details (child)
FK_WCA_DefinitionSrc_WCA_DeptServCode

| Definition: | Child | Parent |
|---|---|---|
| | department | WCA_DeptServCode.department |
| | service | WCA_DeptServCode.service |

Relationship type:    Non-Identifying
Cardinality:    One-to-Zero-or-More

-continued

| | |
|---|---|
| Allow NULLs: | Not allowed |
| Verb phrase: | hasFK_WCA_DefinitionSrc_WCA_&DeptServCode |
| Inverse phrase: | is of |
| Ref. Integrity on update: | No Action |
| Ref. Integrity on delete: | No Action |

WCA_DefSecRegSrc
| | | | |
|---|---|---|---|
| Owner: | dbo | | |
| Target DB name: | WCA310_D | | |
| Number of columns: | 3 | | |
| Number of indexes: | 0 | | |
| Number of foreign keys: | 1 | | |
| Extended attributes: | | | |
| OnFileGroup | PRIMARY | | |
| Clustered PK | No | | |
| Columns | Data type | Allow NULLs | Value/Range |
| department | int | Not allowed | |
| service | int | Not allowed | |
| regID (FK) | int | Not allowed | |
| Foreign keys | | Child | Parent |
| FK_WCA_DefSecReg_Src_WCA_SecReg_Src | | regID | WCA_SecRegSrc.regID |

Column details
1. department
Physical data type: int
Allow NULLs: Not allowed
2. service
Physical data type: int
Allow NULLs: Not allowed
3. regID (FK)
Physical data type: int
Allow NULLs: Not allowed
Foreign key details (child)
FK_WCA_DefSecReg_Src_WCA_SecReg_Src
| | | |
|---|---|---|
| Definition: | Child | Parent |
| | regID | WCA_SecRegSrc.regID |
| Relationship type: | Identifying | |
| Cardinality: | One-to-Zero-or-More | |
| Allow NULLs: | Not allowed | |
| Verb phrase: | hasFK_WCA_DefSecReg_Src_WCA_SecReg_Src | |
| Inverse phrase: | is of | |
| Ref. Integrity on update: | No Action | |
| Ref. Integrity on delete: | No Action | |

WCA_DeptServCode
| | | | | |
|---|---|---|---|---|
| Owner: | dbo | | | |
| Target DB name: | WCA310_D | | | |
| Number of columns: | 4 | | | |
| Number of indexes: | 1 | | | |
| Number of foreign keys: | 0 | | | |
| Extended attributes: | | | | |
| OnFileGroup | PRIMARY | | | |
| Clustered PK | No | | | |
| Columns | Data type | Allow NULLs | Value/Range | |
| department | int | Not allowed | | |
| service | int | Not allowed | | |
| departmentName (U1) | varchar(50) | Not allowed | | |
| serviceName (U1) | varchar(50) | Not allowed | | |
| Indexes | | Columns | Sort order | |
| IX_WCA_DeptServCode (U1) | | departmentName | Ascending | |
| | | serviceName | Ascending | |
| Foreign keys | | | Child | Parent |
| FK_WCA_AcronymSrc_WCA_DeptservCode | | | WCA_AcronymSrc.department | department |
| | | | | service |
| | | | WCA_AcronymSrc.service | |
| FK_WCA_DefinitionSrc_WCA_DeptServCode | | | WCA_DefinitionSrc.department | department |
| | | | | service |
| | | | WCA_DefinitionSrc.service | |
| FK_WCA_SecRegSrc_WCA_DeptServCode | | | WCA_SecRegSrc.department | department |
| | | | | service |
| | | | WCA_SecRegSrc.service | |

Column details
1. department
Physical data type: int
Allow NULLs: Not allowed
2. service
Physical data type: int
Allow NULLs: Not allowed
3. departmentName (U1)
Physical data type: varchar(50)
Allow NULLs: Not allowed
4. serviceName (U1)

-continued

Physical data type:     varchar(50)
Allow NULLs:    Not allowed

Index details
IX_WCA_DeptServCode
Column(s):      departmentName (Asc)
serviceName (Asc)
Unique: Yes
Extended attributes:
OnFileGroup             PRIMARY
CLUSTERED No
IGNORE_DUP_KEY          No
FILLFACTOR              90
PAD_INDEX No
DROP_EXISTING           No
STATISTICS_NORECOMPUTE  No

---

WCA_DocParaTTLSrc
Owner:                          dbo
Target DB name:                 WCA310_D
Number of columns:              6
Number of indexes:              0
Number of foreign keys:         0
Extended attributes:
OnFileGroup             PRIMARY
Clustered PK            No

| Columns | Data type | Allow NULLs | Value/Range |
|---|---|---|---|
| title | varchar(60) | Not allowed | |
| paragraph | varchar(50) | Not allowed | |
| document | varchar(50) | Not allowed | |
| applPubFormat | varchar(50) | Not allowed | |
| paragraphLevel | int | Not allowed | |
| paragraphType | varchar(50) | Allowed | |

Column details
1. title
Physical data type:     varchar(60)
Allow NULLs:    Not allowed
2. paragraph
Physical data type:     varchar(50)
Allow NULLs:    Not allowed
3. document
Physical data type:     varchar(50)
Allow NULLs:    Not allowed
4. applPubFormat
Physical data type:     varchar(50)
Allow NULLs:    Not allowed
5. paragraphLevel
Physical data type:     int
Allow NULLs:    Not allowed
6. paragraphType
Physical data type:     varchar(50)
Allow NULLs:    Allowed

---

WCA_DocTmplSrc
Owner:                          dbo
Target DB name:                 WCA310_D
Number of columns:              6
Number of indexes:              0
Number of foreign keys:         0
Extended attributes:
OnFileGroup             PRIMARY
TextImageOnGroup        PRIMARY
Clustered PK            No

| Columns | Data type | Allow NULLs | Value/Range |
|---|---|---|---|
| instance | int | Not allowed | |
| dtsText | text | Allowed | |
| notes | varchar(50) | Allowed | |
| document | varchar(50) | Not allowed | |
| paragraph | varchar(255) | Not allowed | |
| applPubFormat | varchar(50) | Not allowed | |

Column details
1. instance
Physical data type:     int
Allow NULLs:    Not allowed
2. dtsText
Physical data type:     text
Allow NULLs:    Allowed
3. notes
Physical data type:     varchar(50)
Allow NULLs:    Allowed
4. document
Physical data type:     varchar(50)
Allow NULLs:    Not allowed
5. paragraph
Physical data type:     varchar(255)
Allow NULLs:    Not allowed
6. applPubFormat
Physical data type:     varchar(50)
Allow NULLs:    Not allowed

---

WCA_HelpExampleSrc
Owner:                          dbo
Target DB name:                 WCA310_D
Number of columns:              13
Number of indexes:              0
Number of foreign keys:         0
Extended attributes:
OnFileGroup             PRIMARY
TextImageOnGroup        PRIMARY
Clustered PK            Yes

| Columns | Data type | Allow NULLs | Value/Range |
|---|---|---|---|
| ID | int | Not allowed | |
| page | varchar(50) | Allowed | |
| applPubFormat | varchar(50) | Not allowed | |
| type | varchar(50) | Allowed | |
| title | varchar(100) | Allowed | |
| helptext | text | Allowed | |
| height | int | Not allowed | |
| width | int | Not allowed | |
| seeAlso | int | Allowed | |
| pageID | varchar(50) | Not allowed | |
| heading | varchar(100) | Not allowed | |
| stgID | decimal(18, 0) | Allowed | |
| paragraph | varchar(50) | Allowed | |

Column details
1. ID
Physical data type:     int
Allow NULLs:    Not allowed
2. page
Physical data type:     varchar(50)
Allow NULLs:    Allowed -continued 3. applPubFormat
Physical data type: varchar(50)
Allow NULLs: Not allowed
4. type
Physical data type: varchar(50)
Allow NULLs: Allowed
5. title
Physical data type: varchar(100)
Allow NULLs: Allowed
6. helptext
Physical data type: text
Allow NULLs: Allowed
7. height
Physical data type: int
Allow NULLs: Not allowed
8. width
Physical data type: int
Allow NULLs: Not allowed
9. seeAlso
Physical data type: int
Allow NULLs: Allowed
10. PageID
Physical data type: varchar(50)
Allow NULLs: Not allowed
11. heading
Physical data type: varchar(100)
Allow NULLs: Not allowed
12. stgID
Physical data type: decimal(18, 0)
Allow NULLs: Allowed
13. paragraph
Physical data type: varchar(50)
Allow NULLs: Allowed WCA_HwFamilyLookup
Owner: dbo
Target DB name: WCA310_D
Number of columns: 4
Number of indexes: 0
Number of foreign keys: 0
Extended attributes:
OnFileGroup PRIMARY
Clustered PK No

| Columns | Data type | Allow NULLs | Value/Range |
|---|---|---|---|
| hwFamily | varchar(50) | Not allowed | |
| rank | int | Not allowed | |
| type | char(10) | Not allowed | |
| hwID | decimal(18, 0) | Not allowed | |

Column details
1. hwFamily
Physical data type: varchar(50)
Allow NULLs: Not allowed
2. rank
Physical data type: int
Allow NULLs: Not allowed
3. type
Physical data type: char(10)
Allow NULLs: Not allowed
4. hwID
Physical data type: decimal(18, 0)
Allow NULLs: Not allowed WCA_InfoCategory
Owner: dbo
Target DB name: WCA310_D
Number of columns: 5
Number of indexes: 0
Number of foreign keys: 0
Extended attributes:
OnFileGroup PRIMARY -continued Clustered PK No

| Columns | Data type | Allow NULLs | Value/Range |
|---|---|---|---|
| infoCatID | int | Not allowed | |
| infoCatName | varchar(60) | Allowed | |
| infoCatValue | varchar(5) | Allowed | |
| rank | int | Allowed | |
| weight | float | Not allowed | |

Column details
1. infoCatID
Physical data type: int
Allow NULLs: Not allowed
2. infoCatName
Physical data type: varchar(60)
Allow NULLs: Allowed
3. infoCatValue
Physical data type: varchar(5)
Allow NULLs: Allowed
4. rank
Physical data type: int
Allow NULLs: Allowed
5. weight
Physical data type: float
Allow NULLs: Not allowed WCA_LevelDetermin
Owner: dbo
Target DB name: WCA310_D
Number of columns: 6
Number of indexes: 0
Number of foreign keys: 0
Extended attributes:
OnFileGroup PRIMARY
Clustered PK No

| Columns | Data type | Allow NULLs | Value/Range |
|---|---|---|---|
| ID | int | Not allowed | |
| weightedTotalMin | float | Allowed | |
| weightedTotalMax | float | Allowed | |
| class | int | Allowed | |
| description | varchar(255) | Allowed | |
| applPubFormat | varchar(50) | Not allowed | |

Column details
1. ID
Physical data type: int
Allow NULLs: Not allowed
2. weightedTotalMin
Physical data type: float
Allow NULLs: Allowed
3. weightedTotalMax
Physical data type: float
Allow NULLs: Allowed
4. class
Physical data type: int
Allow NULLs: Allowed
5. description
Physical data type: varchar(255)
Allow NULLs: Allowed
6. applPubFormat
Physical data type: varchar(50)
Allow NULLs: Not allowed WCA_LookupMgr
Owner: dbo
Target DB name: WCA310_D
Number of columns: 8
Number of indexes: 0
Number of foreign keys: 0
Extended attributes:
OnFileGroup PRIMARY
Clustered PK No

| Columns | Data type | Allow NULLs | Value/Range |
|---|---|---|---|

-continued

| | | |
|---|---|---|
| webCaLookupsID | decimal(18, 0) | Not allowed |
| tableName | varchar(50) | Not allowed |
| columnName | varchar(50) | Not allowed |
| lkupDescription | varchar(50) | Allowed |
| wlSize | decimal(18, 0) | Allowed |
| displayable | char(1) | Allowed |
| required | char(1) | Allowed |
| valuesLkTabName | varchar(30) | Allowed |

Column details
1. webCaLookupsID
Physical data type: decimal(18, 0)
Allow NULLs: Not allowed
2. tableName
Physical data type: varchar(50)
Allow NULLs: Not allowed
3. columnName
Physical data type: varchar(50)
Allow NULLs: Not allowed
4. lkupDescription
Physical data type: varchar(50)
Allow NULLs: Allowed
5. wlSize
Physical data type: decimal(18, 0)
Allow NULLs: Allowed
6. displayable
Physical data type: char(1)
Allow NULLs: Allowed
7. required
Physical data type: char(1)
Allow NULLs: Allowed
8. valuesLkTabName
Physical data type: varchar(30)
Allow NULLs: Allowed

---

WCA_MarkerLookup
Owner: dbo
Target DB name: WCA310_D
Number of columns: 4
Number of indexes: 0
Number of foreign keys: 0
Extended attributes:
OnFileGroup PRIMARY
Clustered PK No

| Columns | Data type | Allow NULLs | Value/Range |
|---|---|---|---|
| marker | varchar(50) | Not allowed | |
| sqlStatement | varchar(1000) | Not allowed | |
| retrievalType | varchar(50) | Not allowed | |
| errorMessageText | varchar(255) | Allowed | |

Column details
1. marker
Physical data type: varchar(50)
Allow NULLs: Not allowed
2. sqlStatement
Physical data type: varchar(1000)
Allow NULLs: Not allowed
3. retrievalType
Physical data type: varchar(50)
Allow NULLs: Not allowed
4. errorMessageText
Physical data type: varchar(255)
Allow NULLs: Allowed

---

WCA_MinSeCkListSrc
Owner: dbo
Target DB name: WCA310_D
Number of columns: 6
Number of indexes: 0
Number of foreign keys: 0
Extended attributes:
OnFileGroup PRIMARY
TextImageOnGroup PRIMARY Clustered PK No

| Columns | Data type | Allow NULLs | Value/Range |
|---|---|---|---|
| sectionName | varchar(255) | Not allowed | |
| question | varchar(50) | Not allowed | |
| testText | text | Allowed | |
| questionSort | decimal(18, 0) | Allowed | |
| applPubFormat | varchar(50) | Allowed | |
| validQuestion | char(1) | Allowed | |

Column details
1. sectionName
Physical data type: varchar(255)
Allow NULLs: Not allowed
2. question
Physical data type: varchar(50)
Allow NULLs: Not allowed
3. testText
Physical data type: text
Allow NULLs: Allowed
4. questionSort
Physical data type: decimal(18, 0)
Allow NULLs: Allowed
5. applPubFormat
Physical data type: varchar(50)
Allow NULLs: Allowed
6. validQuestion
Physical data type: char(1)
Allow NULLs: Allowed

---

WCA_MLSecClass
Owner: dbo
Target DB name: WCA310_D
Number of columns: 6
Number of indexes: 0
Number of foreign keys: 0
Extended attributes:
OnFileGroup PRIMARY
Clustered PK No

| Columns | Data type | Allow NULLs | Value/Range |
|---|---|---|---|
| ID | int | Allowed | |
| maxDateClass | varchar(255) | Allowed | |
| minUserClear | varchar(255) | Allowed | |
| case1 | varchar(255) | Allowed | |
| case2 | varchar(255) | Allowed | |
| case3 | varchar(255) | Allowed | |

Column details
1. ID
Physical data type: int
Allow NULLs: Allowed
2. maxDateClass
Physical data type: varchar(255)
Allow NULLs: Allowed
3. minUserClear
Physical data type: varchar(255)
Allow NULLs: Allowed
4. case1
Physical data type: varchar(255)
Allow NULLs: Allowed
5. case2
Physical data type: varchar(255)
Allow NULLs: Allowed
6. case3
Physical data type: varchar(255)
Allow NULLs: Allowed WCA_Organization
Owner:                          dbo
Target DB name:                 WCA310_D
Number of columns:              3
Number of indexes:              0
Number of foreign keys:         0
Extended attributes:
OnFileGroup         PRIMARY
Clustered PK        No
    Columns         Data type       Allow NULLs     Value/Range
    orgID           decimal(18, 0)  Not allowed
    orgName         varchar(50)     Not allowed
    orgDescription  varchar(255)    Not allowed
Foreign keys                                Child                       Parent
FK_RCT_ActorDefn_WCA_Organization           RCT_OrgActorDefn.orgID      orgID
FK_RCT_TitleDefn_WCA_Organization           RCT_OrgTitleDefn.orgID      orgID
FK_WCA_OrgUser_WCA_Organization             WCA_OrgUser.orgID           orgID
FK_WCA_Project WCA_Organization             WCA_Project.orgID           orgID
FK_WPM_OrgEventRules_WCA_Organization       WPM_OrgEventRules.orgID     orgID
FK_WPM_OrgPrereq_WCA_Organization           WPM_OrgPrereq.orgID         orgID
FK_WPM_OrgPS_WCA_Organization               WPM_OrgPS.orgID             orgID
FK_WPM_OrgWBS_WCA_Organization              WPM_OrgWBS.orgID            orgID
FK_WPM_OrgWP_WCA_Organization               WPM_OrgWP.orgID             orgID
Column details
1. orgID
Physical data type:     decimal(18, 0)
Allow NULLs:    Not allowed
2. orgName
Physical data type:     varchar(50)
Allow NULLs:    Not allowed
3. orgDescription
Physical data type:     varchar(255)
Allow NULLs:    Not allowed WCA_OrgUser
Owner:                          dbo
Target DB name:                 WCA310_D
Number of columns:              2
Number of indexes:              1
Number of foreign keys:         1
Extended attributes:
OnFileGroup         PRIMARY
Clustered PK        No
Columns         Data type       Allow NULLs     Value/Range
orgID (FK, I1)  decimal(18, 0)  Not allowed
userID          int             Not allowed
    Indexes             Columns     Sort order
    IX_WCA_OrgUser (I1) orgID       Ascending
Foreign keys                Child   Parent
FK_WCA_OrgUser_WCA_         orgID   WCA_Organization.orgID
Organization
Column details
1. orgID (FK, I1)
Physical data type:     decimal(18, 0)
Allow NULLs:    Not allowed
2. userID
Physical data type:     int
Allow NULLs:    Not allowed
Index details
IX_WCA_OrgUser
Column(s):      orgID (Asc)
Unique: No
Extended attributes:
OnFileGroup         PRIMARY
CLUSTERED           No
IGNORE_DUP_KEY      No
FILLFACTOR          90
PAD_INDEX           No
DROP_EXISTING       No
STATISTICS_NORECOMPUTE  No
Foreign key details (child)
FK_WCA_OrgUser_WCA_Organization
Definition:         Child   Parent -continued orgID       WCA_Organization.orgID
Relationship type:      Non-Identifying
Cardinality:            One-to-Zero-or-More
Allow NULLs:            Not allowed
Verb phrase:            hasFK_WCA_OrgUser_WCA_Organization
Inverse phrase:         is of
Ref. Integrity on update:   No Action
Ref. Integrity on delete:   No Action WCA_OsFamilyLookup
Owner:                          dbo
Target DB name:                 WCA310_D
Number of columns:              4
Number of indexes:              0
Number of foreign keys:         0
Extended attributes:
OnFileGroup         PRIMARY
Clustered PK        No
Columns     Data type       Allow NULLs     Value/Range
osFamily    varchar(50)     Not allowed
rank        int             Not allowed
type        char(10)        Not allowed
osID        decimal(18, 0)  Not allowed
Column details
1. osFamily
Physical data type:     varchar(50)
Allow NULLs:    Not allowed
2. rank
Physical data type:     int
Allow NULLs:    Not allowed
3. type
Physical data type:     char(10)
Allow NULLs:    Not allowed
4. osID
Physical data type:     decimal(18, 0)
Allow NULLs:    Not allowed WCA_OSSource
Owner:                         dbo
Target DB name:                WCA310_D
Number of columns:             7
Number of indexes:             0
Number of foreign keys:        0
Extended attributes:
OnFileGroup                    PRIMARY
Clustered PK                   No

| Columns | Data type | Allow NULLs | Value/Range |
|---|---|---|---|
| osReference | varchar(50) | Not allowed | |
| osFamily | varchar(20) | Allowed | |
| osMfr | varchar(50) | Allowed | |
| osName | varchar(50) | Allowed | |
| osVersion | varchar(50) | Allowed | |
| osPatchLevel | varchar(50) | Allowed | |
| Type | char(1) | Allowed | |

Column details
1. osReference
Physical data type:            varchar(50)
Allow NULLs:                   Not allowed
2. osFamily
Physical data type:            varchar(20)
Allow NULLs:                   Allowed
3. osMfr
Physical data type:            varchar(50)
Allow NULLs:                   Allowed
4. osName
Physical data type:            varchar(50)
Allow NULLs:                   Allowed
5. osVersion
Physical data type:            varchar(50)
Allow NULLs:                   Allowed
6. osPatchLevel
Physical data type:            varchar(50)
Allow NULLs:                   Allowed
7. Type
Physical data type:            char(1)
Allow NULLs:                   Allowed WCA_PageAttrs
Owner:                         dbo
Target DR name:                WCA310_D
Number of columns:             6
Number of indexes:             0
Number of foreign keys:        0
Extended attributes:
OnFileGroup                    PRIMARY
Clustered PK                   Yes

| Columns | Data type | Allow NULLs | Value/Range |
|---|---|---|---|
| pageID | varchar(50) | Not allowed | |
| stgID | decimal(18, 0) | Not allowed | |
| appPageTitle | varchar(50) | Not allowed | |
| appPageHeading | varchar(50) | Allowed | |
| processStep | varchar(50) | Not allowed | |
| servlet | varchar(255) | Not allowed | |

| Foreign keys | Child | Parent |
|---|---|---|
| FK_WPM_ProjPS_WCA_PageAttrs | WPM_ProjPS.pageID | pageID |
| FK_WPM_PSSrc_WCA_PageAttrs | WPM_PSSrc.pageID | pageID |

Column details
1. pageID
Physical data type:            varchar(50)
Allow NULLs:                   Not allowed
2. stgID
Physical data type:            decimal(18, 0)
Allow NULLs:                   Not allowed
3. appPageTitle
Physical data type:            varchar(50)
Allow NULLs:                   Not allowed
4. appPageHeading
Physical data type:            varchar(50)
Allow NULLs:                   Allowed
5. processStep
Physical data type:            varchar(50)

-continued

Allow NULLs:                   Not allowed
6. servlet
Physical data type:            varchar(255)
Allow NULLs:                   Not allowed WCA_ProjAcBoundary
Owner:                         dbo
Target DB name:                WCA310_D
Number of columns:             4
Number of indexes:             0
Number of foreign keys:        1
Extended attributes:
OnFileGroup                    PRIMARY
TextImageOnGroup               PRIMARY
Clustered PK                   No

| Columns | Data type | Allow NULLs | Value/Range |
|---|---|---|---|
| PID (EK) | decimal(18, 0) | Not allowed | |
| pabName | varchar(50) | Not allowed | |
| pabDescription | text | Not allowed | |
| adID | decimal(18, 0) | Not allowed | |

| Foreign keys | Child | Parent |
|---|---|---|
| FK_WCA_ProjAcBound | PID | WCA_Project.PID |

Column details
1. PID (FK)
Physical data type:            decimal(18, 0)
Allow NULLs:                   Not allowed
2. pabName
Physical data type:            varchar(50)
Allow NULLs:                   Not allowed
3. pabDescription
Physical data type:            text
Allow NULLs:                   Not allowed
4. adID
Physical data type:            decimal(18, 0)
Allow NULLs:                   Not allowed
Foreign key details (child)
FK_WCA_ProjAcBound
Definition:                    Child  Parent
PID                            WCA_Project.PID
Relationship type:             Non-Identifying
Cardinality:                   One-to-Zero-or-More
Allow NULLs:                   Not allowed
Verb phrase:                   hasFK_WCA_ProjAcBound
Inverse phrase:                is of
Ref. Integrity on update:      No Action
Ref. Integrity on delete:      No Action WCA_ProjAcronym
Owner:                         dbo
Target DB name:                WCA310_D
Number of columns:             4
Number of indexes:             0
Number of foreign keys:        1
Extended attributes:
OnFileGroup                    PRIMARY
TextImageOnGroup               PRIMARY
Clustered PK                   No

| Columns | Data type | Allow NULLs | Value/Range |
|---|---|---|---|
| ID | int | Not allowed | |
| PID (FK) | decimal(18, 0) | Not allowed | |
| acronym | varchar(50) | Allowed | |
| description | text | Allowed | |

| Foreign keys | Child | Parent |
|---|---|---|
| FK_WCA_ProjAcronym | PID | WCA_Project.PID |

Column details
1. ID
Physical data type:            int
Allow NULLs:                   Not allowed
2. PID (FK)
Physical data type:            decimal(18, 0)

-continued

```
Allow NULLs:      Not allowed
3. acronym
Physical data type:       varchar(50)
Allow NULLs:      Allowed
4. description
Physical data type:       text
Allow NULLs:      Allowed
Foreign key details (child)
FK_WCA_ProjAcronym
Definition:               Child       Parent
PID       WCA_Project.PID
Relationship type:        Non-Identifying
Cardinality:              One-to-Zero-or-More
Allow NULLs:      Not allowed
Verb phrase:              hasFK_WCA_ProjAcronym
Inverse phrase:           is of
Ref. Integrity on update:        No Action
Ref. Integrity on delete:        No Action
```

```
WCA_ProjAppdxFile
Owner:                    dbo
Target DB name:           WCA310_D
Number of columns:        11
Number of indexes:        0
Number of foreign keys:   1
Extended attributes:
OnFileGroup       PRIMARY
Clustered PK      No
Columns        Data type      Allow NULLs     Value/Range
ID             decimal(18, 0) Not allowed
PID (FK)       decimal(18, 0) Not allowed
letter         varchar(50)    Not allowed
title          varchar(255)   Allowed
shortTitle     varchar(255)   Allowed
author         varchar(255)   Allowed
afDate         varchar(255)   Allowed
version        varchar(50)    Allowed
url            varchar(255)   Allowed
appendixCFlag  char(10)       Allowed
fileID         decimal(18, 0) Not allowed
     Foreign keys         Child        Parent
     FK_WCA_ProjAppdxFiile  PID       WCA_Project.PID
Column details
1. ID
Physical data type:       decimal(18, 0)
Allow NULLs:      Not allowed
2. PID (FK)
Physical data type:       decimal(18, 0)
Allow NULLs:      Not allowed
3. letter
Physical data type:       varchar(50)
Allow NULLs:      Not allowed
4. title
Physical data type:       varchar(255)
Allow NULLs:      Allowed
5. shortTitle
Physical data type:       varchar(255)
Allow NULLs:      Allowed
6. author
Physical data type:       varchar(255)
Allow NULLs:      Allowed
7. afDate
Physical data type:       varchar(255)
Allow NULLs:      Allowed
8. version
Physical data type:       varchar(50)
Allow NULLs:      Allowed
9. url
Physical data type:       varchar(255)
Allow NULLs:      Allowed
10. appendixCFlag
Physical data type:       char(10)
Allow NULLs:      Allowed
11. fileID
```

-continued

```
Physical data type:       decimal(18, 0)
Allow NULLs:      Not allowed
Foreign key details (child)
FK_WCA_ProjAppdxFile
Definition:               Child       Parent
PID       WCA_Project.PID
Relationship type:        Non-Identifying
Cardinality:              One-to-Zero-or-More
Allow NULLs:      Not allowed
Verb phrase:              hasFK_WCA_ProjAppdxFile
Inverse phrase:           is of
Ref. Integrity on update:        No Action
Ref. Integrity on delete:        No Action
```

```
WCA_ProjCharDtl
Owner:                    dbo
Target DB name:           WCA310_D
Number of columns:        4
Number of indexes:        0
Number of foreign keys:   2
Extended attributes:
OnFileGroup       PRIMARY
Clustered PK      No
Columns        Data type      Allow NULLs     Value/Range
PID (FK)       decimal(18, 0) Not allowed
charName (FK)  varchar(50)    Not allowed
stringValue    varchar(50)    Not allowed
weight         float          Allowed
Foreign keys                  Child          Parent
FK_WCA_ProjCharDtl_           charName       WCA_CharSrc.charName
WCA_CharSrc
FK_WCA_ProjCharDtl_           PID            WCA_Project.PID
WCA_Project
Column details
1. PID (FK)
Physical data type:       decimal(18, 0)
Allow NULLs:      Not allowed
2. charName (FK)
Physical data type:       varchar(50)
Allow NULLs:      Not allowed
3. stringValue
Physical data type:       varchar(50)
Allow NULLs:      Not allowed
4. weight
Physical data type:       float
Allow NULLs:      Allowed
Foreign key details (child)
FK_WCA_ProjCharDtl_WCA_CharSrc
Definition:               Child       Parent
charName                  WCA_CharSrc.charName
Relationship type:        Identifying
Cardinality:              One-to-Zero-or-More
Allow NULLs:      Not allowed
Verb phrase:              hasFK_WCA_ProjCharDtl_WCA_CharSrc
Inverse phrase:           is of
Ref. Integrity on update:        No Action
Ref. Integrity on delete:        No Action
FK_WCA_ProjCharDtl_WCA_Project
Definition:               Child       Parent
PID       WCA_Project.PID
Relationship type:        Identifying
Cardinality:              One-to-Zero-or-More
Allow NULLs:      Not allowed
Verb phrase:              hasFK_WCA_ProjCharDtl_WCA_Project
Inverse phrase:           is of
Ref. Integrity on update:        No Action
Ref. Integrity on delete:        No Action
```

```
WCA_ProjCkListRes
Owner:                    dbo
Target DB name:           WCA310_D
Number of columns:        4
Number of indexes:        0
```

```
Number of foreign keys:        1
Extended attributes:
OnFileGroup          PRIMARY
Clustered PK         No
Columns           Data type         Allow NULLs    Value/Range
PID (FK)          decimal(18, 0)    Not allowed
sectionName       varchar(255)      Not allowed
question          varchar(50)       Not allowed
result            varchar(50)       Allowed
Foreign keys                       Child   Parent
FK_WCA_ProjCkListRes_WCA_Project   PID    WCA_Project.PID
Column details
1. PID (FK)
Physical data type:       decimal(18, 0)
Allow NULLs:     Not allowed
2. sectionName
Physical data type:       varchar(255)
Allow NULLs:     Not allowed
3. question
```

```
Physical data type:       varchar(50)
Allow NULLs:     Not allowed
4. result
Physical data type:       varchar(50)
Allow NULLs:     Allowed
Foreign key details (child)
FK_WCA_ProjCkListRes_WCA_Project
Definition:              Child   Parent
PID      WCA_Project.PID
Relationship type:       Identifying
Cardinality:             One-to-Zero-or-More
Allow NULLs:             Not allowed
Verb phrase:             hasFK_WCA_ProjCkListRes_WCA_Project
Inverse phrase:          is of
Ref. Integrity on update:   No Action
Ref. Integrity on delete:   No Action
```

```
WCA_ProjCleanStat
Owner: dbo
Target DR name: WCA310_D
Number of columns:     5
Number of indexes:     0
Number of foreign keys:  1
Extended attributes:
OnFileGroup  PRIMARY
Clustered PK  No
Columns                              Data type          Allow NULLs    Value/Range
PID (FK)                             decimal(18,0)      Not allowed
baselineMod                          char(1)            Not allowed
platCatMod                           char(1)            Not allowed
equipInvenMod                        char(1)            Not allowed
conTestResultMod                     char(1)            Not allowed
Foreign keys                         Child              Parent
FK_WCA_ProjCleanStat_WCA_Project     PID                WCA_Project.PID
Column details
1. PID (FK)
Physical data type:      decimal(18,0)
Allow NULLs:    Not allowed
2. baselineMod
Physical data type:      char(1)
Allow NULLs:    Not allowed
3. platCatMod
Physical data type:      char(1)
Allow NULLs:    Not allowed
4. equipInvenMod
Physical data type:      char(l)
Allow NULLs:    Not allowed
5. conTestResultMod
Physical data type:      char(l)
Allow NULLs:    Not allowed
Foreign key details (child)
FK_WCA_ProjCleanStat_WCA_Project
Definition:     Child   Parent
PID      WCA_Project.PID
Relationship type:  Identifying
Cardinality:    One-to-Exactly-1
Allow NULLs:    Not allowed
Verb phrase:    hasFK_WCA_ProjCleanStat_WCA_Project
Inverse phrase:    is of
Ref. Integrity on update:   No Action
Ref. Integrity on delete:   No Action
```

WCA_ProjConTestRes  
Owner: dbo  
Target DB name: WCA310_D  
Number of columns: 23  
Number of indexes: 1  
Number of foreign keys: 1  
Extended attributes:  
OnFileGroup PRIMARY  
TextImageOnGroup PRIMARY  
Clustered PK No

| Columns | Data type | Allow NULLs | Value/Range |
|---|---|---|---|
| platId (I1) | decimal(18,0) | Not allowed | |
| PID (FK) | decimal(18,0) | Not allowed | |
| cat1 | varchar(50) | Allowed | |
| cat2 | varchar(50) | Allowed | |
| cat3 | varchar(50) | Allowed | |
| aggregatedResult | varchar(50) | Allowed | |
| statementOfIssue | text | Allowed | |
| hwPlatform | varchar(50) | Allowed | |
| threat | varchar(50) | Allowed | |
| impactStatement | text | Allowed | |
| testTitle | varchar(100) | Allowed | |
| associatedRequirement | text | Allowed | |
| templateId | decimal(18,0) | Not allowed | |
| testType | varchar(50) | Allowed | |
| projOSType | varchar(50) | Allowed | |
| testCategoryId | decimal(18,0) | Not allowed | |
| certAnalysisLevel | decimal(18,0) | Allowed | |
| testRequirements | text | Allowed | |
| riskElemRef | decimal(18,0) | Allowed | |
| totalPopulation | decimal(18,0) | Allowed | |
| testPopulation | decimal(18,0) | Allowed | |
| totalFailed | decimal(18,0) | Allowed | |
| numAggregatedResult | float | Allowed | |

| Indexes | Columns | Sort order |
|---|---|---|
| IX_WCA_ProjConTestRes (I1) | platId | Ascending |

| Foreign keys | Child | Parent |
|---|---|---|
| FK_WCA_ProjConTestRes_WCA_Project | PID | WCA_Project.PID |

Column details  
1. platId (I1)  
Physical data type: decimal(18,0)  
Allow NULLs: Not allowed  
2. PID (FK)  
Physical data type: decimal(18,0)  
Allow NULLs: Not allowed  
3. cat1  
Physical data type: varchar(50)  
Allow NULLs: Allowed  
4. cat2  
Physical data type: varchar(50)  
Allow NULLs: Allowed  
5. cat3  
Physical data type: varchar(50)  
Allow NULLs: Allowed  
6. aggregatedResult  
Physical data type: varchar(50)  
Allow NULLs: Allowed  
7. statementOfIssue  
Physical data type: text  
Allow NULLs: Allowed  
8. hwPlatform  
Physical data type: varchar(50)  
Allow NULLs: Allowed  
9. threat  
Physical data type: varchar(50)  
Allow NULLs: Allowed  
10. impactStatement  
Physical data type: text  
Allow NULLs: Allowed  
11. testTitle  
Physical data type: varchar(100)  
Allow NULLs: Allowed  
12. associatedRequirement  
Physical data type: text  
Allow NULLs: Allowed  
13. templateId  
Physical data type: decimal(18,0)  
Allow NULLs: Not allowed  
14. testType -continued

```
Physical data type:        varchar(50)
Allow NULLs:     Allowed
15. projOSType
Physical data type:        varchar(50)
Allow NULLs:     Allowed
16. testCategoryId
Physical data type:        decimal(18,0)
Allow NULLs:     Not allowed
17. certAnalysisLevel
Physical data type:        decimal(18,0)
Allow NULLs:     Allowed
18. testRequirements
Physical data type:        text
Allow NULLs:     Allowed
19. riskElemRef
Physical data type:        decimal(18,0)
Allow NULLs:     Allowed
20. totalPopulation
Physical data type:        decimal(18,0)
Allow NULLs:     Allowed
21. testPopulation
Physical data type:        decimal(18,0)
Allow NULLs:     Allowed
22. totalFailed
Physical data type:        decimal(18,0)
Allow NULLs:     Allowed
23. numAggregatedResult
Physical data type:        float
Allow NULLs:     Allowed
Index details
IX_WCA_ProjConTestRes
Column(s):       platId (Asc)
Unique: No
Extended attributes:
OnFileGroup       PRIMARY
CLUSTERED         No
IGNORE_DUP_KEY            No
FILLFACTOR        0
PAD_INDEX         No
DROP_EXISTING             No
STATISTICS_NORECOMPUTE    No
Foreign key details (child)
FK_WCA_ProjConTestRes_WCA_Project
Definition:       Child    Parent
PID      WCA_Project.PID
Relationship type:    Non-Identifying
Cardinality:          One-to-Zero-or-More
Allow NULLs:          Not allowed
Verb phrase:          hasFK_WCA_ProjConTestRes_WCA_Project
Inverse phrase:       is of
Ref. Integrity on update:    No Action
Ref. Integrity on delete:    No Action
```

```
WCA_ProjDataFlow
Owner: dbo
Target DB name:     WCA310_D
Number of columns:       4
Number of indexes:       0
Number of foreign keys:  1
Extended attributes:
OnFileGroup       PRIMARY
TextImageOnGroup          PRIMARY
Clustered PK      No
Columns                    Data type          Allow NULLs    Value/Range
dataFlowID                 decimal(18,0)      Not allowed
dataFlowDesc               text               Not allowed
PID (FK)                   decimal(18,0)      Not allowed
shortName                  varchar(50)        Not allowed
Foreign keys                       Child              Parent
FK_WCA_ProjSysDataFlow_WCA_Project PID                WCA_Project.PID
Column details
1. dataFlowID
Physical data type:        decimal(18,0)
Allow NULLs:     Not allowed
```

-continued 2. dataFlowDesc
Physical data type: text
Allow NULLs: Not allowed
3. PID (FK)
Physical data type: decimal(18,0)
Allow NULLs: Not allowed
4. shortName
Physical data type: varchar(50)
Allow NULLs: Not allowed
Foreign key details (child)
FK_WCA_ProjSysDataFlow_WCA_Project
Definition: Child  Parent
PID    WCA_Project.PID
Relationship type: Non-Identifying
Cardinality: One-to-Zero-or-More
Allow NULLs: Not allowed
Verb phrase: hasFK_WCA_ProjSysDataFlow_WCA_Project
Inverse phrase: is of
Ref. Integrity on update: No Action
Ref. Integrity on delete: No Action WCA_ProjDefAccess
Owner: dbo
Target DR name: WCA310_D
Number of columns: 3
Number of indexes: 0
Number of foreign keys: 2
Extended attributes:
OnFileGroup    PRIMARY
Clustered PK   No

| Columns | Data type | Allow NULLs | Value/Range |
|---|---|---|---|
| PID (FK) | decimal(18,0) | Not allowed | |
| stgID (FK) | decimal(18,0) | Not allowed | |
| stageAccess | char(1) | Not allowed | |

| Foreign keys | Child | Parent |
|---|---|---|
| FK_WCA_ProjDefAccess_WCA_Project | PID | WCA_Project.PID |
| FK_WCA_ProjDefAccess_WCA_Stages | stgID | WCA_Stages.stgID |
| FK_WCA_ProjUserAccess_WCA_ProjDefAccess | WCA_ProjUserAccess.PID | PID |
| | WCA_ProjUserAccess.stgID | stgID |

Column details
1. PID (FK)
Physical data type: decimal(18,0)
Allow NULLs: Not allowed
2. stgID (FK)
Physical data type: decimal(18,0)
Allow NULLs: Not allowed
3. stageAccess
Physical data type: char(1)
Allow NULLs: Not allowed
Foreign key details (child)
FK_WCA_ProjDefAccess_WCA_Project
Definition: Child  Parent
PID    WCA_Project.PID
Relationship type: Identifying
Cardinality: One-to-Zero-or-More
Allow NULLs: Not allowed
Verb phrase: hasFK_WCA_ProjDefAccess_WCA_Project
Inverse phrase: is of
Ref. Integrity on update: No Action
Ref. Integrity on delete: No Action
FK_WCA_ProjDefAccess_WCA_Stages
Definition: Child  Parent
stgID   WCA_Stages.stgID
Relationship type: Identifying
Cardinality: One-to-Zero-or-More
Allow NULLs: Not allowed
Verb phrase: hasFK_WCA_ProjDefAccess_WCA_Stages
Inverse phrase: is of
Ref. Integrity on update: No Action
Ref. Integrity on delete: No Action WCA_ProjDefinitions
Owner: dbo
Target DB name:    WCA310_D
Number of columns:    4
Number of indexes:    0
Number of foreign keys:    1
Extended attributes:
OnFileGroup    PRIMARY
TextImageOnGroup    PRIMARY
Clustered PK    No

| Columns | Data type | Allow NULLs | Value/Range |
|---|---|---|---|
| ID | int | Not allowed | |
| PID (FK) | decimal(18,0) | Not allowed | |
| term | varchar(255) | Allowed | |
| definition | text | Allowed | |

| Foreign keys | Child | Parent |
|---|---|---|
| FK_WCA_ProjDefinitions_WCA Project | PID | WCA_Project.PID | column details
1. ID
Physical data type:    int
Allow NULLs:    Not allowed
2. PID (FK)
Physical data type:    decimal(18,0)
Allow NULLs:    Not allowed
3. term
Physical data type:    varchar(255)
Allow NULLs:    Allowed
4. definition
Physical data type:    text
Allow NULLs:    Allowed
Foreign key details (child)
FK_WCA_ProjDefinitions_WCA_Project
Definition:    Child    Parent
PID    WCA_Project.PID
Relationship type:    Non-Identifying
Cardinality:    One-to-Zero-or-More
Allow NULLs:    Not allowed
Verb phrase:    hasFK_WCA_ProjDefinitions_WCA_Project
Inverse phrase:    is of
Ref. Integrity on update:    No Action
Ref. Integrity on delete:    No Action

---

WCA_ProjDocPara
Owner: dbo
Target DB name:    WCA310_D
Number of columns:    7
Number of indexes:    0
Number of foreign keys:    1
Extended attributes:
OnFileGroup    PRIMARY
TextImageOnGroup    PRIMARY
Clustered PK    No

| Columns | Data type | Allow NULLs | Value/Range |
|---|---|---|---|
| PID (FK) | decimal(18,0) | Not allowed | |
| paragraph | varchar(255) | Not allowed | |
| dptext | text | Allowed | |
| document | varchar(50) | Not allowed | |
| title | varchar(255) | Allowed | |
| paragraphLevel | decimal(18,0) | Allowed | |
| paragraphType | varchar(50) | Allowed | |

| Foreign keys | Child | Parent |
|---|---|---|
| FK_WCA_ProjDocPara)_WCA_Project | PID | WCA_Project.PID |

Column details
1. PID (FK)
Physical data type:    decimal(18,0)
Allow NULLs:    Not allowed
2. paragraph
Physical data type:    varchar(255)
Allow NULLs:    Not allowed
3. dptext
Physical data type:    text
Allow NULLs:    Allowed
4. document
Physical data type:    varchar(50)

-continued

```
Allow NULLs:          Not allowed
5. title
Physical data type:              varchar(255)
Allow NULLs:          Allowed
6. paragraphLevel
Physical data type:              decimal(18,0)
Allow NULLs:          Allowed
7. paragraphType
Physical data type:              varchar(50)
Allow NULLs:          Allowed
Foreign key details (child)
FK_WCA_ProjDocPara_WCA_Project
Definition:           Child      Parent
PID       WCA_Project.PID
Relationship type:    Non-Identifying
Cardinality:          One-to-Zero-or-More
Allow NULLs:          Not allowed
Verb phrase:          hasFK_WCA_ProjDocPara_WCA_Project
Inverse phrase:       is of
Ref. Integrity on update:        No Action
Ref. Integrity on delete:        No Action
```

```
WCA_ProjDocTTL
Owner: dbo
Target DB name:       WCA310_D
Number of columns:    8
Number of indexes:    0
Number of foreign keys:  1
Extended attributes:
OnFileGroup           PRIMARY
Clustered PK          No
Columns               Data type          Allow NULLs    Value/Range
PID (FK)              decimal(18,0)      Not allowed
letter                varchar(50)        Not allowed
title                 varchar(255)       Not allowed
documentType          varchar(50)        Not allowed
classLevel            varchar(50)        Not allowed
document              varchar(50)        Not allowed
ID                    decimal(18,0)      Allowed
pubDate               varchar(50)        Allowed
Foreign keys                             Child          Parent
FK_WCA_ProjDocTTL_WCA_Project            PID            WCA_Project.PID
1. PID (FK)
Physical data type:              decimal(18,0)
Allow NULLs:          Not allowed
2. letter
Physical data type:              varchar(50)
Allow NULLs:          Not allowed
3. title
Physical data type:              varchar(255)
Allow NULLs:          Not allowed
4. documentType
Physical data type:              varchar(50)
Allow NULLs:          Not allowed
5. classLevel
Physical data type:              varchar(50)
Allow NULLs:          Not allowed
6. document
Physical data type:              varchar(50)
Allow NULLs:          Not allowed
7. ID
Physical data type:              decimal(18,0)
Allow NULLs:          Allowed
8. pubDate
Physical data type:              varchar(50)
Allow NULLs:          Allowed
Foreign key details (child)
FK_WCA_ProjDocTTL_WCA_Project
Definition:           Child      Parent
PID       WCA_Project.PID
Relationship type:    Non-Identifying
Cardinality:          One-to-Zero-or-More
Allow NULLs:          Not allowed
Verb phrase:          hasFK_WCA_ProjDocTTL_WCA_Project
```

-continued

| | |
|---|---|
| Inverse phrase: | is of |
| Ref. Integrity on update: | No Action |
| Ref. Integrity on delete: | No Action |

WCA_Project
Owner: dbo
Target DB name:	WCA310_D
Number of columns:	21
Number of indexes:	1
Number of foreign keys:	1
Extended attributes:
OnFileGronp	PRIMARY
TextImageOnGroup	PRIMARY
Clustered PK	No

| Columns | Data type | Allow NULLs | Value/Range |
|---|---|---|---|
| PID | decimal(18,0) | Not allowed | |
| name | varchar(250) | Not allowed | |
| acronym | varchar(50) | Allowed | |
| projDescription | text | Not allowed | |
| version | varchar(50) | Allowed | |
| department | int | Not allowed | |
| service | int | Not allowed | |
| subscriptionKey | varchar(50) | Not allowed | |
| accreditationType | varchar(50) | Allowed | |
| certLevel | decimal(18,0) | Allowed | |
| orgID (FK,I1) | decimal(18,0) | Not allowed | |
| projStatus | varchar(10) | Not allowed | |
| publishingFormat | varchar(50) | Not allowed | |
| infoCatID | int | Allowed | |
| answers | varchar(7) | Allowed | |
| userDefinedCertLvl | int | Allowed | |
| expirationDate | datetime | Not allowed | |
| total Val | int | Allowed | |
| WBSName | varchar(50) | Allowed | |
| WBSDesc | varchar(255) | Allowed | |
| webcaType | varchar(50) | Allowed | |

| Indexes | Columns | Sort Order |
|---|---|---|
| IX_WCA_Project_orgID (I1) | orgID | Ascending |

| Foreign keys | Child | Parent |
|---|---|---|
| FK_WCA_Project_WCA_Organization | orgID | WCA_Organization.orgID |
| FK_RCT_WPActor_WCA_Project | RCT_ProjWPActor.PID | PID |
| FK_WCA_ProjAcBound | WCA_ProjAcBoundary.PID | PID |
| FK_WCA_ProjAcronym | WCA_ProjAcronym.PID | PID |
| FK_WCA_ProjAppdxFiile | WCA_ProjAppdxFile.PID | PID |
| FK_WCA_ProjCharDtL_WCA_Project | WCA_ProjCharDtl.PID | PID |
| FK_WCA_ProjCkListRes_WCA_Project | WCA_ProjCkListRes.PID | PID |
| FK_WCA_ProjCleanStat_WCA_Project | WCA_ProjCleanStat.PID | PID |
| FK_WCA_ProjConTestRes_WCA_Project | WCA_ProjConTestRes.PID | PID |
| FK_WCA_ProjSysDataFlow_WCA_Project | WCA_ProjDataFlow.PID | PID |
| FK_WCA_ProjDefAccess_WCA_Project | WCA_ProjDefAccess.PID | PID |
| FK_WCA_ProjDefinitions_WCA_Project | WCA_ProjDefinitions.PID | PID |
| FK_WCA_ProjDocPara_WCA_Project | WCA_ProjDocPara.PID | PID |
| FK_WCA_ProjDocTTL_WCA_Project | WCA_ProjDocTFL.PID | PID |
| FK_WCA_ProjEquipInven1 | WCA_ProjEquipInven.PID | PID |
| FK_WCA_ProjEventStatus_WCA_Project | WCA_ProjEventStatus.PID | PID |
| FK_WCA_ProjFile_WCA_Project | WCA_ProjFile.PID | PID |
| FK_WCA_ProjFileData_WCA_Project | WCA_ProjFiLeData.PID | PID |
| FK_WCA_ProjMilestone_WCA_Project | WCA_ProjMilestone.PID | PID |
| FK_WCA_ProjParaFig | WCA_ProjParaFig.PID | PID |
| FK_WCA_ProjPers_WCA_Project | WCA_ProjPersonnel.PID | PID |
| FK_WCA_ProjPlatCat_WCA_Project | WCA_ProjPlatCat.PID | PID |
| FK_WCA_ProjReference_WCA_Project | WCA_ProjReference.PID | PID |
| FK_WCA_ProjRiskElem | WCA_ProjRiskElem.PID | PID |
| FK_WCA_ProjRqmt | WCA_ProjRqmt.PID | PID |
| FK_WCA_ProjSysInterface_WCA_Project | WCA_ProjSysInterf.PID | PID |
| FK_WCA_ProjSysLvlRisk_WCA_Project | WCA_ProjSysLvlRisk.PID | PID |
| FK_WCA_ProjSystemUser_WCA_Project | WCA_ProjSystemUser.PID | PID |
| FK_WCA_ProjSysThreat | WCA_ProjSysThreat.PID | PID |
| FK_WCA_ProjTestProc_WCA_Project | WCA_ProjTestProc.PID | PID |
| FK_WCA_ProjThreatEnv_WCA_Project | WCA_ProjThreatEnv.PID | PID |
| FK_WCA_ProjUser_WCA_Project | WCA_ProjUser.PID | PID |
| FK_WPM_ProjAnalystPerm_WCA_Project | WPM_ProjAnalystPerm.PID | PID |
| FK_WPM_ProjDefPerm_WCA_Project | WPM_ProjDefPerm.PID | PID |
| FK_WPM_ProjEventRules_WCA_Project | WPM_ProjEventRules.PID | PID |

-continued

| | | |
|---|---|---|
| FK_WPM_ProjPrereq_WCA_Project | WPM_ProjPrereq.PID | PID |
| FK_WPM_ProjPS_WCA_Project | WPM_ProjPS.PID | PID |
| FK_WPM_ProjWP_WCA_Project | WPM_ProjWP.PID | PID |
| FK_WPM_ProjWPHistory_WCA_Project | WPM_ProjWPHistory.PID | PID |
| FK_WPM_ProjXEE_WCA_Project | WPM_ProjXEE.PID | PID |

Column details
1. PID
Physical data type:    decimal(18,0)
Allow NULLs:    Not allowed
2. name
Physical data type:    varchar(250)
Allow NULLs:    Not allowed
3. acronym
Physical data type:    varchar(50)
Allow NULLs:    Allowed
4. projDescription
Physical data type:    text
Allow NULLs:    Not allowed
5. version
Physical data type:    varchar(50)
Allow NULLs:    Allowed
6. department
Physical data type:    int
Allow NULLs:    Not allowed
7. service
Physical data type:    int
Allow NULLs:    Not allowed
8. subscriptionKey
Physical data type:    varchar(50)
Allow NULLs:    Not allowed
9. accreditationType
Physical data type:    varchar(50)
Allow NULLs:    Allowed
10. certLevel
Physical data type:    decimal(18,0)
Allow NULLs:    Allowed
11. orgID (FK,I1)
Physical data type:    decimal(18,0)
Allow NULLs:    Not allowed
12. projStatus
Physical data type:    varchar(10)
Allow NULLs:    Not allowed
13. publishingFormat
Physical data type:    varchar(50)
Allow NULLs:    Not allowed
14. infoCatID
Physical data type:    int
Allow NULLs:    Allowed
15. answers
Physical data type:    varchar(7)
Allow NULLs:    Allowed
16. userDefinedCertLvl
Physical data type:    int
Allow NULLs:    Allowed
17. expirationDate
Physical data type:    datetime
Allow NULLs:    Not allowed
18. totalVal
Physical data type:    int
Allow NULLs:    Allowed
19. WBSName
Physical data type:    varchar(50)
Allow NULLs:    Allowed
20. WBSDesc
Physical data type:    varchar(255)
Allow NULLs:    Allowed
21. webcaType
Physical data type:    varchar(50)
Allow NULLs:    Allowed
Index details
IX_WCA_Project_orgID
Column(s):    orgID (Asc)
Unique: No
Extended attributes:
OnFileGroup    PRIMARY
CLUSTERED    No
IGNORE_DUP_KEY    No
FILLFACTOR    90
PAD_INDEX    No -continued

```
DROP_EXISTING              No
STATISTICS_NORECOMPUTE     No
Foreign key details (child)
FK_WCA_Project_WCA_Organization
Definition:           Child       Parent
orgID      WCA_Organization.orgID
Relationship type:    Non-Identifying
Cardinality:          One-to-Zero-or-More
Allow NULLs:          Not allowed
Verb phrase:          hasFK_WCA_Project_WCA_Organization
Inverse phrase:       is of
Ref. Integrity on update:    No Action
Ref. Integrity on delete:    No Action
```

```
WCA_ProjEquipInven
Owner: dbo
Target DB name:     WCA310_D
Number of columns:         30
Number of indexes:          0
Number of foreign keys:     1
Extended attributes:
OnFileGroup         PRIMARY
TextImageOnGroup            PRIMARY
Clustered PK        No
Columns                 Data type          Allow NULLs   Value/Range
PID (FK)                decimal(18,0)      Not allowed
equipID                 decimal(18,0)      Not allowed
platID                  decimal(18,0)      Not allowed
equipMfr                varchar(50)        Allowed
equipModel              varchar(50)        Allowed
equipSN                 varchar(50)        Allowed
equipDescription        text               Allowed
equipHwFamily           varchar(20)        Allowed
equipCPUType            varchar(50)        Allowed
equipCPUQty             varchar(50)        Allowed
equipCPUSpeed           varchar(50)        Allowed
equipRAM                varchar(50)        Allowed
equipDiskSize           varchar(50)        Allowed
equipDiskDesc           text               Allowed
equipOtherStorage       text               Allowed
equipDisplay            varchar(50)        Allowed
equipOtherHw            text               Allowed
equipOsReference        varchar(50)        Allowed
equipOsFamily           varchar(20)        Allowed
equipOsMfr              varchar(50)        Allowed
equipOSName             varchar(5O)        Allowed
equipOSVersion          varchar(50)        Allowed
equipOSDescription      text               Allowed
equipIPAddress          varchar(255)       Not allowed
equipMAC                varchar(20)        Allowed
equipHostName           varchar(50)        Allowed
equipTestFlag           char(1)            Allowed
equipLocation           varchar(50)        Allowed
equipVisualId           varchar(50)        Allowed
equipOsPatchLevel       varchar(50)        Allowed
Foreign keys                        Child              Parent
FK_WCA_ProjEquipInven1              PID                WCA_Project.PID
Column details
1. PID (FK)
Physical data type:         decimal(18,0)
Allow NULLs:        Not allowed
2. equipID
Physical data type:         decimal(18,0)
Allow NULLs:        Not allowed
3. platID
Physical data type:         decimal(18,0)
Allow NULLs:        Not allowed
4. equipMfr
Physical data type:         varchar(50)
Allow NULLs:        Allowed
5. equipModel
Physical data type:         varchar(50)
Allow NULLs:        Allowed
6. equipSN
```

-continued

```
Physical data type:       varchar(50)
Allow NULLs:     Allowed
7. equipDescription
Physical data type:       text
Allow NULLs:     Allowed
8. equipHWFamily
Physical data type:       varchar(20)
Allow NULLs:     Allowed
9. equipCPUType
Physical data type:       varchar(50)
Allow NULLs:     Allowed
10. equipCPUQty
Physical data type:       varchar(50)
Allow NULLs:     Allowed
11. equipCPUSpeed
Physical data type:       varchar(50)
Allow NULLs:     Allowed
12. equipRAM
Physical data type:       varchar(50)
Allow NULLs:     Allowed
13. equipDiskSize
Physical data type:       varchar(50)
Allow NULLs:     Allowed
14. equipDiskDesc
Physical data type:       text
Allow NULLs:     Allowed
15. epuipOtherStorage
Physical data type:       text
Allow NULLs:     Allowed
16. equipDisplay
Physical data type:       varchar(50)
Allow NULLs:     Allowed
17. equipOtherHw
Physical data type:       text
Allow NULLs:     Allowed
18. equipOsReference
Physical data type:       varchar(50)
Allow NULLs:     Allowed
19. equipOsFamily
Physical data type:       varchar(20)
Allow NULLs:     Allowed
20. equipOsMfr
Physical data type:       varchar(50)
Allow NULLs:     Allowed
21. equipOSName
Physical data type:       varchar(50)
Allow NULLs:     Allowed
22. equipOSVersion
Physical data type:       varchar(50)
Allow NULLs:     Allowed
23. equipOSDescription
Physical data type:       text
Allow NULLs:     Allowed
24. equipIPAddress
Physical data type:       varchar(255)
Allow NULLs:     Not allowed
25. equipMAC
Physical data type:       varchar(20)
Allow NULLs:     Allowed
26. equipHostName
Physical data type:       varchar(50)
Allow NULLs:     Allowed
27. equipTestFlag
Physical data type:       char(1)
Allow NULLs:     Allowed
28. equipLocation
Physical data type:       varchar(50)
Allow NULLs:     Allowed
29. equipVisualId
Physical data type:       varchar(50)
Allow NULLs:     Allowed
30. equipOsPatchLevel
Physical data type:       varchar(50)
Allow NULLs:     Allowed
Foreign key details (child)
FK_WCA_ProjEquipInven1
Definition:      Child         Parent
PID              WCA_Project.PID
Relationship type:   Identifying
```

-continued

| | |
|---|---|
| Cardinality: | One-to-Zero-or-More |
| Allow NULLs: | Not allowed |
| Verb phrase: | hasFK_WCA_ProjEquipInven1 |
| Inverse phrase: | is of |
| Ref. Integrity on update: | No Action |
| Ref. Integrity on delete: | No Action |

WCA_ProjEquipSW
Owner: dbo
Target DB name: WCA310_D
Number of columns: 3
Number of indexes: 0
Number of foreign keys: 1
Extended attributes:
OnFileGroup PRIMARY
Clustered PK No

| Columns | Data type | Allow NULLs | Value/Range |
|---|---|---|---|
| PID (FK) | decimal(18,0) | Not allowed | |
| equipID | decimal(18,0) | Not allowed | |
| softID (FK) | decimal(18,0) | Not allowed | |

| Foreign keys | Child | Parent |
|---|---|---|
| FK_WCA_ProjEquip1 | PID | WCA_Project.PID |
| | softID | WCA_ProjSWInven.softID |

Column details
1. PID (FK)
Physical data type: decimal(18,0)
Allow NULLs: Not allowed
2. equipID
Physical data type: decimal(18,0)
Allow NULLs: Not allowed
3. softID (FK)
Physical data type: decimal(18,0)
Allow NULLs: Not allowed
Foreign key details (child)
FK_WCA_ProjEquip1
Definition: Child Parent
PID WCA_ProjSWInven.PID
softID wCA_ProjSWInven.softID
Relationship type: Identifying
Cardinality: One -to- Zero-or-More
Allow NULLs: Not allowed
Verb phrase: hasFK_WCA_ProjEquip1
Inverse phrase: is of
Ref. Integrity on update: No Action
Ref. Integrity on delete: No Action WCA_ProjEventStatus
Owner: dbo
Target DB name: WCA310_D
Number of columns: 7
Number of indexes: 0
Number of foreign keys: 1
Extended attributes:
OnFileGroup PRIMARY
Clustered PK No

| Columns | Data type | Allow NULLs | Value/Range |
|---|---|---|---|
| PID (FK) | decimal(18,0) | Not allowed | |
| EventID | varchar(50) | Not allowed | |
| FirstOccurred | datetime | Not allowed | |
| LastModified | datetime | Allowed | |
| EventStatus | varchar(15) | Not allowed | |
| UserID | decimal(18,0) | Allowed | |
| PublishingTitle | varchar(255) | Allowed | |

| Foreign keys | Child | Parent |
|---|---|---|
| FK_WCA_ProjEventStatus_WCA_Project | PID | WCA_Project.PID |

Column details
1. PID (FK)
Physical data type: decimal(18,0)
Allow NULLs: Not allowed
2. EventID
Physical data type: varchar(50)
Allow NULLs: Not allowed
3. FirstOccurred
Physical data type: datetime
Allow NULLs: Not allowed
4. LastModified
Physical data type: datetime
Allow NULLs: Allowed
5. EventStatus
Physical data type: varchar(15)
Allow NULLs: Not allowed
6. UserID
Physical data type: decimal(18,0)

-continued

```
Allow NULLs:            Allowed
7. PublishingTitle
Physical data type:             varchar(255)
Allow NULLs:            Allowed
FK_WCA_ProjEventStatus_WCA_Project
Definition:             Child           Parent
PID         WCA_Project.PID
Relationship type:      Non-Identifying
Cardinality:            One-to-Zero-or-More
Allow NULLs:            Not allowed
Verb phrase:            hasFK_WCA_ProjEventStatus_WCA_Project
Inverse phrase:         is of
Ref. Integrity on update:       No Action
Ref. Integrity on delete:       No Action
```

```
WCA_ProjFile
Owner: dbo
Target DB name:     WCA310_D
Number of columns:          6
Number of indexes:          0
Number of foreign keys:     1
Extended attributes:
OnFileGroup         PRIMARY
Clustered PK        No
Columns                     Data type           Allow NULLs     Value/Range
ID                          int                 Not allowed
PID (FK)                    decimal(18,0)       Not allowed
fSize                       int                 Not allowed
name                        varchar(255)        Not allowed
type                        varchar(255)        Not allowed
creationDate                decimal(18,0)       Not allowed
Foreign keys                            Child               Parent
FK_WCA_ProjFileWCA_Project              PID                 WCA_Project.PID
Column details
1. ID
Physical data type:         int
Allow NULLs:        Not allowed
2. PID (FK)
Physical data type:         decimal(18,O)
Allow NULLs:        Not allowed
3. fSize
Physical data type:         int
Allow NULLs:        Not allowed
4. name
Physical data type:         varchar(255)
Allow NULLs:        Not allowed
5. type
Physical data type:         varchar(255)
Allow NULLs:        Not allowed
6. creationDate
Physical data type:         decimal(18,O)
Allow NULLs:        Not allowed
Foreign key details (child)
FK_WCA_ProjFile_WCA_Project
Definition:             Child           Parent
PID         WCA_Project.PID
Relationship type:      Non-Identifying
Cardinality:            One-to-Zero-or-More
Allow NULLs:            Not allowed
Verb phrase:            hasFK_WCA_ProjFile_WCA_Project
Inverse phrase:         is of
Ref. Integrity on update:       No Action
Ref. Integrity on delete:       No Action
```

```
WCA_ProjFileData
Owner: dbo
Target DB name:     WCA31O_D
Number of columns:          4
Number of indexes:          0
Number of foreign keys:     1
```

-continued

```
Extended attributes:
OnFileGroup           PRIMARY
Clustered PK          No
Columns                        Data type            Allow NULLs    Value/Range
ID                             int                  Not allowed
PID (FK)                       decimal(18,0)        Not allowed
offset                         int                  Not allowed
fdData                         varchar(4000)        Allowed
Foreign keys                                        Child                         Parent
FK_WCA_ProjFileData_WCA_Project                     PID                           WC&Project.PID
Column details
1. ID
Physical data type:            int
Allow NULLs:      Not allowed
2. PID (FK)
Physical data type:            decimal(18,O)
Allow NULLs:      Not allowed
3. offset
Physical data type:            int
Allow NULLs:      Not allowed
4. fdData
Physical data type:            varchar(4000)
Allow NULLs:      Allowed
Foreign key details (child)
FK_WCA_ProjFileData_WCA_Project
Definition:       Child      Parent
PID         WCA_Project.PID
Relationship type:    Non-Identifying
Cardinality:          One-to-Zero-or-More
Allow NULLs:          Not allowed
Verb phrase:          hasFK_WCA_ProjFileData_WCA_Project
Inverse phrase:       is of
Ref. Integrity on update:      No Action
Ref. Integrity on delete:      No Action
```

```
WCA_ProjMilestone
Owner: dbo
Target DB name:       WCA310_D
Number of columns:         6
Number of indexes:         0
Number of foreign keys:    1
Extended attributes:
OnFileGroup           PRIMARY
TextImageOnGroup              PRIMARY
Clustered PK          No
Columns                        Data type            Allow NULLs    Value/Range
PID (FK)                       decimal(18,0)        Not allowed
milestoneID                    decimal(18,0)        Not allowed
title                          varchar(50)          Not allowed
milestoneDate                  varchar(50)          Allowed
milestone                      text                 Allowed
newDate                        datetime             Allowed
Foreign keys                                        Child                         Parent
FK_WCA_ProjMilestone_WCA_Project                    PID                           WCA_Project.PID
Column details
1. PID (FK)
Physical data type:            decimal(18,0)
Allow NULLs:      Not allowed
2. milestoneID
Physical data type:            decimal(18,O)
Allow NULLs:      Not allowed
3. title
Physical data type:            varchar(50)
Allow NULLs:      Not allowed
4. milestoneDate
Physical data type:            varchar(50)
Allow NULLs:      Allowed
5. milestone
Physical data type:            text
Allow NULLs:      Allowed
6. newDate
Physical data type:            datetime
Allow NULLs:      Allowed
Foreign key details (child)
```

-continued

FK_WCA_ProjMilestone_WCA_Project
Definition:            Child      Parent
PID       WCA_Project.PID
Relationship type:     Identifying
Cardinality:           One-to-Zero-or-More
Allow NULLs:           Not allowed
Verb phrase:           hasFK_WCA_ProjMilestone_WCA_Project
Inverse phrase:        is of
Ref. Integrity on update:     No Action
Ref. Integrity on delete:     No Action

---

WCA_ProjParaFig
Owner: dbo
Target DB name:        WCA310_D
Number of columns:     9
Number of indexes:     0
Number of foreign keys:   1
Extended attributes:
OnFileGroup            PRIMARY
Clustered PK           No

| Columns | Data type | Allow NULLs | Value/Range |
|---|---|---|---|
| ID | int | Not allowed | |
| PID (FK) | decimal(18,0) | Not allowed | |
| fileID | decimal(18,0) | Not allowed | |
| figureName | varchar(255) | Not allowed | |
| figureNumber | int | Allowed | |
| figureType | varchar(50) | Allowed | |
| document | varchar(50) | Allowed | |
| figureTitle | varchar(255) | Allowed | |
| paragraph | varchar(50) | Allowed | |

| Foreign keys | Child | Parent |
|---|---|---|
| FK_WCA_ProjParaFig | PID | WCA_Project.PID |

Column details
1. ID
Physical data type:          int
Allow NULLs:      Not allowed
2. PID (FK)
Physical data type:          decimal(18,0)
Allow NULLs:      Not allowed
3. fileID
Physical data type:          decimal(18,0)
Allow NULLs:      Not allowed
4. figureName
Physical data type:          varchar(255)
Allow NULLs:      Not allowed
5. figureNumber
Physical data type:          int
Allow NULLs:      Allowed
6. figureType
Physical data type:          varchar(50)
Allow NULLs:      Allowed
7.                document
Physical data type:          varchar(50)
Allow NULLs:      Allowed
8. figureTitle
Physical data type:          varchar(255)
Allow NULLs:      Allowed
9. paragraph
Physical data type:          varchar(50)
Allow NULLs:      Allowed
Foreign key details (child)
FK_WCA_ProjParaFig
Definition:            Child      Parent
PID       WCA_Project.PID
Relationship type:     Non-Identifying
Cardinality:           One-to-Zero-or-More
Allow NULLs:           Not allowed
Verb phrase:           hasFK_WCA_ProjParaFig
Inverse phrase:        is of
Ref. Integrity on update:     No Action
Ref. Integrity on delete:     No Action WCA_ProjPersonnel
Owner: dbo
Target DB name:     WCA310_D
Number of columns:      19
Number of indexes:      0
Number of foreign keys: 1
Extended attributes:
OnFileGroup         PRIMARY
Clustered PK        No

| Columns | Data type | Allow NULLs | Value/Range |
|---|---|---|---|
| projPersID | decimal(18,0) | Not allowed | |
| roleGroup | varchar(50) | Not allowed | |
| roleName | varchar(50) | Not allowed | |
| title | varchar(50) | Allowed | |
| fname | varchar(50) | Not allowed | |
| mi | varchar(50) | Allowed | |
| lname | varchar(50) | Not allowed | |
| office | varchar(50) | Allowed | |
| ppOrganization | varchar(50) | Allowed | |
| address1 | varchar(50) | Allowed | |
| address2 | varchar(50) | Allowed | |
| city | varchar(50) | Allowed | |
| state | varchar(50) | Allowed | |
| zip | varchar(50) | Allowed | |
| phone | varchar(50) | Allowed | |
| officeDesignation | varchar(50) | Allowed | |
| PID (FK) | decimal(18,0) | Not allowed | |
| fax | varchar(50) | Allowed | |
| email | varchar(50) | Allowed | |

| Foreign keys | | Child | Parent |
|---|---|---|---|
| FK_WCA_ProjPers_WCA_Project | | PID | WCA_Projeet.PID |

Column details
1. projPersID
Physical data type:     decimal(18,0)
Allow NULLs:    Not allowed
2. roleGroup
Physical data type:     varchar(50)
Allow NULLs:    Not allowed
3. roleName
Physical data type:     varchar(50)
Allow NULLs:    Not allowed
4. title
Physical data type:     varchar(50)
Allow NULLs:    Allowed
5. fname
Physical data type:     varchar(50)
Allow NULLs:    Not allowed
6. mi
Physical data type:     varchar(50)
Allow NULLs:    Allowed
7. lname
Physical data type:     varchar(50)
Allow NULLs:    Not allowed
8. office
Physical data type:     varchar(50)
Allow NULLs:    Allowed
9. ppOrganization
Physical data type:     varchar(50)
Allow NULLs:    Allowed
10. address1
Physical data type:     varchar(50)
Allow NULLs:    Allowed
11. address2
Physical data type:     varchar(50)
Allow NULLs:    Allowed
12. city
Physical data type:     varchar(50)
Allow NULLs:    Allowed
13. state
Physical data type:     varchar(50)
Allow NULLs:    Allowed
14. zip
Physical data type:     varchar(50)
Allow NULLs:    Allowed
15. phone
Physical data type:     varchar(50)
Allow NULLs:    Allowed
16. officeDesignation
Physical data type:     varchar(50)

-continued

```
Allow NULLs:       Allowed
17. PID (FK)
Physical data type:         decimal(1 8,0)
Allow NULLs:       Not allowed
18. fax
Physical data type:         varchar(50)
Allow NULLs:       Allowed
19. email
Physical data type:         varchar(50)
Allow NULLs:       Allowed
Foreign key details (child)
FK_WCA_ProjPers_WCA_Project
Definition:         Child      Parent
PID       WCA_Project.PID
Relationship type:  Non-Identifying
Cardinality:       One-to-Zero-or-More
Allow NULLs:       Not allowed
Verb phrase:       hasFK_WCA_ProjPers_WCA_Project
Inverse phrase:    is of
Ref. Integrity on update:   No Action
Ref. Integrity on delete:   No Action
```

```
WCA_ProjPlatCat
Owner: dbo
Target DB name:    WCA310_D
Number of columns:         30
Number of indexes:         0
Number of foreign keys:    1
Extended attributes:
OnFileGroup        PRIMARY
TextImageOnGroup           PRIMARY
Clustered PK       No
Columns                    Data type          Allow NULLs    Value/Range
PID (FK)                   decimal(18,0)      Not allowed
platID                     decimal(18,0)      Not allowed
platCategory               varchar(50)        Not allowed
platDescription            text               Allowed
platQtyEstimated           decimal(18,0)      Allowed
platQtyActual              decimal(18,0)      Allowed
platTestStrategy           char(5)            Not allowed
platHwFamily               varchar(20)        Not allowed
platMfr                    varchar(50)        Allowed
platModel                  varchar(50)        Allowed
platCpuType                varchar(50)        Allowed
platCpuQty                 varchar(50)        Allowed
platCpuSpeeed              varchar(50)        Allowed
platRam                    varchar(50)        Allowed
platDiskSize               varchar(50)        Allowed
platDiskDesc               text               Allowed
platOtherStorage           text               Allowed
platDisplay                varchar(50)        Allowed
platOtherHw                text               Allowed
platOsReference            varchar(50)        Allowed
platOsFamily               varchar(20)        Allowed
platOsMfr                  varchar(50)        Allowed
platOsName                 varchar(50)        Allowed
platOsVersion              varchar(50)        Allowed
platOsPatchLevel           varchar(50)        Allowed
platOsDescription          text               Allowed
platIpAddress              varchar(255)       Allowed
platSn                     varchar(50)        Allowed
platLocation               varchar(50)        Allowed
platVisualId               varchar(50)        Allowed
Foreign keys                       Child              Parent
FK_WCA_ProjPlatCat_WCA_Project     PID                WCA_Project.PID
Column details
1. PID (FK)
Physical data type:        decimal(18,0)
Allow NULLs:       Not allowed
2. platID
Physical data type:        decimal(18,0)
Allow NULLs:       Not allowed
3. platCategory
Physical data type:        varchar(50)
```

-continued

```
Allow NULLs:           Not allowed
4. platDescription
Physical data type:        text
Allow NULLs:           Allowed
5. platQtyEstimated
Physical data type:        decimal(18,0)
Allow NULLs:           Allowed
6. platQtyActual
Physical data type:        decimal(18,0)
Allow NULLs:           Allowed
7. platTestStrategy
Physical data type:        char(5)
Allow NULLs:           Not allowed
8. platHwFamily
Physical data type:        varchar(20)
Allow NULLs:           Not allowed
9. platMfr
Physical data type:        varchar(50)
Allow NULLs:           Allowed
10. platModel
Physical data type:        varchar(50)
Allow NULLs:           Allowed
11. platCpuType
Physical data type:        varchar(50)
Allow NULLs:           Allowed
12. platCpuQty
Physical data type:        varchar(50)
Allow NULLs:           Allowed
13. platCpuSpeeed
Physical data type:        varchar(50)
Allow NULLs:           Allowed
14. platRam
Physical data type:        varchar(50)
Allow NULLs:           Allowed
15. platDiskSize
Physical data type:        varchar(50)
Allow NULLs:           Allowed
16. platDiskDesc
Physical data type:        text
Allow NULLs:           Allowed
17. platOtherStorage
Physical data type:        text
Allow NULLs:           Allowed
18. platDisplay
Physical data type:        varchar(50)
Allow NULLs:           Allowed
19. platOtherHw
Physical data type:        text
Allow NULLs:           Allowed
20. platOsReference
Physical data type:        varchar(50)
Allow NULLs:           Allowed
21. platOsFamily
Physical data type:        varchar(20)
Allow NULLs:           Allowed
22. platOsMfr
Physical data type:        varchar(50)
Allow NULLs:           Allowed
23. platOsName
Physical data type:        varchar(50)
Allow NULLs:           Allowed
24. platOsVersion
Physical data type:        varchar(50)
Allow NULLs:           Allowed
25. platOsPatchLevel
Physical data type:        varchar(50)
Allow NULLs:           Allowed
26. platOsDescription
Physical data type:        text
Allow NULLs:           Allowed
27. platIpAddress
Physical data type:        varchar(255)
Allow NULLs:           Allowed
28. platSn
Physical data type:        varchar(50)
Allow NULLs:           Allowed
29. platLocation
Physical data type:        varchar(50)
Allow NULLs:           Allowed
```

-continued

```
30. platVisualId
Physical data type:         varchar(50)
Allow NULLs:                Allowed
Foreign key details (child)
FK_WCA_ProjPlatCat_WCA_Project
Definition:         Child       Parent
PID         WCA_Project.PID
Relationship type:    Identifying
Cardinality:          One-to-Zero-or-More
Allow NULLs:          Not allowed
Verb phrase:          hasFK_WCA_ProjPlatCat_WCA_Project
Inverse phrase:       is of
Ref. Integrity on update:    No Action
Ref. Integrity on delete:    No Action
```

```
WCA_ProjPlatSW
Owner: dbo
Target DB name:     WCA310_D
Number of columns:          3
Number of indexes:          0
Number of foreign keys:     1
Extended attributes:
OnFileGroup         PRIMARY
Clustered PK        No
Columns                 Data type           Allow NULLs    Value/Range
PID (FK)                decimal(18,0)       Not allowed
platID                  decimal(18,0)       Not allowed
softID (FK)             decimal(18,0)       Not allowed
Foreign keys                            Child               Parent
FK_WCA_ProjPlatSW1                      PID                 WCA_ProjSWInven.PID
                                        softID              WCA_ProjSWInven.softID
Column details
1. PID (PK)
Physical data type:         decimal(18,0)
Allow NULLs:        Not allowed
2. platID
Physical data type:         decimal(18,0)
Allow NULLs:        Not allowed
3. softID (FK)
Physical data type:         decimal(18,0)
Allow NULLs:        Not allowed
Foreign key details (child)
FK_WCA_ProjPlatSW1
Definition:         Child       Parent
PID         WCA_ProjSWInven.PID
softID      WCA_ProjSWInven.softID
Relationship type:    Identifying
Cardinality:          One-to-Zero-or-More
Allow NULLs:          Not allowed
Verb phrase:          hasFK_WCA_ProjPlatSW1
Inverse phrase:       is of
Ref. Integrity on update:    No Action
Ref. Integrity on delete:    No Action
```

```
WCA_ProjReference
Owner: dbo
Target DB name:     WCA310_D
Number of columns:          12
Number of indexes:          0
Number of foreign keys:     1
Extended attributes:
OnFileGroup         PRIMARY
Clustered PK        No
Columns                 Data type           Allow NULLs    Value/Range
projRefID               decimal(18,0)       Not allowed
PID (FK)                decimal(18,0)       Not allowed
title                   varchar(255)        Not allowed
sbortTitle              varchar(255)        Allowed
author                  varchar(50)         Allowed
refDate                 varchar(50)         Allowed
version                 varchar(50)         Allowed
url                     varchar(255)        Allowed
```

-continued

| | | | |
|---|---|---|---|
| refType | char(1) | Allowed | |
| regID | decimal(18,0) | Not allowed | |
| appendix | varchar(50) | Allowed | |
| refInstance | decimal(18,0) | Allowed | |
| Foreign keys | | Child | Parent |
| FK_WCA_ProjReference_WCA_Project | | PID | WCA_Project.PID |

1. projRefID
    Physical data type:   decimal(18,0)
    Allow NULLs:   Not allowed
2. PID (FK)
    Physical data type:   decimal(18,0)
    Allow NULLs:   Not allowed
3. title
    Physical data type:   varchar(255)
    Allow NULLs:   Not allowed
4. shortTitle
    Physical data type:   varchar(255)
    Allow NULLs:   Allowed
5. author
    Physical data type:   varchar(50)
    Allow NULLs:   Allowed
6. refDate
    Physical data type:   varchar(50)
    Allow NULLs:   Allowed
7. version
    Physical data type:   varchar(50)
    Allow NULLs:   Allowed
8. url
    Physical data type:   varchar(255)
    Allow NULLs:   Allowed
9. refType
    Physical data type:   char(1)
    Allow NULLs:   Allowed
10. regID
    Physical data type:   decimal(18,0)
    Allow NULLs:   Not allowed
11. appendix
    Physical data type:   varchar(50)
    Allow NULLs:   Allowed
12. refInstance
    Physical data type:   decimal(18,0)
    Allow NULLs:   Allowed Foreign key details (child)
FK_WCA_ProjReference_WCA_Project
Definition:   Child   Parent
   PID   WCA_Project.PID
Relationship type:   Non-Identifying
Cardinality:   One-to-Zero-or-More
Allow NULLs:   Not allowed
Verb phrase:   hasFK_WCA_ProjReference_WCA_Project
Inverse phrase:   is of
Ref. Integrity on update:   No Action
Ref. Integrity on delete:   No Action

---

WCA_ProjRiskElem
Owner: dbo
Target DB name:   WCA310_D
Number of columns:   18
Number of indexes:   0
Number of foreign keys:   1
Extended attributes:
OnFileGroup   PRIMARY
TextImageOnGroup   PRIMARY
Clustered PK   Yes

| Columns | Data type | Allow NULLs | Value/Range |
|---|---|---|---|
| PID (FK) | decimal(18,0) | Not allowed | |
| testFailure | varchar(100) | Not allowed | |
| associatedRqmt | text | Allowed | |
| statementOfIssue | text | Allowed | |
| impactStatement | text | Allowed | |
| safeGuard | text | Allowed | |
| riskAssessment | text | Allowed | |
| calcRiskLevel | varchar(50) | Allowed | |
| userRiskLevel | varchar(50) | Allowed | |

-continued

| | | | | |
|---|---|---|---|---|
| threatCorrelation | varchar(50) | Allowed | | |
| hwPlatform | varchar(50) | Allowed | | |
| riskElemRef | decimal(18,0) | Allowed | | |
| totalPopulation | decimal(18,0) | Allowed | | |
| testPopulation | decimal(18,0) | Allowed | | |
| totalFailed | decimal(18,0) | Allowed | | |
| platID | decimal(18,0) | Not allowed | | |
| testCategoryID | decimal(18,0) | Not allowed | | |
| analysisComp | char(3) | Allowed | | |
| Foreign keys | | Child | | Parent |
| FK_WCA_ProjRiskElem | | PID | | WCA_Project.PID |

Column details
1. PID (FK)
Physical data type: decimal(18,0)
Allow NULLs: Not allowed
2. testFailure
Physical data type: varchar(100)
Allow NULLs: Not allowed
3. associatedRqmnt
Physical data type: text
Allow NULLs: Allowed
4. statementOfIssue
Physical data type: text
Allow NULLs: Allowed
5. impactStatement
Physical data type: text
Allow NULLs: Allowed
6. safeGuard
Physical data type: text
Allow NULLs: Allowed
7. riskAssessment
Physical data type: text
Allow NULLs: Allowed
8. calcRiskLevel
Physical data type: varchar(50)
Allow NULLs: Allowed
9. userRiskLevel
Physical data type: varchar(50)
Allow NULLs: Allowed
10. threatCorrelation
Physical data type: varchar(50)
Allow NULLs: Allowed
11. hwPlatform
Physical data type: varchar(50)
Allow NULLs: Allowed
12. riskElemRef
Physical data type: decimal(18,0)
Allow NULLs: Allowed
13. totalPopulation
Physical data type: decimal(18,0)
Allow NULLs: Allowed
14. testPopulation
Physical data type: decimal(18,0)
Allow NULLs: Allowed
15. totalFailed
Physical data type: decimal(18,0)
Allow NULLs: Allowed
16. platID
Physical data type: decimal(18,0)
Allow NULLs: Not allowed
17. testCategoryID
Physical data type: decimal(18,0)
Allow NULLs: Not allowed
18. analysisComp
Physical data type: char(3)
Allow NULLs: Allowed
Foreign key details (child)
FK_WCA_ProjRiskElem
Definition: Child  Parent
PID    WCA_Project.PID
Relationship type: Identifying
Cardinality: One-to-Zero-or-More
Allow NULLs: Not allowed
Verb phrase: hasFK_WCA_ProjRiskElem
Inverse phrase: is of
Ref. Integrity on update: No Action
Ref. Integrity on delete: No Action WCA_Proj Rqmt
Owner: dbo
Target DB name: WCA310_D
Number of columns: 23
Number of indexes: 1
Number of foreign keys: 1
Extended attributes:
OnFileGroup PRIMARY
Clustered PK No

| Columns | Data Type | Allow NULLs | Value/Range |
|---|---|---|---|
| projRqmtID | decimal(18,0) | Not allowed | |
| PID (FK,I1) | decimal(18,0) | Not allowed | |
| regID (Ii) | decimal(18,0) | Allowed | |
| sourceDoc | varchar(50) | Not allowed | |
| paragraph | varchar(255) | Not allowed | |
| title | varchar(255) | Not allowed | |
| statedRequirement | varchar(4000) | Not allowed | |
| result | varchar(50) | Allowed | |
| certReportRef | varchar(255) | Allowed | |
| cat1 | varchar(50) | Allowed | |
| cat2 | varchar(50) | Allowed | |
| cat3 | varchar(50) | Allowed | |
| alreadyPulled | char(1) | Allowed | |
| templateID | decimal(18,0) | Allowed | |
| regType | char(1) | Allowed | |
| allowEdit | decimal(18,0) | Not allowed | |
| testCategoryId | decimal(18,0) | Allowed | |
| interviewFlag | char(1) | Allowed | |
| observationFlag | char(1) | Allowed | |
| documentFlag | char(1) | Allowed | |
| testFlag | char(1) | Allowed | |
| srtmResult | varchar(50) | Allowed | |
| rqmtOrder | varchar(255) | Allowed | |

| Indexes | Columns | Sort order |
|---|---|---|
| FK_WCA_ProjRqmt (I1) | PID | Ascending |
| | regID | Ascending |

| Foreign keys | Child | Parent |
|---|---|---|
| FK_WCA_ProjRqmt | PID | WCA_Project.PID |

Column details
1. projRqmtID
Physical data type: decimal(18,0)
Allow NULLs: Not allowed
2. PID (FK,I1)
Physical data type: decimal(18,0)
Allow NULLs: Not allowed
3. regID (I1)
Physical data type: decimal(18,0)
Allow NULLs: Allowed
4. sourceDoc
Physical data type: varchar(50)
Allow NULLs: Not allowed
5. paragraph
Physical data type: varchar(255)
Allow NULLs: Not allowed
6. title
Physical data type: varchar(255)
Allow NULLs: Not allowed
7. statedRequirement
Physical data type: varchar(4000)
Allow NULLs: Not allowed
8. result
Physical data type: varchar(50)
Allow NULLs: Allowed
9. certReportRef
Physical data type: varchar(255)
Allow NULLs: Allowed
10. cat1
Physical data type: varchar(50)
Allow NULLs: Allowed
11. cat2
Physical data type: varchar(50)
Allow NULLs: Allowed
12. cat3
Physical data type: varchar(50)
Allow NULLs: Allowed
13. alreadyPulled
Physical data type: char(1)
Allow NULLs: Allowed
14. templateID -continued Physical data type: decimal(18,0)
Allow NULLs: Allowed
15. regType
Physical data type: char(1)
Allow NULLs: Allowed
16. allowEdit
Physical data type: decimal(18,0)
Allow NULLs: Not allowed
17. testCategoryId
Physical data type: decimal(18,0)
Allow NULLs: Allowed
18. interviewFlag
Physical data type: char(1)
Allow NULLs: Allowed
19. observationFlag
Physical data type: char(1)
Allow NULLs: Allowed
20. documentFlag
Physical data type: char(1)
Allow NULLs: Allowed
21. testFlag
Physical data type: char(1)
Allow NULLs: Allowed
22. srtmResult
Physical data type: varchar(50)
Allow NULLs: Allowed
23. rqmtOrder
Physical data type: varchar(255)
Allow NULLs: Allowed
Index details
IX_WCA_ProjRqmt
Column(s): PID (Asc)
regID (Asc)
Unique: No
Extended attributes:
OnFileGroup PRIMARY
CLUSTERED No
IGNORE_DUP_KEY No
FILLFACTOR 90
PAD_INDEX No
DROP_EXISTING No
STATISTICS_NORECOMPUTE No
Foreign key details (child)
FK_WCA_ProjRpmt
Definition: Child Parent
PID WCA_Project.PID
Relationship type: Non-Identifying
Cardinality: One-to-Zero-or-More
Allow NULLs: Not allowed
Verb phrase: hasFK_WCA_ProjRqmt
Inverse phrase: is of
Ref. Integrity on update: No Action
Ref. Integrity on delete: No Action

---

WCA_ProjSWInven
Owner: dbo
Target DB name: WCA310_D
Number of columns: 9
Number of indexes: 0
Number of foreign keys: 0
Extended attributes:
OnFileGroup PRIMARY
TextImageOnGroup PRIMARY
Clustered PK No

| Columns | Data Type | Allow NULLs | Value/Range |
|---|---|---|---|
| PID | decimal(18,0) | Not allowed | |
| softID | decimal(18,0) | Not allowed | |
| softName | varchar(50) | Not allowed | |
| softMfr | varchar(50) | Not allowed | |
| softVersion | varchar(50) | Not allowed | |
| softPatchLevel | varchar(255) | Allowed | |
| softDescription | text | Allowed | |
| SWReference | varchar(50) | Allowed | |
| SWFamily | varchar(20) | Allowed | |

-continued

| Foreign keys | Child | Parent |
|---|---|---|
| FK_WCA_ProjEquip1 | WCA_ProjEquipSW.PID | PID |
| | WCA_ProjEquipSW.softID | softID |
| FK_WCA_ProjPlatSW1 | WCA_ProjPlatSW.PID | PID |
| | WCA_ProjPlatSW.softID | softID |

Column details
1. PID
Physical data type:   decimal(18,0)
Allow NULLs:   Not allowed
2. softID
Physical data type:   decimal(18,0)
Allow NULLs:   Not allowed
3. softName
Physical data type:   varchar(50)
Allow NULLs:   Not allowed
4. softMfr
Physical data type:   varchar(50)
Allow NULLs:   Not allowed
5. softVersion
Physical data type:   varchar(50)
Allow NULLs:   Not allowed
6. softPatchLevel
Physical data type:   varchar(255)
Allow NULLs:   Allowed
7. softDescription
Physical data type:   text
Allow NULLs:   Allowed
8. SWReference
Physical data type:   varchar(50)
Allow NULLs:   Allowed
9. SWFamily
Physical data type:   varchar(20)
Allow NULLs:   Allowed

---

WCA_Proj SysInterf
Owner: dbo
Target DB name:   WCA310_D
Number of columns:   4
Number of indexes:   0
Number of foreign keys:   1
Extended attributes:
OnFileGroup   PRIMARY
TextImageOnGroup   PRIMARY
Clustered PK   No

| Columns | Data Type | Allow NULLs | Value/Range |
|---|---|---|---|
| interfaceID | decimal(18,0) | Not allowed | |
| interfaceName | varchar(50) | Allowed | |
| interfaceDesc | text | Allowed | |
| PID (FK) | decimal(18,0) | Not allowed | |

| Foreign keys | Child | Parent |
|---|---|---|
| FK_WCA_ProjSysInterface_WCA_Project | PID | WCA_Project.PID |

Column details
1. interfaceID
Physical data type:   decimal(18,0)
Allow NULLs:   Not allowed
2. interfaceName
Physical data type:   varchar(50)
Allow NULLs:   Allowed
3. interfaceDesc
Physical data type:   text
Allow NULLs:   Allowed
4. PID (FK)
Physical data type:   decimal(18,0)
Allow NULLs:   Not allowed
FK_WCA_ProjSysInterface_WCA_Project
Definition:   Child   Parent
PID   WCA_Project.PID
Relationship type:   Non-Identifying
Cardinality:   One-to-Zero-or-More
Allow NULLs:   Not allowed
Verb phrase:   hasFK_WCA_ProjSysInterface_WCA_Project
Inverse phrase:   is of
Ref. Integrity on update:   No Action
Ref. Integrity on delete:   No Action WCA_ProjSysLvlRisk
Owner: dbo
Target DB name:     WCA310_D
Number of columns:      4
Number of indexes:      0
Number of foreign keys: 1
Extended attributes:
OnFileGroup         PRIMARY
TextImageOnGroup            PRIMARY
Clustered PK        No
Columns                     Data Type               Allow NULLs     Value/Range
PID (FK)                    decimal(18,0)           Not allowed
riskDescription             text                    Allowed
calcRiskLevel               varchar(50)             Allowed
userDefRiskLevel            varchar(50)             Allowed
Foreign keys                                Child                   Parent
FK_WCA_ProjSysLvlRisk_WCA_Project           PID                     WCA_Project.PID
Column details
1. PID (FK)
Physical data type:         decimal(18,0)
Allow NULLs:        Not allowed
2. riskDescription
Physical data type:         text
Allow NULLs:        Allowed
3. calcRiskLevel
Physical data type:         varchar(50)
Allow NULLs:        Allowed
4. userDefRiskLevel
Physical data type:         varchar(50)
Allow NULLs:        Allowed
Foreign key details (child)
FK_WCA_ProjSvsLvlRisk_WCA_Project
Definition:         Child   Parent
PID     WCA_Project.PID
Relationship type:  Non-Identifying
Cardinality:        One-to-Zero-or-More
Allow NULLs:        Not allowed
Verb phrase:        hasFK_WCA_ProjSysLvlRisk_WCA_Project
Inverse phrase:     is of
Ref. Integrity on update:   No Action
Ref. Integrity on delete:   No Action WCA_ProjSystemUser
Owner: dbo
Target DB name:     WCA310_D
Number of columns:      8
Number of indexes:      0
Number of foreign keys: 1
Extended attributes:
OnFileGroup         PRIMARY
TextImageOnGroup            PRIMARY
Clustered PK        No
Columns                     Data Type               Allow NULLs     Value/Range
sysUserID                   decimal(18,0)           Not allowed
PID (FK)                    decimal(18,0)           Not allowed
category                    varchar(50)             Not allowed
minClearance                varchar(50)             Not allowed
aisCertLevel                varchar(50)             Not allowed
foreignNational             varchar(50)             Not allowed
psuDescription              text                    Allowed
rank                        int                     Not allowed
Foreign keys                                Child                   Parent
FK_WCA_ProjSystemUser_WCA_Project           PID                     WCA_Project.PID
Column details
1. sysUserID
Physical data type:         decimal(18,0)
Allow NULLs:        Not allowed
2. PID (FK)
Physical data type:         decimal(18,0)
Allow NULLs:        Not allowed
3. category
Physical data type:         varchar(50)
Allow NULLs:        Not allowed
4. minClearance -continued Physical data type: varchar(50)
Allow NULLs: Not allowed
5. aisCertLevel
Physical data type: varchar(50)
Allow NULLs: Not allowed
6. foreignNational
Physical data type: varchar(50)
Allow NULLs: Not allowed
7. psuDescription
Physical data type: text
Allow NULLs: Allowed
8. rank
Physical data type: int
Allow NULLs: Not allowed
Foreign key details (child)
FK_WCA_ProjSystemUser_WCA_Project
Definition: Child Parent
PID WCA_Project.PID
Relationship type: Non-Identifying
Cardinality: One-to-Zero-or-More
Allow NULLs: Not allowed
Verb phrase: hasFK_WCA_ProjSystemUser_WCA_Project
Inverse phrase: is of
Ref. Integrity on update: No Action
Ref. Integrity on delete: No Action

---

WCA_ProjSysThreat
Owner: dbo
Target DB name: WCA310_D
Number of columns: 5
Number of indexes: 0
Number of foreign keys: 1
Extended attributes:
OnFileGroup PRIMARY
Clustered PK No

| Columns | Data Type | Allow NULLs | Value/Range |
|---|---|---|---|
| PID (FK) | decimal(18,0) | Not allowed | |
| threatElement | varchar(50) | Not allowed | |
| calcValue | varchar(50) | Allowed | |
| userDefinedValue | varchar(50) | Allowed | |
| threatCategory | varchar(50) | Allowed | |

| Foreign keys | Child | Parent |
|---|---|---|
| FK_WCA_ProjSysThreat | PID | WCA_Project.PID |

Column details
1. PID (FK)
Physical data type: decimal(18,0)
Allow NULLs: Not allowed
2. threatElement
Physical data type: varchar(50)
Allow NULLs: Not allowed
3. calcValue
Physical data type: varchar(50)
Allow NULLs: Allowed
4. userDefinedValue
Physical data type: varchar(50)
Allow NULLs: Allowed
5. threatCategory
Physical data type: varchar(50)
Allow NULLs: Allowed
Foreign key details (child)
FK_WCA_ProjSysThreat
Definition: Child Parent
PID WCA_Project.PID
Relationship type: Identifying
Cardinality: One-to-Zero-or-More
Allow NULLs: Not allowed
Verb phrase: hasFK_WCA_ProjSysThreat
Inverse phrase: is of
Ref. Integrity on update: No Action
Ref. Integrity on delete: No Action WCA_ProjTestProc  
Owner: dbo  
Target DB name:     WCA310_D  
Number of columns:    34  
Number of indexes:    0  
Number of foreign keys:   1  
Extended attributes:  
OnFileGroup         PRIMARY  
TextImageOnGroup        PRIMARY  
Clustered PK        No

| Columns | Data Type | Allow NULLs | Value/Range |
|---|---|---|---|
| PID (FK) | decimal(18,0) | Not allowed | |
| cat1 | varchar(50) | Allowed | |
| cat2 | varchar(50) | Allowed | |
| cat3 | varchar(50) | Allowed | |
| testText | text | Allowed | |
| expectedResult | text | Allowed | |
| result | varchar(50) | Allowed | |
| notes | text | Allowed | |
| tester | varchar(50) | Allowed | |
| datePerformed | datetime | Allowed | |
| hwPlatform | varchar(50) | Allowed | |
| testNumberType | varchar(50) | Allowed | |
| threat | varchar(50) | Allowed | |
| impactStatement | text | Allowed | |
| testTitle | varchar(100) | Allowed | |
| interviewFlag | char(1) | Allowed | |
| observationFlag | char(1) | Allowed | |
| testFlag | char(1) | Allowed | |
| documentFlag | char(1) | Allowed | |
| platID | decimal(18,0) | Not allowed | |
| associatedRqmt | text | Allowed | |
| templateID | decimal(18,0) | Not allowed | |
| testType | char(1) | Not allowed | |
| projOsType | varchar(50) | Allowed | |
| testCategoryID | decimal(18,0) | Not allowed | |
| certAnalysisLevel | decimal(18,0) | Allowed | |
| testRequirements | text | Allowed | |
| testObjective | varchar(1000) | Allowed | |
| testMfr | varchar(50) | Allowed | |
| testModel | varchar(50) | Allowed | |
| testSN | varchar(50) | Allowed | |
| testLocation | varchar(50) | Allowed | |
| testVisualID) | varchar(50) | Allowed | |
| equipID | decimal(18,0) | Not allowed | |

| Foreign keys | Child | Parent |
|---|---|---|
| FK_WCA_ProjTestProc_WCA_Project | PID | WCA_Project.PID |

Column details  
1. PID (FK)  
Physical data type:     decimal(18,0)  
Allow NULLs:    Not allowed  
2. cat1  
Physical data type:     varchar(50)  
Allow NULLs:    Allowed  
3. cat2  
Physical data type:     varchar(50)  
Allow NULLs:    Allowed  
4. cat3  
Physical data type:     varchar(50)  
Allow NULLs:    Allowed  
5. testText  
Physical data type:     text  
Allow NULLs:    Allowed  
6. expectedResult  
Physical data type:     text  
Allow NULLs:    Allowed  
7. result  
Physical data type:     varchar(50)  
Allow NULLs:    Allowed  
8. notes  
Physical data type:     text  
Allow NULLs:    Allowed  
9. tester  
Physical data type:     varchar(50)  
Allow NULLs:    Allowed  
10. datePerformed  
Physical data type:     datetime  
Allow NULLs:    Allowed  
11. hwPlatform

```
Physical data type:       varchar(50)
Allow NULLs:    Allowed
12. testNumberType
Physical data type:       varchar(50)
Allow NULLs:    Allowed
13. threat
Physical data type:       varchar(50)
Allow NULLs:    Allowed
14. impactStatement
Physical data type:       text
Allow NULLs:    Allowed
15. testTitle
Physical data type:       varchar(100)
Allow NULLs:    Allowed
16. interviewFlag
Physical data type:       char(l)
Allow NULLs:    Allowed
17. observationFlag
Physical data type:       char(1)
Allow NULLs:    Allowed
18. testFlag
Physical data type:       char(1)
Allow NULLs:    Allowed
19. documentFlag
Physical data type:       char(l)
Allow NULLs:    Allowed
20. platID
Physical data type:       decimal(18,0)
Allow NULLs:    Not allowed
21. associatedRqmt
Physical data type:       text
Allow NULLs:    Allowed
22. templateID
Physical data type:       decimal(18,0)
Allow NULLs:    Not allowed
23. testType
Physical data type:       char(l)
Allow NULLs:    Not allowed
24. ProjOsType
Physical data type:       varchar(50)
Allow NULLs:    Allowed
25. testCategoryID
Physical data type:       decimal(18,0)
Allow NULLs:    Not allowed
26. certAnalysisLevel
Physical data type:       decimal(18,0)
Allow NULLs:    Allowed
27. testRequirements
Physical data type:       text
Allow NULLs:    Allowed
28. testObjective
Physical data type:       varchar(1000)
Allow NULLs:    Allowed
29. testMfr
Physical data type:       varchar(50)
Allow NULLs:    Allowed
30. testModel
Physical data type:       varchar(50)
Allow NULLs:    Allowed
31. testSN
Physical data type:       varchar(50)
Allow NULLs:    Allowed
32. testLocation
Physical data type:       varchar(50)
Allow NULLs:    Allowed
33. testVisualID
Physical data type:       varchar(50)
Allow NULLs:    Allowed
34. equipID
Physical data type:       decimal(18,0)
Allow NULLs:    Not allowed
Foreign key details (child)
FK_WCA_ProjTestProc_WCA_Project
Definition:      Child    Parent
PID     WCA_Project.PID
Relationship type:   Identifying
Cardinality:         One-to-Zero-or-More
Allow NULLs:         Not allowed
Verb phrase:         hasFK_WCA_ProjTestProc_WCA_Project
```

-continued

| | |
|---|---|
| Inverse phrase: | is of |
| Ref. Integrity on update: | No Action |
| Ref. Integrity on delete: | No Action |

WCA_ProjThreatEnv  
Owner: dbo  
Target DB name: WCA310_D  
Number of columns: 21  
Number of indexes: 0  
Number of foreign keys: 1  
Extended attributes:  
OnFileGroup            PRIMARY  
Clustered PK           No

| Columns | Data Type | Allow NULLs | Value/Range |
|---|---|---|---|
| PID (FK) | decimal(18,0) | Not allowed | |
| location | varchar(50) | Allowed | |
| pteNetwork | varchar(50) | Allowed | |
| wireless | char(1) | Allowed | |
| dialup | char(1) | Allowed | |
| pds | char(1) | Allowed | |
| adminTraining | varchar(50) | Allowed | |
| maintTraining | varchar(50) | Allowed | |
| userTraining | varchar(50) | Allowed | |
| installationFac | varchar(50) | Allowed | |
| flood | char(1) | Allowed | |
| fire | char(1) | Allowed | |
| lightning | char(1) | Allowed | |
| tornado | char(1) | Allowed | |
| volcano | char(1) | Allowed | |
| earthquake | char(1) | Allowed | |
| hurricane | char(1) | Allowed | |
| customHardware | char(1) | Allowed | |
| customSoftware | char(1) | Allowed | |
| projThreatEnvCalc | varchar(50) | Allowed | |
| projThreatEnvUser | varchar(50) | Allowed | |

| Foreign keys | Child | Parent |
|---|---|---|
| FK_WCA_ProjThreatEnv_WCA_Project | PID | WCA_Project.PID |

Column details  
1. PID (FK)  
Physical data type:          decimal(18,0)  
Allow NULLs:         Not allowed  
2. location  
Physical data type:          varchar(50)  
Allow NULLs:         Allowed  
3. pteNetwork  
Physical data type:          varchar(50)  
Allow NULLs:         Allowed  
4. wireless  
Physical data type:          char(1)  
Allow NULLs:         Allowed  
5. dialup  
Physical data type:          char(1)  
Allow NULLs:         Allowed  
6. pds  
Physical data type:          char(1)  
Allow NULLs:         Allowed  
7. adminTraining  
Physical data type:          varchar(50)  
Allow NULLs:         Allowed  
8. maintTraining  
Physical data type:          varchar(50)  
Allow NULLs:         Allowed  
9. userTraining  
Physical data type:          varchar(50)  
Allow NULLs:         Allowed  
10. installationFac  
Physical data type:          varchar(50)  
Allow NULLs:         Allowed  
11. flood  
Physical data type:          char(1)  
Allow NULLs:         Allowed  
12. fire  
Physical data type:          char(1)  
Allow NULLs:         Allowed

```
13. lightning
Physical data type:         char(1)
Allow NULLs:     Allowed
14. tornado
Physical data type:         char(1)
Allow NULLs:     Allowed
15. volcano
Physical data type:         char(1)
Allow NULLs:     Allowed
16. earthquake
Physical data type:         char(1)
Allow NULLs:     Allowed
17. hurricane
Physical data type:         char(1)
Allow NULLs:     Allowed
18. customHardware
Physical data type:         char(1)
Allow NULLs:     Allowed
19. customSoftware
Physical data type:         char(1)
Allow NULLs:     Allowed
20. projThreatEnvCalc
Physical data type:         varchar(50)
Allow NULLs:     Allowed
21. projThreatEnvUser
Physical data type:         varchar(50)
Allow NULLs:     Allowed
Foreign key details (child)
FK_WCA_ProjThreatEnv_WCA_Project
Definition:       Child      Parent
PID       WCA_Project.PID
Relationship type:   Identifying
Cardinality:         One-to-Exactly-1
Allow NULLs:         Not allowed
Verb phrase:         hasFK_WCA_ProjThreatEnv_WCA_Project
Inverse phrase:      is of
Ref. Integrity on update:    No Action
Ref. Integrity on delete:    No Action
```

```
WCA_ProjUser
Owner: dbo
Target DB name:      WCA310_D
Number of columns:       2
Number of indexes:       0
Number of foreign keys:  1
Extended attributes:
OnFileGroup       PRIMARY
Clustered PK No
Columns                        Data Type             Allow NULLs    Value/Range
userID                         decimal(18,0)         Not allowed
PID (FK)                       decimal(18,0)         Not allowed
Foreign keys                                  Child                         Parent
FK_WCA_ProjUser_WCA_Project                   PID                           WCA_Project.PID
FK_WCA_ProjUserAccess_WCA_ProjUser            WCA_ProjUserAccess.userID     userID
                                              WCA_ProjUserAccess.PID
Column details
1. userID
Physical data type:         decimal(18,0)
Allow NULLs:     Not allowed
2. PID (FK)
Physical data type:         decimal(18,0)
Allow NULLs:     Not allowed
FK_WCA_ProjUser_WCA_Project
Definition:       Child      Parent
PID       WCA_Project.PID
Relationship type:   Identifying
Cardinality:         One-to-Zero-or-More
Allow NULLs:         Not allowed
Verb phrase:         hasFK_WCA_ProjUser_WCA_Project
Inverse phrase:      is of
Ref. Integrity on update:    No Action
Ref. Integrity on delete:    No Action
```

WCA_ProjUserAccess
Owner: dbo
Target DB name:      WCA310_D
Number of columns:        4
Number of indexes:        0
Number of foreign keys:   2
Extended attributes:
OnFileGroup          PRIMARY
Clustered PK         No

| Columns | Data Type | Allow NULLs | Value/Range |
|---|---|---|---|
| PID (FK) | decimal(18,0) | Not allowed | |
| userID (FK) | decimal(18,0) | Not allowed | |
| stgID (FK) | decimal(18,0) | Not allowed | |
| stageAccess | char(1) | Not allowed | |

| Foreign keys | Child | Parent |
|---|---|---|
| FK_WCA_ProjUserAccess_WCA_ProjDefAccess | PID | WCA_ProjDefAccess.PID |
| | stgID | WCA_ProjDefAccess.stgID |
| FK_WCA_ProjUserAccess_WCA_ProjUser | userID | WCA_ProjUser.userID |
| | PID | WCA_ProjUser.PID |

Column details
1. PID (FK)
Physical data type:       decimal(18,0)
Allow NULLs:     Not allowed
2. userID (FK)
Physical data type:       decimal(18,0)
Allow NULLs:     Not allowed
3. stgID (FK)
Physical data type:       decimal(18,0)
Allow NULLs:     Not allowed
4. stageAccess
Physical data type:       char(1)
Allow NULLs:     Not allowed
Foreign key details (child)
FK_WCA_ProjUserAccess_WCA_ProjDefAccess
Definition:        Child     Parent
PID       WCA_ProjDefAceess.PID
stgID     WCA_ProjDefAccess.stgID
Relationship type:        Identifying
Cardinality:       One-to-Zero-or-More
Allow NULLs:     Not allowed
Verb phrase:       hasFK_WCA_ProjUserAccess_WCA_ProjDefAccess
Inverse phrase:    is of
Ref. Integrity on update:       No Action
Ref. Integrity on delete:        No Action
FK_WCA_ProjUserAccess_WCA_ProjUser
Definition:        Child     Parent
userID    WCA_ProjUser.userID
PID       WCA_ProjUser.PID
Relationship type:        Identifying
Cardinality:       One-to-Zero-or-More
Allow NULLs:     Not allowed
Verb phrase:       hasFK_WCA_ProjUserAccess_WCA_ProjUser
Inverse phrase:    is of
Ref. Integrity on update:       No Action
Ref. Integrity on delete:        No Action WCA_PublishFmt
Owner:                    dbo
Target DB name:           WCA310_D
Number of columns:        2
Number of indexes:        0
Number of foreign keys:   0
Extended attributes:
OnFileGroup          PRIMARY
Clustered PK         No

| Columns | Data type | Allow NULLs | Value/Range |
|---|---|---|---|
| publishingCode | char(2) | Not allowed | |
| pfDescription | varchar(50) | Not allowed | |

Column details
1. publishingCode
Physical data type:       char(2)
Allow NULLs:     Not allowed
2. pfDescription
Physical data type:       varchar(50)
Allow NULLs:     Not allowed

```
WCA_RiskDetermin
Owner:                        dbo
Target DB name:               WCA310_D
Number of columns:            3
Number of indexes:            1
Number of foreign keys:       1
Extended attributes:
OnFileGroup          PRIMARY
Clustered PK         No
     Columns                    Data type      Allow NULLs         Value/Range
     projThreatElement          char(1)        Not allowed
     testThreatElement          char(1)        Not allowed
     elementRiskLevel (FK, I1)  char(2)        Not allowed
         Indexes                     Columns              Sort order
         IX_WCA_RiskDetermin (I1)    elementRiskLevel     Ascending
Foreign keys                               Child              Parent
FK_WCA_RiskDetermin_WCA_RiskLvlCode        elementRiskLevel   WCA_RiskLvlCode.elementRiskLevel
Column details
1. projThreatElement
Physical data type:       char(1)
Allow NULLs:     Not allowed
2. testThreatElement
Physical data type:       char(1)
Allow NULLs:     Not allowed
3. elementRiskLevel (FK, I1)
Physical data type:       char(2)
Allow NULLs:     Not allowed
Index details
IX_WCA_RiskDetermin
Column(s):           elementRiskLevel (Asc)
Unique:              No
Extended attributes:
OnFileGroup          PRIMARY
CLUSTERED            No
IGNORE_DUP_KEY          No
FILLFACTOR           90
PAD_INDEX            No
DROP_EXISTING           No
STATISTICS_NORECOMPUTE  No
Foreign key details (child)
FK_WCA_RiskDetermin_WCA_RiskLvlCode
Definition:          Child        Parent
elementRiskLevel     WCA_RiskLvlCode.elementRiskLevel
Relationship type:   Non-Identifying
Cardinality:         One-to-Zero-or-More
Allow NULLs:         Not allowed
Verb phrase:         hasFK_WCA_RiskDetermin_WCA_RiskLvlCode
Inverse phrase:      is of
Ref. Integrity on update:    No Action
Ref. Integrity on delete:    No Action
```

```
WCA_RiskLvlCode
Owner:                        dbo
Target DB name:               WCA310_D
Number of columns:            2
Number of indexes:            0
Number of foreign keys:       0
Extended attributes:
OnFileGroup          PRIMARY
Clustered PK         No
     Columns              Data type       Allow NULLs         Value/Range
     elementRiskLevel     char(2)         Not allowed
     riskLevelDesc        varchar(50)     Not allowed
Foreign keys                               Child                              Parent
FK_WCA_RiskDetermin_WCA_RiskLvlCode        WCA_RiskDetermin.elementRiskLevel  elementRiskLevel
Column details
1. elementRiskLevel
Physical data type:       char(2)
Allow NULLs:     Not allowed
2. riskLevelDesc
Physical data type:       varchar(50)
Allow NULLs:     Not allowed
```

WCA_SecRegSrc
Owner: dbo
Target DB name: WCA310_D
Number of columns: 13
Number of indexes: 0
Number of foreign keys: 1
Extended attributes:
OnFileGroup PRIMARY
Clustered PK No

| Columns | Data type | Allow NULLs | Value/Range |
|---|---|---|---|
| regID | int | Not allowed | |
| shortTitle | varchar(255) | Allowed | |
| title | varchar(255) | Not allowed | |
| sourceDoc | varchar(50) | Allowed | |
| service (FK) | int | Allowed | |
| qualifier | varchar(50) | Allowed | |
| author | varchar(50) | Allowed | |
| regDate | varchar(50) | Allowed | |
| version | varchar(50) | Allowed | |
| url | varchar(255) | Allowed | |
| regType | char(1) | Allowed | |
| department (FK) | int | Not allowed | |
| applPubFormat | varchar(50) | Not allowed | |

| Foreign keys | Child | Parent |
|---|---|---|
| FK_WCA_SecRegSrc_WCA_DeptServCode | department service | WCA_DeptServCode.department WCA_DeptServCode.service |
| FK_WCA_DefSecReg_Src_WCA_SecReg_Src | WCA_DefSecRegSrc.regID | regID |
| FK_WCA_SecRqmt_Src_WCA_SecReg_Src | WCA_SecRqmtSrc.regID | regID |

Column details
1. regID
Physical data type: int
Allow NULLs: Not allowed
2. shortTitle
Physical data type: varchar(255)
Allow NULLs: Allowed
3. title
Physical data type: varchar(255)
Allow NULLs: Not allowed
4. sourceDoc
Physical data type: varchar(50)
Allow NULLs: Allowed
5. service (FK)
Physical data type: int
Allow NULLs: Allowed
6. qualifier
Physical data type: varchar(50)
Allow NULLs: Allowed
7. author
Physical data type: varchar(50)
Allow NULLs: Allowed
8. regDate
Physical data type: varchar(50)
Allow NULLs: Allowed
9. version
Physical data type: varchar(50)
Allow NULLs: Allowed
10. url
Physical data type: varchar(255)
Allow NULLs: Allowed
11. regType
Physical data type: char(1)
Allow NULLs: Allowed
12. department (FK)
Physical data type: int
Allow NULLs: Not allowed
13. applPubFormat
Physical data type: varchar(50)
Allow NULLs: Not allowed
Foreign key details (child)
FK_WCA_SecRegSrc_WCA_DeptServCode
Definition: Child    Parent
department    WCA_DeptServCode.department
service    WCA_DeptServCode.service
Relationship type: Non-Identifying
Cardinality: One-to-Zero-or-More
Allow NULLs: Not allowed
Verb phrase: hasFK_WCA_SecRegSrc_WCA_DeptServCode
Inverse phrase: is of -continued

| Ref. Integrity on update: | No Action |
| --- | --- |
| Ref. Integrity on delete: | No Action |

WCA_SecReqCritQ
Owner: dbo
Target DB name: WCA310_D
Number of columns: 3
Number of indexes: 0
Number of foreign keys: 0
Extended attributes:
OnFileGroup PRIMARY
Clustered PK No

| Columns | Data type | Allow NULLs | Value/Range |
| --- | --- | --- | --- |
| secRegCritQID | int | Not allowed | |

-continued

| code | varchar(255) | Not allowed |
| --- | --- | --- |
| message | varchar(255) | Not allowed |

Column details
1. secRegCritQID
Physical data type: int
Allow NULLs: Not allowed
2. code
Physical data type: varchar(255)
Allow NULLs: Not allowed
3. message
Physical data type: varchar(255)
Allow NULLs: Not allowed WCA_SecRqmtSrc
Owner: dbo
Target DR name: WCA310_D
Number of columns: 13
Number of indexes: 0
Number of foreign keys: 1
Extended attributes:
OnFileGroup PRIMARY
Clustered PK No

| Columns | Data type | Allow NULLs | Value/Range |
| --- | --- | --- | --- |
| regID (FK) | int | Not allowed | |
| sourceDoc | varchar(50) | Not allowed | |
| paragraph | varchar(255) | Not allowed | |
| title | varchar(255) | Not allowed | |
| statedRequirement | varchar(4000) | Not allowed | |
| secClass | varchar(255) | Allowed | |
| criteria | varchar(50) | Allowed | |
| cat1 | varchar(50) | Allowed | |
| cat2 | varchar(50) | Allowed | |
| cat3 | varchar(50) | Allowed | |
| allowEdit | decimal(18,0) | Not allowed | |
| testCategoryID | decimal(18,0) | Allowed | |
| rqmtID | int | Allowed | |

| Foreign keys | | Child | Parent |
| --- | --- | --- | --- |
| FK_WCA_SecRqmt_Src_WCA_SecReg_Src | | regID | WCA_SecRegSrc.regID |

Column details
1. regID (FK)
Physical data type: int
Allow NULLs: Not allowed
2. sourceDoc
Physical data type: varchar(50)
Allow NULLs: Not allowed
3. paragraph
Physical data type: varchar(255)
Allow NULLs: Not allowed
4. title
Physical data type: varchar(255)
Allow NULLs: Not allowed
5. statedRequirement
Physical data type: varchar(4000)
Allow NULLs: Not allowed
6. secClass
Physical data type: varchar(255)
Allow NULLs: Allowed
7. criteria
Physical data type: varchar(50)
Allow NULLs: Allowed
8. cat1
Physical data type: varchar(50)
Allow NULLs: Allowed -continued 9. cat2
Physical data type: varchar(50)
Allow NULLs: Allowed
10. cat3
Physical data type: varchar(50)
Allow NULLs: Allowed
11. allowEdit
Physical data type: decimal(18,0)
Allow NULLs: Not allowed
12. testCategoryID
Physical data type: decimal(18,0)
Allow NULLs: Allowed
13. rqmtID
Physical data type: int
Allow NULLs: Allowed
Foreign key details (child)
FK_WCA_SecRqmt_Src_WCA_SecReg_Src
Definition: Child   Parent
regID   WCA_SecRegSrc.regID
Relationship type: Non-Identifying
Cardinality: One -to- Zero-or-More
Allow NULLs: Not allowed
Verb phrase: hasFK_WCA_SecRqmt_Src_WCA_SecReg_Src
Inverse phrase: is of
Ref. Integrity on update: No Action
Ref. Integrity on delete: No Action

---

WCA_Stages
Owner: dbo
Target DB name: WCA310_D
Number of columns: 2
Number of indexes: 0
Number of foreign keys: 0
Extended attributes:
OnFileGroup PRIMARY
Clustered PK No

| Columns | Data type | Allow NULLs | Value/Range |
|---|---|---|---|
| stgID | decimal(18,0) | Not allowed | |
| stageName | varchar(50) | Not allowed | |

| Foreign keys | Child | Parent |
|---|---|---|
| FK_WCA_ProjDef-Access_WCA_Stages | WCA_ProjDef-Access.stgID | stgID |

Column details
1. stgID
Physical data type: decimal(18,0)
Allow NULLs: Not allowed
2. stageName
Physical data type: varchar(50)
Allow NULLs: Not allowed

---

-continued

Allow NULLs: Not allowed
2. attributeName
Physical data type: varchar(50)
Allow NULLs: Not allowed
3. rank
Physical data type: int
Allow NULLs: Allowed
Foreign key details (child)
FK_WCA StaticLkpDtl_WCA_StaticLookup
Definition: Child Parent
lookupName WCA_StaticLookup.lookupName
Relationship type: Identifying
Cardinality: One-to-Zero-or-More
Allow NULLs: Not allowed
Verb phrase: hasFK_WCA_StaticLkpDtl_WCA_StaticLookup
Inverse phrase: is of
Ref. Integrity on update: No Action
Ref. Integrity on delete: No Action

---

WCA_StaticLkpDtl
Owner: dbo
Target DB name: WCA310_D
Number of columns: 3
Number of indexes: 0
Number of foreign keys: 1
Extended attributes:
OnFileGroup PRIMARY
Clustered PK No

| Columns | Data type | Allow NULLs | Value/Range |
|---|---|---|---|
| lookupName (FK) | varchar(50) | Not allowed | |
| attributeName | varchar(50) | Not allowed | |
| rank | int | Allowed | |

| Foreign keys | Child | Parent |
|---|---|---|
| FK_WCA_StaticLkpDtl_WCA_StaticLookup | lookupName | WCA_StaticLookup.lookupName |

Column details
1. lookupName (FK)
Physical data type: varchar(50)

---

WCA_StaticLookup
Owner: dbo
Target DB name: WCA310_D
Number of columns: 1
Number of indexes: 0
Number of foreign keys: 0
Extended attributes:
OnFileGroup PRIMARY
Clustered PK No

| Columns | Data type | Allow NULLs | Value/Range |
|---|---|---|---|
| lookupName | varchar(50) | Not allowed | |

| Foreign keys | Child | Parent |
|---|---|---|
| FK_WCA_StaticLkpDtl_WCA_StaticLookup | WCA_StaticLkpDtl.lookup Name | lookupName |

Column details
1. lookupName
Physical data type: varchar(50)
Allow NULLs: Not allowed WCA_SwFamilyLookup
Owner:                                  dbo
Target DB name:                         WCA310_D
Number of columns:                      4
Number of indexes:                      0
Number of foreign keys:                 0
Extended attributes:
OnFileGroup            PRIMARY
Clustered PK           No
Columns          Data type       Allow NULLs    Value/Range
swFamily         varchar(50)     Not allowed
rank             int             Not allowed
type             char(10)        Not allowed
swID             decimal(18,0)   Not allowed
Column details
1. swFamily
Physical data type:       varchar(50)
Allow NULLs:      Not allowed
2. rank
Physical data type:       int
Allow NULLs:      Not allowed
3. type
Physical data type:       char(10)
Allow NULLs:      Not allowed
4. swID
Physical data type:       decimal(18, 0)
Allow NULLs:      Not allowed WCA_SWSource
Owner:                                  dbo
Target DB name:                         WCA310_D
Number of columns:                      7
Number of indexes:                      0
Number of foreign keys:                 0
Extended attributes:
OnFileGroup            PRIMARY
Clustered PK           No
Columns          Data type       Allow NULLs    Value/Range
swReference      varchar(50)     Not allowed
swFamily         varchar(20)     Allowed
swMfr            varchar(50)     Allowed
swName           varchar(50)     Allowed
swVersion        varchar(50)     Allowed
swPatchLevel     varchar(50)     Allowed
Type             char(1)         Allowed
Column details
1. swReference
Physical data type:       varchar(50)
Allow NULLs:      Not allowed
2. swFamily
Physical data type:       varchar(20)
Allow NULLs:      Allowed
3. swMfr
Physical data type:       varchar(50)
Allow NULLs:      Allowed
4. swName
Physical data type:       varchar(50)
Allow NULLs:      Allowed
5. swVersion
Physical data type:       varchar(50)
Allow NULLs:      Allowed
6. swPatchLevel
Physical data type:       varchar(50)
Allow NULLs:      Allowed
7. Type
Physical data type:       char(1)
Allow NULLs:      Allowed WCA_SysUserCategory
Owner:                                  dbo
Target DB name:                         WCA310_D
Number of columns:                      3
Number of indexes:                      0
Number of foreign keys:                 0
Extended attributes:
OnFileGroup            PRIMARY
Clustered PK           No
Columns             Data type       Allow NULLs    Value/Range
sysUserCategoryID   int             Not allowed
category            varchar(50)     Not allowed
categoryType        char(1)         Allowed
Column details
1. sysUserCategoryID
Physical data type:       int
Allow NULLs:      Not allowed
2. category
Physical data type:       varchar(50)
Allow NULLs:      Not allowed
3. categoryType
Physical data type:       char(1)
Allow NULLs:      Allowed WCA_TestProcSrc
Owner:                                  dbo
Target DB name:                         WCA310_D
Number of columns:                      17
Number of indexes:                      0
Number of foreign keys:                 0
Extended attributes:
OnFileGroup            PRIMARY
TextImageOnGroup       PRIMARY
Clustered PK           No
Columns             Data type       Allow NULLs    Value/Range
templateID          decimal(18, 0)  Not allowed
cat1                varchar(50)     Allowed
cat2                varchar(50)     Allowed
cat3                varchar(50)     Allowed
osType              varchar(50)     Allowed
testText            text            Allowed
expectedResult      text            Allowed
testInstance        varchar(50)     Allowed
testTitle           varchar(100)    Allowed
certAnalysisLevel   decimal(10,0)   Allowed
threat              varchar(50)     Allowed
impactStatement     text            Allowed
interviewFlag       char(1)         Allowed
observationFlag     char(1)         Allowed
testFlag            char(1)         Allowed
documeatFlag        char(1)         Allowed
testCategoryID      decimal(18, 0)  Not allowed
Column details
1. templateID
Physical data type:       decimal(18, 0)
Allow NULLs:      Not allowed
2. cat1
Physical data type:       varchar(50)
Allow NULLs:      Allowed
3. cat2
Physical data type:       varchar(50)
Allow NULLs:      Allowed
4. cat3
Physical data type:       varchar(50)
Allow NULLs:      Allowed
5. osType
Physical data type:       varchar(50)
Allow NULLs:      Allowed
6. testText
Physical data type:       text
Allow NULLs:      Allowed
7. expectedResult
Physical data type:       text
Allow NULLs:      Allowed
8. testInstance
Physical data type:       varchar(50)

-continued

Allow NULLs: Allowed
9. testTitle
Physical data type: varchar(100)
Allow NULLs: Allowed
10. certAnalysisLevel
Physical data type: decimal(10.0)
Allow NULLs: Allowed
11. threat
Physical data type: varchar(50)
Allow NULLs: Allowed
12. impactStatement
Physical data type: text
Allow NULLs: Allowed
13. interviewFlag
Physical data type: char(1)
Allow NULLs: Allowed
14. observationFlag
Physical data type: char(1)
Allow NULLs: Allowed
15. testFlag
Physical data type: char(1)
Allow NULLs: Allowed
16. documentFlag
Physical data type: char(1)
Allow NULLs: Allowed
17. testCategoryID
Physical data type: decimal(18, 0)
Allow NULLs: Not allowed WPM_EventRulesSrc
Owner: dbo
Target DB name: WCA310_D
Number of columns: 4
Number of indexes: 0
Number of foreign keys: 0
Extended attributes:
OnFileGroup PRIMARY
Clustered PK Yes

| Columns | Data type | Allow NULLs | Value/Range |
|---|---|---|---|
| WBSID | decimal(18,0) | Not allowed | |
| WPID | decimal(18,0) | Not allowed | |
| eventID | varchar(15) | Not allowed | |
| eventParam | varchar(1000) | Allowed | |

Column details
1. WBSID
Physical data type: decimal(18, 0)
Allow NULLs: Not allowed
2. WPID
Physical data type: decimal(18, 0)
Allow NULLs: Not allowed
3. eventID
Physical data type: varchar(15)
Allow NULLs: Not allowed
4. eventParam
Physical data type: varchar(1000)
Allow NULLs: Allowed WPM_OrgEventRules
Owner: dbo
Target DB name: WCA310_D
Number of columns: 5
Number of indexes: 0
Number of foreign keys: 1
Extended attributes:
OnFileGroup PRIMARY
Clustered PK Yes

| Columns | Data type | Allow NULLs | Value/Range |
|---|---|---|---|
| orgID (FK) | decimal(18, 0) | Not allowed | |
| WBSID | decimal(18,0) | Not allowed | |
| WPID | decimal(18,0) | Not allowed | |
| eventID | varchar(15) | Not allowed | |
| eventParam | varchar(1000) | Allowed | |

| Foreign Keys | Child | Parent |
|---|---|---|
| FK_WPM_OrgEventRules_WCA_Organization | orgID | WCA_Organization.orgID |

Column details
1. orgID (FK)
Physical data type: decimal(18, 0)
Allow NULLs: Not allowed
2. WBSID
Physical data type: decimal(18, 0)
Allow NULLs: Not allowed
3. WPID
Physical data type: decimal(18, 0)
Allow NULLs: Not allowed
4. eventID
Physical data type: varchar(15)
Allow NULLs: Not allowed
5. eventParam
Physical data type: varchar(1000)
Allow NULLs: Allowed
Foreign key details (child)
FK_WPM_OrgEventRules_WCA_Organization
Definition: Child Parent
orgID WCA_Organization.orgID
Relationship type: Identifying
Cardinality: One-to-Zero-or-More
Allow NULLs: Not allowed
Verb phrase: hasFK_WPM_OrgEventRules_WCA_Organization
Inverse phrase: is of
Ref. Integrity on update: No Action
Ref. Integrity on delete: No Action WPM_OrgPrereq
Owner: dbo
Target DB name: WCA310_D
Number of columns: 4
Number of indexes: 0
Number of foreign keys: 1
Extended attributes:
OnFileGroup PRIMARY
Clustered PK Yes

| Columns | Data type | Allow NULLs | Value/Range |
|---|---|---|---|
| orgID (FK) | decimal(18,0) | Not allowed | |
| WBSID | decimal(18,0) | Not allowed | |
| WPID | decimal(18,0) | Not allowed | |
| prereqWPID | decimal(18,0) | Not allowed | |

| Foreign keys | Child | Parent |
|---|---|---|
| FK_WPM_OrgPrereq_WCA_Organization | orgID | WCA_Organization.orgID |

Column details
1. orgID (FK)
Physical data type: decimal(18, 0)
Allow NULLs: Not allowed
2. WBSID
Physical data type: decimal(18, 0)
Allow NULLs: Not allowed
3. WPID
Physical data type: decimal(18, 0)
Allow NULLs: Not allowed
4. prereqWPID
Physical data type: decimal(18, 0)
Allow NULLs: Not allowed
Foreign key details (child)
FK_WPM_OrgPrereq_WCA_Organization
Definition: Child Parent
orgID WCA_Organization.orgID
Relationship type: Identifying
Cardinality: One-to-Zero-or-More
Allow NULLs: Not allowed
Verb phrase: hasFK_WPM_OrgPrereq_WCA_Organization
Inverse phrase: is of
Ref. Integrity on update: No Action
Ref. Integrity on delete: No Action

```
WPM_OrgPS
Owner:                    dbo
Target DB name:           WCA310_D
Number of columns:        8
Number of indexes:        0
Number of foreign keys:   1
Extended attributes:
OnFileGroup               PRIMARY
Clustered PK              Yes
Columns       Data type         Allow NULLs     Value/Range
orgID (FK)    decimal(18,0)     Not allowed
WBSID         decimal(18,0)     Not allowed
WPID          decimal(18,0)     Not allowed
PSRank        decimal(18,0)     Not allowed
PSName        varchar(50)       Allowed
PSDesc        varchar(255)      Allowed
processStep   varchar(50)       Not allowed
pageID        varchar(50)       Allowed
Foreign keys              child      Parent
FK_WPM_OrgPS_WCA_         orgID      WCA_Organization.orgID
Organization
Column details
1. orgID (FK)
Physical data type:       decimal(18, 0)
Allow NULLs:              Not allowed
2. WBSID
Physical data type:       decimal(18, 0)
Allow NULLs:              Not allowed
3. WPID
Physical data type:       decimaL(18, 0)
Allow NULLs:              Not allowed
4. PSRank
Physical data type:       decimal(18, 0)
Allow NULLs:              Not allowed
5. PSName
Physical data type:       varchar(50)
Allow NULLs:              Allowed
6. PSDesc
Physical data type:       varchar(255)
Allow NULLs:              Allowed
7. processStep
Physical data type:       varchar(50)
Allow NULLs:              Not allowed
8. pageID
Physical data type:       varchar(50)
Allow NULLs:              Allowed
Foreign key details (child)
FK_WPM_OrgPS_WCA_Organization
Definition:               Child      Parent
orgID         WCA_Organization.orgID
Relationship type:        Identifying
Cardinality:              One-to-Zero-or-More
Allow NULLs:              Not allowed
Verb phrase:              hasFK_WPM_OrgPS_WCA_Organization
Inverse phrase:           is of
Ref. Integrity on update: No Action
Ref. Integrity on delete: No Action WPM_OrgWBS
Owner:                    dbo
Target DB name:           WCA310_D
Number of columns:        5
Number of indexes:        0
Number of foreign keys:   1
Extended attributes:
OnFileGroup               PRIMARY
Clustered PK              Yes
Columns       Data type         Allow NULLs     value/Range
orgID (FK)    decimal(18,0)     Not allowed
WBSID         decimal(18,0)     Not allowed
WBSName       varchar(50)       Allowed
WBSDesc       varchar(255)      Allowed
applPubFormat varchar(50)       Not allowed
Foreign keys              Child      Parent
FK_WPM_OrgWBS_WCA_        orgID      WCA_Organization.orgID
Organization
Column details
1. orgID (FK)
Physical data type:       decimal(18, 0)
Allow NULLs:              Not allowed
2. WBSID
Physical data type:       decimal(18, 0)
Allow NULLs:              Not allowed
3. WBSName
Physical data type:       varchar(50)
Allow NULLs:              Allowed
4. WBSDesc
Physical data type:       varchar(255)
Allow NULLs:              Allowed
5. applPubFormat
Physical data type:       varchar(50)
Allow NULLs:              Not allowed
Foreign key details (child)
FK_WPM_OrgWBS_WCA_Organization
Definition:               Child      Parent
orgID         WCA_Organization.orgID
Relationship type:        Identifying
Cardinality:              One-to-Zero-or-More
Allow NULLs:              Not allowed
Verb phrase:              hasFK_WPM_OrgWBS_WCA_Organization
Inverse phrase:           is of
Ref. Integrity on update: No Action
Ref. Integrity on delete: No Action WPM_OrgWP
Owner:                    dbo
Target DB name:           WCA310_D
Number of columns:        6
Number of indexes:        0
Number of foreign keys:   1
Extended attributes:
OnFileGroup               PRIMARY
Clustered PK              Yes
Columns       Data type         Allow NULLs     Value/Range
orgID (FK)    decimal(18,0)     Not allowed
WBSID         decimal(18,0)     Not allowed
WPID          decimal(18,0)     Not allowed
WPName        varchar(50)       Allowed
WPDesc        varchar(255)      Allowed
WPRank        decimal(18,0)     Not allowed
Foreign keys              Child      Parent
FK_WPM_OrgWP_WCA_         orgID      WCA_Organization.orgID
Organization
Column details
1. orgID (FK)
Physical data type:       decimal(18, 0)
Allow NULLs:              Not allowed
2. WBSID
Physical data type:       decimal(18, 0)
Allow NULLs:              Not allowed
3. WPID
Physical data type:       decimal(18, 0)
Allow NULLs:              Not allowed
4. WPName
Physical data type:       varchar(50)
Allow NULLs:              Allowed
5. WPDesc
Physical data type:       varchar(255)
Allow NULLs:              Allowed
6. WPRank
Physical data type:       decimal(18, 0)
Allow NULLs:              Not allowed
Foreign key details (child)
FK_WPM_OrgWP_WCA_Organization
Definition:               Child      Parent
orgID         WCA_Organization.orgID
Relationship type:        Identifying
Cardinality:              One-to-Zero-or-More
```

-continued

```
Allow NULLs:           Not allowed
Verb phrase:           hasFK_WPM_OrgWP_WCA_Organization
Inverse phrase:        is of
Ref. Integrity on update:    No Action
Ref. Integrity on delete:    No Action
```

```
WPM_ProjAnalystPerm
Owner:                           dbo
Target DR name:                  WCA310_D
Number of columns:               4
Number of indexes:               0
Number of foreign keys:          2
Extended attributes:
OnFileGroup              PRIMARY
Clustered PK             Yes
Columns         Data type       Allow NULLs     Value/Range
PID (FK)        decimal(18,0)   Not allowed
WPID            decimal(18,0)   Not allowed
userID (FK)     decimal(18,0)   Not allowed
userPerm        char(4)         Allowed
Foreign keys                    child       Parent
FK_WPM_ProjAnalystPerm_AppUser  userID      AppUser.userID
FK_WPM_ProjAnalystPerm_WCA_     PID         WCA_Project.PID
Project
Column details
1. PID (FK)
Physical data type:      decimal(18, 0)
Allow NULLs:             Not allowed
2. WPID
Physical data type:      decimal(18, 0)
Allow NULLs:             Not allowed
3. userID (FK)
Physical data type:      decimal(18, 0)
Allow NULLs:             Not allowed
4. userPerm
Physical data type:      char(4)
Allow NULLs:             Allowed
Foreign key details (child)
FK_WPM_ProjAnalystPerm_AppUser
Definition:              Child       Parent
userID AppUser.userID
Relationship type:       Identifying
Cardinality:             One-to-Zero-or-More
Allow NULLs:             Not allowed
Verb phrase:             hasFK_WPM_ProjAnalystPerm_AppUser
Inverse phrase:          is of
Ref. Integrity on update:    No Action
Ref. Integrity on delete:    No Action
FK_WPM_ProjAnalystPerm_WCA_Project
Definition:              Child       Parent
PID    WCA_Project.PID
Relationship type:       Identifying
Cardinality:             One-to-Zero-or-More
Allow NULLs:             Not allowed
Verb phrase:             hasFK_WPM_ProjAnalystPerm_WCA_Project
Inverse phrase:          is of
Ref. Integrity on update:    No Action
Ref. Integrity on delete:    No Action
```

```
WPM_ProjDefPerm
Owner:                           dbo
Target DB name:                  WCA310_D
Number of columns:               3
Number of indexes:               0
Number of foreign keys:          1
Extended attributes:
OnFileGroup              PRIMARY
Clustered PK             Yes
Columns         Data type       Allow NULLs     Value/Range
PID (FK)        decimal(18,0)   Not allowed
WPID            decimal(18,0)   Not allowed
userPerm        char(4)         Not allowed
Foreign keys                    Child       Parent
FK_WPM_ProjDefPerm_WCA_Project  PID         WCA_Project.PID
Column details
1. PID (FK)
Physical data type:      decimal(18, 0)
Allow NULLs:             Not allowed
2. WPID
Physical data type:      decimal(18, 0)
Allow NULLs:             Not allowed
3. userPerm
Physical data type:      char(4)
Allow NULLs:             Not allowed
Foreign key details (child)
FK_WPM_ProjDefPerm_WCA_Project
Definition:              Child       Parent
PID    WCA_Project.PID
Relationship type:       Identifying
Cardinality:             One-to-Zero-or-More
Allow NULLs:             Not allowed
Verb phrase:             hasFK_WPM_ProjDefPerm_WCA_project
Inverse phrase:          is of
Ref. Integrity on update:    No Action
Ref. Integrity on delete:    No Action
```

```
WPM_ProjEventRules
Owner:                           dbo
Target DB name:                  WCA310_D
Number of columns:               4
Number of indexes:               0
Number of foreign keys:          1
Extended attributes:
OnFileGroup              PRIMARY
Clustered PK             Yes
Columns         Data type       Allow NULLs     Value/Range
PID (FK)        decimal(18,0)   Not allowed
WPID            decimal(18,0)   Not allowed
eventID         varchar(15)     Not allowed
eventParam      varchar(1000)   Allowed
Foreign keys                    Child       Parent
FK_WPM_ProjEventRules_WCA_Project   PID     WCA_Project.PID
Column details
1. PID (FK)
Physical data type:      decimal(18,0)
Allow NULLs:             Not allowed
2. WPID
Physical data type:      decimal(18,0)
Allow NULLs:             Not allowed
3. eventID
Physical data type:      varchar(15)
Allow NULLs:             Not allowed
4. eventParam
Physical data type:      varchar(1000)
Allow NULLs:             Allowed
Foreign key details (child)
FK_WPM_ProjEventRules_WCA_Project
Definition:              Child       Parent
PID    WCA_Project.PID
Relationship type:       Identifying
Cardinality:             One-to-Zero-or-More
Allow NULLs:             Not allowed
Verb phrase:             hasFK_WPM_ProjEventRules_WCA_Project
Inverse phrase:          is of
Ref. Integrity on update:    No Action
Ref. Integrity on delete:    No Action
```

```
WPM_ProjPrereq
Owner:                           dbo
Target DB name:                  WCA310_D
```

-continued

```
Number of columns:              3
Number of indexes:              0
Number of foreign keys:         1
Extended attributes:
OnFileGroup             PRIMARY
Clustered PK            Yes
Columns         Data type       Allow NULLs     Value/Range
PID (FK)        decimal(18,0)   Not allowed
WPID            decimal(18,0)   Not allowed
prereq WPID     decimal(18,0)   Not allowed
Foreign keys                    Child           Parent
FK_WPM_ProjPrereq_WCA_Project   PID             WCA_Project.PID
Column details
1. PID (FK)
Physical data type:     decimal(18,0)
Allow NULLs:            Not allowed
2. WPID
Physical data type:     decimal(18,0)
Allow NULLs:            Not allowed
3. prereq WPID
Physical data type:     decimal(18,0)
Allow NULLs:            Not allowed
Foreign key details (child)
FK_WPM_ProjPrereq_WCA_Project
Definition:             Child           Parent
PID             WCA_Project.PID
Relationship type:      Identifying
Cardinality:            One-to-Zero-or-More
Allow NULLs:            Not allowed
Verb phrase:            hasFK_WPM_ProjPrereq_WCA_Project
Inverse phrase:         is of
Ref. Integrity on update:       No Action
Ref. Integrity on delete:       No Action
```

```
WPM_ProjPS
Owner:                  dbo
Target DB name:         WCA310_D
Number of columns:      7
Number of indexes:      0
Number of foreign keys: 2
Extended attributes:
OnFileGroup             PRIMARY
Clustered PK            Yes
Columns         Data type       Allow NULLs     Value/Range
PID (FK)        decimal(18,0)   Not allowed
WPID            decimal(18,0)   Not allowed
PSRank          decimal(18,0)   Not allowed
PSName          varchar(50)     Allowed
PSDesc          varchar(255)    Allowed
processStep     varchar(50)     Not allowed
pageID (FK)     varchar(50)     Allowed
Foreign keys                    Child           Parent
FK_WPM_ProjPS_WCA_              pageID          WCA_PageAttrs.pageID
PageAttrs
FK_WPM_ProjPS_WCA_Project       PID             WCA_Project.PID
Column details
1. PID (FK)
Physical data type:     decimal(18,0)
Allow NULLs:            Not allowed
2. WPID
Physical data type:     decimal(18,0)
Allow NULLs:            Not allowed
3. PSRank
Physical data type:     decimal(18,0)
Allow NULLs:            Not allowed
4. PSName
Physical data type:     varchar(50)
Allow NULLs:            Allowed
5. PSDesc
Physical data type:     varchar(255)
Allow NULLs:            Allowed
6. processStep
Physical data type:     varchar(50)
Allow NULLs:            Not allowed
```

-continued

```
7. pageID (FK)
Physical data type:     varchar(50)
Allow NULLs:            Allowed
Foreign key details (child)
FK_WPM_ProjPS_WCA_PageAttrs
Definition:             Child           Parent
pageID          WCA_PageAttrs.pageID
Relationship type:      Non-Identifying
Cardinality:            One-to-Zero-or-More
Allow NULLs:            Not allowed
Verb phrase:            hasFK_WPM_ProjPS_WCA_PageAttrs
Inverse phrase:         is of
Ref. Integrity on update:       No Action
Ref. Integrity on delete:       No Action
FK_WPM_ProjPS_WCA_Project
Definition:             Child           Parent
PID             WCA_Project.PID
Relationship type:      Identifying
Cardinality:            One-to-Zero-or-More
Allow NULLs:            Not allowed
Verb phrase:            hasFK_WPM_ProjPS_WCA_Project
Inverse phrase:         is of
Ref. Integrity on update:       No Action
Ref. Integrity on delete:       No Action
```

```
WPM_ProjWP
Owner:                  dbo
Target DB name:         WCA310_D
Number of columns:      6
Number of indexes:      0
Number of foreign keys: 1
Extended attributes:
OnFileGroup             PRIMARY
Clustered PK            Yes
Columns         Data type       Allow NULLs     Value/Range
PID (FK)        decimal(18,0)   Not allowed
WPID            decimal(18,0)   Not allowed
WPName          varchar(50)     Allowed
WPDesc          varchar(255)    Allowed
WPRank          decimal(18,0)   Not allowed
status          int             Allowed
Foreign keys                    Child           Parent
FK_WPM_ProjWP_WCA_Project       PID             WCA_Project.PID
Column details
1. PID (FK)
Physical data type:     decimal(18,0)
Allow NULLs:            Not allowed
2. WPID
Physical data type:     decimal(18,0)
Allow NULLs:            Not allowed
3. WPName
Physical data type:     varchar(50)
Allow NULLs:            Allowed
4. WPDesc
Physical data type:     varchar(255)
Allow NULLs:            Allowed
5. WPRank
Physical data type:     decimal(18,0)
Allow NULLs:            Not allowed
6. status
Physical data type:     int
Allow NULLs:            Allowed
Foreign key details (child)
FK_WPM_ProjWP_WCA_Project
Definition:             Child           Parent
PID             WCA_Project.PID
Relationship type:      Identifying
Cardinality:            One-to-Zero-or-More
Allow NULLs:            Not allowed
Verb phrase:            hasFK_WPM_ProjWP_WCA_Project
Inverse phrase:         is of
Ref. Integrity on update:       No Action
Ref. Integrity on delete:       No Action
```

```
WPM_ProjWPHistory
Owner:                       dbo
Target DR name:              WCA310_D
Number of columns:           7
Number of indexes:           0
Number of foreign keys:      1
Extended attributes:
OnFileGroup                  PRIMARY
TextImageOnGroup             PRIMARY
Clustered PK                 No
Columns         Data type         Allow NULLs      Value/Range
PID (FK)        decimal(18,0)     Not allowed
WPID            decimal(18,0)     Not allowed
UserID          decimal(18,0)     Not allowed
UserName        varchar(50)       Allowed
eventID         varchar(15)       Not allowed
actionTime      datetime          Not allowed
actionComment   text              Allowed
Foreign keys                      Child    Parent
FK_WPM_ProjWPHistory_WCA_Project  PID      WCA_Project.PID
Column details
1. PID (FK)
Physical data type:    decimal(18,0)
Allow NULLs:           Not allowed
2. WPID
Physical data type:    decimal(18,0)
Allow NULLs:           Not allowed
3. UserID
Physical data type:    decimal(18,0)
Allow NULLs:           Not allowed
4. UserName
Physical data type:    varchar(50)
Allow NULLs:           Allowed
5. eventID
Physical data type:    varchar(15)
Allow NULLs:           Not allowed
6. actionTime
Physical data type:    datetime
Allow NULLs:           Not allowed
7. actionComment
Physical data type:    text
Allow NULLs:           Allowed
Foreign key details (child)
FK_WPM_ProjWPHistory_WCA_Project
Definition:            Child    Parent
PID       WCA_Project.PID
Relationship type:     Non-Identifying
Cardinality:           One-to-Zero-or-More
Allow NULLs:           Not allowed
Verb phrase:           hasFK_WPM_ProjWPHistory_WCA_Project
Inverse phrase:        is of
Ref. Integrity on update:    No Action
Ref. Integrity on delete:    No Action WPM_ProjXEE
Owner:                       dbo
Target DB name:              WCA310_D
Number of columns:           6
Number of indexes:           0
Number of foreign keys:      1
Extended attributes:
OnFileGroup                  PRIMARY
Clustered PK                 No
Columns         Data type         Allow NULLs      Value/Range
PID (FK)        decimal(18,0)     Not allowed
WPID            decimal(18,0)     Not allowed
eventID         varchar(15)       Not allowed
eventtime       datetime          Allowed
userID          decimal(18,0)     Allowed
eventParam      varchar(1000)     Allowed
Foreign keys                      Child    Parent
FK_WPM_ProjXEE_WCA_Project        PID      WCA_Project.PID
Column details
1. PID (FK)
```

-continued

```
Physical data type:    decimal(18,0)
Allow NULLs:           Not allowed
2. WPID
Physical data type:    decimal(18,0)
Allow NULLs:           Not allowed
3. eventID
Physical data type:    varchar(15)
Allow NULLs:           Not allowed
4. eventtime
Physical data type:    datetime
Allow NULLs:           Allowed
5. userID
Physical data type:    decimal(18,0)
Allow NULLs:           Allowed
6. eventParam
Physical data type:    varchar(1000)
Allow NULLs:           Allowed
Foreign key details (child)
FK_WPM_ProjXEE_WCA_Project
Definition:            Child    Parent
PID       WCA_Project.PID
Relationship type:     Non-Identifying
Cardinality:           One-to-Zero-or-More
Allow NULLs:           Not allowed
Verb phrase:           hasFK_WPM_ProjXEE_WCA_Project
Inverse phrase:        is of
Ref. Integrity on update:    No Action
Ref. Integrity on delete:    No Action WPM_PSSrc
Owner:                       dbo
Target DB name:              WCA310_D
Number of columns:           7
Number of indexes:           0
Number of foreign keys:      1
Extended attributes:
OnFileGroup                  PRIMARY
Clustered PK                 Yes
Columns         Data type         Allow NULLs      Value/Range
WBSID           decimal(18,0)     Not allowed
WPID            decimal(18,0)     Not allowed
PSRank          decimal(18,0)     Not allowed
PSName          varchar(50)       Allowed
PSDesc          varchar(255)      Allowed
processStep     varchar(50)       Not allowed
pageID (FK)     varchar(50)       Allowed
Foreign keys                      Child    Parent
FK_WPM_PSSrc_WCA_             pageID   WCA_PageAttrs.pageID
PageAttrs
Column details
1. WBSID
Physical data type:    decimal(18,0)
Allow NULLs:           Not allowed
2. WPID
Physical data type:    decimal(18,0)
Allow NULLs:           Not allowed
3. PSRank
Physical data type:    decimal(18,0)
Allow NULLs:           Not allowed
4. PSName
Physical data type:    varchar(50)
Allow NULLs:           Allowed
5. PSDesc
Physical data type:    varchar(255)
Allow NULLs:           Allowed
6. processStep
Physical data type:    varchar(50)
Allow NULLs:           Not allowed
7. pageID (FK)
Physical data type:    varchar(50)
Allow NULLs:           Allowed
Foreign key details (child)
FK_WPM PSSrc_WCA_PageAttrs
Definition:            Child    Parent
```

```
pageID                    WCA_PageAttrs.pageID
Relationship type:        Non-Identifying
Cardinality:              One-to-Zero-or-More
Allow NULLs:              Not allowed
Verb phrase:              hasFK_WPM_PSSrc_WCA_PageAttrs
Inverse phrase:           is of
Ref. Integrity on update: No Action
Ref. Integrity on delete: No Action
```

```
WPM_State
Owner:                    dbo
Target DB name:           WCA310_D
Number of columns:        2
Number of indexes:        0
Number of foreign keys:   0
Extended attributes:
OnFileGroup               PRIMARY
Clustered PK              Yes
Columns       Data type     Allow NULLs    Value/Range
state         varchar(15)   Not allowed
status        int           Not allowed
Column details
1. state
Physical data type:       varchar(15)
Allow NULLs:              Not allowed
2. status
Physical data type:       int
Allow NULLs:              Not allowed
```

```
WPM_StateTranLkp
Owner:                    dbo
Target DB name:           WCA310_D
Number of columns:        3
Number of indexes:        0
Number of foreign keys:   0
Extended attributes:
OnFileGroup               PRIMARY
Clustered PK              No
Columns       Data type     Allow NULLs    Value/Range
eventID       varchar(15)   Not allowed
InitialStatus int           Not allowed
FinalStatus   int           Not allowed
Column details
1. eventID
Physical data type:       varchar(15)
Allow NULLs:              Not allowed
2. InitialStatus
Physical data type:       int
Allow NULLs:              Not allowed
3. FinalStatus
Physical data type:       int
Allow NULLs:              Not allowed
```

```
WPM_WBSSrc
Owner:                    dbo
Target DB name:           WCA310_D
Number of columns:        5
Number of indexes:        0
Number of foreign keys:   0
Extended attributes:
OnFileGroup               PRIMARY
Clustered PK              Yes
Columns       Data type      Allow NULLs    Value/Range
WBSID         decimal(18,0)  Not allowed
WBSName       varchar(50)    Allowed
WBSDesc       varchar(255)   Allowed
applPubFormat varchar(50)    Not allowed
webcaType     varchar(50)    Allowed
Column details
1. WBSID
Physical data type:       decimal(18,0)
Allow NULLs:              Not allowed
2. WBSName
Physical data type:       varchar(50)
Allow NULLs:              Allowed
3. WBSDesc
Physical data type:       varchar(255)
Allow NULLs:              Allowed
4. applPubFormat
Physical data type:       varchar(50)
Allow NULLs:              Not allowed
5. webcaType
Physical data type:       varchar(50)
Allow NULLs:              Allowed
```

```
WPM_WPPrereqSrc
Owner:                    dbo
Target DB name:           WCA310_D
Number of columns:        3
Number of indexes:        0
Number of foreign keys:   0
Extended attributes:
OnFileGroup               PRIMARY
Clustered PK              Yes
Columns       Data type      Allow NULLs    Value/Range
WBSID         decimal(18,0)  Not allowed
WPID          decimal(18,0)  Not allowed
prereqWPID    decimal(18,0)  Not allowed
Column details
1. WBSID
Physical data type:       decimal(18,0)
Allow NULLs:              Not allowed
2. WPID
Physical data type:       decimal(18,0)
Allow NULLs:              Not allowed
3. prereqWPID
Physical data type:       decimal(18,0)
Allow NULLs:              Not allowed
```

```
WPM_WPSrc
Owner:                    dbo
Target DB name:           WCA310_D
Number of columns:        5
Number of indexes:        0
Number of foreign keys:   0
Extended attributes:
OnFileGroup               PRIMARY
Clustered PK              Yes
Columns       Data type      Allow NULLs    Value/Range
WBSID         decimal(18,0)  Not allowed
WPID          decimal(18,0)  Not allowed
WPName        varchar(50)    Allowed
WPDesc        varchar(255)   Allowed
WPRank        decimal(18,0)  Not allowed
Column details
1. WBSID
Physical data type:       decimal(18,0)
Allow NULLs:              Not allowed
2. WPID
Physical data type:       decimal(18,0)
Allow NULLs:              Not allowed
3. WPName
Physical data type:       varchar(50)
Allow NULLs:              Allowed
4. WPDesc
Physical data type:       varchar(255)
```

| | |
|---|---|
| Allow NULLs: | Allowed |
| 5. WPRank | |
| Physical data type: | decimal(18,0) |
| Allow NULLs: | Not allowed |

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

Having thus described our invention, what we claim as new and desire to secure by Letters Patent is as follows:

1. A method of assessing risk over a computer network having at least one target system and a server that communicates with the at least one target system via the computer network, the server performing the method comprising the steps of:
   a) enabling a user to choose at least one of a plurality of predefined process steps pertaining to collecting information descriptive of at least one aspect of a target system hardware and/or software, and/or a physical environment in which the target system operates;
   b) testing the target system against at least one test procedure selected to satisfy at least one predefined standard, regulation and/or requirement with which the target system is to comply;
   c) generating a score for at least one threat element, the score indicating a likelihood of that threat element affecting the target system;
   d) receiving at least a portion of the result of tests performed for the at least one test procedure in said step b); and
   e) (1) obtaining a threat correlation indication associated with said at least one test procedure, wherein said threat correlation indication indicates a relative potential of one or more given threats to exploit a vulnerability caused by a failure of said at least one test procedure, and
   (2) determining a risk assessment by comparing each score generated in said step c) with a corresponding threat correlation indication of said step e) (1).

2. The method of claim 1, further comprising enabling the user to choose at least one predefined process step pertaining to selecting at least one predefined standard, regulation and/or requirement.

3. The method of claim 2, further comprising enabling the user to edit at least one standard, regulation and/or requirement.

4. The method of claim 1, further comprising enabling the user to define an order of at least one of the plurality of process steps.

5. The method of claim 1, further comprising enabling the user to define at least one role for at least one user performing at least a portion of a process step.

6. The method of claim 5, wherein the at least one role comprise at least one of certification and accreditation analyst, computer security incident response capabilities representative, privacy advocates office representative, disclosure office representative, vulnerabilities office representative, technical contingency planning document representative, request for information system originator, owner of business system, certification and accreditation request for information system coordinator, critical infrastructure protection representative, system point of contact, principal accrediting authority, certification and accreditation administrator, and certification and accreditation chief.

7. The method of claim 5, further comprising sending an electronic notification to one or more users performing at least a portion of a specified process step upon the occurrence of a predefined event.

8. The method of claim 7, wherein the predefined events comprise at least one of opening a process step, submitting a process step for approval, re-opening a process step, and approving a process step.

9. The method of claim 1 wherein said testing the target system further comprises enabling the user to test the target system.

10. The method of claim 1, further comprising:
   enabling at least one of a system administrator and the user to define at least one role for each user performing at least a portion of a process step; and
   performing the steps associated with said at least one test procedure to determine whether the target system passes or fails said at least one test procedures.

11. The method of claim 1, further comprising:
   enabling at least one of a system administrator and the user to define at least one role for each user performing at least a portion of a process step with which the target system is to comply; and
   enabling at least one of a system administrator and the user to define an order of at least one of the process steps.

12. The method of claim 1, wherein the information collected in said step a) comprises at least one of central processing unit (CPU) manufacturer, CPU clock speed, operating system (OS) manufacturer, OS version, and OS patches.

13. The method of claim 1, wherein said scores for said step c) comprise at least one of:
   a) negligible, wherein negligible indicates that the threat element is not applicable or has negligible likelihood of occurrence;
   b) low, wherein low indicates that the threat element has a relatively low likelihood of occurrence;
   c) medium, wherein medium indicates that the threat element has a medium likelihood of occurrence; and
   d) high, wherein high indicates that the threat element has a relatively high likelihood of occurrence.

14. The method of claim 1, wherein the scores of said step c) are generated in response to one or more user provided inputs.

15. The method of claim 14, wherein the user can modify and/or edit said scores.

16. The method of claim 1, wherein said step c) threat elements comprise at least one of natural disaster elements, system failure elements, environmental failure elements, unintentional human caused elements, and intentional human caused elements.

17. The method of claim 16, wherein the natural disaster threat elements comprise at least one of fire, flood, earthquake, volcano, tornado, weather, and lighting elements.

18. The method of claim 16, wherein the system failure threat elements comprise at least one of a hardware failure, a power failure, and a communication link failure.

19. The method of claim 16, wherein the environmental failure threat elements comprise at least one of temperature, power, humidity, sand, dust, shock, and vibration.

20. The method of claim 16, wherein the human caused unintentional threat element comprises at least one of a software design error, a system design error, and an operator error.

21. The method of claim 16, wherein the human caused intentional threat elements comprise actions by at least one of an authorized system administrator, an authorized maintenance personnel, an authorized user, a terrorist, a hacker, a saboteur, a thief, and a vandal.

22. The method of claim 1 wherein said step e) threat correlation indication comprises at least one of the following scores:
   a) negligible, wherein negligible indicates that the threat is not applicable to the vulnerability;
   b) low, wherein low indicates that the threat has a low potential to exploit the vulnerability;
   c) medium, wherein medium indicates that the threat has a potential to exploit the vulnerability; and
   d) high, wherein high indicates that the threat has a relatively high potential to exploit the vulnerability.

23. The method of claim 22, wherein the risk assessment in said step e) is determined by:
   a) for each element in the project threat profile and corresponding element in the threat correlation pattern, determining an overall risk of an element in a threat correlation indication in accordance with at least one of the following:
      (1) if a threat element score as determined in said step c) is negligible and a corresponding element in the threat correlation indication as determined in said step e) is anything, then the overall risk of the element is negligible;
      (2) if a threat element score as determined in said step c) is low and the corresponding element in the threat correlation indication as determined in said step e) is negligible, then the overall risk of the element is low;
      (3) if a threat element score as determined in said step c) is low and the corresponding element in the threat correlation indication as determined in said step e) is low, then the overall risk of the element is low;
      (4) if a threat element score as determined in said step c) is low and the corresponding element in the threat correlation indication as determined in said step e) is medium, then the overall risk of the element is low;
      (5) if a threat element score as determined in said step c) is low and the corresponding element in the threat correlation indication as determined in said step e) is high, then the overall risk of the element is medium;
      (6) if a threat element score as determined in said step c) is medium and the corresponding element in the threat correlation indication as determined in said step e) is negligible, then the overall risk of the element is negligible;
      (7) if a threat element score as determined in said step c) is medium and the corresponding element in the threat correlation indication as determined in said step e) is low, then the overall risk of the element is low;
      (8) if a threat element score as determined in said step c) is medium and the corresponding element in the threat correlation indication as determined in said step e) is medium, then the overall risk of the element is medium;
      (9) if a threat element score as determined in said step c) is medium and the corresponding element in the threat correlation indication as determined in said step e) is high, then the overall risk of the element is medium;
      (10) if a threat element score as determined in said step c) is high and the corresponding element in the threat correlation indication as determined in said step e) is negligible, then the overall risk of the element is negligible;
      (11) if a threat element score as determined in said step c) is high and the corresponding element in the threat correlation indication as determined in said step e) is low, then the overall risk of the element is medium;
      (12) if a threat element score as determined in said step c) is high and the corresponding element in the threat correlation indication as determined in said step e) is medium, then the overall risk of the element is high; and
      (13) if a threat element score as determined in said step c) is high and the corresponding element in the threat correlation indication as determined in said step e) is high, then the overall risk of the element is high; and
   b) selecting the risk profile for the test procedure, if that test procedure is failed, as being the highest overall risk as determined in at least one of steps a)1)-a)13).

24. The method of claim 23, further comprising determining an overall system risk.

25. The method of claim 24, wherein the overall system risk is the highest overall risk element of each of one or more failed test procedures.

26. The method of claim 24, further comprising printing a documentation package that will enable a determination to be made whether the target system complies with the at least one predefined standard, regulation and/or requirement of said step b).

27. The method of claim 26, wherein the documentation package includes a risk assessment for at least one test procedure.

28. The method of claim 26, wherein the documentation package includes an overall system risk.

29. A system for assessing risk over a computer network having at least one target system and a server that communicates with the at least one target system via the computer network, the server comprising:
   a) a process step module for enabling a user to choose at least one of a plurality of predefined process steps pertaining to collecting information descriptive of at least one aspect of the target system hardware and/or software, and/or a physical environment in which the target system operates;
   b) a test procedure module for testing the target system against at least one test procedure selected to satisfy the at least one predefined standard, regulation and/or requirement which the target system is to comply, and enabling the user to enter test data;
   c) a threat element score generation module for generating a score for at least one threat element, the score indicating a likelihood of that threat element affecting the target system;
   d) (1) obtaining a threat correlation indication associated with said at least one test procedure, wherein said threat correlation indication indicates a relative potential of one or more given threats to exploit a vulnerability caused by a failure of said at least one test procedure, and (2) determining a risk assessment by comparing each score generated in said step c) with a corresponding threat correlation indication of said step d) (1).

30. The system of claim 29, wherein the process step module enables the user to define an order of at least one of the plurality of process steps.

31. The system of claim 29, wherein the process step module enables the user to define at least one role for at least one user performing at least a portion of a process step.

32. The system of claim 31, wherein the at least one role comprise at least one of certification and accreditation analyst, computer security incident response capabilities representative, privacy advocates office representative, disclosure office representative, vulnerabilities office representative, technical contingency planning document representative, request for information system originator, owner of business system, certification and accreditation request for information system coordinator, critical infrastructure protection representative, system point of contact, principal accrediting authority, certification and accreditation administrator, and certification and accreditation chief.

33. The system of claim 31, wherein the process step module enables a user to send an electronic notification to one or more users performing at least a portion of a specified process step upon the occurrence of a predefined event.

34. The system of claim 32, wherein the predefined events comprise at least one of opening a process step, submitting a process step for approval, re-opening a process step, and approving a process step.

35. The system of claim 29, wherein the information collected by said process step module comprises at least one of central processing unit (CPU) manufacturer, CPU clock speed, operating system (OS) manufacturer, OS version, and OS patches.

36. The system of claim 29, wherein the test procedure module further enables the user to edit at least one standard, regulation and/or requirement.

37. The system of claim 29, wherein said threat element score generation module generates scores comprising at least one of:
 a) negligible, wherein negligible indicates that the threat element is not applicable or has negligible likelihood of occurrence;
 b) low, wherein low indicates that the threat element has a relatively low likelihood of occurrence;
 c) medium, wherein medium indicates that the threat element has a medium likelihood of occurrence; and
 d) high, wherein high indicates that the threat element has a relatively high likelihood of occurrence.

38. The system of claim 29, wherein the scores generated by said threat element score generation module are generated in response to one or more user provided inputs.

39. The system of claim 38, wherein the user can modify and/or edit any of said scores.

40. The system of claim 29, wherein said threat element score generation module threat elements comprise at least one of natural disaster elements, system failure elements, environmental failure elements, unintentional human caused elements, and intentional human caused elements.

41. The system of claim 40, wherein the natural disaster threat elements comprise at least one of fire, flood, earthquake, volcano, tornado, weather, and lighting elements.

42. The system of claim 40, wherein the system failure threat elements comprise at least one of a hardware failure, a power failure, and a communication link failure.

43. The system of claim 40, wherein the environmental failure threat elements comprise at least one of temperature, power, humidity, sand, dust, shock, and vibration.

44. The system of claim 40, wherein the human caused unintentional threat element comprises at least one of a software design error, a system design error, and an operator error.

45. The system of claim 40, wherein the human caused intentional threat elements comprise actions by at least one of an authorized system administrator, an authorized maintenance personnel, an authorized user, a terrorist, a hacker, a saboteur, a thief, and a vandal.

46. The system of claim 29, wherein the threat correlation indication comprises at least one of the following scores:
 a) negligible, wherein negligible indicates that the threat is not applicable to the vulnerability;
 b) low, wherein low indicates that the threat has a low potential to exploit the vulnerability;
 c) medium, wherein medium indicates that the threat has a potential to exploit the vulnerability; and
 d) high, wherein high indicates that the threat has a relatively high potential to exploit the vulnerability.

47. The system of claim 46, wherein the risk assessment module assesses risk by:
 a) for each element in the project threat profile and corresponding element in the threat correlation pattern, determining an overall risk of an element in a threat correlation indication in accordance with at least one of the following:
  (1) if a threat element score as determined in said threat element score generation module is negligible and a corresponding element in the threat correlation indication is anything, then the overall risk of the element is negligible;
  (2) if a threat element score as determined in said threat element score generation module is low and the corresponding element in the threat correlation indication is negligible, then the overall risk of the element is low;
  (3) if a threat element score as determined in said threat element score generation module is low and the corresponding element in the threat correlation indication is low, then the overall risk of the element is low;
  (4) if a threat element score as determined in said threat element score generation module is low and the corresponding element in the threat correlation indication is medium, then the overall risk of the element is low;
  (5) if a threat element score as determined in said threat element score generation module is low and the corresponding element in the threat correlation indication is high, then the overall risk of the element is medium;
  (6) if a threat element score as determined in said threat element score generation module is medium and the corresponding element in the threat correlation indication is negligible, then the overall risk of the element is negligible;
  (7) if a threat element score as determined in said threat element score generation module is medium and the corresponding element in the threat correlation indication is low, then the overall risk of the element is low;

(8) if a threat element score as determined in said threat element score generation module is medium and the corresponding element in the threat correlation indication is medium, then the overall risk of the element is medium;

(9) if a threat element score as determined in said threat element score generation module is medium and the corresponding element in the threat correlation indication is high, then the overall risk of the element is medium;

(10) if a threat element score as determined in said threat element score generation module is high and the corresponding element in the threat correlation indication is negligible, then the overall risk of the element is negligible;

(11) if a threat element score as determined in said threat element score generation module is high and the corresponding element in the threat correlation indication is low, then the overall risk of the element is medium;

(12) if a threat element score as determined in said threat element score generation module is high and the corresponding element in the threat correlation indication is medium, then the overall risk of the element is high; and

(13) if a threat element score as determined in said threat element score generation module is high and the corresponding element in the threat correlation indication is high, then the overall risk of the element is high; and b) selecting the risk profile for the test procedure, if that test procedure is failed, as being the highest overall risk element as determined by at least one of steps a) 1)-a) 13).

48. The system of claim 47, wherein said risk assessment module further determines an overall system risk.

49. The system of claim 48, wherein the overall system risk is the highest overall risk element of each of one or more failed test procedures.

50. The system of claim 48, further comprising a printing module for printing a documentation package that will enable a determination to be made whether the target system complies with the at least one predefined standard, regulation and/or requirement.

51. The system of claim 50, wherein the documentation package includes a risk assessment for at least one test procedure.

52. The system of claim 50, wherein the documentation package includes an overall system risk.

53. A computer-readable medium for storing computer instructions therein, the computer-readable medium comprising instructions for assessing risk over a computer network having at least one target system and a server that communicates with the at least one target system via the computer network, the server executing the computer instructions for performing the method comprising the steps of:
   a) enabling the user to choose at least one predefined process step pertaining to collecting information descriptive of at least one aspect of a target system hardware and/or software, and/or a physical environment in which the target system operates;
   b) testing the target system against at least one test procedure selected to satisfy at least one predefined standard, regulation and/or requirement with which the target system is to comply for purposes of certification and accreditation;
   c) generating a score for at least one threat element, the score indicating a likelihood of that threat element affecting the target system;
   d) (1) obtaining a threat correlation indication associated with said at least one test procedure, wherein said threat correlation indication indicates a relative potential of one or more given threats to exploit a vulnerability caused by a failure of said at least one test procedure, and
      (2) determining a risk assessment by comparing each score generated in said step c) with a corresponding threat correlation indication of said element d) (1) instructions.

54. The method of claim 53, further comprising receiving at least a portion of the result of tests performed for the at least one test procedure.

55. The computer-readable medium of claim 53, comprising instructions that enable the user to enter at least a subscription key to gain access to the process steps.

56. The computer-readable medium of claim 53, further comprising instructions that enable a user to define an order of at least one of the plurality of process steps.

57. The computer-readable medium of claim 53, further comprising instructions that enable a user to define at least one role for at least one user performing at least a portion of a process step.

58. The computer-readable medium of claim 57, wherein the roles comprise at least one of certification and accreditation analyst, computer security incident response capabilities representative, privacy advocates office representative, disclosure office representative, vulnerabilities office representative, technical contingency planning document representative, request for information system originator, owner of business system, certification and accreditation request for information system coordinator, critical infrastructure protection representative, system point of contact, principal accrediting authority, certification and accreditation administrator, and certification and accreditation chief.

59. The computer-readable medium of claim 57, further comprising instructions that enable an electronic notification to be sent to one or more users performing at least a portion of a specified process step upon the occurrence of a predefined event.

60. The computer-readable medium of claim 59 wherein the predefined events comprise at least one of opening a process step, submitting a process step for approval, re-opening a process step, and approving a process step.

61. The computer-readable medium of claim 53 wherein the information collected in said element a) instructions comprises at least one of central processing unit (CPU) manufacturer, CPU clock speed, operating system (OS) manufacturer, OS version, and OS patches.

62. The computer-readable medium of claim 53, further comprising instructions that enable a user to optionally edit at least one standard, regulation and/or requirement.

63. The computer-readable medium of claim 53, wherein said scores for said element c) instructions comprise at least one of:
   a) negligible, wherein negligible indicates that the threat element is not applicable or has negligible likelihood of occurrence;
   b) low, wherein low indicates that the threat element has a relatively low likelihood of occurrence;
   c) medium, wherein medium indicates that the threat element has a medium likelihood of occurrence; and
   d) high, wherein high indicates that the threat element has a relatively high likelihood of occurrence.

64. The computer-readable medium of claim 53 wherein the scores of said element c) instructions are generated in response to one or more user provided inputs.

65. The computer-readable medium of claim 64, further comprising instructions that enable a user to modify and/or edit said scores.

66. The computer-readable medium of claim 53, wherein said element c) threat element instructions comprise at least one of natural disaster elements, system failure elements, environmental failure elements, unintentional human caused elements, and intentional human caused elements.

67. The computer-readable medium of claim 66, wherein the natural disaster threat elements comprise at least one of fire, flood, earthquake, volcano, tornado, weather, and lighting elements.

68. The computer-readable medium of claim 66, wherein the system failure threat elements comprise at least one of a hardware failure, a power failure, and a communication link failure.

69. The computer-readable medium of claim 66, wherein the environmental failure threat elements comprise at least one of temperature, power, humidity, sand, dust, shock, and vibration.

70. The computer-readable medium of claim 66, wherein the human caused unintentional threat element comprises at least one of a software design error, a system design error, and an operator error.

71. The computer-readable medium of claim 66, wherein the human caused intentional threat elements comprise actions by at least one of an authorized system administrator, an authorized maintenance personnel, an authorized user, a terrorist, a hacker, a saboteur, a thief, and a vandal.

72. The computer-readable medium of claim 53, wherein said element e) threat correlation indication instructions comprise at least one of the following scores:
   a) negligible, wherein negligible indicates that the threat is not applicable to the vulnerability;
   b) low, wherein low indicates that the threat has a low potential to exploit the vulnerability;
   c) medium, wherein medium indicates that the threat has a potential to exploit the vulnerability; and
   d) high, wherein high indicates that the threat has a relatively high potential to exploit the vulnerability.

73. The computer-readable medium of claim 72 wherein the risk assessment in said element e) instructions is determined by:
   a) for each element in the project threat profile and corresponding element in the threat correlation pattern, determining an overall risk of an element in a threat correlation indication in accordance with at least one of the following:
      (1) if a threat element score as determined in said element e) instructions is negligible and a corresponding element in the threat correlation indication as determined in said element e) instructions is anything, then the overall risk of the element is negligible;
      (2) if a threat element score as determined in said element c) instructions is low and the corresponding element in the threat correlation indication as determined in said element e) instructions is negligible, then the overall risk of the element is low;
      (3) if a threat element score as determined in said element c) instructions is low and the corresponding element in the threat correlation indication as determined in said element e) instructions is low, then the overall risk of the element is low;
      (4) if a threat element score as determined in said element c) instructions is low and the corresponding element in the threat correlation indication as determined in said element e) instructions is medium, then the overall risk of the element is low;
      (5) if a threat element score as determined in said element c) instructions is low and the corresponding element in the threat correlation indication as determined in said element e) instructions is high, then the overall risk of the element is medium;
      (6) if a threat element score as determined in said element c) instructions is medium and the corresponding element in the threat correlation indication as determined in said element e) instructions is negligible, then the overall risk of the element is negligible;
      (7) if a threat element score as determined in said element c) instructions is medium and the corresponding element in the threat correlation indication as determined in said element e) instructions is low, then the overall risk of the element is low;
      (8) if a threat element score as determined in said element c) instructions is medium and the corresponding element in the threat correlation indication as determined in said element e) instructions is medium, then the overall risk of the element is medium;
      (9) if a threat element score as determined in said element c) instructions is medium and the corresponding element in the threat correlation indication as determined in said element e) instructions is high, then the overall risk of the element is medium;
      (10) if a threat element score as determined in said element c) instructions is high and the corresponding element in the threat correlation indication as determined in said element e) instructions is negligible, then the overall risk of the element is negligible;
      (11) if a threat element score as determined in said element c) instructions is high and the corresponding element in the threat correlation indication as determined in said element e) instructions is low, then the overall risk of the element is medium;
      (12) if a threat element score as determined in said element c) instructions is high and the corresponding element in the threat correlation indication as determined in said element e) instructions is medium, then the overall risk of the element is high; and
      (13) if a threat element score as determined in said element c) instructions is high and the corresponding element in the threat correlation indication as determined in said element e) instructions is high, then the overall risk of the element is high; and
   b) selecting the risk profile for the test procedure, if that test procedure is failed, as being the highest overall risk element of at least one of instructions a)1)-a)13).

74. The computer-readable medium of claim 73, further comprising instructions that determine an overall system risk.

75. The computer-readable medium of claim 74, wherein the overall system risk is the highest overall risk element of each of one or more test procedures.

76. The computer-readable medium of claim 74, further comprising instructions that enable a user to print a documentation package that will enable a determination to be made whether the target system complies with the at least one predefined standard, regulation and/or requirement.

77. The computer-readable medium of claim 76, wherein the documentation package includes a risk assessment for at least one test procedure.

78. The computer-readable medium of claim 76, wherein the documentation package includes an overall system risk.

79. A general purpose computing system for assessing risk over a computer network having at least one target system and a server that communicates with the at least one target system via the computer network, the computing system comprising:
   a first means for:
   a) enabling a user to utilize a predefined sequence of process steps to collect and/or receive information descriptive of at least one aspect of a target system hardware and/or software, and/or a physical environment in which the system operates;
   b) generating a score for each of a plurality of threat elements, each score indicating a likelihood of that threat element affecting the target system;
   c) enabling at least one of the user and the system to test the system against at least one test procedure selected to satisfy the at least one predefined standard, regulation and/or requirement;
   d) enabling a user to enter results associated with said at least one test procedure selected in said element d) to determine whether the target system passes or fails said at least one test procedure; and
   e) (1) obtaining a threat correlation indication associated with said at least one test procedure, wherein said threat correlation indication indicates a relative potential of one or more given threats to exploit a vulnerability caused by a failure of said at least one test procedure, and
   (2) determining a risk assessment by comparing each score generated in said element c) with a corresponding threat correlation indication of said element e) (1); and
   a second means for:
   f) enabling the user to choose one or more predefined process steps associated with said element a) information and/or said element a) process steps.

80. The general purpose computing system of claim 79, further comprising enabling the user to utilize a predefined sequence of process steps for selecting at least one predefined standard, regulation and/or requirement with which the target system is to comply for purposes of certification and accreditation.

81. The general purpose computing system of claim 79, wherein said first means comprises a host computer having a first module and said second means comprises a host computer having a second module.

82. The general purpose computing system of claim 81, wherein said first module contains instructions for enabling at least one of two or more users working collaboratively via a network to select, via a local or remote terminal, at least one test procedure against which the target system is tested to satisfy the at least one predefined standard, regulation and/or requirement.

83. The system of claim 79, wherein the second means further enables the user to define an order of at least one of the prerequisite process steps.

84. The system of claim 79, wherein the second means further enables the user to define at least one role for at least one user performing at least a portion of a process step.

85. The system of claim 84, wherein the at least one role comprises at least one of certification and accreditation analyst, computer security incident response capabilities representative, privacy advocates office representative, disclosure office representative, vulnerabilities office representative, technical contingency planning document representative, request for information system originator, owner of business system, certification and accreditation request for information system coordinator, critical infrastructure protection representative, system point of contact, principal accrediting authority, certification and accreditation administrator, and certification and accreditation chief.

86. The system of claim 79, wherein the second means further enables the user to direct the system to send an electronic notification to one or more users performing at least a portion of a specified process step upon the occurrence of a predefined event.

87. The system of claim 86, wherein the predefined events comprise at least one of opening a process step, submitting a process step for approval, re-opening a process step, and approving a process step.

88. The system of claim 79, wherein a predefined mapping between said element a) information and/or said element b) process steps and the said element d) test procedures enables the system to select at least one said element d) test procedure.

89. A computer-readable medium for storing computer instructions therein, the computer-readable medium comprising instructions for assessing risk over a computer network having at least one target system and a server that communicates with the at least one target system via the computer network, the medium comprising:
   first instructions for:
   a) enabling the user to utilize a predefined sequence of process steps to collect and/or receive information descriptive of at least one aspect of a target system hardware and/or software, and/or a physical environment in which the system operates;
   b) generating a score for each of a plurality of threat elements, each score indicating a likelihood of that threat element affecting the target system with which the target system is to comply;
   c) enabling at least one of the user and the system to test the system against at least one test procedure selected to satisfy the at least one predefined standard, regulation and/or requirement;
   d) enabling a user to enter results associated with said at least one test procedure selected in said instruction element d) to determine whether the target system passes or fails said at least one test procedure; and
   e) (1) obtaining a threat correlation indication associated with said at least one test procedure, wherein said threat correlation indication indicates a relative potential of one or more given threats to exploit a vulnerability caused by a failure of said at least one test procedure, and
   (2) determining a risk assessment by comparing each score generated in said instruction element b) with a corresponding threat correlation indication of said instruction element e) (1); and
   second instructions for:
   f) enabling the user to choose one or more predefined process steps associated with said instructions element a) information.

90. The medium of claim 89, wherein said second instructions further comprise instructions that enable the user to define an order of at least one of the prerequisite process steps.

91. The medium of claim 89, wherein said second instructions further comprise instructions that enable the user to define at least one role for at least one user performing at least a portion of a process step.

92. The medium of claim 91, wherein the at least one role comprises at least one of certification and accreditation analyst, computer security incident response capabilities representative, privacy advocates office representative, disclosure office representative, vulnerabilities office representative, technical contingency planning document representative, request for information system originator, owner of business system, certification and accreditation request for information system coordinator, critical infrastructure protection representative, system point of contact, principal accrediting authority, certification and accreditation administrator, and certification and accreditation chief.

93. The medium of claim 89, wherein said second instructions further comprise instructions that enable the user to direct the system to send an electronic notification one or more users performing at least a portion of a specified process step upon the occurrence of a predefined event.

94. The medium of claim 93, wherein the predefined events comprise at least one of opening a process step, submitting a process step for approval, re-opening a process step, and approving a process step.

95. The medium of claim 89, wherein a predefined mapping between first instruction element a) information and the first instruction element c) test procedures enables the system to select at least one first instruction element c) test procedure.

96. The computer program medium storing computer instructions therein of claim 89, said first instructions further comprising instructions for:
   enabling at least one user via a local or remote terminal to utilize a predefined sequence of process steps for selecting at least one predefined standard, regulation and/or requirement with which the target system is to comply; and
   enabling at least one of two or more users working collaboratively via a network to select, via a local or remote terminal, at least one test procedure against which the target system is tested to satisfy the at least one predefined standard, regulation and/or requirement.

97. A system for assessing risk over a computer network having at least one target system and a server that communicates with the at least one target system via the computer network, the server comprising:
   means for enabling at least one user via a local or remote terminal to utilize a predefined sequence of process steps to collect and/or receive information descriptive of at least one aspect of a target system hardware and/or software, and/or a physical environment in which the target system operates;
   means for enabling at least one user via a local or remote terminal to utilize a predefined sequence of process steps for selecting at least one predefined standard, regulation and/or requirement with which the target system is to comply;
   at least one storage medium for storing thereon:
      (i) at least one predefined standard, regulation and/or requirement with which the segment is to comply; and
      (ii) data pertaining to at least one platform category, each platform category having associated therewith one or more devices having at least a hardware specification and an operating system; and
   decision logic for determining which test procedures will be used to test each of the at least one platform category based on a mapping between the test procedures and the at least one predefined standard, regulation and/or requirement.

98. The system of claim 97, further comprising a printer for printing the one or more test procedures.

99. The system of claim 97, wherein the target system information comprises at least one of an IP address, a hostname, a media access control address, operating system name, operating system version.

100. The system of claim 99, wherein the information further comprises at least one of application software, hard disk drive capacity, device manufacturer, and device model.

101. A system for assessing risk over a computer network having at least one target system and a server that communicates with the at least one target system via the computer network, the server comprising:
   means for enabling at least one user via a local or remote terminal to utilize a predefined sequence of process steps to collect and/or receive information descriptive of at least one aspect of a target system hardware and/or software, and/or a physical environment in which the system operates;
   means for enabling at least one user via a local or remote terminal to utilize a predefined sequence of process steps for selecting at least one predefined standard, regulation and/or requirement with which the target system is to comply;
   a storage medium for storing the at least one predefined standard, regulation and/or requirement with which the target system is to comply;
   a plurality of information entities, each of said plurality of information entities storing data pertaining to at least one platform category, each platform category defining one or more devices having at least a hardware specification and an operating system; and
   decision logic for determining which of one or more test procedures will be used to test each platform category based on a mapping between the test procedures and the at least one predefined standard, regulation and/or requirement.

102. The system of claim 101, wherein said plurality of information entities comprise relational database tables.

103. The system of claim 102, wherein said relational database tables comprise tables for defining:
   a) each of the at least one platform category;
   b) each of the at least one device;
   c) each application program;
   d) each defined association between an application program and a platform category, wherein each such association indicates that the application program is typically installed on devices belonging to the platform category; and
   e) each defined association between an application program and a device, wherein each such association indicates that the application program is actually installed on the device; and
   f) each standard operating system.

104. A method of assessing risk over a computer network having at least one target system and a server that communicates with the at least one target system via the computer network, the server performing the method comprising the steps of:
   a) enabling at least one user via a local or remote terminal to utilize a predefined sequence of process steps to collect and/or receive information descriptive of at least one aspect of the target system hardware and/or software, and/or a physical environment in which the system operates;
b) enabling at least one user via a local or remote terminal to utilize a predefined sequence of process steps for selecting at least one predefined standard, regulation and/or requirement with which the target system is to comply;
c) associating hardware and/or software information pertaining to the at least one device, collected in said step a), with at least one pre-defined platform category;
d) for each of said at least one platform category, determining which of one or more test procedures will be used to test hardware and/or software associated with said at least one platform category based on a mapping between the test procedures and the at least one predefined standard, regulation and/or requirement; and
e) generating at least one test procedure as determined in said step d) for each platform category.

105. A system for assessing risk over a computer network having at least one target system and a server that communicates with the at least one target system via the computer network, the server comprising:
 a) a discovery engine that scans a target system for a hardware configuration, operating system and/or application programs of each of at least one device in the target system;
 b) at least one storage medium for storing thereon:
  (i) at least one predefined standard, regulation and/or requirement with which the target system is to comply, and
  (ii) data pertaining to at least one platform category, each platform category having associated therewith one or more devices having at least a hardware specification and an operating system; and
 c) decision logic for determining which of zero or more test procedures will be used to test each of the at least one platform category based on a mapping between the test procedures and the at least one predefined standard, regulation and/or requirement.

* * * * *